United States Patent
Josephson et al.

(10) Patent No.: US 10,263,967 B2
(45) Date of Patent: Apr. 16, 2019

(54) APPARATUSES, SYSTEMS AND METHODS FOR CONSTRUCTING UNIQUE IDENTIFIERS

(71) Applicant: Quantum Interface, LLC, Austin, TX (US)

(72) Inventors: Jonathan Josephson, Austin, TX (US); Robert W. Strozier, Houston, TX (US)

(73) Assignee: Quantum Interface, LLC, Austin, TX (US)

( * ) Notice: Subject to any disclaimer, the term of this patent is extended or adjusted under 35 U.S.C. 154(b) by 41 days.

(21) Appl. No.: 15/255,107

(22) Filed: Sep. 1, 2016

(65) Prior Publication Data

US 2017/0180336 A1  Jun. 22, 2017

Related U.S. Application Data

(60) Provisional application No. 62/212,706, filed on Sep. 1, 2015.

(51) Int. Cl.
| | | |
|---|---|---|
| G06F 21/00 | (2013.01) | |
| H04L 29/06 | (2006.01) | |
| G06F 21/32 | (2013.01) | |
| G06F 3/01 | (2006.01) | |
| G06F 3/0482 | (2013.01) | |
| G06F 3/0485 | (2013.01) | |

(Continued)

(52) U.S. Cl.
CPC ............ *H04L 63/06* (2013.01); *G06F 3/011* (2013.01); *G06F 3/015* (2013.01); *G06F 3/017* (2013.01); *G06F 3/0482* (2013.01); *G06F 3/0485* (2013.01); *G06F 3/0488* (2013.01); *G06F 21/32* (2013.01); *G06K 9/00335* (2013.01); *G06K 9/00892* (2013.01); *H04L 63/083* (2013.01); *H04L 63/0861* (2013.01); *H04W 12/06* (2013.01)

(58) Field of Classification Search
None
See application file for complete search history.

(56) References Cited

U.S. PATENT DOCUMENTS

| 7,831,932 B2 | 11/2010 | Josephson |
|---|---|---|
| 7,861,188 B2 | 12/2010 | Josephson |

(Continued)

FOREIGN PATENT DOCUMENTS

| WO | 2013-095677 A1 | 6/2013 |
|---|---|---|
| WO | 2015-028916 A1 | 3/2015 |

OTHER PUBLICATIONS

Bao, Shu-Di, et al. Using the Timing Information of Heartbeats as an Entity Identifier to Secure Body Sensor Network. IEEE Transactions on Information Technology in Biomedicine, vol. 12, Issue: 6. https://ieeexplore.ieee.org/stamp/stamp.jsp?tp=&arnumber=4534350 (Year: 2008).*

(Continued)

*Primary Examiner* — Jeremiah L Avery
(74) *Attorney, Agent, or Firm* — Robert W. Strozier

(57) ABSTRACT

An apparatus for producing unique user specific identifiers including capturing user specific biometric data, kinetic data, biokinetic data, kinetic data and biometric data, biokinetic data and biometric data, and kinetic data, biokinetic data and biometric data and generating unique user specific identifiers.

32 Claims, 53 Drawing Sheets

(51) Int. Cl.
 *G06F 3/0488* (2013.01)
 *G06K 9/00* (2006.01)
 *H04W 12/06* (2009.01)

(56) References Cited

U.S. PATENT DOCUMENTS

| | | | |
|---|---|---|---|
| 8,788,966 B2 | 7/2014 | Josephson | |
| 9,101,279 B2* | 8/2015 | Ritchey | G16H 40/63 |
| 2008/0030005 A1 | 2/2008 | Wang | |
| 2008/0034331 A1 | 2/2008 | Josephson et al. | |
| 2010/0134425 A1 | 6/2010 | Storrusten | |
| 2011/0043443 A1 | 2/2011 | Kawano et al. | |
| 2011/0055773 A1 | 3/2011 | Agarawala et al. | |
| 2011/0221974 A1 | 9/2011 | Stern et al. | |
| 2011/0289456 A1 | 11/2011 | Reville et al. | |
| 2012/0050157 A1 | 3/2012 | Latta et al. | |
| 2012/0216143 A1 | 8/2012 | Shiplacoff et al. | |
| 2013/0135194 A1 | 5/2013 | Josephson | |
| 2013/0346168 A1* | 12/2013 | Zhou | G06F 1/163 705/14.4 |
| 2014/0005037 A1 | 1/2014 | Burdeniuc et al. | |
| 2014/0016820 A1 | 1/2014 | Roberts et al. | |
| 2014/0337243 A1* | 11/2014 | Dutt | G06Q 50/265 705/325 |
| 2015/0015391 A1 | 1/2015 | Pimentel | |
| 2015/0049083 A1* | 2/2015 | Bidne | G06T 19/006 345/420 |
| 2015/0153913 A1* | 6/2015 | Ballard | H04W 76/10 715/727 |
| 2015/0242601 A1* | 8/2015 | Griffiths | G06F 21/305 726/5 |
| 2015/0242605 A1* | 8/2015 | Du | G06F 21/32 726/7 |
| 2017/0236407 A1* | 8/2017 | Rhoads | G06F 17/30241 455/420 |

OTHER PUBLICATIONS

Zhang, Guang-He, et al. Analysis of Using Interpulse Intervals to Generate 128-Bit Biometric Random Binary Sequences for Securing Wireless Body Sensor Networks.IEEE Transactions on Information Technology in Biomedicine, vol. 16, Issue: 1.https://ieeexplore.ieee.org/stamp/stamp.jsp?tp=&arnumber=6062679 (Year: 2011).*

Lu, Yang; Bao, Shu-Di. Efficient Fuzzy Vault Application in Node Recognition for Securing Body Sensor Networks. 2014 IEEE International Conference on Communications (ICC). https://ieeexplore.ieee.org/stamp/stamp.jsp?tp=&arnumber=6883888 (Year: 2014).*

Jan. 25, 2017 PCT ISR WO PCT/US2014/058706.

* cited by examiner

APPARATUSES, SYSTEMS AND METHODS FOR CONSTRUCTING UNIQUE IDENTIFIERS

RELATED APPLICATIONS

The present disclosure claims priority to and the benefit of U.S. Provisional Patent Application Ser. No. 62/212,706 filed Sep. 1, 2015 (1 Sep. 2015) and U.S. Provisional Patent Application Ser. No. 62/311,883 filed Mar. 22, 2016 (22 Mar. 2016). The present disclosure is also related U.S. patent application Ser. No. 14/504,391 filed Oct. 1, 2014 (1 Oct. 2014).

BACKGROUND OF THE INVENTION

1. Field of the Invention

Embodiments of the present disclosure relate to apparatuses, systems, and methods implemented on processing units, processing systems, distributed processing systems, and/or distributing processing environments, where the apparatuses, systems, and methods create unique kinetic and/or biokinetic identifiers (IDs) such as kinetic and/or biokinetic passwords, verifiers, authenticators, any other user identifier, or mixtures and combinations thereof.

More particularly, embodiments of this disclosure relate to apparatuses, systems, and methods implemented on a processing unit, processing system, distributed processing system or distributing processing environment, where the apparatuses, systems, and methods create unique kinetic and/or biokinetic identifiers (IDs) such as kinetic and/or biokinetic signatures, passwords, verifiers, authenticators, any other user identifier, or mixtures and combinations thereof and where the kinetic identifiers include user specific kinetic/motion data, while the biokinetic identifiers include user specific biometric data and user specific kinetic/motion data so that the kinetic and biokinetic identifiers are unique to each user and are more difficult to hack, replicate, or counterfeit.

2. Description of the Related Art

Many user identification, authentication, and verification software processes have been designed and implemented on processing units, processing systems, distributed processing systems, and/or distributing processing environments. We currently use varieties of these procedures every time we log into any computer system. Some methods have integrated some aspects of keyboard or writing data and kinetic data associated with keyboard entry or writing. See for example, patent applications for biokinetic signatures, using a pen to recognize a person's hand-written signature WO2006085783A1 and WO2011112113A1.

Recently, motion based interfaces have been disclosed. These interfaces use motion as the mechanism for viewing, scrolling, selecting, differentiating, and activating virtual and/or real objects and/or attributes associated therewith. These interfaces have broadly disclosed the use of motion in security system. While many user identification, authentication, and verification software processes have been implemented, all are vulnerable to hacking, counterfeiting or theft for nefarious uses, thus there is a need in the art for unique user identifiers that have improved and increased security and reduced risk of hacking, counterfeiting or theft.

SUMMARY OF THE INVENTION

Kinetic/Biokinetic Systems

Embodiments of the disclosure provide systems including: (a) a sensor subsystem including one or a plurality of biometric sensors, one or a plurality of motion sensors, and/or one or a plurality of biokinetic sensors, (b) a processing subsystem including one or a plurality of processing units, and (c) an interface subsystem including one or a plurality of user interfaces having one or a plurality of display devices or other human or animal cognizable output devices. The systems of this disclosure collect and/or capture biometric data, motion/kinetic data and/or biokinetic data to produce or generate unique kinetic and/or biokinetic user specific identifiers. The user specific data includes: (a) kinetic data associated with the whole, a part or a plurality of parts of an animal or human body or object(s) under the control of the animal or the human, (b) biometric data associated with the whole, a part or a plurality of parts of an animal or human body, (c) biokinetic data associated with the whole, a part or a plurality of parts of an animal or human body or object(s) under the control of the animal or the human, or (d) mixtures or combination thereof.

Control Systems

Embodiments of the present disclosure also provide control systems for controlling real and/or virtual objects such as electrical devices, hardware devices, software systems, programs, objects, and/or elements, where the systems convert movement/motion into commands for controlling the real and/or virtual objects, where the movement/motion includes linear and/or non-linear motion, linear and/or non-linear velocity, linear and/or non-linear acceleration, changes in linear and/or non-linear motion, changes in linear and/or non-linear velocity, changes in linear and/or non-linear acceleration, rates of change in linear and/or non-linear direction, rates of change in linear and/or non-linear velocity, rates of change of linear and/or non-linear acceleration, and/or mixtures or combinations thereof. The changes in linear and/or non-linear direction, velocity, and/or acceleration may also include stops and/or timed holds in conjunction with the changes in direction, velocity and/or acceleration.

Methods of Forming User Identifiers

Embodiments of the disclosure provide methods implemented on a processing unit including the step of capturing biometric data via the biometric sensors and/or kinetic/motion data via the motion sensors and/or biokinetic data via the bio-kinetic sensors and creating a unique kinetic or biokinetic user identifier. One, some or all of the biometric sensors and/or the motion sensors may be the same or different.

Method for Using the Control Systems

Embodiments of the present disclosure provide methods implemented on a processing unit for using the unique identifiers of this disclosure including the step of activating a system of this disclosure, opening an application, activating a login protocol, submitting a kinetic and/or biokinetic identifier of this disclosure to the application, verifying the login, and launching the application.

User Interfaces of this Disclosure

Embodiments of the present disclosure also provide user interface apparatuses including at least one motion sensor, sensor array, sensing component and/or mixture thereof, at least one processing unit and/or at least one motion sensor processing unit, one or a plurality of display devices or other human or animal cognizable output devices, and at least one communication hardware and software component, where the communication component interconnects the sensors, sensor arrays, sensing components and the processing units. The interface apparatuses of this disclosure collect and/or capture biometric data, motion/kinetic data and/or biokinetic data to produce or generate unique kinetic and/or biokinetic user specific identifiers. The user specific data includes: (a) kinetic data associated with the whole, a part or a plurality of parts of an animal or human body or object(s) under the control of the animal or the human, (b) biometric data associated with the whole, a part or a plurality of parts of an animal or human body, (c) biokinetic data associated with the whole, a part or a plurality of parts of an animal or human body or object(s) under the control of the animal or the human, or (d) mixtures or combination thereof.

Methods for Using the User Interface Apparatuses

Embodiments of the present disclosure provide methods implemented on a processing unit including the step of capturing biometric data via the biometric sensors and/or kinetic/motion data via the motion sensors and/or biokinetic data via the bio-kinetic sensors and creating a unique kinetic or biokinetic user identifier. One, some or all of the biometric sensors and/or the motion sensors may be the same or different.

Unique Identifiers

Embodiments of the disclosure provide unique kinetic and/or biokinetic identifiers such as signatures, verifiers, identifiers, and/or authenticators, where the kinetic identifiers include user specific kinetic or motion data and the biokinetic identifiers include user specific biometric data, kinetic or motion data, and/or biokinetic data.

BRIEF DESCRIPTION OF THE DRAWINGS

The disclosure can be better understood with reference to the following detailed description together with the appended illustrative drawings in which like elements are numbered the same.

Control Apparatuses, Systems, and Methods

Unique Identifier Apparatuses and Systems

Figure 7A:
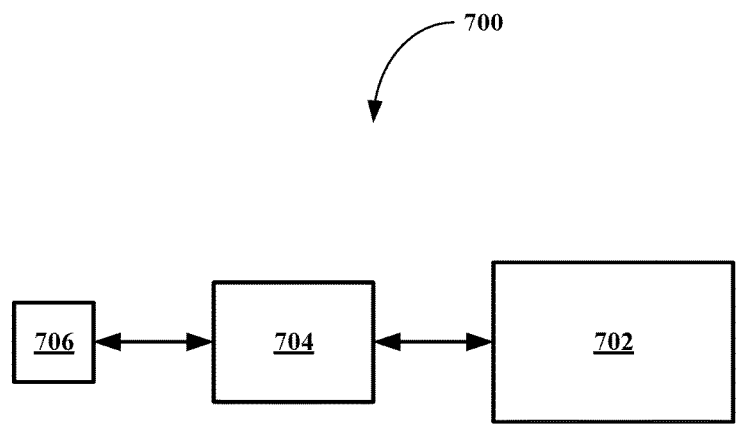
Figure 7B:
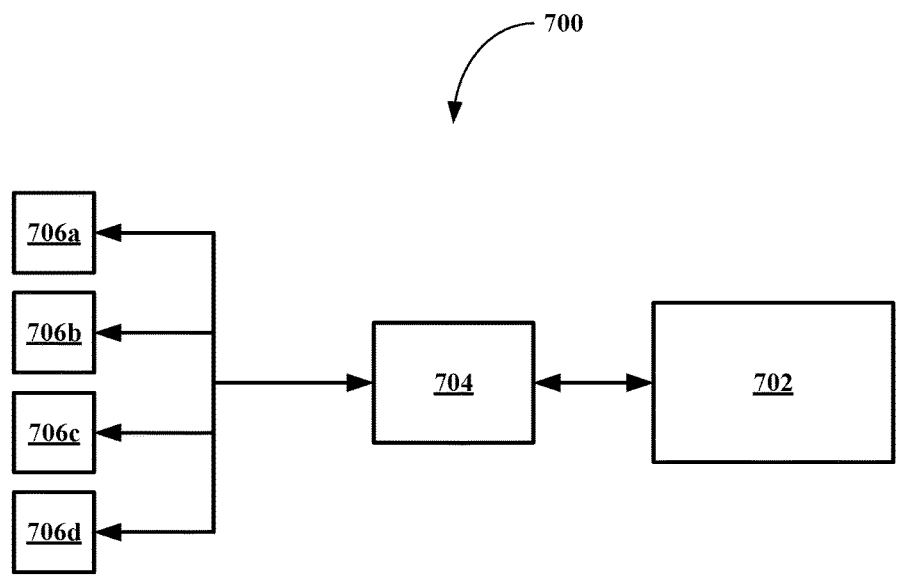
Figure 7C:
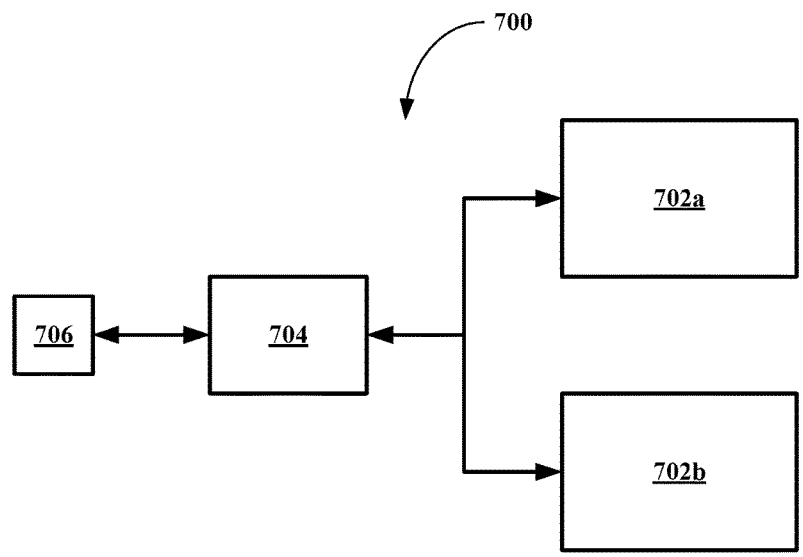
Figure 7D:
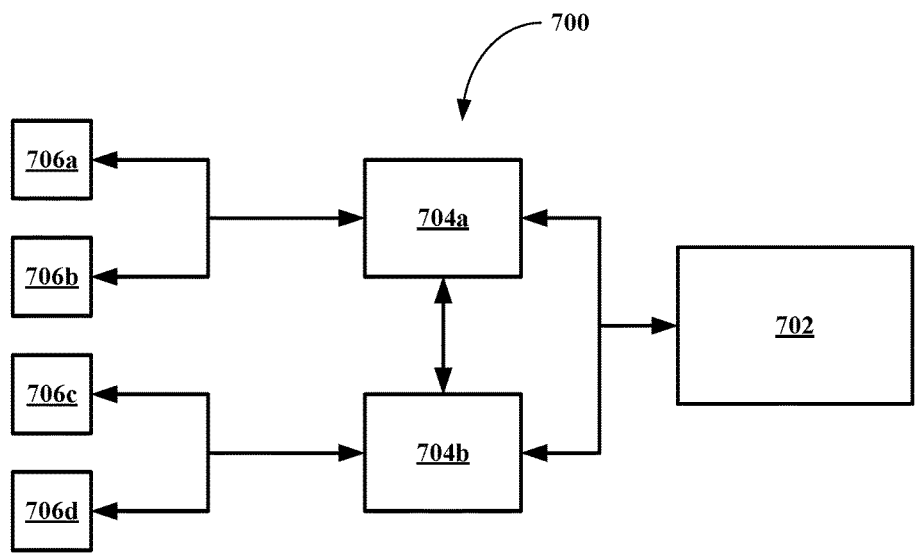
Figure 7E:
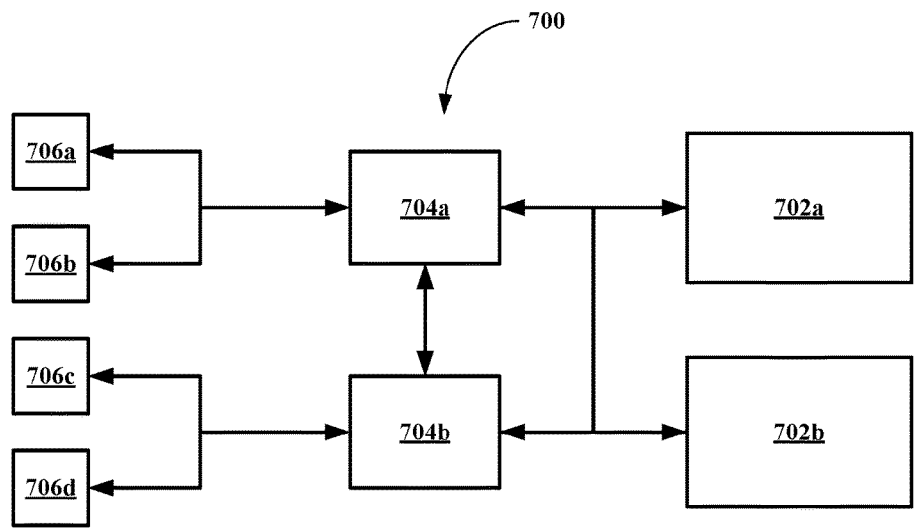
Figure 7F:
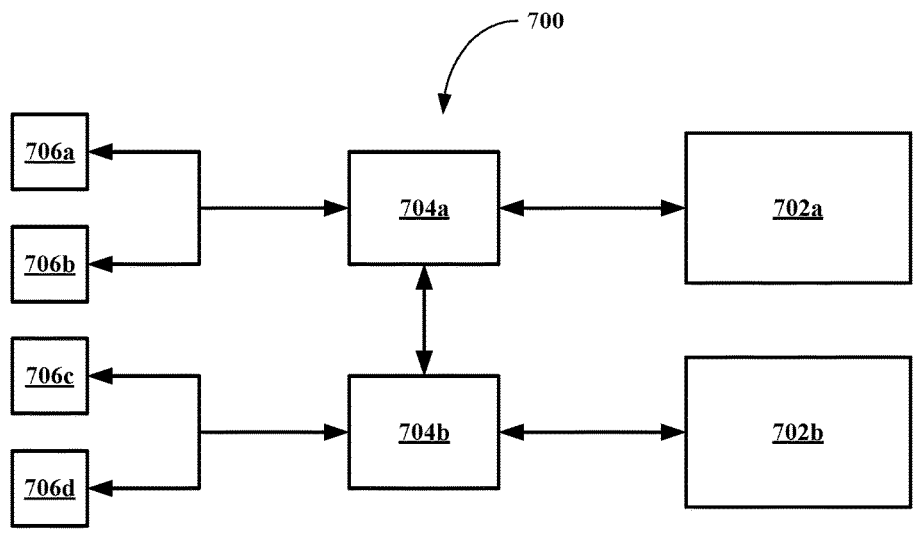
Figure 7G:
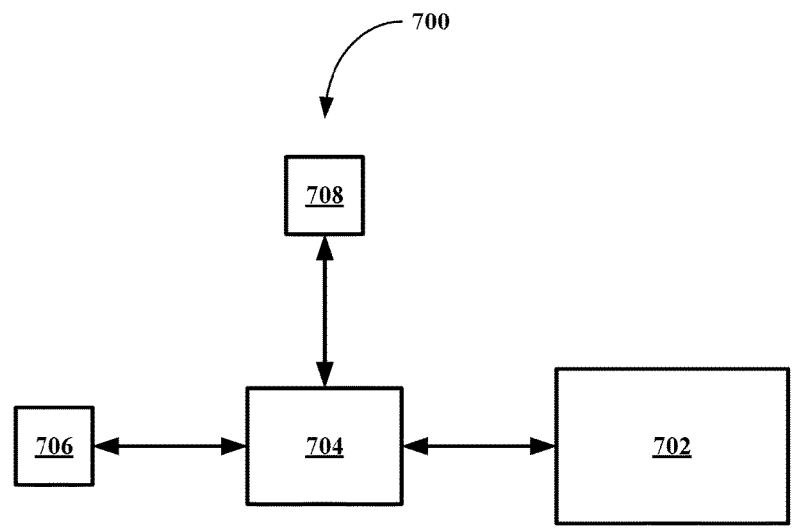
Figure 7H:
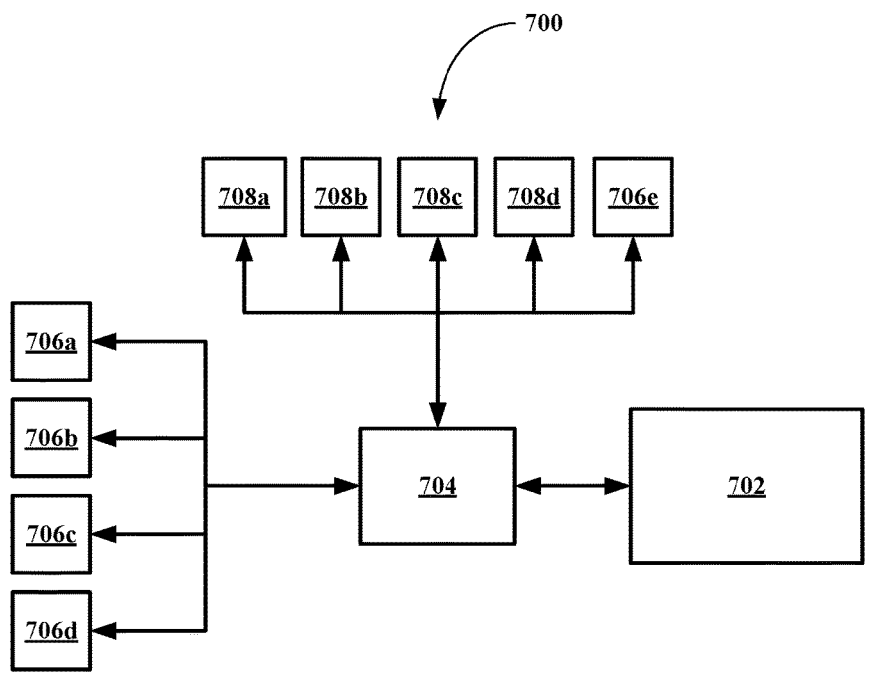
Figure 7I:
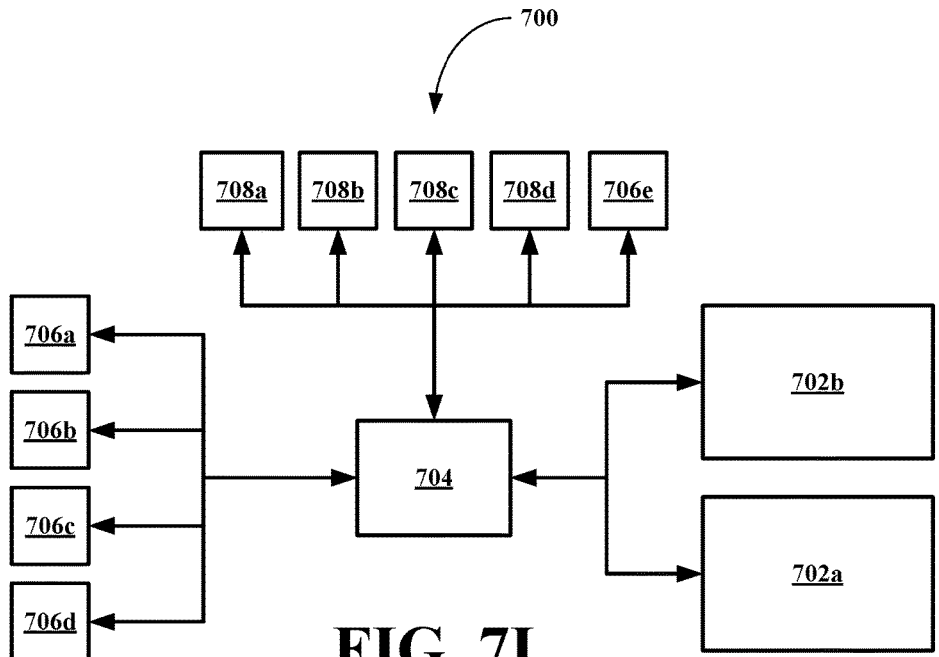
Figure 7J:
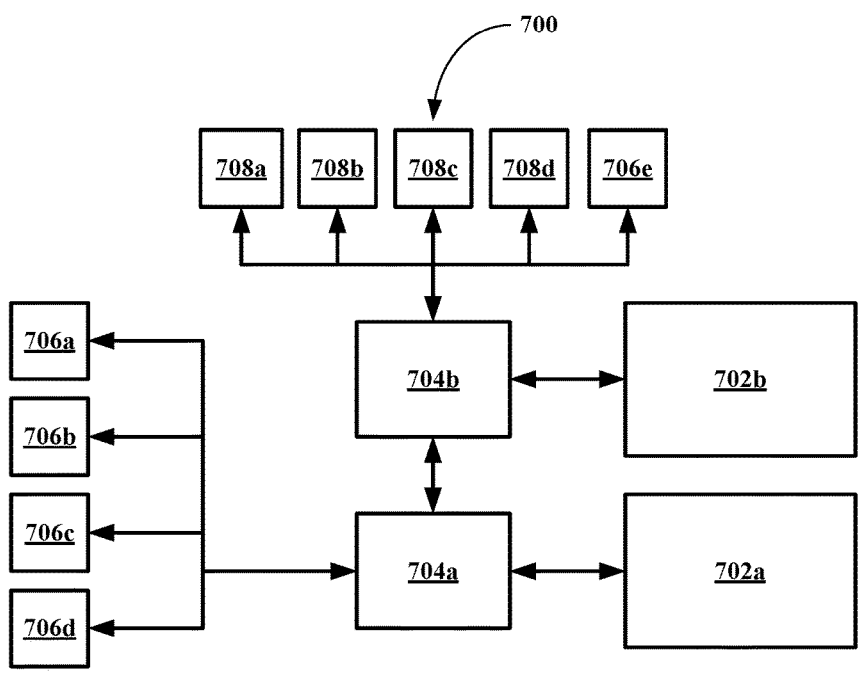
Figure 7K:
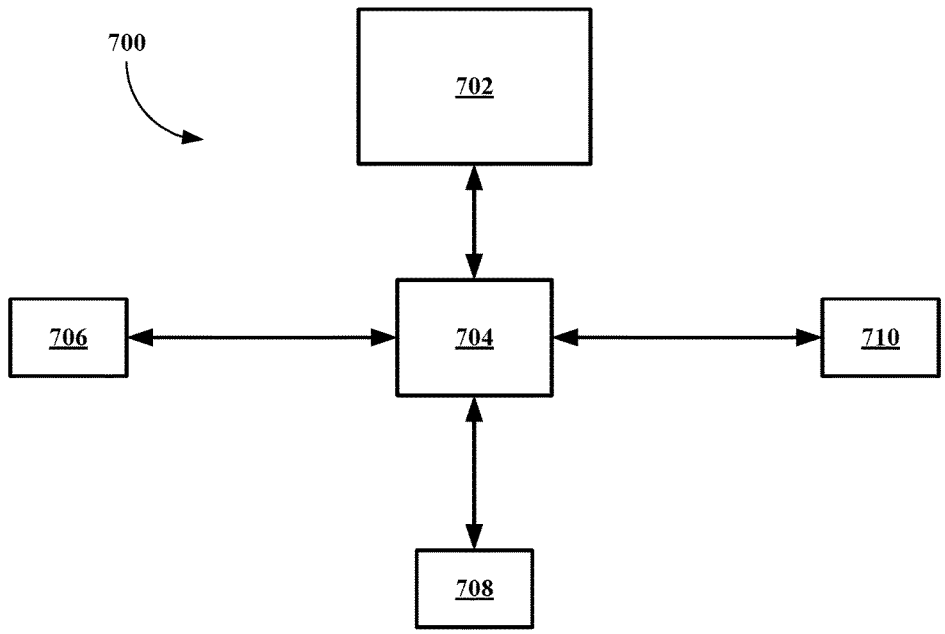
Figure 7L:
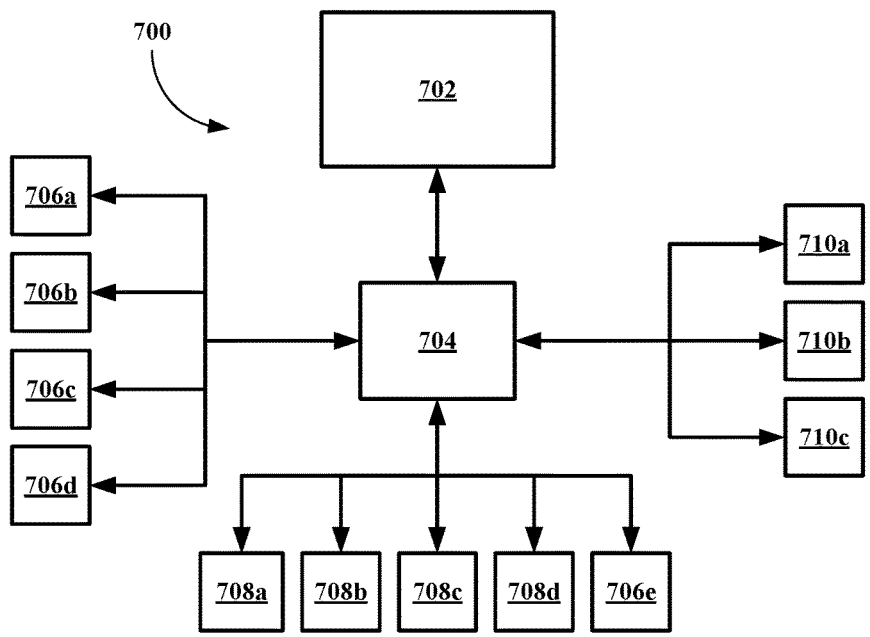
Figure 7M:
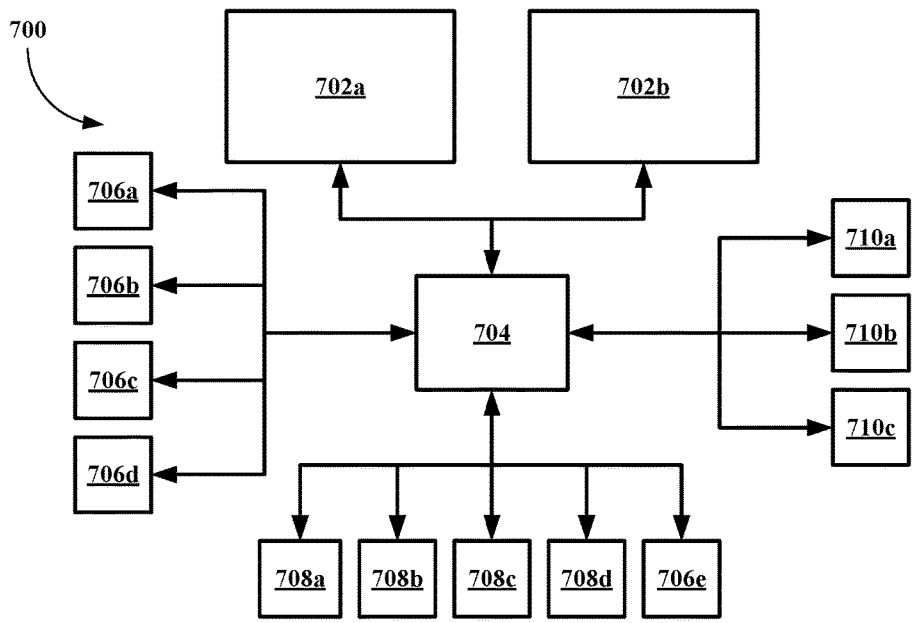
Figure 7N:
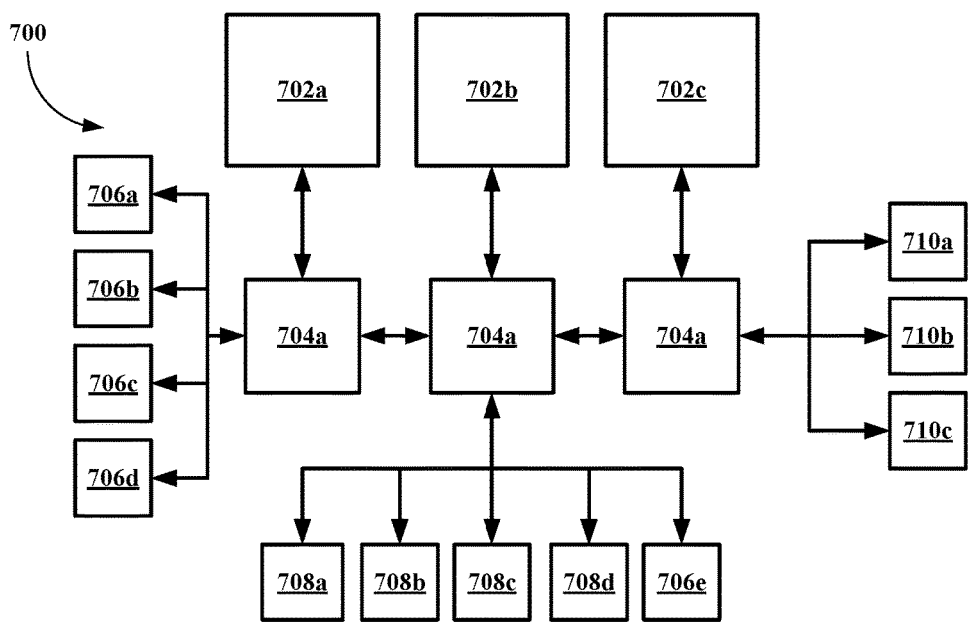
Figure 7O:
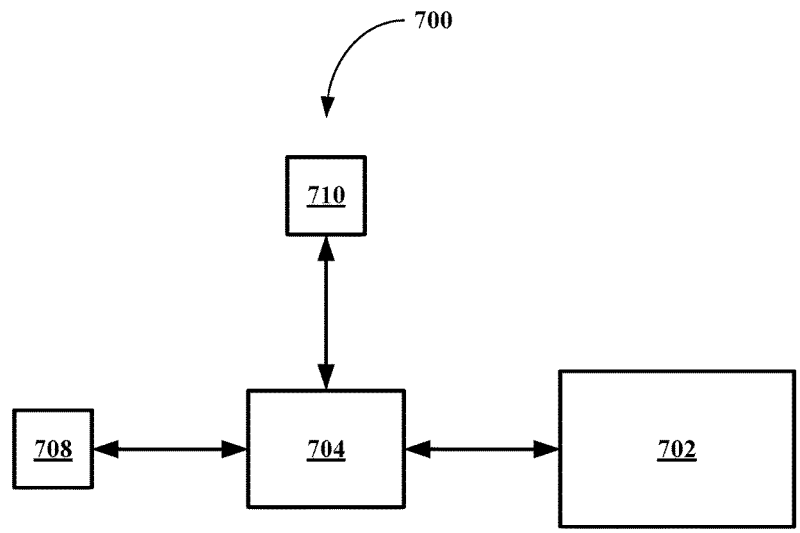
Figure 7P:
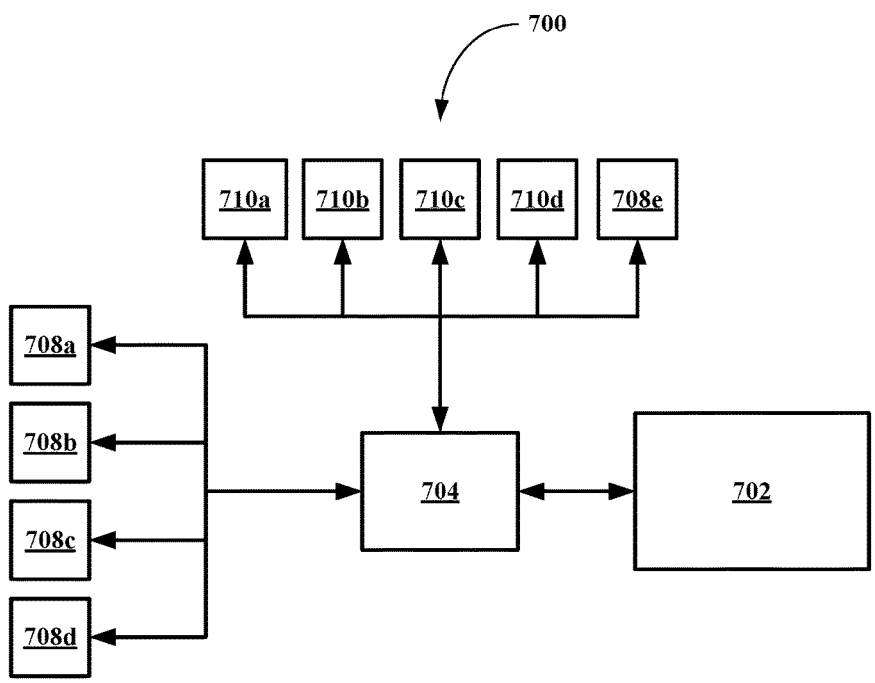
Figure 7Q:
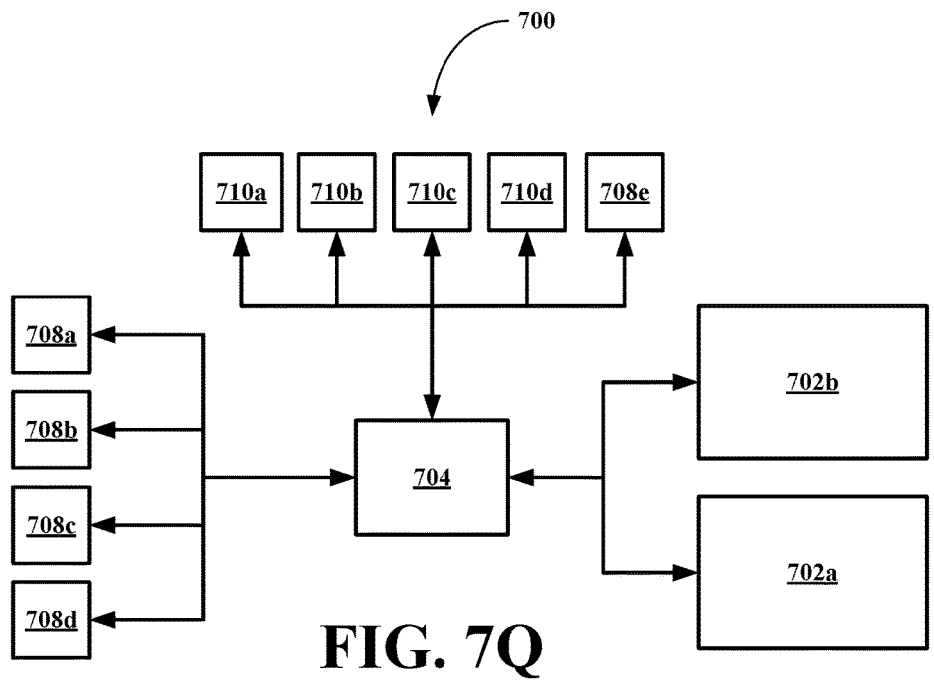
Figure 7R:
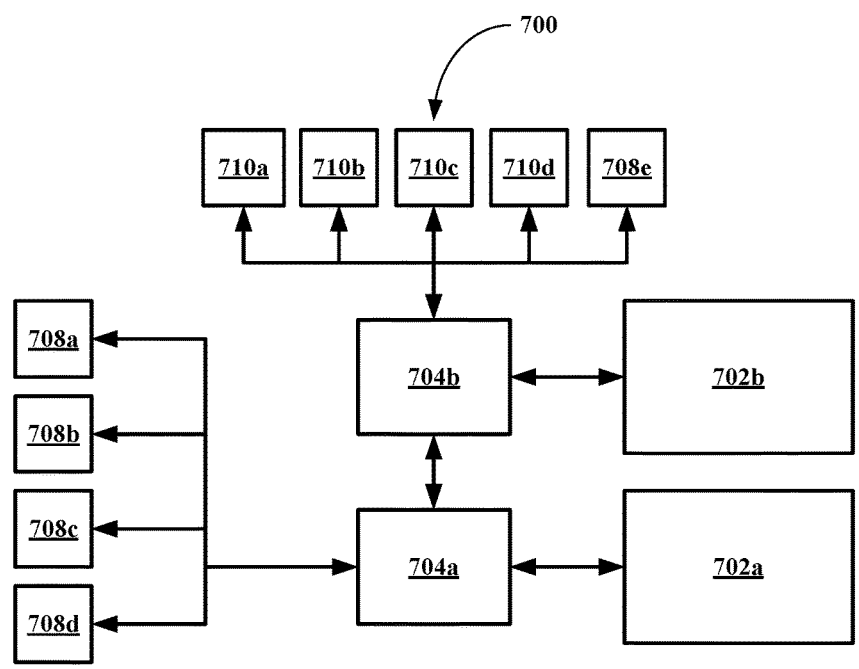

FIGS. 7A-R depict embodiments of unique identifier apparatuses/systems of this disclosure for producing unique identifiers.

Unique Identifier Methods

FIGS. 8-14 depict embodiments of identifier methods of this disclosure for producing unique identifiers and embodiments of uniqueness tests.

Types of Data Collection

Figure 15A:
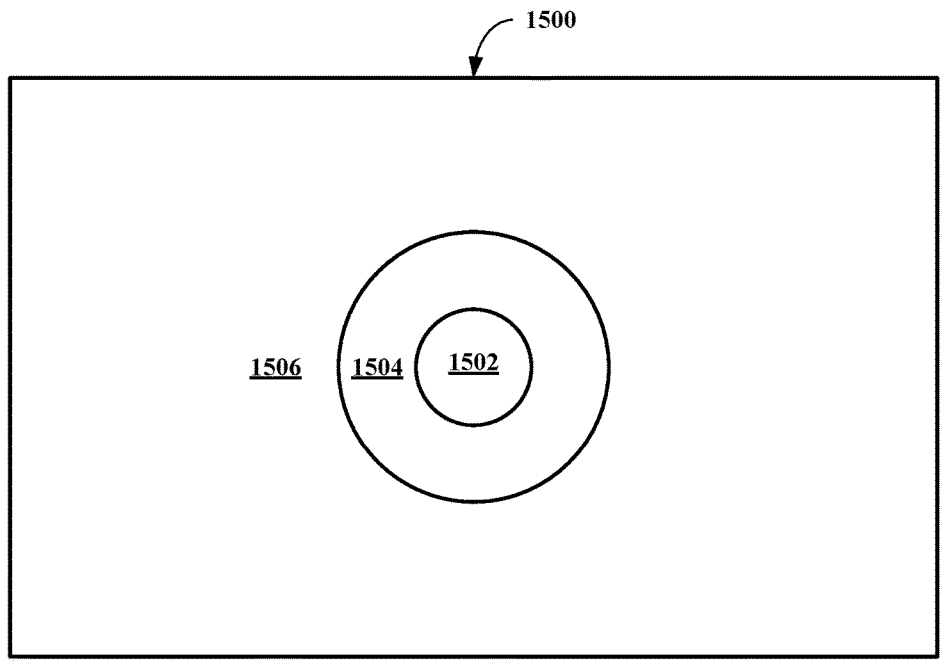
Figure 15B:
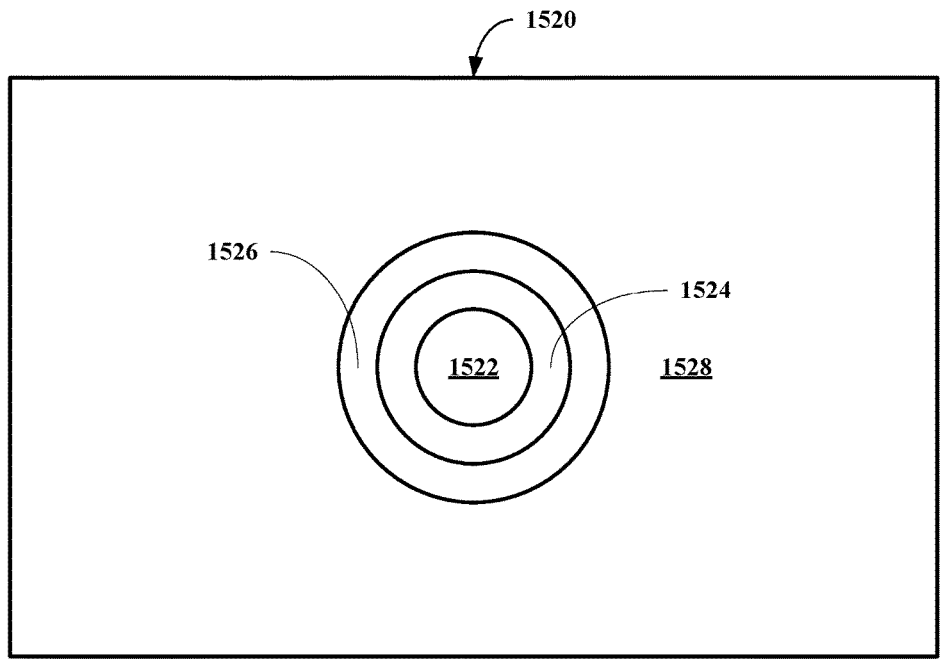

FIGS. 15A-B depict embodiments of data capture on a touch sensitive sensor or sensor device.

Figure 16A:
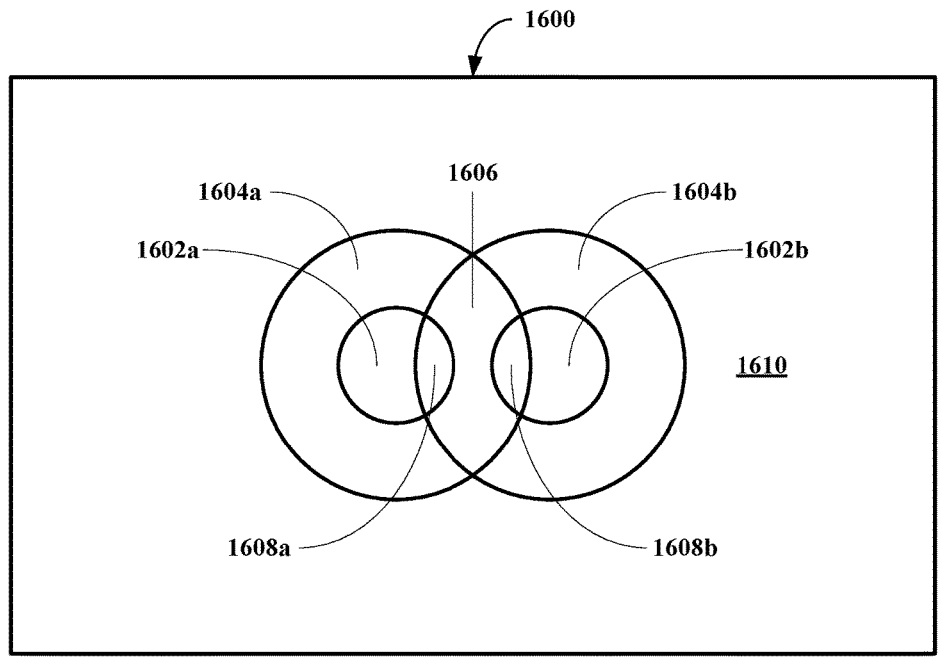
Figure 16B:
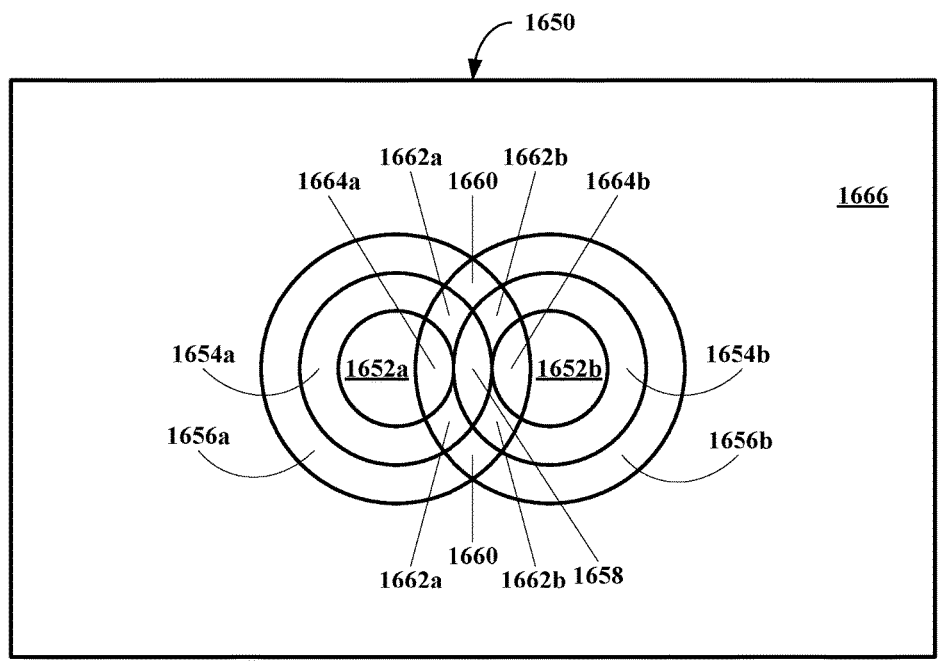

FIGS. 16A-B depict embodiments of data capture on a touch sensitive sensor or sensor device.

Figure 17:
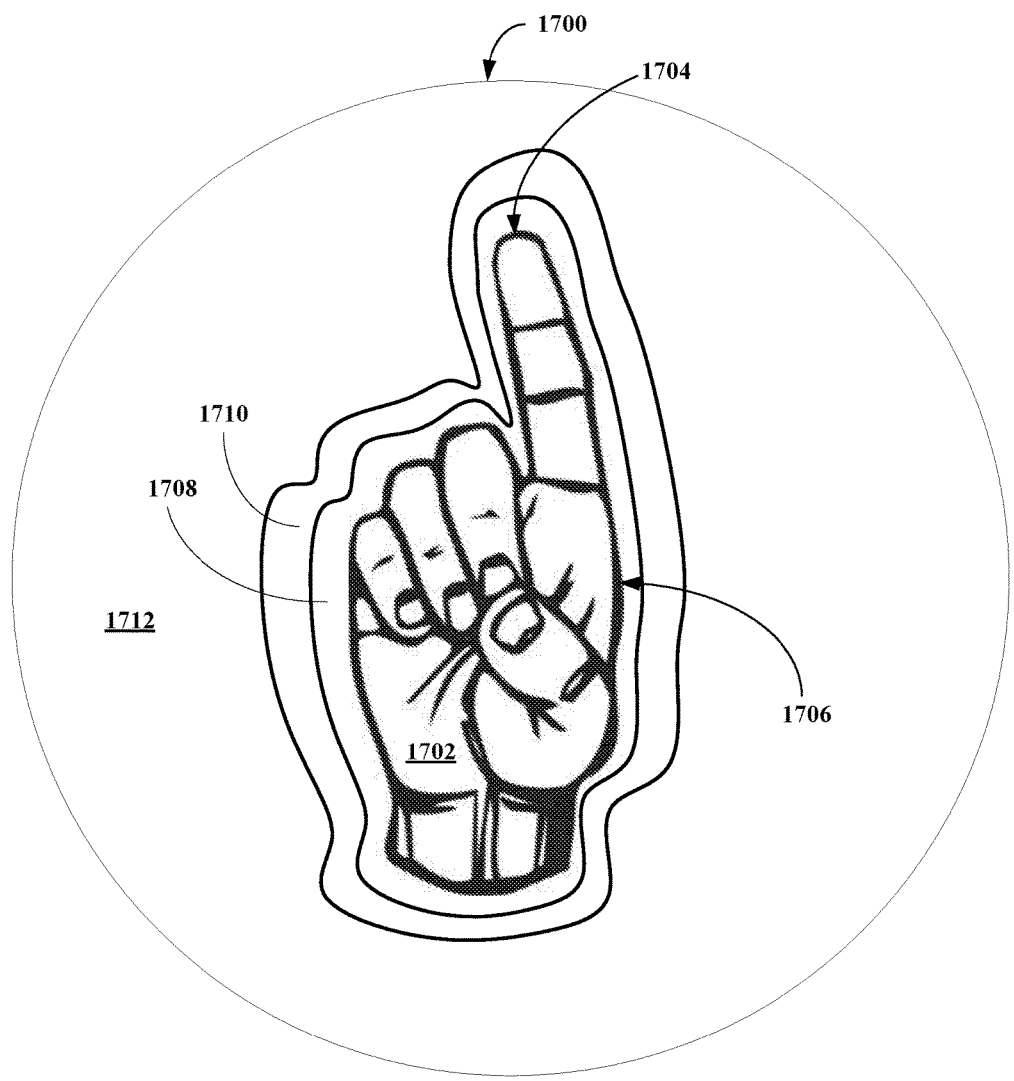

FIG. 17 depicts an embodiment of data capture on from an image capturing sensor or device.

Figure 18:
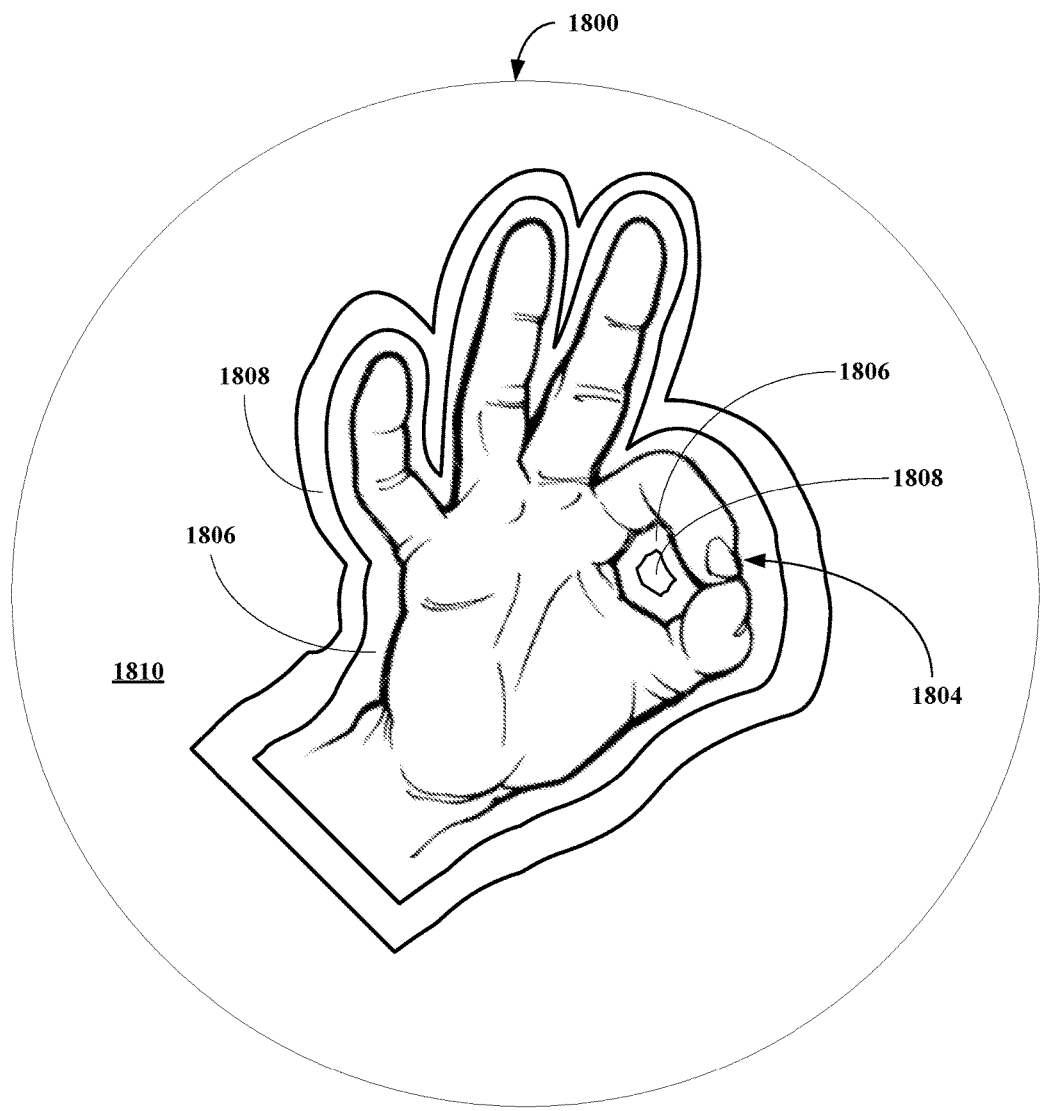

FIG. 18 depicts an embodiment of data capture on from an image capturing sensor or device.

Blob Data Collection

FIGS. 19A-H depict an embodiment of blob data capture.

FIGS. 20A-H depict another embodiment of blob data capture.

DEFINITIONS USED IN THE INVENTION

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

The term "kinetic", "motion" or "movement" are often used interchangeably and mean motion or movement that is capable of being detected by a motion sensor or motion sensing component within an active zone of the sensor such as a sensing area or volume of a motion sensor or motion sensing component. "Kinetic" also includes "kinematic" elements, as included in the study of dynamics or dynamic motion. Thus, if the sensor is a forward viewing sensor and is capable of sensing motion within a forward extending conical active zone, then movement of anything within that active zone that meets certain threshold detection criteria, will result in a motion sensor output, where the output may include at least direction, velocity, and/or acceleration. Of course, the sensors does not need to have threshold detection criteria, but may simply generate output anytime motion or any nature is detected. The processing units can then determine whether the motion is an actionable motion or movement and a non-actionable motion or movement.

The term "motion sensor" or "motion sensing component" means any sensor or component capable of sensing motion of any kind by anything within an active zone—area or volume, regardless of whether the sensor's or component's primary function is motion sensing.

The term "biometric sensor" or "biometric sensing component" means any sensor or component capable of acquiring biometric data.

The term "bio-kinetic sensor" or "bio-kinetic sensing component" means any sensor or component capable of simultaneously or sequentially acquiring biometric data and kinetic data (i.e., sensed motion of any kind) by anything moving within an active zone of a motion sensor, sensors, array, and/or arrays—area or volume, regardless of whether the primary function of the sensor or component is motion sensing.

The term "real object" or "real world object" means any real world device or article that is capable of being controlled by a processing unit. Real objects include objects or articles that have real world presence including physical, mechanical, electro-mechanical, magnetic, electro-magnetic, electrical, or electronic devices or any other real world device that can be controlled by a processing unit.

The term "virtual object" means any construct generated in a virtual world or by a computer and displayed by a display device and that are capable of being controlled by a processing unit. Virtual objects include objects that have no real world presence, but are still controllable by a processing unit, or may include virtual representations of real objects. These objects include elements within a software system, product or program such as icons, list elements, menu elements, generated graphic objects, 2D and 3D graphic images or objects, generated real world objects such as generated people, generated animals, generated devices, generated plants, generated landscapes and landscape objects, generate seascapes and seascape objects, generated skyscapes or skyscape objects, or any other generated real world or imaginary objects. Haptic, audible, and other attributes may be associated with these virtual objects in order to make them more like "real" objects.

The term "at least one" means one or more or one or a plurality, additionally, these three terms may be used interchangeably within this application. For example, at least one device means one or more devices or one device and a plurality of devices.

The term "mixtures" mean the objects, data or anything else is mixed together, not segregated, but more or less collected randomly—uniform or homogeneous.

The term "combinations" mean the objects, data or anything else segregated into groups, packets, bundles, etc., —non-uniform or inhomogeneous.

The term "sensor data" mean data derived from at least one sensor including user data, motion data, environment data, temporal data, contextual data, or other data derived from any kind of sensor or environment, in real time of historically, or mixtures and combinations thereof.

The term "user data" mean user attributes, attributes of entities under the control of the user, attributes of members under the control of the user, information or contextual information associated with the user, or mixtures and combinations thereof.

The term "motion data" mean data evidencing one or a plurality of motion attributes.

The term "motion attributes" mean attributes associated with the motion data including motion direction (linear, curvilinear, circular, elliptical, etc.), motion velocity (linear, angular, etc.), motion acceleration (linear, angular, etc.), motion signature—manner of motion (motion characteristics associated with the user, users, objects, areas, zones, or combinations of thereof), motion as a product of distance traveled over time, dynamic motion attributes such as motion in a given situation, motion learned by the system based on user interaction with the system, motion characteristics based on the dynamics of the environment, changes in any of these attributes, and mixtures or combinations thereof.

The term "environment data" mean data associated with the user's surrounding or environment such as location (GPS, etc.), type of location (home, office, store, highway, road, etc.), extent of the location, context, frequency of use or reference, any data associated with any environment, and mixtures or combinations thereof.

The term "temporal data" mean data associated with time, time of day, day of month, month of year, any other temporal data, and mixtures or combinations thereof.

The term "contextual data" mean data associated with user activities, environment activities, environmental states, frequency of use or association, orientation of objects, devices or users, association with other devices and systems, temporal activities, and mixtures or combinations thereof.

The term "biometric data" means any data that relates to specific characteristics, features, aspects, attributes etc. of a primary entity, a secondary entity under the control of a primary entity, or a real world object under the control of a primary or secondary entity. For entities, the data include, without limitation, fingerprints, palm prints, foot prints, toe prints, retinal patterns, internal and/or external organ shapes, features, colorings, shadings, textures, attributes, etc., skeletal shapes, features, colorings, shadings, textures, attributes, etc., internal and/or external placements, ratio of organ dimensions, hair color, distribution, texture, etc., whole body shapes, features, colorings, shadings, textures, attributes, neural or chemical signatures, emf fields, etc., any other attribute, feature, etc. or mixtures and combinations thereof. For real world objects, the data include, without limitation, shape, texture, color, shade, composition, any other feature or attribute or mixtures and combinations thereof.

The term "entity" means a human or an animal.

The term "primary entity" means any living organism with independent volition, which in the present application is a human, but other animals may meet the independent volition test. or organic entities under the control of a living organism with independent volition. Living organisms with independent volition include human for this disclosure, while all other living organisms useful in this disclosure are living organisms that are controllable by a living organism with independent volition.

The term "secondary entity" means any living organism or non-living (robots) device that is capable of being controlled by a primary entity including, without limitation, mammals, robots, robotic hands, arms, etc. that respond to instruction by primary entities.

The term "entity object" means a human or a part of a human (fingers, hands, toes, feet, arms, legs, eyes, head, body, etc.), an animal or a port of an animal (fingers, hands, toes, feet, arms, legs, eyes, head, body, etc.), or a real world object under the control of a human or an animal, or robotics under the control of a system, computer or software system or systems, or autonomously controlled (including with artificial intelligence), and include such articles as pointers, sticks, mobile devices, or any other real world object or virtual object representing a real entity object that can be directly or indirectly controlled by a human or animal or robot or robotic system.

The term "user" means an entity in a generic sense.

The term "real world object" means any object that is under the control of a primary or secondary entity including, without limitation, robots, pointers, light pointers, laser pointers, canes, crutches, bats, batons, etc. or mixtures and combinations thereof.

The terms "user features", "entity features", and "member features" means features including: overall user, entity, make up, or member shape, texture, proportions, information, state, layer, size, surface, zone, area, any other overall feature, and mixtures or combinations thereof specific user, entity, or member part shape, texture, proportions, any other part feature, and mixtures or combinations thereof and particular user, entity, or member dynamic shape, texture, proportions, any other part feature, and mixtures or combinations thereof and mixtures or combinations thereof.

The term a "short time frame" means a time duration between less than or equal to 1 ns and less than 1 μs.

The term a "medium time frame" means a time duration between less than or equal to 1 μs and less than 1 ms.

The term a "long time frame" means a time duration between less than or equal to about 1 ms and less than or equal to 1 s.

The term a "very long time frame" means a time duration greater than 1 s, but less than or equal to 1 minute.

The term a "mobile device" means any smart device that may be carried by a user and is capable of interacting with wireless communication network such as a WIFI™ network, a cellular network, a satellite network, or any other type of wireless network.

DETAILED DESCRIPTION OF THE INVENTION

Biokinetic Apparatuses, Systems and Methods

The inventors have found that apparatuses may be constructed for creating unique motion/kinetic and/or biokinetic identifiers (IDs), systems including the apparatuses, and methods implementing the systems on at least one processing unit. The motion/kinetic and the biokinetic IDs may be constructed using motion data or motion data and biometric data, respectively, so that the motion/kinetic IDs and biokinetic IDs are unique to each user making them more difficult to hack, replicate, or counterfeit. The motion/kinetic include, without limitation, any sensed motion and/or any motion property. Specifically, the motion/kinetic data include, without limitation, linear and/or non-linear motion, linear and/or non-linear velocity, linear and/or non-linear acceleration, changes in linear and/or non-linear motion, changes in linear and/or non-linear velocity, changes linear and/or non-linear acceleration, rates of change in direction, rates of change in linear and/or non-linear velocity, rates of change of linear and/or non-linear acceleration, and/or mixtures or combinations thereof. The inventors have also found that multiple sensor inputs may produce different combinations of kinetic/motion data, where differences in direction, in the velocity, and/or acceleration of each input, or differences in combinations of rates of change from multiple inputs or sensed linear and/or non-linear motion, linear and/or non-linear velocity, linear and/or non-linear acceleration, changes in linear and/or non-linear motion, changes in linear and/or non-linear velocity, changes in linear and/or non-linear acceleration produce different motion/kinetic IDs. The biometric data include, without limitation, any characteristic, any feature, any aspect, any attribute, etc. or mixtures and combinations thereof of a primary entity, a secondary entity under the control of a primary entity, or a real world object under the control of a primary or secondary entity or any combination thereof. Specifically, the biometric data include, without limitation, organ (eyes, hands, fingers, palm, feet, toes, head, nose, ears, cheeks, face, arms, etc.) shape, size, textures, coloring, location, location relative to other organs, ratio of organ dimensions, locations, relative locations, finger prints, palm prints, retinal patterns, vein patterns, color patterns, mole patterns, iris color pattern, skin shading, skin shading pattern, finger pattern, toe pattern, other patterns associated with external body features, patterns associated with internal features such as fluid data, electrical, magnetic, and/or chemical data, thermal data, thermal data patterns, EEG data, EEG data patterns, EKG data, EKG data patterns, blood pressure data, vocal chord motion data, any other external and/or internal data or patterns associated with a primary or secondary entity, and mixtures or combinations thereof.

The inventors have found that apparatuses, systems and methods implemented on a processing unit(s) may be constructed that improve user identification, verification, and/or authentication using a kinetic (motion or movement) data or a combination of kinetic and biometric data to generate unique IDs, verifiers, and/or authenticators. In certain embodiments, the apparatuses and systems include one or a plurality of processing units and one or a plurality of user interfaces, where the interfaces may include a human cognizable output device such as a display device, a video device, an audio device, an audiovisual device, etc. In certain embodiments, the apparatuses and systems also include one or a plurality of motion sensors, one or a plurality of motion sensor arrays, or mixtures and combinations. In other embodiments, the apparatuses and systems may also include one or a plurality of biometric sensors. In other embodiments the apparatuses and systems may also include one or a plurality of biokinetic sensors. The sensors collect kinetic data, biometric data, and/or biokinetic data. The kinetic data is used to produce unique kinetic IDs. The kinetic data and the biometric data are used to produce unique biokinetic IDs. The kinetic data, the biometric data, and the biokinetic data are used to produce other type of unique biokinetic IDs. The unique kinetic and biokinetic IDs are less susceptible to hacking, theft, counterfeiting, replicating, etc. In certain embodiments, the systems and methods use kinetic data collected from the motion sensors to construction kinetic IDs, while in other embodiments, the systems and methods use a combination of biometric data collected from the biometric sensors and kinetic data collected from the motion sensors to produce unique and more secure bio-kinetic user signatures, identifiers, and/or authenticators. The methods include sensing kinetic data via the motion sensor(s), sensing biometric data via the biometric sensor(s), and using the kinetic data and the biometric data to produce the unique bio-kinetic IDs based on a combination of the sensed biometric data and the sensed kinetic data. Because each person is uniquely made, kinetic data may be all that is required to construct unique IDs. For example, each user has unique kinetic movements, which may be sensed by motion sensors to construct unique kinetic IDs. The unique kinetic movements include, without limitation, any feature, attribute, and/or aspect of the way a person or animal acting for a person moves. Such features, attributes, and/or aspects include rocking, tremors, vibrations, hesitations, movements of one body part relative to another body part, trajectories of movement, any other feature of movement unique to the user, or mixtures and combinations thereof. In certain embodiments, the kinetic and/or biokinetic IDs of this disclosure may be constructed using data collected only from a motion sensor. In all these systems and methods, one, some or all of the motion sensor(s), biokinetic sensors, and biometric sensor(s) may be the same or different. Thus, the unique biokinetic IDs comprise at least one biometric attribute and at least one kinetic or motion attribute. For examples, the unique biokinetic IDs may be constructed using biometric data of a first body part and kinetic or motion data of a second body part. Thus, biometric data from one or more body parts coupled with kinetic or motion data from the one or more body parts, where the body parts may be the same or different, may be used to construct unique kinetic and/or biokinetic IDs.

Kinetic/Biokinetic Systems

Embodiments of the disclosure broadly relate to systems including a sensor subsystem comprising one or a plurality of sensors, where the sensors include motion sensors and biometric sensor or biokinetic sensors and motion sensors, biometric sensors, and biokinetic sensors, a processing subsystem including one or a plurality of processing units, and an interface subsystem including one or a plurality of user interfaces having one or a plurality of human or animal cognizable output devices. The systems of this disclosure collect and/or capture (a) kinetic or motion data, (b) kinetic or motion data and biometric data, (c) biokinetic data, (d) biometric data and biokinetic data, or (e) motion or kinetic data, biometric data and biokinetic data to construct or generate unique kinetic and/or biokinetic IDs such as passwords, signatures, identifiers, verifiers, and/or authenticators, where each kinetic ID includes kinetic data and each biokinetic ID include (a) biometric data and kinetic or motion data or (b) biometric data, kinetic or motion data, and biokinetic data. One, some or all of the biometric sensors, the kinetic or motion sensors and/or biokinetic sensors may be the same or different. In certain embodiments, the systems may use facial biometric/kinetic/biokinetic features such as seeing how facial features move or change as different words are spoken. Sound does not have to be used, but watching the actual movements of the facial features such as differences in the shape of lips, cheeks, tongue, etc., size of lip/cheek/tongue motion, relative motion of the jaw to nose, etc. may also be used as a kinetic/biokinetic tool for enhancing user identifier uniqueness. Thus, the systems may request the user to say a specific word such as "Hello". The systems collect or captures user's facial data as the word is spoken and audio data associated with the spoken word correlated with the facial data, features. The facial data may include (a) kinetic data associated with the whole, a part or a plurality of parts of the user's face as the user speaks the word, (b) biometric data associated with the user's face, part or parts thereof as the user speaks the word, (c) biokinetic data associated with the user's face as the user speaks the word, or (d) mixtures or combination thereof. This data may then be used to produce or generate unique identifiers for a verification process. Thus, saying Hello or even responding with a different word may represent another type of data for generating unique identifiers. Additionally, the systems may collect or capture skeletal features such as size and shape of the mouth, nose and eyes (one or all or other selected biometrics) and how these features change in size and shape, as well as the tongue or other parts may be used to produce or generate unique identifiers in verification or signature or authentication systems. This may also be associated or used in combination with environmental data, such as the user's voice pattern or reflected waves of the user's voice from the physical environment.

Unique Identifier and Control Systems

Embodiments of the present disclosure also broadly relate to systems for constructing unique kinetic IDs, biometric IDs, and/or biokinetic IDs that may be used to access control systems that control real and/or virtual objects such as electrical devices, hardware devices, software programs and/or software objects, where the control systems convert movement(s) into commands for controlling the real and/or virtual objects, where the movement(s) including linear and/or non-linear motion, linear and/or non-linear velocity, linear and/or non-linear acceleration, changes in linear and/or non-linear motion, changes in linear and/or non-linear velocity, changes in linear and/or non-linear acceleration, rates of change in direction, rates of change in linear and/or non-linear velocity, rates of change of linear and/or non-linear acceleration, and/or mixtures or combinations thereof. The changes in movement direction, velocity, and/or acceleration may also include stops and/or timed holds in conjunction with the changes in direction, velocity and/or acceleration. The systems utilize kinetic movement data including direction, velocity, acceleration, changes of any of these thereto and mixtures or combinations thereof are used to construct unique kinetic IDs. Additionally, the control systems and methods may use the kinetic, biometric and/or biokinetic data for generating command and control functions.

Embodiments of the present disclosure also broadly relate to systems for constructing unique kinetic IDs, biometric IDs, and/or biokinetic IDs that may be used to access control systems for controlling real and/or virtual objects and/or virtual systems. The control systems include at least one motion sensor or a motion sensing apparatus including a motion-sensing component for sensing movement within at least one active sensing field, a processing unit for converting sensor output into commands for controlling the real and/or virtual objects and/or virtual systems in communication with the processing unit, and optionally a user interface for human interaction. Of course, these processors and components may be combined into one or more units. The movement may result from movement of an animal or a human, an animal or human body part, an object under the control of an animal or a human or an autonomous robot or robotic system. Movement may occur in or around a sensor, array of sensors, or the sensor(s) itself may move, or a combination thereof. The movement may include motion in linear and/or non-linear motion in any direction, linear and/or non-linear velocity in any direction, linear and/or non-linear acceleration, changes in linear and/or non-linear motion, changes in linear and/or non-linear velocity, changes in linear and/or non-linear acceleration, rates of change in direction, rates of change in linear and/or non-linear velocity, rates of change of linear and/or non-linear acceleration, and/or mixtures or combinations thereof. The commands permit users to scroll through lists or menus, to simultaneously select and scroll through lists or menus, to simultaneously select and scroll through sublists or submenus, to select, control, or simultaneously select and control at least one real object or at least one list of real objects and/or virtual object or at least one list of virtual objects, to simultaneously select and control at least one real object attribute and/or at least one virtual objects attribute, or to simultaneously select and proportionally control at least one real object, at least one virtual object, at least one real object attribute, and/or at least one virtual object attribute by discernible changes in movement sensed by the sensor(s) and/or the processing unit(s). In certain embodiments, the control systems may also include at least one remote control unit. In these apparatuses, the communication between the various components may be direct via wires or hardware connections and/or indirect via wireless connections. The systems utilize kinetic movement data including direction, velocity, acceleration, motion attributes, changes of any of these thereto and mixtures or combinations thereof are used to construct unique kinetic IDs. Additionally, the control systems and methods may use the kinetic, biometric and/or biokinetic data for generating command and control functions.

Embodiments of the present disclosure also broadly relate to systems for constructing unique kinetic IDs, biometric IDs, and/or biokinetic IDs that may be used to access control systems including at least one motion sensor capable of sensing movement, where movement within at least one sensing zone of the sensor(s) produces at least one output signal for selecting, controlling or simultaneously selecting and controlling one or a plurality of the real objects and/or one or a plurality of the virtual objects or for simultaneously selecting and controlling one or a plurality of attributes of the one or a plurality of the real and/or virtual objects. Moreover, the control systems may allow attribute selection and control based on linear and/or angular motion, linear and/or angular velocity, linear and/or angular acceleration, changes in linear and/or angular motion, changes in linear and/or angular velocity, changes in linear and/or angular acceleration, rates of change in direction, rates of changes of distance traveled rates of change in linear and/or angular velocity, rates of change of linear and/or angular acceleration, rates of change in motion attributes, and/or mixtures or combinations thereof. Furthermore, the control systems may include a preset or programmable sequence of motions within the motion sensor sensing zone, where each sequence causes a preset or pre-programmed response of selected devices and/or programs. These sequences may also include changes in velocity or acceleration within the sequences, where these changes are used to give different commands based upon these changes in velocity or acceleration. In this way, the same preset or programmable sequence of motions may have different outcomes based upon differences of velocity or acceleration within the sequence of motions, yielding different output commands. Additionally, the control systems may utilize the preset or programmable sequences to control all of the real objects and/or virtual list or objects or any subset of the real and/or virtual objects, including attributes, where different patterns or sequences may result in activating preset real objects and/or virtual lists or attributes or objects settings or a pre-programmed global or partial global preset setting such as mood lighting, music settings, virtual object selections and settings, etc. The systems utilize kinetic movement data including direction, velocity, acceleration, changes of any of these thereto and mixtures or combinations thereof are used to construct unique kinetic IDs. Additionally, the control systems and methods may use the kinetic, biometric and/or biokinetic data for generating command and control functions.

Methods of Forming Kinetic and Biokinetic Identifiers

Embodiments of the disclosure also broadly relate to methods implemented on processing unit including the step of capturing biometric data via the biometric sensors and kinetic or motion data via the motion sensors and/or biokinetic data via the bio-kinetic sensors and creating unique kinetic IDs and/or unique biokinetic IDs such as user signatures, user names, passwords, identifiers, verifiers, and/or authenticators and using the unique kinetic or biokinetic IDs to access any system requiring a unique IDs. One, some or all of the biometric sensors and/or the motion sensors may be the same or different.

Method for Constructing the Identifier and Using Them in Control Systems

Embodiments of the present disclosure also broadly relate to methods implemented on a processing unit for constructing unique kinetic IDs that may be used to access control system for controlling at least one real object and/or at least one virtual list or object or a plurality of real objects and/or virtual lists or objects using systems of this disclosure. The methods include capturing kinetic data, kinetic and biometric data, biokinetic data, and kinetic data, biometric data, and biokinetic data and constructing unique kinetic IDs and/or biokinetic IDs. The methods then use these unique kinetic IDs and/or biokinetic IDs to access control systems. The methods step associated with the control systems include sensing movement within at least one sensing zone of at least one motion sensor or motion sensing apparatus, where the movement includes linear and/or angular motion, linear and/or angular velocity, linear and/or angular acceleration, changes in linear and/or angular motion, changes in linear and/or angular velocity, changes in linear and/or angular acceleration, rates of change in direction, rates of change in linear and/or angular velocity, rates of change of linear and/or angular acceleration, and/or mixtures or combinations thereof. The methods also include producing at least one output signal from the sensor(s) based on the movement detected within the sensing zone(s). The methods also include converting the output signals into control functions for controlling the real objects, the virtual objects, real object attributes, and/or virtual object attributes, or any combination thereof. The control functions include scroll functions, selection functions, activate functions, attribute control functions, simultaneous select and scroll functions, simultaneous select and device and/or software program activate functions, simultaneous select and attribute activate functions, simultaneous select and attribute control functions, and/or simultaneous device and/or software program activate and attribute control functions, or any combination thereof.

User Interfaces for Constructing the Identifier and Using Them in Control Systems Embodiments of the present disclosure also broadly relate to user interfaces including at least one motion sensor or motion sensing component or at least one motion sensor or motion sensing component and at least one biometric sensing component or at least one biokinetic sensing component, or at least one motion sensor or motion sensing component, at least one biometric sensing component and at least one biokinetic sensing component, at least one processing unit, or at least one motion sensor/processing unit and at least one communication hardware and software unit and at least one human or animal cognizable output unit. That is, motion sensor and processing unit may be combined, in fact all these may be combined into one unit. Sensors may be associated with mobile devices (such as a phone, tablet, etc.) or the sensors may capable of detecting and capturing movement with in an active zone associated with the sensor to produce kinetic data, detecting and capturing biometric characteristics to produce biometric data, and detecting and capturing biokinetic characteristics to produce biokinetic data. In certain embodiments, the user interfaces use (a) the kinetic data to construct unique kinetic IDs, (b) the biometric and kinetic data to construct unique biokinetic IDs, (c) the biokinetic data to construct unique biokinetic IDs, (d) the biometric data and biokinetic data to construct biokinetic IDs, (e) the kinetic data, the biometric data, and the biokinetic data to construct kinetic IDs and biokinetic IDs. The kinetic IDs and/or the biokinetic IDs are then used to access control system that utilize the motion sensors to sense movement within at least one sensing zone and produce at least one output signal corresponding to the sensed movement, where the movement includes linear and/or angular motion, linear and/or angular velocity, linear and/or angular acceleration, changes in linear and/or angular motion, changes in linear and/or angular velocity, changes in linear and/or angular acceleration, rates of change in direction, rates or changes of distance traveled, rates of change in linear and/or angular velocity, rates of change of linear and/or angular acceleration, rates of changes in motion attributes, or mixtures or combinations thereof. The processing units convert the sensor output signals into command and control functions for controlling one real object and/or list, one virtual object and/or list, a plurality of real objects and/or lists, a plurality of virtual objects and/or lists, attributes of the real objects and/or attributes or the virtual objects and/or lists, and/or mixtures and combinations thereof. The communication units send the command and control functions to selected real and/or virtual objects. The motion sensors are capable of sensing movement of an animal or human, an animal or human body part, or an object controlled by an animal or human within the sensing zones, autonomous robots or robotic systems, or any combination thereof.

Methods for Constructing the Identifier Using User Interfaces

Embodiments of the present disclosure also broadly relate to methods implemented on a processing unit for constructing unique kinetic IDs that may be used to access control system for controlling at least one real object and/or at least one virtual list or object or a plurality of real objects and/or virtual lists or objects using systems of this disclosure. The methods include capturing kinetic data, kinetic and biometric data, biokinetic data, and kinetic data, biometric data, and biokinetic data and constructing unique kinetic IDs and/or biokinetic IDs. The methods then use these unique kinetic IDs and/or biokinetic IDs to access control systems. The methods step associated with the control systems include manipulating one real object and/or list and/or virtual object and/or list or a plurality of real objects and/or lists and/or virtual objects and/or lists and/or associated attributes (executable or controllable) using interfaces or apparatuses of this disclosure, including the steps of sensing movement within at least one sensing zone of at least one motion sensor. The movements includes linear motion and/or angular motion, linear velocity and/or angular velocity, linear acceleration and/or angular acceleration, changes in linear motion and/or angular motion, changes in linear velocity and/or angular velocity, changes in linear acceleration and/or angular acceleration, rates of change in direction of motion, rates or changes of distance traveled, rates of change in linear and/or angular velocity, rates of change of linear and/or angular acceleration, rates of changes in motion attributes, and mixtures or combination thereof. The methods also include producing at least one output signal from the sensors. The methods also include converting the output signals into control functions for controlling the real and/or virtual objects, real object attributes, and/or virtual object attributes. The control functions include scroll functions, simultaneous select and scroll functions, simultaneous select and activate functions, simultaneous select and attribute activate functions, simultaneous select and attribute control functions, and/or simultaneous activate and attribute control functions, or any combination thereof. Of course, multiple outputs from multiple sensors and/or inputs may produce multiple output commands, a single command, or a combination of commands at different output rates and sequences. For examples, dynamic wings in aircraft including advanced swept-wing designs, where the wings will fold down and/or sweep at different rates, providing amazing turning capabilities. A right hand controlling a UAV from a domed surface may accelerate the hand and all the fingers forward while simultaneously moving the thumb away from the center of the hand, causing the left wing to drop down slightly, causing a banking of the plane to the left.

Unique Identifiers

Embodiments of the disclosure provide unique signatures, verifiers, identifiers, and/or authenticators (sometimes referred to generally as identifiers), where the unique identifiers may include biometric data, kinetic or motion data, and/or biokinetic data. The biometric data was captured or collected via biometric sensors, the kinetic motion data was captured or collected via motion sensors and/or biokinetic data was captured or collected via the biokinetic sensors. One, some or all of the biometric sensors, the motion or kinetic sensors, and/or the biokinetic sensors may be the same or different.

Sensor Functioning

The biometric sensors are designed to capture biometric data including, without limitation, external data, internal data, or mixtures and combinations thereof. The external data include external whole body data, external body part data, or mixtures and combinations thereof. The internal data include internal whole body data, internal body part data, or mixtures and combinations thereof. Exemplary examples of external whole body data include height, weight, posture, size, location, structure, form, orientation, texture, color, coloring, features, ratio of body parts, location of body parts, forms of body parts, structures of body parts, brain waves, brain wave patterns, temperature distributions, aura data, bioelectric and/or biomagnetic data, other external whole body data, or mixtures and combinations thereof. Exemplary examples of external body part data include, without limitation, body part shape, size, location, structure, form, orientation, texture, color, coloring, features, etc., auditory data, retinal data, finger print data, palm print data, other external body part data, or mixtures and combinations thereof. Exemplary examples of internal whole body data include skeletal data, blood circulation data, muscular data, EEG data, EKG data, ratio of internal body parts, location of internal body parts, forms of internal body parts, structures of internal body parts, other internal whole body data, or mixtures and combinations thereof. Exemplary examples of internal body part data include, without limitation, internal body part shape, size, location, structure, form, orientation, texture, color, coloring, features, etc., other internal body part data, or mixtures and combinations thereof.

The biometric data may be 1D biometric data, 2D biometric data, and/or 3D biometric data. The 1D biometric data may be linear data, non-linear, and/or curvilinear data derived from at least one body part. The body parts may include a body structure, a facial structure, a hand structure, a finger structure, a joint structure, an arm structure, a leg structure, a nose structure, an eye structure, an ear structure, any other body structure (internal and/or external), or mixtures and combinations thereof. The 2D biometric data may include surface structural data derived from body parts including whole body structure, facial structure, hand structure, arm structure, leg structure, nose structure, eye structure, ear structure, joint structure, internal organ structure such as vocal chord motion, blood flow motion, etc., any other body structure, or mixtures and combinations thereof. The 3D biometric data may include volume structures derived from body parts including body structure, facial structure, hand structure, arm structure, leg structure, nose structure, eye structure, ear structure, joint structure, internal organ structure such as vocal chord motion, blood flow motion, etc., any other body structure, or mixtures and combinations thereof. The biometric data may also include internal structure, fluid flow data, electrical data, chemical data, and/or any other data derived from sonic generators and sonic sensors, ultrasound generators and ultrasound sensors, X-ray generators and X-ray sensors, optical generators and optical sensors, or other penetrating generators and associated sensors.

The motion sensors are designed to capture kinetic or motion data associated with movement of an entity, one or more body parts, or one or more devices under the control of an entity (human or animal or robot), where kinetic data may include, without limitation, eye motion data, finger motion data, hand motion data, arm motion data, leg motion data, head motion data, whole body motion data, other body part motion data, or mixtures and combinations thereof. Similarly to the biometric data, the kinetic data may be 1D, 2D, 3D or mixtures and combinations thereof. The kinetic data is used to construct unique kinetic IDs such as user signatures, user names, passwords, identifiers, verifiers, and/or authenticators. These unique kinetic IDs may be used to access any other system including the control systems of this disclosure. The kinetic or motion data to be captured may be a user predefined movement or sequence of movements, a system predetermined movement or sequence of movements derived from a user's routine interaction user with the systems, or a system dynamic movement or sequence of movement derived dynamically via user interaction with the systems. This kinetic data or any combination of these kinetic data may be used to create or construct the kinetic IDs of this disclosure.

The systems and methods of this disclosure may be used to create or construct unique kinetic and/or biokinetic IDs such as signatures, user names, passwords, identifiers, verifiers, and/or authenticators for accessing control system including security systems such as electronic key lock systems, electro-mechanical locking systems, sensor systems, program element security systems and activation systems, virtual and augmented reality systems (VR/AR), wearable device systems, software systems, elements of software systems, other security systems, or mixtures and combinations thereof. Such security devices may include separate sensors or sensor arrays. Thus, an active pad sensor may be used not only to capture kinetic data via sensed motion, but may also be used to capture biometric data such as an image or images of finger or hand prints, while an optical sensor may also capture other types of biometric data such as a retinal scan.

The systems and methods of this disclosure may also include biometric sensing units and associated software such as finger print readers, hand print readers, other biometric reader, bio-kinetic readers, biomedical readers, ocular readers, chemical readers, chemical marker readers, retinal readers, voice recognition devices, or mixtures and combinations thereof. The systems and methods utilize the biometric data in combination with kinetic data and/or biokinetic data to construct unique kinetic and/or biokinetic IDs that are used to access electronic security systems, key locks, any other type of mechanical, software, and/or virtual locking mechanisms, or mixtures or combinations thereof. Such security devices may include separate sensors or may use the motion sensors. Thus, an active pad sensor may be used not only to sense motion, but may also be able to process a finger print or hand print to produce a bio-kinetic signature, identifier, and/or authenticator, while an optical sensor may also support a retinal scan function. The term biokinetic IDs such as signatures, user names, passwords, identifiers, verifiers, and/or authenticators means that the signatures, user names, passwords, identifiers, verifiers, and/or authenticators are construct or comprise at least one biometric attribute coupled with at least one user specific motion attribute. The biometric attributes include, without limitation, shape of the hand, fingers, EMF attributes, optical attributes, acoustic attributes, and/or any other wave and/or associated noise interference pattern attributes associated with the biology or combination of biology and sensor, such as eddy or noise EMF currents associated with static or dynamic kinetic or biometric data or events.

Biokinetic sensors may be designed and may function in different ways. Biokinetic sensors may be capable of capturing biometric data (i.e., biometrics refers to technologies that measure and analyze human body characteristics including DNA, fingerprints, retinas, irises, voice patterns, facial patterns, and hand measurements, etc.) and kinetic or motion data including kinetic data from one or a plurality of body part movements and/or from whole body movements. Thus, a fingerprint or skeletal dimension combined with user specific motion data may be used to construct more secure IDs such as signatures, user names, passwords, identifiers, verifiers, and/or authenticators than IDs based solely on biometric data such as fingerprint, voice print, retina scan, and/or other biometric data. This data may also be captures in more than one form a at once; an example being the emf signature of a finger or hand, and also the center of mass data captured simultaneously of the same or the like, then compared, creating a unique biometric identifier. By adding the kinetic component of one or more of these identifiers, a more secure verification can be made. A relationship constant or ration can also be determined between these, creating yet another unique identifier.

In certain embodiments, the systems or methods of this disclosure may capture additional biometric data such as a pulse, an oxygen content, and/or other physiological measurements coupled with user specific kinetic motion data such as rolling a finger or hand. The systems and methods then utilize this additional biometric data in combination with kinetic and/or biokinetic data with the addition of other biometric data to construct more secure IDs such as signatures, user names, passwords, identifiers, verifiers, and/or authenticators to access a residential security system, a commercial security system, a software application such as a banking software, communication software, unlocking mobile devices or programs in touch or touchless environments (including AR/VR environments) or any other software application that requires user identification, verification, and/or authentication. These unique kinetic IDs and/or biokinetic IDs may also be used for electronic vaults such as bank vaults, residential vaults, commercial vaults, etc., other devices that require identification, verification, and/or authentication than using just biometric data alone or motion data alone. For example, taking a retinal scan and moving (simultaneously or sequentially) the eye in a certain way or in combinations of movements may cause the systems or methods to construct new and more secure identifiers, verifiers, controllers, and/or authenticators than identifiers, verifiers, and/or authenticators based solely on a retinal scan. The biometric data and the motion or kinetic data may be captured in any order, simultaneously or sequentially. The kinetic or motion may be a singular movement, a sequence of movements, a plurality of predetermined movements, or a pattern of movements.

Other embodiments of the systems and methods of this disclosure relate to the use of capacitive, acoustic, or other sensors, which are capable of capturing body specific metrics or biometric data such as skeletal dimensions of a finger, etc. The systems and methods of this disclosure then coupled this biometric data with kinetic or motion data to construct unique biokinetic IDs such as signatures, user names, passwords, identifiers, verifiers, and/or authenticators. For examples, putting two fingers, a finger and a thumb, or any combination of body parts together and moving them in a specific manner may be used to construct unique kinetic and/or biokinetic IDs such as signatures, user names, passwords, identifiers, verifiers, and/or authenticators, where these IDs have improved security relative to signatures, user names, passwords, identifiers, verifiers, and/or authenticators constructed using biometric data alone. For example, the kinetic or motion data may involve moving two fingers together showing a relative differentiation between body parts for use in constructing unique kinetic and/or biokinetic signatures, user names, passwords, identifiers, verifiers, and/or authenticators. For example, the kinetic or motion data may involve moving three fingers random manner or in a predetermined manner to construct unique kinetic IDs and/or biokinetic IDs. Another example, the kinetic or motion data may include a simple swiping motion or a simple gesture such as an up, down or up/down movement to construct unique kinetic IDs and/or biokinetic IDs.

In other embodiments, the systems and methods may also use linear and/or non-linear velocity, linear and/or non-linear acceleration, changes of velocity or acceleration, which are vector quantities or changes in vector quantities and include a time dimension, where this data may be used to construct unique kinetic IDs. In certain embodiments, the captured kinetic data may be compared in whole or part of kinetic data stored in a database or a look-up table to identify the user or to determine the proper user identity or to activate a control system of this disclosure or any other system that requires unique IDs. In other embodiments, the IDs may be may even more unique by capturing multi-directional gestures coupled with biometric data, where the gestures or kinetic data and the biometric data may be compared in whole or part to kinetic data and biometric data stored in a database or a look-up table. In other embodiments, the unique IDs may also incorporate real-time analysis of user movement and movements, where slight differences in speed, direction or acceleration of the body part(s) being sensed along with the biometric data associated with body parts, or any combination of these. In other embodiments, the unique IDs may also incorporate multiple instances of real-time motion analytics, whether in combination or sequentially, may be used as well. In other embodiments, the unique IDs may also incorporate hovers, pauses, holds, and/or timed holds.

In other embodiments, the systems and methods for producing unique IDs may capture a movement pattern or a plurality of movement patterns, where each pattern may include a wave pattern, a pattern of predetermined movements, a pattern of user defined movements, a pattern of movement displayed in a mirrored format, which may be user defined, predetermined, or dynamic. For instance, one or more sensors may capture data including two fingers held tightly together and gaps between the tightly held fingers may be seen by one or more sensors. In certain embodiments, the systems and methods may use waveform interference and/or phase patterns to improve or amplify not only the uniqueness of the gaps between the fingers, but also the uniqueness of the fingers. The systems and methods may then use this data to construct unique biokinetic IDs do to the inclusion of the interference patterns. In certain embodiments, one or more sensors capture the waveforms and/or interference patterns to add further uniqueness to the biokinetic IDs of this disclosure. By capturing data over a time period, even very short period of time (e.g., time periods having a duration between about 1 ns (very short) and about 10 s (fairly long), but longer and shorter time periods may be used), differences in the waveform and/or interference patterns over the time period such as shifts in constructive and destructive interferences, the biokinetic IDs may be made even more secure against copying, counterfeiting, etc. In an similar manner, the systems and methods may capture biokinetic data of a finger at rest as a finger of a living being is never fully at rest over time, where small movements do to blood flow, nerve firings, heartbeats, breathing, any other cause of small movements, and combinations thereof. The biokinetic data may comprise interference patterns, movement patterns, any other time varying pattern represent patterns unique to an entity. In this way, even data that would appear at first blush to be purely biometric, now becomes biokinetic do to the inclusion of macro kinetic data and/or micro kinetic data to produce biokinetic data. The kinetic data and/or biokinetic data may be used by the systems and methods to construct or create unique kinetic and biokinetic IDs. In other embodiments, so call "noise" associated with sensing and capturing movement of a body or body part or associated with sensing and capturing biometric data or associated with sensing and capturing biokinetic data (internal and external data) may be used by the systems and methods to construct or create unique biometric, kinetic and/or biokinetic IDs including contributions from the noise. This noise may also be compared to the biometric, kinetic, or biokinetic data and compared, creating a unique relational data to each other, this being another unique identifier that may be used in combination with the other data, or by itself to create a unique identifier or data metric.

While the kinetic data may include very precise and often time consuming data collection/capture sequences, the systems and methods may also collect/capture whole body and/or body part movement to construct unique kinetic and/or biokinetic IDs. It is believed that movement of a whole body or a body part may require less precise sensors or less time to capture data unique to a given user.

In other examples, the kinetic and/or biokinetic IDs of this disclosure may include data from different sources: 1) kinetic or motion data including simply motion data such as direction, velocity, acceleration, etc., compound or complex motion data such as combinations of direction, velocity, acceleration, gestures, etc., motion change data such as changes in direction, velocity of motion, acceleration, gestures, etc. over time, or mixtures and combinations thereof, (2) biometric data including verbal, touch, facial expressions, etc., or mixtures and combinations thereof, and/or 3) biokinetic data including body motion data, body part motion data, body motion and body biometric data, body part motion and body part biometric data, etc., or mixtures and combinations thereof. The systems and methods may utilize these data to construct unique kinetic and/or biokinetic IDs, i.e., kinetic and/or biokinetic IDs are unique to a particular entity—human or animal.

Not only may the kinetic, biometric and/or biokinetic data be used to produce unique kinetic and/or biokinetic IDs such as kinetic and/or biokinetic signatures, signals, verifiers, identifiers, and/or authenticators for security purposes, these kinetic and/or biokinetic IDs may be used to access systems of this disclosure or other systems requiring unique identifiers. Additionally, the kinetic, biometric and/or biokinetic data may be used by the control systems of this disclosure to generate command and control for actuating, adjusting, scrolling, attribute control, selection, and other uses. By adding user specific kinetic, biometric and/or biokinetic data, the same motions performed by one person may cause a different result compared to another persons as aspects of the user specific data will be unique to each user.

Control Systems

Embodiments of the present disclosure broadly relate to control systems for controlling real and/or virtual objects such as mechanical devices, electrical devices, electromechanical devices, appliances, software programs, software routines, software objects, or other real or virtual objects, where the systems include at least one motion sensor, data from a sensor capable of sensing motion, at least one processing unit or a sensor/processing combined unit, and optionally at least one user interface. The motion sensors detect movement within sensing zones, areas, and/or volumes and produce output signals of the sensed movement. The processing units receive the output signals and convert the output signals into control and/or command functions for controlling one real and/or virtual object or a plurality of real and/or virtual objects. The control functions include scroll functions, select functions, attribute functions, simultaneous select and scroll functions, simultaneous select and activate functions, simultaneous select and attribute activate functions, simultaneous select and attribute control functions, simultaneous select, activate, and attribute control functions, and mixtures or combination thereof. The systems may also include remote control units. The systems of this disclosure may also include security units and associated software such as finger print readers, hand print readers, biometric reader, bio-kinetic readers, biomedical readers, retinal readers, voice recognition devices, gesture recognition readers, other electronic security systems, key locks, any other type of mechanical locking mechanism, or mixtures or combinations thereof. Such security devices may include separate sensors or may use the motion sensors. Thus, an active pad sensor may be used not only to sense motion, but may also be able to process a finger print or hand print image, or bio-kinetic print, image or pattern, while an optical sensor may also support a retinal, facial, finger, palm, or other body part scan functions. The term "bio-kinetic" means that the movement of a user is specific to that user, especially when considering the shape of the hand, fingers, or body parts used by the motion sensor to detect movement, and the unique EMF, optical, acoustic, and/or any other wave interference patterns associated with the biology and movement of the user.

Embodiments of the present disclosure broadly relate to at least one user interface to allow the system to interact with an animal and/or a human and/or robot or robotic systems based on sensed motion.

Embodiments of the present disclosure broadly relate to control systems for controlling real and/or virtual objects such as electrical devices, appliances, software programs, software routines, software objects, sensors, projected objects, or other real or virtual objects, where the systems includes at least one motion sensor or data from a motion sensor, at least one processing unit, and at least one user interface. The motion sensors detect movement or motion within one or a plurality of sensing zones, areas, and/or volumes associated with the sensors, and the motion sensors produce output signals of the sensed movement. The processing units receive output signals from the motion sensors and convert the output signals into control and/or command functions for controlling one real and/or virtual object or a plurality of real and/or virtual objects. Of course, the motion sensors and processing units may be combined into single units sometimes referred to as sensor/processing units. The control and/or command functions include scroll functions, select functions, attribute functions, simultaneous select and scroll functions, simultaneous select and activate functions, simultaneous select and attribute activate functions, simultaneous select and attribute control functions, simultaneous select, activate functions and attribute control functions, simultaneous activate and attribute control functions or any combination thereof. The systems may also include remote units. The systems of this disclosure may also include security units and associated software such as finger print readers, hand print readers, biometric readers, bio-kinetic readers, biomedical readers, EMF detection units, optical detection units, acoustic detection units, audible detection units, or other type of wave form readers, retinal readers, voice recognition devices, other electronic security systems, key locks, any other type of mechanical locking mechanism, or mixtures or combinations thereof. Such security devices may include separate sensors or may use the motion sensors. Thus, an active pad sensor may be used not only to sense motion, but also to able to process a finger print or hand print image, while an optical sensor may also support a retinal scan function, or an acoustic sensor may be able to detect the motions as well as voice commands, or a combination thereof.

Embodiments of the present disclosure broadly relate to control systems for real and/or virtual objects such as electrical devices, appliances, software programs, software routines, software objects, or other real or virtual objects, where the systems include at least one remote control device including at least one motion sensor, at least one processing unit, and at least one user interface, or a unit or units that provide these functions. The motion sensor(s) detect movement or motion within sensing zones, areas, and/or volumes and produce output signals of the sensed movement or motion. The processing units receive output signals from the sensors and convert the output signals into control and/or command functions for controlling one real and/or virtual object or a plurality of real and/or virtual objects. The control and/or command functions include scroll functions, select functions, attribute functions, simultaneous select and scroll functions, simultaneous select and activate functions, simultaneous select and attribute activate functions, simultaneous select and attribute control functions, simultaneous select, activate functions and attribute control functions, and/or simultaneous activate and attribute control functions or any combination thereof. The systems may also include remote units. The system of this disclosure may also include security units and associated software such as finger print readers, hand print readers, biometric readers, bio-kinetic readers, biomedical readers, EMF detection units, optical detection units, acoustic detection units, audible detection units, or other type of wave form readers, retinal readers, voice recognition devices, other electronic security systems, key locks, any other type of mechanical locking mechanism, or mixtures or combinations thereof. Such security devices may include separate sensors or may use the motion sensors. Thus, an active pad sensor may be used not only to sense motion, but also to able to process a finger print or hand print image, while an optical sensor may also support a retinal scan function.

The systems of this disclosure allow users to control real and/or virtual objects such as electrical devices, appliances, software programs, software routines, software objects, sensors, or other real or virtual objects based solely on movement detected with the motion sensing zones of the motion sensors without invoking any hard selection protocol, such as a mouse click or double click, touch or double touch of a pad, or any other hard selection process, though these hard selections may also be incorporated into systems. The systems simply track movement or motion in the sensing zone, converting the sensed movement or motion into output signals that are processed into command and/or control function(s) for controlling devices, appliances, software programs, and/or real or virtual objects. The motion sensors and/or processing units are capable of discerning attributes of the sensed motion including direction, velocity, and/or acceleration, sensed changes in direction, velocity, and/or acceleration, or rates of change in direction, velocity, and/or acceleration. These attributes generally only trigger a command and/or control function, if the sensed motion satisfies software thresholds for movement or motion direction, movement or motion velocity, movement or motion acceleration and/or changes in movement direction, velocity, and/or acceleration and/or rates of change in direction, rates of change in linear and/or angular velocity, rates of change of linear and/or angular acceleration, and/or mixtures or combinations thereof. Although the movement or motion may be in any direction, have any velocity, and/or have any acceleration within the sensing zones, changes in direction, velocity, and/or acceleration of movement or motion are subject to the motion sensors and/or processing unit's ability to discriminate there between. The discrimination criteria may be no discrimination (all motion generates an output signal), may be preset, may be manually adjusted or may be automatically adjust depending on the sensing zones, the type of motion being sensed, the surrounding (noise, interference, ambient light, temperature, sound changes, etc.), or other conditions that could affect the motion sensors and/or the processing unit by design or inadvertently. Thus, when a user or robot or robotic system moves, moves a body part, moves a sensor or sensor/processing unit or moves an object under user control within one or more sensing zones, the movement and attributes thereof including at least direction, linear and/or angular velocity, linear and/or angular acceleration and/or changes in direction, linear and/or angular velocity, and/or linear and/or angular acceleration including stops and times holds are sensed. The sensed movement or motion is then converted by the processing units into command and control function as set forth above.

Embodiments of the systems of this disclosure include motion sensors that are capable of detecting movement or motion in one dimension, two dimensions, and/or three dimensions including over time and in different conditions. For example, the motion sensors may be capable of detecting motion in x, y, and/or z axes or equivalent systems such as areas on a surface (such a the skin motions of the pad area of a finger tip), volumes in a space, volumes in a liquid, volumes in a gas, cylindrical coordinates, spherical coordinates, radial coordinates, and/or any other coordinate system for detecting movement in three directions, or along vectors or other motion paths. The motion sensors are also capable of determining changes in movement or motions in one dimension (velocity and/or acceleration), two dimension (direction, area, velocity and/or acceleration), and/or three dimension (direction, area, volume, velocity and/or acceleration). The sensors may also be capable of determining different motions over different time spans and areas/volumes of space, combinations of inputs such as audible, tactile, environmental and other waveforms, and combinations thereof. The changes in movement may be changes in direction, changes in velocity, changes in acceleration and/or mixtures of changes in direction, changes in velocity or changes in acceleration and/or rates of change in direction, rates of change in velocity, rates of change of acceleration, and/or mixtures or combinations thereof, including from multiple motion sensors, sensors with motion sensing ability, or multiple sensor outputs, where the velocity and/or acceleration may be linear, angular or mixtures and combinations thereof, especially when movement or motion is detected by two or more motion sensors or two or more sensor outputs. The movement or motion detected by the sensor(s) is(are) used by one or move processing units to convert the sensed motion into appropriate command and control functions as set forth herein.

In certain embodiments, the systems of this disclosure may also include security detectors and security software to limit access to motion detector output(s), the processing unit(s), and/or the real or virtual object(s) under the control of the processing unit(s). In other embodiments, the systems of this disclosure include wireless receivers and/or transceivers capable of determining all or part of the controllable real and/or virtual objects within the range of the receivers and/or transceivers in the system. Thus, the systems are capable of polling a zone to determine numbers and types of all controllable objects within the scanning zone of the receivers and/or transceivers associated with the systems. Thus, if the systems are portable, the systems will poll their surroundings in order to determine the numbers and types of controllable objects, where the polling may be continuous, periodic, and/or intermittent. These objects, whether virtual or real, may also be used as a sensor array, creating a dynamic sensor for the user to control these and other real and/or virtual objects. The motion sensors are capable of sensing movement of a body (e.g., animal or human), a part of an animal or human (e.g., legs, arms, hands, fingers, feet, toes, eyes, mouth, etc.), and/or an object under control of an animal or human (wands, lights, sticks, phones, mobile devices, wheel chairs, canes, laser pointers, location devices, locating devices, etc.), and robots and/or robotic systems that take the place of animals or humans. Another example of this would be to sense if multiple objects, such as people in a public assembly change their rate of walking (a change of acceleration or velocity is sensed) in an egress corridor, thus, indicating a panic situation, whereby additional egress doors are automatically opened, additional egress directional signage may also be illuminated, and/or voice commands may be activated, with or without other types of sensors being made active.

A timed hold in front of a sensor may be used to activate different functions, e.g., for a sensor on a wall, holding a finger or object briefly in front of sensor causes lights to be adjusted to a preset level, causes TV and/or stereo equipment to be activated, and/or causes security systems to come on line or be activated, or begins a scroll function through submenus or subroutines. While, continuing to hold, begins a bright/dim cycle that ends, when the hand or other body part is removed. Alternatively, the timed hold causes an attribute value to change, e.g., if the attribute is at its maximum value, a timed hold would cause the attribute value to decrease at a predetermined rate, until the body part or object is removed from or within the active zone. If the attribute value is at its minimum value, then a timed hold would cause the attribute value to increase at a predetermined rate, until the body part or object is removed from or within the active zone. If the value is somewhere in the middle, then the software may allow random selection or may select the direction, velocity, acceleration, changes in these motion properties or rates of changes in these motion properties that may allow maximum control. Of course the interface may allow for the direction, velocity, acceleration, changes in these motion properties, or rates of changes of these motion properties to be determined by the initial direction of motion, while the timed hold would continue to change the attribute value until the body part or object is removed from or within the active zone. A stoppage of motion may be included, such as in the example of a user using a scroll wheel motion with a body part, whereby a list is scrolled through on a display. Once a stoppage of circular motion occurs, a linear scroll function begins, and remains so until a circular motion begins, at which point a circular scroll function remains in effect until stoppage of this kind of motion occurs. This change of direction may be performed with different parts of the body and not just one part as well sequentially or simultaneously. In this way, a change of direction, and/or a change of speed (change in acceleration) alone has caused a change in selection of control functions and/or attribute controls. In the circular scroll function, an increase in acceleration might cause the list to not only accelerate in the scroll speed, but also cause the font size to appear smaller, while a decrease in acceleration might cause the scroll speed to decelerate and the font size to increase. Another example might be that as a user moves towards a virtual or real object, the object would move towards the user based upon the user's rate of acceleration; i.e., as the user moves faster towards the object, the object would move faster towards the user, or would change color based upon the change of speed and/or direction of the user. The term "brief" or "briefly" means that the timed hold or cessation of movement occurs for a period to time of less than a second. In certain embodiments, the term "brief" or "briefly" means for a period of time of less than 2.5 seconds. In other embodiments, the term "brief" or "briefly" means for a period of time of less than 5 seconds. In other embodiments, the term "brief" or "briefly" means for a period of time of less than 7.5 seconds. In other embodiments, the term "brief" or "briefly" means for a period of time of less than 10 seconds. In other embodiments, the term "brief" or "briefly" means for a period of time of less than 15 seconds. In other embodiments, the term "brief" or "briefly" means for a period of time of less than 20 seconds. In other embodiments, the term "brief" or "briefly" means for a period of time of less than 30 seconds.

All that is required in order for the systems of the disclosure of operate properly is that the software must be able to determine when to transition from one command format, such as scrolling through a list to selecting a member from the list has occurred do to a change in a direction, velocity, or acceleration of motion, changes in these motion properties, and/or rates of changes of these motion properties sensed by the systems. Thus, the difference in the direction, velocity, acceleration, and/or changes thereof and/or rates of changes thereof must be sufficient to allow the software to make such a determination (i.e., a discernible change in motion direction, velocity, and/or acceleration), without frustrating the user because the direction, velocity, and/or acceleration change routines do not permit sufficient angular and/or distance deviation from a given direction before changing from one command format to another, i.e., changing from a list scroll function to a select and attribute value adjustment function associated with a member of the list. Although the angle deviation can be any value, the value is may be about ±1° from the initial direction or about ±2.5° from the initial direction or about ±5° from the initial direction, or about ±10° from the initial direction or about ±15° from the initial direction. For systems set to run on orthogonal directions, e.g., x and y or x, y and z, the deviation can be as great as about ±45° or about ±35° or about ±25° or about ±15° or about ±5° or about ±2.5° or about ±1°. Alternatively, movement in a given direction within an angle deviation of ±x° will result in the control of a single device, while movement in a direction half way between two devices within an angle deviation of ±x° will result in the control of both devices, where the magnitude of value change may be the same or less than that for a single device and where the value of x will depend on the number of device directions active, but in certain embodiments, will be less than or equal to ¼ of the angle separating adjacent devices. For example, if four devices are located at +x, −x, +y and −y from a center of the an active sensing zone, movement in a 45° angle relative to +x and +y would adjust the attribute of both the +x and +y device simultaneously, at a single device rate or at half a single device rate or at any other predetermined rate of attribute value change, or all four devices may be decreased or increased collectively and proportionately to the distance from the user's coordinates(s) and the change in direction coupled with velocity, acceleration, changes in these motion properties, and/or rates of changes in these motion properties. In another example, changes in speed of one cm per second, or combinations of speed change and angular changes as described above will provide enough change in acceleration that the output command or control of the object(s) will occur as desired. In another example, the distance moved by itself, or in combination with other motion attributes will provide enough change to provide the output command or control of object(s). The systems of the present disclosures may also include gesture processing. For example, the systems of this disclosure will be able to sense a start pose, a motion, and an end pose, where the sensed gesture may be referenced to a list of gestures stored in a look-up table. It should be noted that a gesture in the form of this disclosure may contain all the elements listed herein (i.e., any motion or movement, changes in direction of motion or movement, velocity and/or acceleration of the motion or movement) and may also include the sensing of a change of in any of these motion properties to provide a different output based upon differences in the motion properties associated with a given gesture. For example, if the pattern of motion incorporated in the gesture, say the moving of a fist or pointed finger in a circular clock-wise direction causes a command of "choose all" or "play all" from a list of objects to be issues, speeding up the circular motion of the hand or finger while making the circular motion (increases in angular motion—velocity or acceleration) may provide a different command to be issued, such as "choose all but increase the lighting magnitude as well" or "play all but play in a different order". In this way, a change of linear and/or angular velocity and/or acceleration could be used as a gestural command or a series of gestures, as well as a motion-based commands where selections, controls and commands are given when a change in motion properties are made, or where any combination of gestures and motions of these is made.

For purposes of measuring acceleration or changes in velocity, an accelerometer may be used. An accelerometer is a device that measures "proper acceleration". Proper acceleration is physical acceleration (i.e., measurable acceleration as by an accelerometer) experienced by an object and is the acceleration felt by occupants associated with an accelerating object, and which is described as a G-force, which is not a force, but rather an acceleration. For the purposes of this disclosure, an accelerometer, therefore, is a device that measures acceleration and changes in acceleration by any means.

Velocity and acceleration are vector quantities, consisting of magnitude (amount) and direction (linear and non-linear). Distance is typically a product of velocity and time, and traveling a distance can always be expressed in terms of velocity, acceleration and time, where a change, measurement or threshold of distance traveled can be expressed as a threshold of velocity and or time criteria. Acceleration is typically thought of as a change in velocity, when the direction of velocity remains the same. However, acceleration also occurs when the velocity is constant, but the direction of the velocity changes, such as when a car makes a turn or a satellite orbits the earth. If a car's velocity remains constant, but the radius is continuously reduced in a turn, the force resulting from the acceleration increases. This force is called G-force. Acceleration rate may change, such as when a satellite keeps its same orbit with reference to the earth, but increases or decreases its speed along that orbit in order to be moved to a different location at a different time.

Typically, acceleration is expressed mathematically by $a=dv/dt$ or $a=d^2x/dt^2$—a change of velocity with respect to time, while velocity is express mathematically by $v=dx/dt$—a change in distance with respect to time. If a motion sensor is capable of sensing velocity and/or acceleration, then the output of such a device, which may be used for command and control function generation and determination, would include sampling to measure units of average velocity and/or accelerations over a given time or as close to instantaneous velocity and/or accelerations as possible. These changes may also be used for command and control function generation and determination including all acceptable command and control functions. It should be noted that average or instantaneous accelerations or velocities may be used to determine states or rates of change of motion, or may be used to provide multiple or different attribute or command functions concurrently or in a compounded manner. These capabilities are more simply visualized by saying when an acceleration value, as measured by an accelerometer, is sensed, a command may be issued, either in real time, or as an average of change over time (avg da/dt), or as an "acceleration gesture" where an acceleration has been sensed and incorporated into the table values relevant to pose-movement-pose then look-up table value recognized and command sent, as is the way gestures are defined. Gestures are currently defined as pose, then a movement, then a pose as measured over a given time, which is then paired with a look-up table to see if the values match, and if they do, a command is issued. A velocity gesture and an acceleration gesture would include the ability to incorporate velocity or changes in velocity or acceleration or changes in acceleration as sensed and identified between the poses, offering a much more powerful and natural identifier of gestures, as well as a more secure gesture where desired. In fact, the addition of changes in motion properties during a gesture can be used to greatly expand the number of gesture and the richness of gesture processing and on-the-fly gesture modification during processing so that the look-up table would identify the "basic" gesture type and the system would then invoke routines to augment the basic response in a pre-determined or adaptive manner.

Embodiments of this disclosure relate to methods that are capable of measuring a person, a person's body part(s), or object(s) under the control of a person moving in a continuous direction, but undergoing a change in velocity in such a manner that a sensor is capable of discerning the change in velocity represented by $\Delta v$ or $dv$ or acc. Once a change in velocity is sensed by the sensor, the sensor output is forwarded to a processing unit that issues a command function in response to the sensor output, where the command function comprises functions previously disclosed. These process may occur simultaneously where capabilities to do so exist or multiple instances of these processes may occur simultaneously or sequentially, such as with the capabilities of Quantum Processors. The communication may be wired or wireless, if wired, the communication may be electrical, optical, sonic, or the like, if the communication is wireless, the communication may be: 1) light, light waveforms, or pulsed light transmissions such as Rf, microwave, infra-red (IR), visible, ultraviolet, or other light communication formats, 2) acoustic, audile, sonic, or acoustic waveforms such as ultrasound or other sonic communication formats, or 3) any other type of wireless communication format. The processing unit includes an object list having an object identifier for each object and an object specific attribute list for each object having one or a plurality of attributes, where each object specific attribute has an attribute identifier.

The systems and methods are disclosed herein where command functions for selection and/or control of real and/or virtual objects may be generated based on a change in velocity at constant direction, a change in direction at constant velocity, a change in both direction and velocity, a change in a rate of velocity, a change in a rate of acceleration, and/or a change of distance within a velocity or acceleration. Once detected by a detector or sensor, these changes may be used by a processing unit to issue commands for controlling real and/or virtual objects. A selection or combination scroll, selection, and attribute selection may occur upon the first movement. Such motion may be associated with doors opening and closing in any direction, golf swings, virtual or real world games, light moving ahead of a runner, but staying with a walker, or any other motion having compound properties such as direction, velocity, acceleration, and changes in any one or all of these primary properties; thus, direction, velocity, and acceleration may be considered primary motion properties, while changes in these primary properties may be considered secondary motion properties. The system may then be capable of differentially handling of primary and secondary motion properties. Thus, the primary properties may cause primary functions to be issued, while secondary properties may cause primary function to be issued, but may also cause the modification of primary function and/or secondary functions to be issued. For example, if a primary function comprises a predetermined selection format, the secondary motion properties may expand or contract the selection format.

In another example of this primary/secondary format for causing the system to generate command functions may involve an object display. Thus, by moving the object in a direction away from the user's eyes, the state of the display may change, such as from a graphic to a combination graphic and text, to a text display only, while moving side to side or moving a finger or eyes from side to side could scroll the displayed objects or change the font or graphic size, while moving the head to a different position in space might reveal or control selections, attributes, and/or submenus of the object. Thus, these changes in motions may be discrete, compounded, or include changes in velocity, acceleration and rates of these changes to provide different results for the user. These examples illustrate two concepts: 1) the ability to have compound motions which provide different results than the motions separately or sequentially, and (2) the ability to change states or attributes, such as graphics to text solely or in combination with single or compound motions, or with multiple inputs, such as verbal, touch, facial expressions, or bio-kinetically, all working together to give different results, or to provide the same results in different ways.

It must be recognized that the present disclosure while based on the use of sensed velocity, acceleration, and changes and rates of changes in these properties to effect control of real world objects and/or virtual objects, the present disclosure may also use other properties of the sensed motion in combination with sensed velocity, acceleration, and changes in these properties to effect control of real world and/or virtual objects, where the other properties include direction and change in direction of motion, where the motion has a constant velocity. For example, if the motion sensor(s) senses velocity, acceleration, direction, changes in direction, changes in velocity, changes in acceleration, changes in distance, and/or combinations thereof that is used for primary control of the objects via motion of a primary sensed human, animal, part thereof, real world object under the control of a human or animal, or robots under control of the human or animal, then sensing motion of a second body part may be used to confirm primary selection protocols or may be used to fine tune the selected command and control function. Thus, if the selection is for a group of objects, then the secondary motion may be used to differentially control object attributes to achieve a desired final state of the objects.

For example, suppose the apparatuses of this disclosure control lighting in a building. There are banks of lights on or in all four walls (recessed or mounted) and on or in the ceiling (recessed or mounted). The user has already selected and activated lights from a selection menu using motion to activate the apparatus and motion to select and activate the lights from a list of selectable menu items such as sound system, lights, cameras, video system, etc. Now that lights have been selected from the menu, movement to the right would select and activate the lights on the right wall. Movement straight down would turn all of the lights of the right wall down—dim the lights. Movement straight up would turn all of the lights on the right wall up—brighten. The velocity of the movement down or up would control the rate that the lights were dimmed or brighten. Stopping movement would stop the adjustment or removing the body, body part or object under the user control within the motion sensing area would stop the adjustment. Using a time component would provide even more control possibilities, providing distance thresholds (a product of speed and time).

For even more sophisticated control using motion properties, the user may move within the motion sensor active area to map out a downward concave arc, which would cause the lights on the right wall to dim proportionally to the arc distance from the lights. Thus, the right lights would be more dimmed in the center of the wall and less dimmed toward the ends of the wall.

Alternatively, if the movement was convex downward, then the light would dim with the center being dimmed the least and the ends the most. Concave up and convex up would cause differential brightening of the lights in accord with the nature of the curve.

Now, the apparatus may also use the velocity of the movement of the mapping out the concave or convex movement to further change the dimming or brightening of the lights. Using velocity, starting off slowly and increasing speed in a downward motion would cause the lights on the wall to be dimmed more as the motion moved down. Thus, the lights at one end of the wall would be dimmed less than the lights at the other end of the wall.

Now, suppose that the motion is a S-shape, then the light would be dimmed or brightened in a S-shaped configuration. Again, velocity may be used to change the amount of dimming or brightening in different lights simply by changing the velocity of movement. Thus, by slowing the movement, those lights would be dimmed or brightened less than when the movement is speed up. By changing the rate of velocity—acceleration—further refinements of the lighting configuration may be obtained. Again, adding a time component to the velocity or acceleration would provide even more possibilities.

Now suppose that all the lights in the room have been selected, then circular or spiral motion would permit the user to adjust all of the lights, with direction, velocity and acceleration properties being used to dim and/or brighten all the lights in accord with the movement relative to the lights in the room. For the ceiling lights, the circular motion may move up or down in the z direction to affect the luminosity of the ceiling lights. Thus, through the sensing of motion or movement within an active sensor zone—area and especially volume, a user can use simple or complex motion to differentially control large numbers of devices simultaneously.

This differential control through the use of sensed complex motion permits a user to nearly instantaneously change lighting configurations, sound configurations, TV configurations, or any configuration of systems having a plurality of devices being simultaneously controlled or of a single system having a plurality of objects or attributes capable of simultaneous control. For examples, in a computer game including large numbers of virtual objects such as troops, tanks, airplanes, etc., sensed complex motion would permit the user to quickly deploy, redeploy, rearrangement, manipulated and generally quickly reconfigure all controllable objects and/or attributes by simply conforming the movement of the objects to the movement of the user sensed by the motion detector. This same differential device and/or object control would find utility in military and law enforcement, where command personnel by motion or movement within a sensing zone of a motion sensor quickly deploy, redeploy, rearrangement, manipulated and generally quickly reconfigure all assets to address a rapidly changing situation.

Embodiments of systems of this disclosure include a motion sensor or sensor array or data from a motion sensor or sensor array, where each sensor includes an active zone and where each sensor senses movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration, and/or component or components thereof within the active zone by one or a plurality of body parts or objects and produces an output signal. The systems also include at least one processing unit including communication software and hardware, where the processing units convert the output signal or signals from the motion sensor or sensors into command and control functions, and one or a plurality of real objects and/or virtual objects in communication with the processing units. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. The processing unit or units (1) processes a scroll function or a plurality of scroll functions, (2) selects and processes a scroll function or a plurality of scroll functions, (3) selects and activates an object or a plurality of objects in communication with the processing unit, or (4) selects and activates an attribute or a plurality of attributes associated with an object or a plurality of objects in communication with the processing unit or units, or any combination thereof. The objects comprise mechanical devices, electromechanical devices, electrical devices, electrical systems, sensors, hardware devices, hardware systems, environmental devices and systems, energy and energy distribution devices and systems, software systems, software programs, software elements, software objects, AR objects, VR objects, AR elements, VR elements, or combinations thereof. The attributes comprise adjustable attributes associated with the devices, systems, programs and/or objects. In certain embodiments, the sensor(s) is(are) capable of discerning a change in movement, velocity and/or acceleration of ±5%. In other embodiments, the sensor(s) is(are) capable of discerning a change in movement, velocity and/or acceleration of ±10°. In other embodiments, the system further comprising a remote control unit or remote control system in communication with the processing unit to provide remote control of the processing unit and all real and/or virtual objects under the control of the processing unit. In other embodiments, the motion sensor is selected from the group consisting of digital cameras, optical scanners, optical roller ball devices, touch pads, inductive pads, capacitive pads, holographic devices, laser tracking devices, thermal devices, touch or touchless sensors, acoustic devices, and any other device capable of sensing motion, waveform changes and derivatives, arrays of such devices, and mixtures and combinations thereof. In other embodiments, the objects include environmental controls, lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical or manufacturing plant control systems, computer operating systems and other software systems, remote control systems, mobile devices, electrical systems, sensors, hardware devices, hardware systems, environmental devices and systems, energy and energy distribution devices and systems, software programs, software elements, or objects or mixtures and combinations thereof.

Embodiments of methods of this disclosure for controlling objects include the step of sensing movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration within the active zone by one or a plurality of body parts or objects within an active sensing zone of a motion sensor or within active sensing zones of an array of motion sensors. The methods also include the step of producing an output signal or a plurality of output signals from the sensor or sensors and converting the output signal or signals into a command function or a plurality of command functions. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions or any combination thereof. In certain embodiments, the objects comprise mechanical devices, electromechanical devices, electrical devices, electrical systems, sensors, hardware devices, hardware systems, environmental devices and systems, energy and energy distribution devices and systems, AR systems, VR systems, AR objects, VR objects, AR elements, VR elements, software systems, software programs, software objects, or combinations thereof. In other embodiments, the attributes comprise adjustable attributes associated with the devices, systems, programs and/or objects. In other embodiments, the timed hold is brief or the brief cessation of movement causing the attribute to be adjusted to a preset level, causing a selection to be made, causing a scroll function to be implemented, or a combination thereof. In other embodiments, the timed hold is continued causing the attribute to undergo a high value/low value cycle or predetermined attribute changes that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value or scroll function in a direction of the initial motion until the timed hold is removed. In other embodiments, the motion sensor is selected from the group consisting of sensors of any kind including digital cameras, optical scanners, optical roller ball devices, touch pads, inductive pads, capacitive pads, holographic devices, laser tracking devices, thermal devices, touch or touchless sensors, acoustic devices, and any other device capable of sensing motion or changes in any waveform do to motion or arrays of such devices, and mixtures and combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems and other software systems, remote control systems, sensors, or mixtures and combinations thereof.

Embodiments of this disclosure relate to methods for controlling objects include sensing motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, a time and motion property, stops, holds, timed holds, or mixtures and combinations thereof. The methods also include producing an output signal or a plurality of output signals corresponding to the sensed motion and converting the output signal or signals via a processing unit in communication with the motion sensor into a command function or a plurality of command functions. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The methods also include processing the command function or the command functions, where the command function or the command functions include: (1) processing a scroll function, (2) selecting and processing a scroll function, (3) selecting and activating an object or a plurality of objects in communication with the processing unit, (4) selecting and activating an attribute or a plurality of attributes associated with the object or the plurality of objects in communication with the processing unit, (5) selecting, activating an object or a plurality of objects in communication with the processing unit, and activating an attribute or a plurality of attributes associated with the object or the plurality of objects in communication with the processing unit, or mixtures and combinations thereof.

In certain embodiments, the objects comprise real world objects, virtual objects and mixtures or combinations thereof, where the real world objects include physical, mechanical, electro-mechanical, magnetic, electro-magnetic, electrical, or electronic devices or any other real world device that can be controlled by a processing unit, and the virtual objects include any construct generated in a virtual world or by a computer and displayed by a display device and that are capable of being controlled by a processing unit including software programs, and elements that are seen or not seen. In other embodiments, the attributes comprise activatable, executable and/or adjustable attributes associated with the objects. In other embodiments, changes in motion properties are changes discernible by the motion sensors and/or the processing units. In other embodiments, the motion sensor is selected from the group consisting of digital cameras, optical scanners, optical sensors, optical roller ball devices, touch pads, inductive pads, capacitive pads, holographic devices, laser tracking devices, thermal devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, vehicle systems, military systems, control systems, other software systems, programs, and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change, causes the attribute to be controlled at a pre-determined rate and type, or changes the attribute to allow maximum control, or (4) the timed hold causes a continuous change in the attribute value in a direction of the initial motion until the timed hold is removed.

Embodiments of this disclosure relate to methods for controlling real world objects include sensing motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The methods also include producing an output signal or a plurality of output signals corresponding to the sensed motion and converting the output signal or signals via a processing unit in communication with the motion sensor into a command function or a plurality of command functions. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The methods also include (1) processing a scroll function, (2) selecting and processing a scroll function, (3) selecting and activating an object or a plurality of objects in communication with the processing unit, (4) selecting and activating an attribute or a plurality of attributes associated with the object or the plurality of objects in communication with the processing unit, or (5) selecting, activating an object or a plurality of objects in communication with the processing unit, and activating an attribute or a plurality of attributes associated with the object or the plurality of objects in communication with the processing unit.

In certain embodiments, the objects comprise real world objects and mixtures or combinations thereof, where the real world objects include physical, mechanical, electro-mechanical, magnetic, electro-magnetic, electrical, or electronic devices or any other real world device that can be controlled by a processing unit or units. In other embodiments, the attributes comprise activateable, executable and/or adjustable attributes associated with the objects. In other embodiments, changes in motion properties are changes discernible by the motion sensors and/or the processing units. In other embodiments, the motion sensor is selected from the group consisting of digital cameras, optical scanners, optical sensors, optical roller ball devices, touch pads, inductive pads, capacitive pads, holographic devices, laser tracking devices, thermal devices, waveform sensors, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, remote control systems, software systems, software programs, software elements, or mixtures and combinations thereof.

Embodiments of this disclosure relate to methods for controlling virtual objects, virtual reality (VR) objects, and/or augmented reality (AR) objects include sensing motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, time elements (providing for changes in distance by changes in velocity/acceleration and time), or mixtures and combinations thereof. The methods also include producing an output signal or a plurality of output signals corresponding to the sensed motion and converting the output signal or signals via a processing unit in communication with the motion sensor into a command function or a plurality of command functions. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The methods also include (1) processing a scroll function, (2) selecting and processing a scroll function, (3) selecting and activating an object or a plurality of objects in communication with the processing unit, (4) selecting and activating an attribute or a plurality of attributes associated with the object or the plurality of objects in communication with the processing unit, or (5) selecting, activating an object or a plurality of objects in communication with the processing unit, and activating an attribute or a plurality of attributes associated with the object or the plurality of objects in communication with the processing unit.

In certain embodiments, the objects comprise virtual objects, virtual reality (VR) objects, and/or augmented reality (AR) objects and mixtures or combinations thereof, where the virtual objects include any construct generated in a virtual world or by a computer and displayed by a display device and that are capable of being controlled by a processing unit. In other embodiments, the attributes comprise activatable, executable and/or adjustable attributes associated with the objects. In other embodiments, changes in motion properties are changes discernible by the motion sensors and/or the processing units. In other embodiments, the motion sensor is selected from the group consisting of digital cameras, optical scanners, optical sensors, optical roller ball devices, touch pads, inductive pads, capacitive pads, holographic devices, laser tracking devices, thermal devices, waveform sensors, neural sensors, any other device capable of sensing motion, arrays of motion sensors, and mixtures or combinations thereof. In other embodiments, the software products include computer operating systems, graphics systems, business software systems, word processor systems, internet browsers, accounting systems, military systems, control systems, other software systems, software objects, software elements, or mixtures and combinations thereof.

Embodiments of this disclosure relate to systems and apparatuses for controlling objects include one or a plurality of motion sensor including an active zone, where the sensor senses motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof to produce an output signal or a plurality of output signals. The systems and apparatuses also include one or a plurality of processing unit including communication software and hardware, where the processing unit or units convert the outputs into command and control functions, and one or a plurality of controllable objects in communication with the processing unit or units. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The processing unit or units (1) process scroll functions, (2) select and process scroll functions, (3) select and activate one controllable object or a plurality of controllable objects in communication with the processing unit, (4) select and activate one controllable attribute or a plurality of controllable attributes associated with the controllable objects in communication with the processing unit, or (5) select, activate an object or a plurality of objects in communication with the processing unit, and activate an attribute or a plurality of attributes associated with the object or the plurality of objects in communication with the processing unit.

In certain embodiments, the objects comprise real world objects, virtual objects and mixtures or combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. In other embodiments, the attributes comprise activatable, executable and/or adjustable attributes associated with the objects. In other embodiments, changes in motion properties are changes discernible by the motion sensors and/or the processing units. In other embodiments, the motion sensor is selected from the group consisting of digital cameras, optical scanners, optical roller ball devices, touch pads, inductive pads, capacitive pads, holographic devices, laser tracking devices, thermal devices, accelerometers, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, control systems, other software systems, remote control systems, or mixtures and combinations thereof. In other embodiments, the sensor and/or the processing unit are capable of discerning a change in direction of motion of ±15°. In other embodiments, the sensor and/or the processing unit are capable of discerning a change in direction of motion of ±10°. In other embodiments, the sensor and/or the processing unit are capable of discerning a change in direction of motion of ±5°. In other embodiments, the systems and apparatuses further include a remote control unit in communication with the processing unit to provide remote control of the processing unit and the objects in communication with the processing unit.

Embodiments of this disclosure relate to systems and apparatuses for controlling real world objects include data from one or more sensors, one or a plurality of motion sensor including an active zone, where the sensor senses motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The systems and apparatuses also include one or a plurality of processing unit or data from one or more processing units including communication software and hardware, where the unit converts the output into command and control functions, and one or a plurality of controllable objects in communication with the processing unit. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The processing unit or units (1) process scroll functions, (2) select and process scroll functions, (3) select and activate one controllable object or a plurality of controllable objects in communication with the processing unit, (4) select and activate one controllable attribute or a plurality of controllable attributes associated with the controllable objects in communication with the processing unit, or (5) select, activate an object or a plurality of objects in communication with the processing unit, and activate an attribute or a plurality of attributes associated with the object or the plurality of objects in communication with the processing unit, or (6) any combination thereof.

In certain embodiments, the objects comprise real world objects and mixtures or combinations thereof, where the real world objects include physical, mechanical, electro-mechanical, magnetic, electro-magnetic, electrical, or electronic devices or any other real world device that can be controlled by a processing unit. In other embodiments, the attributes comprise activatable, executable and/or adjustable attributes associated with the objects. In other embodiments, changes in motion properties are changes discernible by the motion sensors and/or the processing units. In certain embodiments, the motion sensor is selected from the group consisting of digital cameras, optical scanners, optical roller ball devices, touch pads, inductive pads, capacitive pads, holographic devices, laser tracking devices, thermal devices, any other device capable of sensing motion, arrays of motion sensors, and mixtures or combinations thereof. In certain embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, remote control systems, or mixtures and combinations thereof. In certain embodiments, the sensor and/or the processing unit are capable of discerning a change in direction of motion of ±15°. In certain embodiments, the sensor and/or the processing unit are capable of discerning a change in direction of motion of ±10°. In certain embodiments, the sensor and/or the processing unit are capable of discerning a change in direction of motion of ±5°. In certain embodiments, the methods further include a remote control unit in communication with the processing unit to provide remote control of the processing unit and the objects in communication with the processing unit.

Embodiments of this disclosure relate to systems and apparatuses for controlling virtual objects include data from one or more sensors, one or a plurality of motion sensor including an active zone, where the sensor senses motion including motion properties within an active sensing zone of a motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The systems and apparatuses also include one or a plurality of processing unit or data from one or more processing units including communication software and hardware, where the unit converts the output into command and control functions, and one or a plurality of controllable objects in communication with the processing unit or units. The command functions include a scroll function, a select function, an attribute function, an attribute control function, a simultaneous control function, or mixtures and combinations thereof. The simultaneous control functions include a select and scroll function, a select, scroll and activate function, a select, scroll, activate, and attribute control function, a select and activate function, a select and attribute control function, a select, active, and attribute control function, or mixtures or combinations thereof. The processing unit or units (1) process scroll functions, (2) select and process scroll functions, (3) select and activate one controllable object or a plurality of controllable objects in communication with the processing unit, (4) select and activate one controllable attribute or a plurality of controllable attributes associated with the controllable objects in communication with the processing unit, or (5) select, activate an object or a plurality of objects in communication with the processing unit, and activate an attribute or a plurality of attributes associated with the object or the plurality of objects in communication with the processing unit.

In certain embodiments, the objects comprise virtual objects and mixtures or combinations thereof, where the virtual objects include any construct generated in a virtual world or by a computer and displayed by a display device and that are capable of being controlled by a processing unit. In other embodiments, the attributes comprise activatable, executable and/or adjustable attributes associated with the objects. In other embodiments, the objects comprise combinations of real and virtual objects and/or attributes. In other embodiments, changes in motion properties are changes discernible by the motion sensors and/or the processing units. In other embodiments, the sensor and/or the processing unit are capable of discerning a change in direction of motion of ±15°. In other embodiments, the sensor and/or the processing unit are capable of discerning a change in direction of motion of ±10°. In other embodiments, the sensor and/or the processing unit are capable of discerning a change in direction of motion of ±5°. In other embodiments, systems and apparatuses further include a remote control unit in communication with the processing unit to provide remote control of the processing unit and the objects in communication with the processing unit. In other embodiments, the motion sensor is selected from the group consisting of digital cameras, optical scanners, optical roller ball devices, touch pads, inductive pads, capacitive pads, holographic devices, laser tracking devices, thermal devices, any other device capable of sensing motion, arrays of motion sensors, and mixtures or combinations thereof. In other embodiments, the software products include computer operating systems, graphics systems, business software systems, word processor systems, internet browsers, accounting systems, military systems, control systems, or mixtures and combinations thereof.

The unique identifiers of this disclosure may include kinetic aspects and/or biometric aspects. These aspects may be collected and/or captured simultaneously and/or sequentially. Thus, the systems of this disclosure may collect and/or capture kinetic, biometric, and/or biokinetic data or any sequential or simultaneous combination of these as the user operates the interface. For example, the systems may collect and/or capture motion (kinetic) data and/or biokinetic data (mixture of kinetic data and biometric data), while a user is navigating through a menu. This data may be used in the construction of the identifiers of this disclosure, where motion data associated with use of the interfaces of this disclosure are used to enhance the uniqueness of the identifiers. Thus, motion of a user using the interfaces of this disclosure such as slight differences in a roll of a finger or fingers, an inclination of a wrist, a facial expression, etc. may be used to construct unique kinetic and/or biokinetic identifiers instead of using the more common aspects of biometrics such as a finger print, retinal scans, etc. For examples, differences in motion dynamics such as jitters, shaking, or other "noise" aspects of motion of a user interacting with the interfaces of this disclosure may be used to construct unique identifiers as these dynamic aspects of a user motion are unique to the user, again improving the uniqueness of the identifiers of this disclosure.

In certain embodiments, the identifiers of this disclosure are constructed from the dynamic nature of movements of a user interacting with the system independent of biometric data associated the user. Obviously, the motion is associated with movement of some real entity, entity part, and/or object sensed by a sensor, a sensing device or data generated by a sensor or sensing device. Thus, by collecting and/or capturing the dynamic motion associated with a user's interaction with the interfaces, a unique user identifier may be constructed using only the nature of the user's movements associated with using the interfaces of this disclosure. In fact, a person's biometric data may be realized by evaluating the size and type of motion made, where the roll of a finger while drawing circle may be used to deduce the size and length of the finger, wrist and even arm, thus providing a unique identifier(s) of the user. In other embodiments, the identifiers of this disclosure are constructed from both the dynamic nature of the user movements associated with using the interfaces of this disclosure and from user specific biometric data. Thus, the systems of this disclosure may be used to construct unique kinetic identifiers (user specific movement), to construct unique biokinetic identifiers, to construct unique identifiers that include combinations of: (1) a unique kinetic identifier and a unique biokinetic identifier, (2) a unique kinetic identifier and a unique biometric identifier, (3) a unique biokinetic identifier and a unique biometric identifier, or (4) a unique biokinetic identifier, a unique kinetic identifier, and a unique biometric identifier.

In certain embodiments, the systems of this disclosure collect and/or capture dynamic movement and/or motion data of a user using a mouse to control a cursor or data associated with movement and/or motion on a touch screen or pad to construct unique kinetic identifiers. The systems may also combine this kinetic data with biometric data to form unique biokinetic identifiers. Thus, by collecting and/or capturing data associated with using a mouse to move a cursor or using a finger to moving across a touch screen or touch pad, the data contains unique features of the way a user uses the mouse device or passes a finger across the touch screen or touch pad. The data includes direction, speed, acceleration, changes in direction, changes in velocity, changes in acceleration, time associated with changes in direction, velocity, acceleration, and/or distance traveled. In certain embodiments, the motion is collected and/or captured in a designated zone. Thus, the specific mannerisms of a user moving a cursor may be used to construct unique identifiers for security or signature verification. In other embodiments, interaction of the user's motion of a finger or mouse with kinetic objects or objects with dynamic or static attributes further provides identifiers for security or verification.

In certain embodiments, the systems collect and/or capture motion data associated with opening a program or program component using a gesture or a manner in which the user opens a program or program components including, without limitation, direction, velocity, acceleration, changes in direction, velocity and/or acceleration, variation in the smoothness of the motions, timing associated with the motion components to identify unique characteristics associated with how the user moves in opening a program or a program component. For example, the user may make a check mark motion in a unique and discernible manner, i.e., the motion is unique relative to other users that move in a similar manner. The uniqueness of the motion may be enhanced by collecting and/or capturing data associated with the manner a user moves a cursor or a finger over (a) a certain section of an icon, (b) near, next to or proximate the icon, (c) a specific edge(s), (d) near, next to, or proximate a certain side(s), or (e) a mixture or combination of such movements. The uniqueness may be further enhanced by collecting and/or capturing motion as the icon or program begins to open or respond; for example, as the cursor (or finger or remote controlled object) is moved over a log-in button on a screen, the button might expand in size, and as it expands, or after it gets to a designated size, another motion is made in a designated area of the object, or towards a corner (for example) as the object is enlarging or after it enlarges, then this may be equivalent to a two stage verification based on motion.

The specific area of the icon or screen may be highlighted and/or designated by objects, colors, sounds, shapes, etc. or combinations of such attributes. So as a user moves, the cursor over a "login" button, the login button may expand in size, then having the user delay to provide time to activate the signature/authentication process. Once the object stopped expanding (taking milliseconds to seconds normally), then the cursor may be moved towards or to a designated area/object/attribute in a linear way/direction or a non-linear way/direction, or around one or more objects, creating a curvilinear or other type of 2D or 3D motion. The motion or path may also include mouse clicks, taps on a screen with one or more touch points, double mouse clicks or touches on a screen, motions in 3D space, such as pumping motions, etc. The motion of the cursor to, on or in proximity to an object may cause an attribute change of the object, then clicking or touching and dragging a cursor (creating a motion—cursor of finger motion may be kept unseen as well) may be used in conjunction with the motion, and a release of the mouse button or touch off event or motion in a different direction may be used in conjunction with the motion on or about the object to further provide a unique signature. The attribute of the expanding object may be replaced by color changes, sounds or any other attribute or combination of attributes.

By the same token, asking a user to follow or replicate an animated motion with a cursor, and collecting and/or capturing user data as the user replicates the animated motion, where the data includes motion direction, distance, velocity, angle, acceleration, timing, and/or changes in the variables. This data would provide unique data for each user so that each user may be differentiated therefrom. This unique data may then be used to construct a unique biokinetic and/or kinetic identifier. The data may be 2D, 3D or a combination of motion is 2D and/or 3D environments. For example, the systems may display a specific movement of a body or body part, which the user mimics or replicates. The systems then collect and/or capture the user's replication of the specific movement data. The data includes kinetic data, biometric data, and/or biokinetic data. The kinetic data include, without limitation, distance, direction, velocity, angle, acceleration, timing, and/or changes in these variables. The biometric data include, without limitation, external body and body part data (e.g., external organ shape, size, coloration, structure, and/or texture, finger prints, palm prints, retinal scans, vein distribution data, EKG data, EEG data, etc.), internal body or body part data (e.g., internal organ shape, size, coloration, structure, and/or texture, finger prints, palm prints, retinal scans, vein distribution data, X-ray data, MRI data, ultrasonic data, EMF data, etc.) and/or object and object part data (e.g., internal and/or external, shape, size, coloration, structure, and/or texture, finger prints, palm prints, retinal scans, vein distribution data, X-ray data, MRI data, ultrasonic data, EMF data, etc.). The data may then be used to construct unique biometric, kinetic, and/or biokinetic identifiers. The animated movement may also be changed, and move at different speeds based on randomly generated patterns, with different speed elements and timed holds or acceleration differences to provide security measures and unique transactional information for each transaction, meaning not only unique user identification, but also every transaction having its own unique signature. Another example would be in an AR/VR environment. A virtual ball may be tossed to a user. Not only is the way the user catches the virtual ball be unique to the user (such as with one hand, two hands, hands behind the ball, on top and below, etc.), but the size of the hands, fingers, and the unique relationship between a motion based catch and biometrics is virtually impossible to duplicate. Even just a snapshot or still picture of this action would provide enough unique information to provide unique identifier.

By performing replications of animated movements several times (same or different movements), the identifier uniqueness may be enhanced, which would in turn enhance the unique verification of the user based on the kinetic or biokinetic identifier. Two frames (images) in a row provides two instances of a multi-verification process that, to the user, required no memorization and would be unique. The same process may be used with a mouse and cursor or touch based system, where providing an animated object and determining the unique way a user would "catch" the object with a cursor (changes of direction, speed, acceleration, timing, etc.) to construct a unique identifier. Multiple instances of motions, snapshots and gestures may be used in combination for extremely unique and discrete kinetic/biokinetic identifiers. In fact, by collecting and/or capturing how the user continues to make slight changes in biometric, kinetic, and/or biokinetic data, the systems may be able to predict changes in the user behavior further improving the uniqueness of the identifiers of this disclosure or provide biometric data, kinetic data, and/or biokinetic data that would match the user's unique physical, emotional, environmental, mental, neurological and physiological state over time. The animated paths may be defined by any function, combination of functions, intersections of function(s), function-line intercept, or any combination of combined function values prescribing intersection points with the user's motions, or may be chosen as random points in area or space. Using contextual or temporal data in conjunction with these techniques would further provide data for user or transactional or event verification and uniqueness.

In another embodiment, the systems of this disclosure construct a unique identifier from a user's interaction with the system using only a cursor. For examples, a user moves the cursor towards a log-in object. As the cursor moves, the object changes attribute (size, color, animation, etc.), then the user moves the cursor towards a designated corner of the log-in object associated with a log-in button. The user then activates the button, which may be performed solely by motion, and uses the cursor to sign within a signature field. The systems store the signature and data associated with all of the movement of the cursor in conjunction with moving towards the log-in object, selecting the log-in object, activating the log-in button, and signing within the signature field. The motion or movement data includes the trajectory information such as direction, velocity, acceleration, contact area, pressure distribution of contact area, and/or changes and/or fluctuations in any of these any of these terms.

Example of Data Captures

For biometric identifiers using apparatuses having touch sensitive motion sensors, the systems and methods of this disclosure may capture biometric data including finger print data, thumb print data, palm print data, and/or data associated with any parts thereof. In certain embodiments, this biometric data may be coupled with pressure distribution data. In other embodiments, this biometric data may be coupled with temperature distribution data. In certain embodiments, the systems and methods of this disclosure may use the biometric print data to construct biometric identifiers. In other embodiments, the systems and methods of this disclosure may use the biometric print data and the pressure distribution or the temperature distribution data to construct or generate a biometric identifier. In other embodiments, the systems and methods of this disclosure may use the biometric print data and the pressure distribution and the temperature distribution data to construct or generate a biometric identifier.

For kinetic identifiers, the systems and methods of this disclosure may capture the above data over time, where the capture time frame may be a short time frame data capture, a medium time frame data capture, a long time frame, and/or a very long time frame data capture as those terms are described herein, so that kinetic identifiers may be constructed from changes in print data such as flattening of print elements, rocking of print elements, or other movements of the finger, thumb, palm and/or part thereof within in the capture time frame. In other embodiments, the systems and methods of this disclosure may capture changes in the pressure distribution data and changes in the temperature distribution data. If the touch device also has ultrasound sensors capable of transmitting and detecting ultrasonic waves, then the biometric and kinetic data may include internal structural feature data and blood blow data, blood flow pattern data, changes in internal data, or other internal data over short, medium, long, and/or very long time frame data collections. For biokinetic identifiers, the systems and methods of this disclosure may simultaneously capture the above referenced biometric data and kinetic data as well as other biokinetic data depending on sensor, sensors, array, and/or array and sensor configurations. The systems and methods of this disclosure may then construct biokinetic identifiers from any combination of the biometric data, the kinetic data and/or the biokinetic data.

For optical, audio, or other non touch devices, the systems and methods of this disclosure may capture biometric data such as external body and/or body part data including shape, size, relative relationships between one or more body parts, and/or, if the sensor configuration admits internal data capture, then internal body part structural data may be captured or collected and used to construct biometric identifiers. For kinetic identifiers, the systems and methods of this disclosure may capture the biometric features changing over short, medium, long, and/or very long time frame data captures. For biokinetic identifies, the systems and methods of this disclosure may capture biokinetic data using the sensor or the sensor configuration. The systems and methods of this disclosure may then use these data to construct biometric identifiers, kinetic identifier, and/or biokinetic identifiers.

For gestures based or predetermined, predefined, or on the fly movement pattern systems and methods, the systems and methods of this disclosure may capture biometric data associated with a gesture or a pattern and the biometric data may be used to construct biometric identifiers. In other embodiments, the systems and methods of this disclosure may capture kinetic data associated with changes associated with the gesture or the pattern and the kinetic data may be sued to construct kinetic identifiers. In other embodiments, the systems and methods of this disclosure may capture biokinetic data associated with the gesture or the pattern and the biokinetic data may be used to construct biokinetic identifiers The systems and methods of this disclosure may construct identifiers including body and/or body part biometric data, body and/or body part kinetic data, and/or body and/or body part biokinetic data. The kinetic data may include fluctuation data, trajectory data, relative fluctuation data, and/or relative trajectory data. The biometric data may include gap data, interference pattern data, relative position data, any other biometric data associated with gesture or pattern movement. The biokinetic data may include any combination of the biometric data and kinetic data as well as the biokinetic data.

In other embodiments, the biometric data, the kinetic data and/or the biokinetic data may be associated with different type of movement patterns and/or trajectories carried out by the user. These movement patterns and/or trajectories may be predetermined, predefined, or dynamic—on-the-fly—based on the interaction of the user with the apparatuses or systems of this disclosure. For example, the systems, apparatuses, and/or methods of this disclosure may be configured to capture these data types based on a data capture of movement of a body and/or a body part and/or an object under control of an entity within an active zone of one or more sensors and/or sensor arrays as the body and/or body part undergoes a normal movement within the active zones. The movement may be over a short distance, a medium distance, or a long distance, where a short distance is a travel distance of less than about 25% of the area or volume of the zones, a medium distance is a travel distance of greater than 25% and less than about 75% of the area or volume of the zones, and the long distance is a travel distance of more than 75% of the area or volume of the zones. Of course, it should be recognized that the short, medium, and long distance may be defined differently provided that they are scaled relative to the extent of the zone of each of the sensors or sensor arrays.

In other embodiments, the threshold movement for activating the systems and apparatuses of this disclosure may be determined by a movement of a body and/or a body part and/or an object under control of an entity within an active zone of one or more sensors and/or sensor arrays as the body and/or body part. The movement may be at a velocity for a period of time or over a distance sufficient to meet the movement threshold for each sensor or sensor array. The movement may be a short distance, a medium distance, or a long distance, where a short distance is a travel distance or velocity times time of less than about 5% of the area or volume of the zones, a medium distance is a travel distance or velocity times time of greater than 5% and less than about 10% of the area or volume of the zones, and the long distance is a travel distance or velocity times time of more than 10% of the area or volume of the zones, where the time duration are sufficient to meet the distance criteria at the sensed velocity. Of course, it should be recognized that the short, medium, and long distance or velocity times time may be defined differently provided that they are scaled relative to the extent of the zone of each of the sensors or sensor arrays.

Other Embodiments

Embodiments of this disclosure broadly relate to methods comprising: receiving first input at a computing device, the first input corresponding to first movement in a virtual reality (VR) or augmented reality (AR) environment; initiating at a display device, display of a first menu in response to the first input, the first menu including a plurality of selectable items; receiving second input during display of the first menu, the second input corresponding to a selection of a particular selectable item of the plurality of selectable items; and initiating, at the display device, display of an indication that the particular selectable item has been selected. In certain embodiments, at least one of the first input or the second input corresponds to movement of a hand, an arm, a finger, a leg, and/or a foot. In other embodiments, at least one of the first input or the second input correspond to eye movement or an eye gaze. In other embodiments, the first movement in the VR or AR environment comprises movement of a virtual object or a cursor in the VR or AR environment. In other embodiments, the second input indicates second movement in a particular direction in the VR or AR environment, and further comprising determining, based on the particular direction, that the second input corresponds to the selection of the particular selectable item. In other embodiments, methods further comprise initiating execution of an application corresponding to the particular selectable item. In other embodiments, methods further comprising initiating display of a second menu corresponding to the particular selectable item. In other embodiments, the second menu includes a second plurality of selectable items. In other embodiments, the display device is integrated into the computing device. In other embodiments, the computing device comprises a VR or AR headset. In other embodiments, the display device is external to and coupled to the computing device.

Embodiments of this disclosure broadly relate to apparatuses comprising: an interface configured to: receive first input at corresponding to first movement in a virtual reality (VR) or augmented reality (AR) environment; and receiving second input corresponding to a selection of a particular selectable item of a plurality of selectable items; and a processor configured to: initiating at a display device, display of a first menu in response to the first input, the first menu including the plurality of selectable items; and initiate, at the display device, display of an indication that the particular selectable item has been selected. In certain embodiments, the apparatus further comprises the display device. In other embodiments, the first input and the second input are received from the same input device. In certain embodiments, the apparatus further comprises the input device. In other embodiments, the input device comprises an eye tracking device or a motion sensor. In other embodiments, the first input is received from a first input device and wherein the second input is received from a second input device that is distinct from the first input device.

Embodiments of this disclosure broadly relate to methods comprising: receiving first input at a touchscreen of a mobile device; displaying a first menu on the touchscreen in response to the first input, the first menu including a plurality of selectable items; receiving, at the touchscreen while the first menu is displayed on the touchscreen, second input corresponding to movement in a particular direction; and determining, based on the particular direction, that the second input corresponds to a selection of a particular selectable item of the plurality of selectable items. In other embodiments, the first input corresponds to movement in a first direction. In other embodiments, the first direction differs from the particular direction. In other embodiments, the first input is received at a particular location of the touchscreen that is designated for menu navigation input. In other embodiments, the first input ends at a first location of the touchscreen, wherein displaying the first menu includes displaying each of the plurality of selectable items, and wherein the movement corresponding to the second input ends at a second location of the touchscreen that is substantially collinear with the first location and the particular selectable item. In other embodiments, the second location is between the first location and the particular selectable item. In other embodiments, the methods further comprises displaying, at the touchscreen, movement of the particular selectable item towards the second location in response to the second input. In other embodiments, the methods further comprises launching an application corresponding to the particular selectable item. In other embodiments, the methods further comprises displaying a second menu on the touchscreen in response to the selection of the particular selectable item. In other embodiments, the first input and the second input are based on contact between a human finger and the touchscreen, and wherein the movement corresponding to the second input comprises movement of the human finger from a first location on the touchscreen to a second location of the touchscreen.

Embodiments of this disclosure broadly relate to mobile devices comprising: a touchscreen; and a processor configured to: responsive to first input at the touchscreen, initiate display of a first menu on the touchscreen, the first menu including a plurality of selectable items; and responsive to second input corresponding to movement in a particular direction while the first menu is displayed on the touchscreen, determine based on the particular direction that the second input corresponds to a selection of a particular selectable item of the plurality of selectable items. In other embodiments, the touchscreen and the processor are integrated into a mobile phone. In other embodiments, the touchscreen and the processor are integrated into a tablet computer. In other embodiments, the touchscreen and the processor are integrated into a wearable device.

Embodiments of this disclosure broadly relate to methods of implemented on an apparatus comprising at least one sensor or at least one sensor array, at least one processing unit, and at least one user interface, where each sensor has an active zone, where the sensors and/or sensor arrays are biokinetic, kinetic, and/or biometric, or producing unique identifiers, where the method comprises: detecting biometric properties and/or movement or motion by one or more of the sensors and/or sensor arrays, testing the biometric properties and/or detected movement to determine if the detected biometric properties and/or movement meet or exceed biometric properties and/or movement threshold criteria, if the detected biometric properties and/or movement fail the biometric properties and/or movement test, then control is transferred back to the detecting step, if the biometric properties and/or movement or motion pass the biometric properties and/or movement test, capturing sensor data, where the sensor data include kinetic data, biokinetic data, biometric data, or mixtures and combinations thereof, generating a user specific identifier, where the user specific identifier including biometric data only, kinetic data only, biokinetic data only, or any combination of two or more of the data types, and setting the generated user specific identifier for use in a user verification interface, program, website, or other verification system. In other embodiments, the methods further comprise testing the generated user specific identifier in a uniqueness test, if the generated user specific identifier fails the uniqueness test, then control is transferred back to creating step, if the generated user specific identifier passes the uniqueness test, setting the generated user specific identifier for use in a user verification interface, program, website, or other verification system. In other embodiments, the methods further comprise storing the captured data in a database associated with the processing unit. In other embodiments, the methods further comprise sensing a motion within an active sensing zone of one or more of the motion sensors, producing an output signal based on the sensed motion, converting, via a processing unit in communication with the motion sensor and configure to control one object or a plurality of objects, the output signal into a scroll command; processing the scroll command, the scroll command corresponding to traversal through a list or menu based on the motion, wherein the object or the plurality of objects comprise electrical devices, software systems, software products, or combinations thereof and wherein adjustable attributes are associated with the object or the plurality of objects, selecting and opening an object requiring a user specific identifier, sending a user specific identifier to the object, and activating the object based on the sent user specific identifier. In other embodiments, the methods further comprise logging out of the object, sensing a motion within an active sensing zone of a motion sensor, producing an output signal based on the sensed motion, converting, via a processing unit in communication with the motion sensor, the output signal into a select command; processing the select command comprising selecting a particular object from a plurality of objects based on the motion, wherein the particular object comprises an electrical devices, a software system, a software product, a list, a menu, or a combination thereof, and wherein adjustable attributes are associated with the particular object, selecting and opening an object requiring a user specific identifier, sending a user specific identifier to the object, and activating the object based on the sent user specific identifier. In other embodiments, the methods further comprise sensing a motion within an active sensing zone of a motion sensor, producing an output signal based on the sensed motion, converting, via a processing unit in communication with the motion sensor, the output signal into a select command; processing the select command comprising selecting a particular object from a plurality of objects based on the motion, wherein the particular object comprises an electrical devices, a software system, a software product, a list, a menu, or a combination thereof, and wherein adjustable attributes are associated with the particular object, selecting and opening an object requiring a user specific identifier, sending a user specific identifier to the object, and activating the object based on the sent user specific identifier. In other embodiments, the methods further comprise logging out of the object, sensing a motion within an active sensing zone of a motion sensor, producing an output signal based on the sensed motion, converting, via a processing unit in communication with the motion sensor, the output signal into a select command; processing the select command comprising selecting a particular object from a plurality of objects based on the motion, selecting and opening the object requiring the user specific identifier, sending the user specific identifier to the object, and activating the object based on the sent user specific identifier. In other embodiments, the activating step includes: detecting a touch on a touch sensitive sensor or touch screen, or detecting movement within an active zone of one or more sensors, or detecting a sound, or detecting a change in a value of any other sensor or sensor array, or any combination thereof. In other embodiments, the detected value exceeds a threshold value. In other embodiments, the identifier comprises a signature, a user name, a password, a verifier, an authenticator, or any other user unique identifier. In other embodiments, the user specific identifier comprises a biometric user specific identifier. In other embodiments, the user specific identifier comprises a kinetic user specific identifier. In other embodiments, the user specific identifier comprises a biokinetic user specific identifier comprising (a) user specific biokinetic data, (b) a mixture or combination of user specific biometric data and user specific kinetic data, or (c) a mixture or combination of user specific biometric data, user specific kinetic data, and user specific biokinetic data.

Embodiments of this disclosure broadly relate to systems of producing unique identifiers comprising at least one sensor or at least one sensor array, at least one processing unit, and at least one user interface, where each sensor has an active zone, where each sensor comprises a biokinetic sensor, a kinetic sensor, and/or a biometric sensor, where each sensor measures biokinetic data, kinetic data, and/or biometric data, where the processing unit captures biokinetic data, kinetic data, and/or biometric data exceeding a threshold value for each sensor, where the processing unit generates a user specific identifier including biometric data only, kinetic data only, biokinetic data only, or any combination of two or more of the data types, where the processing unit tests the user specific identifier to insure the user specific identifier passes a uniqueness test, where the processing unit sets the user specific identifier for use in a user verification interface, program, website, or other verification system.

Embodiments of this disclosure broadly relate to methods comprising detecting biometric properties and/or movement or motion by one or more of the sensors and/or sensor arrays, testing the detected biometric properties and/or movement to determine if the detected biometric properties and/or movement meet or exceed biometric properties and/or movement threshold criteria, if the detected biometric properties and/or movement fail the biometric properties and/or movement test, then control is transferred back to the detecting step, if the biometric properties and/or movement or motion pass the biometric properties and/or movement test, capturing sensor data, where the sensor data include kinetic data, biokinetic data, biometric data, or mixtures and combinations thereof, generating a user specific identifier, where the user specific identifier including biometric data only, kinetic data only, biokinetic data only, or any combination of two or more of the data types, setting the generated user specific identifier for use in a user verification interface, program, website, or other verification system, logging into a virtual reality (VR) or augmented reality (AR) environment using the user specific identifier, receiving first input at a computing device, the first input corresponding to first movement in a virtual reality (VR) or augmented reality (AR) environment; initiating at a display device, display of a first menu in response to the first input, the first menu including a plurality of selectable items; receiving second input during display of the first menu, the second input corresponding to a selection of a particular selectable item of the plurality of selectable items; and initiating, at the display device, display of an indication that the particular selectable item has been selected. In other embodiments, at least one of the first input or the second input corresponds to movement of a hand, an arm, a finger, a leg, or a foot, and/or wherein at least one of the first input or the second input correspond to eye movement or an eye gaze. In other embodiments, the first movement in the VR or AR environment comprises movement of a virtual object or a cursor in the VR or AR environment and/or wherein the second input indicates second movement in a particular direction in the VR or AR environment, and further comprising determining, based on the particular direction, that the second input corresponds to the selection of the particular selectable item. In other embodiments, the methods further comprise initiating execution of an application corresponding to the particular selectable item, and/or initiating display of a second menu corresponding to the particular selectable item. In other embodiments, the second menu includes a second plurality of selectable items, or the display device is integrated into the computing device, or the computing device comprises a VR or AR headset or the display device is external to and coupled to the computing device.

Embodiments of this disclosure broadly relate to apparatuses comprising: an interface configured to: detect biometric properties and/or movement or motion by one or more of the sensors and/or sensor arrays; testing the detected biometric properties and/or movement to determine if the detected biometric properties and/or movement meet or exceed biometric properties and/or movement threshold criteria; if the detected biometric properties and/or movement fail the biometric properties and/or movement test, then control is transferred back to the detecting step; if the biometric properties and/or movement or motion pass the biometric properties and/or movement test, capturing sensor data, where the sensor data include kinetic data, biokinetic data, biometric data, or mixtures and combinations thereof; and the processor configured to: generate a user specific identifier, where the user specific identifier including biometric data only, kinetic data only, biokinetic data only, or any combination of two or more of the data types; set the generated user specific identifier for use in a virtual reality (VR) or augmented reality (AR) environment; and log in to the virtual reality (VR) or augmented reality (AR) environment using the user specific identifier. In other embodiments, the interface is further configured to: receive first input at corresponding to first movement in a virtual reality (VR) or augmented reality (AR) environment; and receive second input corresponding to a selection of a particular selectable item of a plurality of selectable items; and the processor is further configured to: initiate at a display device, display of a first menu in response to the first input, the first menu including the plurality of selectable items; and initiate, at the display device, display of an indication that the particular selectable item has been selected. In other embodiments, apparatuses further comprise: the display device, and/or wherein the first input and the second input are received from the same input device and the apparatus further comprises the input device. In other embodiments, the input device comprises an eye tracking device or a motion sensor. In other embodiments, the first input is received from a first input device and wherein the second input is received from a second input device that is distinct from the first input device.

Embodiments of this disclosure broadly relate to methods comprising: detecting biometric properties and/or movement or motion by one or more of the sensors and/or sensor arrays associated with a touchscreen of a mobile device, testing the detected biometric properties and/or movement to determine if the detected biometric properties and/or movement meet or exceed biometric properties and/or movement threshold criteria, if the detected biometric properties and/or movement fail the biometric properties and/or movement test, then control is transferred back to the detecting step, if the biometric properties and/or movement or motion pass the biometric properties and/or movement test, capturing sensor data, where the sensor data include kinetic data, biokinetic data, biometric data, or mixtures and combinations thereof, generating a user specific identifier, where the user specific identifier including biometric data only, kinetic data only, biokinetic data only, or any combination of two or more of the data types, setting the generated user specific identifier for use in a user verification interface, program, website, or other verification system, logging into a virtual reality (VR) or augmented reality (AR) environment using the user specific identifier, receiving first input at the touchscreen of the mobile device; displaying a first menu on the touchscreen in response to the first input, the first menu including a plurality of selectable items; receiving, at the touchscreen while the first menu is displayed on the touchscreen, second input corresponding to movement in a particular direction; and determining, based on the particular direction, that the second input corresponds to a selection of a particular selectable item of the plurality of selectable items. In other embodiments, the first input corresponds to movement in a first direction and/or wherein the first direction differs from the particular direction and/or wherein the first input is received at a particular location of the touchscreen that is designated for menu navigation input and/or wherein the first input ends at a first location of the touchscreen, wherein displaying the first menu includes displaying each of the plurality of selectable items, and wherein the movement corresponding to the second input ends at a second location of the touchscreen that is substantially collinear with the first location and the particular selectable item, and/or wherein the second location is between the first location and the particular selectable item. In other embodiments, the methods further comprise: displaying, at the touchscreen, movement of the particular selectable item towards the second location in response to the second input, and/or launching an application corresponding to the particular selectable item, and/or displaying a second menu on the touchscreen in response to the selection of the particular selectable item. In other embodiments, the first input and the second input are based on contact between a human finger and the touchscreen, and wherein the movement corresponding to the second input comprises movement of the human finger from a first location on the touchscreen to a second location of the touchscreen.

Embodiments of this disclosure broadly relate to mobile devices comprising: a touchscreen; and a processor configured to: detect biometric properties and/or movement or motion by one or more of the sensors and/or sensor arrays associated with the mobile device and/or the touchscreen; test the detected biometric properties and/or movement to determine if the detected biometric properties and/or movement meet or exceed biometric properties and/or movement threshold criteria; if the detected biometric properties and/or movement fail the biometric properties and/or movement test, then control is transferred back to the detect biometric properties and/or movement; if the biometric properties and/or movement or motion pass the biometric properties and/or movement test, capturing sensor data, where the sensor data include kinetic data, biokinetic data, biometric data, or mixtures and combinations thereof; and generate a user specific identifier, where the user specific identifier including biometric data only, kinetic data only, biokinetic data only, or any combination of two or more of the data types; set the generated user specific identifier for use in a virtual reality (VR) or augmented reality (AR) environment; and log in to the virtual reality (VR) or augmented reality (AR) environment using the user specific identifier. In other embodiments, the processor is further configured to be: responsive to first input at the touchscreen, initiate display of a first menu on the touchscreen, the first menu including a plurality of selectable items; and responsive to second input corresponding to movement in a particular direction while the first menu is displayed on the touchscreen, determine based on the particular direction that the second input corresponds to a selection of a particular selectable item of the plurality of selectable items. In other embodiments, the touchscreen and the processor are integrated into a mobile phone, or wherein the touchscreen and the processor are integrated into a tablet computer, or the touchscreen and the processor are integrated into a wearable device.

Suitable Components for Use in the Invention

The motion sensors may also be used in conjunction with displays, keyboards, touch pads, touchless pads, sensors of any type, or other devices associated with a computer, a notebook computer, a drawing tablet, any other mobile or stationary device, VR systems, devices, objects, and/or elements, and/or AR systems, devices, objects, and/or elements. The motion sensors may be optical sensors, acoustic sensors, thermal sensors, optoacoustic sensors, acoustic devices, accelerometers, velocity sensors, waveform sensors, any other sensor that senses movement or changes in movement, or mixtures or combinations thereof. The sensors may be digital, analog or a combination of digital and analog. For camera and/or video systems, the systems may sense motion (kinetic) data and/or biometric data within a zone, area or volume in front of the lens. Optical sensors may operate in any region of the electromagnetic spectrum and may detect any waveform or waveform type including, without limitation, RF, microwave, near IR, IR, far IR, visible, UV or mixtures or combinations thereof. Acoustic sensor may operate over the entire sonic range which includes the human audio range, animal audio ranges, or combinations thereof. EMF sensors may be used and operate in any region of a discernable wavelength or magnitude where motion or biometric data may be discerned. Moreover, LCD screen(s) may be incorporated to identify which devices are chosen or the temperature setting, etc. Moreover, the interface may project a virtual, virtual reality, and/or augmented reality and sense motion within the projected image and invoke actions based on the sensed motion. The motion sensor associated with the interfaces of this disclosure can also be acoustic motion sensor using any acceptable region of the sound spectrum. A volume of a liquid or gas, where a user's body part or object under the control of a user may be immersed, may be used, where sensors associated with the liquid or gas can discern motion. Any sensor being able to discern differences in transverse, longitudinal, pulse, compression or any other waveform could be used to discern motion and any sensor measuring gravitational, magnetic, electro-magnetic, or electrical changes relating to motion or contact while moving (resistive and capacitive screens) could be used. Of course, the interfaces can include mixtures or combinations of any known or yet to be invented motion sensors. Exemplary examples of motion sensing apparatus include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, any other device capable of sensing motion, changes in EMF, changes in wave form, or the like or arrays of such devices or mixtures or combinations thereof.

The biometric sensors for use in the present disclosure include, without limitation, finger print scanners, palm print scanners, retinal scanners, optical sensors, capacitive sensors, thermal sensors, electric field sensors (eField or EMF), ultrasound sensors, neural or neurological sensors, piezoelectric sensors, other type of biometric sensors, or mixtures and combinations thereof. These sensors are capable of capturing biometric data including external and/or internal body part shapes, body part features, body part textures, body part patterns, relative spacing between body parts, and/or any other body part attribute.

The biokinetic sensors for use in the present disclosure include, without limitation, any motion sensor or biometric sensor that is capable of acquiring both biometric data and motion data simultaneously, sequentially, periodically, and/or intermittently.

Suitable physical mechanical, electro-mechanical, magnetic, electro-magnetic, electrical, or electronic devices, hardware devices, appliances, and/or any other real world device that can be controlled by a processing unit include, without limitation, any electrical and/or hardware device or appliance having attributes which can be controlled by a switch, a joy stick or similar type controller, or software program or object. Exemplary examples of such attributes include, without limitation, ON, OFF, intensity and/or amplitude, impedance, capacitance, inductance, software attributes, lists or submenus of software programs or objects, or any other controllable electrical and/or electro-mechanical function and/or attribute of the device. Exemplary examples of devices include, without limitation, environmental controls, building systems and controls, lighting devices such as indoor and/or outdoor lights or light fixtures, cameras, ovens (conventional, convection, microwave, and/or etc.), dishwashers, stoves, sound systems, mobile devices, display systems (TVs, VCRs, DVDs, cable boxes, satellite boxes, and/or etc.), alarm systems, control systems, air conditioning systems (air conditions and heaters), energy management systems, medical devices, vehicles, robots, robotic control systems, UAV, equipment and machinery control systems, hot and cold water supply devices, air conditioning system, heating systems, fuel delivery systems, energy management systems, product delivery systems, ventilation systems, air handling systems, computers and computer systems, chemical plant control systems, manufacturing plant control systems, computer operating systems and other software systems, programs, routines, objects, and/or elements, AR systems, VR systems, remote control systems, or the like or mixtures or combinations thereof.

Suitable software systems, software products, and/or software objects that are amenable to control by the interface of this disclosure include, without limitation, any analog or digital processing unit or units having single or a plurality of software products installed thereon and where each software product has one or more adjustable attributes associated therewith, or singular software programs or systems with one or more adjustable attributes, menus, lists or other functions or display outputs. Exemplary examples of such software products include, without limitation, operating systems, graphics systems, business software systems, word processor systems, business systems, online merchandising, online merchandising systems, purchasing and business transaction systems, databases, software programs and applications, augmented reality (AR) systems, virtual reality (VR) systems, internet browsers, accounting systems, military systems, control systems, or the like, or mixtures or combinations thereof. Software objects generally refer to all components within a software system or product that are controllable by at least one processing unit.

Suitable processing units for use in the present disclosure include, without limitation, digital processing units (DPUs), analog processing units (APUs), any other technology that can receive motion sensor output and generate command and/or control functions for objects under the control of the processing unit, or mixtures and combinations thereof.

Suitable digital processing units (DPUs) include, without limitation, any digital processing unit capable of accepting input from a plurality of devices and converting at least some of the input into output designed to select and/or control attributes of one or more of the devices. Exemplary examples of such DPUs include, without limitation, microprocessor, microcontrollers, or the like manufactured by Intel, Motorola, Eriksson, HP, Samsung, Hitachi, NRC, Applied Materials, AMD, Cyrix, Sun Microsystem, Philips, National Semiconductor, Qualcomm, or any other manufacture of microprocessors or microcontrollers.

Suitable analog processing units (APUs) include, without limitation, any analog processing unit capable of accepting input from a plurality of devices and converting at least some of the input into output designed to control attributes of one or more of the devices. Such analog devices are available from manufacturers such as Analog Devices Inc.

Suitable motion sensing apparatus include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, particles sensors, any other device capable of sensing motion, changes in EMF, changes in wave form, or the like or arrays of such devices or mixtures or combinations thereof.

Suitable smart mobile devices include, without limitation, smart phones, tablets, notebooks, desktops, watches, wearable smart devices, or any other type of mobile smart device. Exemplary smart phone, table, notebook, watches, wearable smart devices, or other similar device manufacturers include, without limitation, ACER, ALCATEL, ALLVIEW, AMAZON, AMOI, APPLE, ARCHOS, ASUS, AT&T, BENEFON, BENQ, BENQ-SIEMENS, BIRD, BLACKBERRY, BLU, BOSCH, BQ, CASIO, CAT, CELKON, CHEA, COOLPAD, DELL, EMPORIA, ENERGIZER, ERICSSON, ETEN, FUJITSU SIEMENS, GARMIN-ASUS, GIGABYTE, GIONEE, GOOGLE, HAIER, HP, HTC, HUAWEI, I-MATE, I-MOBILE, ICEMOBILE, INNOSTREAM, INQ, INTEX, JOLLA, KARBONN, KYOCERA, LAVA, LEECO, LENOVO, LG, MAXON, MAXWEST, MEIZU, MICROMAX, MICROSOFT, MITAC, MITSUBISHI, MODU, MOTOROLA, MWG, NEC, NEONODE, NIU, NOKIA, NVIDIA, O2, ONEPLUS, OPPO, ORANGE, PALM, PANASONIC, PANTECH, PARLA, PHILIPS, PLUM, POSH, PRESTIGIO, QMOBILE, QTEK, QUALCOM, SAGEM, SAMSUNG, SENDO, SEWON, SHARP, SIEMENS, SONIM, SONY, SONY ERICSSON, SPICE, T-MOBILE, TEL.ME., TELIT, THURAYA, TOSHIBA, UNNECTO, VERTU, VERYKOOL, VIVO, VK MOBILE, VODAFONE, WIKO, WND, XCUTE, XIAOMI, XOLO, YEZZ, YOTA, YU, and ZTE. It should be recognized that all of these mobile smart devices including a processing unit (often times more than one), memory, communication hardware and software, a rechargeable power supply, and at least one human cognizable output device, where the output device may to be audio, visual and/or audio visual.

Suitable non-mobile, computer and server devices include, without limitation, such devices manufactured by @Xi Computer Corporation, @Xi Computer, ABS Computer Technologies (Parent: Newegg), Acer, Gateway, Packard Bell, ADEK Industrial Computers, Advent, Amiga, Inc., A-EON Technology, ACube Systems Srl, Hyperion Entertainment, Agilent, Aigo, AMD, Aleutia, Alienware (Parent: Dell), AMAX Information Technologies, Ankermann, AORUS, AOpen, Apple, Arnouse Digital Devices Corp (ADDC), ASRock, Asus, AVADirect, AXIOO International, BenQ, Biostar, BOXX Technologies, Inc., Chassis Plans, Chillblast, Chip PC, Clevo, Sager Notebook Computers, Cray, Crystal Group, Cybernet Computer Inc., Compal, Cooler Master, CyberPower PC, Cybertron PC, Dell, Wyse Technology, DFI, Digital Storm, Doel (computer), Elitegroup Computer Systems (ECS), Evans & Sutherland, Everex, EVGA, Falcon Northwest, FIC, Fujitsu, Fusion Red, Foxconn, Founder Technology, Getac, Gigabyte, Gradiente, Groupe Bull, Grundig (Parent: Arçelik), Hasee, Hewlett-Packard (HP), Compaq, Hitachi, HTC, Hyundai, IBM, IBuyPower, Intel, Inventec, In-Win, Ironside, Itautec, IGEL, Jetta International, Kohjinsha, Kontron AG, LanFirePC, Lanix, Lanner Electronics, LanSlide Gaming PCs, Lenovo, Medion, LG, LiteOn, Maingear, MDG Computers, Meebox, Mesh Computers, Micron, Microsoft, Micro-Star International (MSI), Micro Center, MiTAC, Motion Computing, Motorola, NComputing, NCR, NEC, NUDT, NVIDIA, NZXT, Olidata, Olivetti, Oracle, Origin PC, Panasonic, Positivo Informatica, Psychsoftpc, Puget Systems, Quanta Computer, RCA, Razer, RoseWill, Samsung, Sapphire Technology, Sharp Corporation, Shuttle, SGI, Siragon, Sony, StealthMachines, Supermicro, Systemax, System76, T-Platforms, TabletKiosk, Tadpole Computer, Tatung, Toshiba, Tyan, Unisys, V3 Gaming PC, Velocity Micro, Overdrive PC, Vestel, Venom, VIA Technologies, ViewSonic, Viglen, Virus Computers Inc., Vizio, VT Miltope, Wistron, Wortmann, Xidax, Zelybron, Zombie PC, and Zoostorm, and Zotac. It should be recognized that all of these computer and services including at least one processing unit (often times many processing units), memory, storage devices, communication hardware and software, a power supply, and at least one human cognizable output device, where the output device may to be audio, visual and/or audio visual. It should be recognized that these systems may be in communication with processing units of vehicles (land, air or sea, manned or unmanned) or integrated into the processing units of vehicles (land, air or sea, manned or unmanned).

Suitable biometric measurements include, without limitation, external and internal organ structure, placement, relative placement, gaps between body parts such as gaps between fingers and toes held in a specific orientation, organ shape, size, texture, coloring, color patterns, etc., circulatory system (veins, arteries, capillaries, etc.) shapes, sizes, structures, patterns, etc., any other biometric measure, or mixtures and combinations thereof.

Suitable kinetic measurements include, without limitation, (a) body movements characteristics—how the body moves generally or moves according to a specific set or pattern of movements, (b) body part movement characteristics—how the body part moves generally or moves according to a specific set or pattern of movements, (c) breathing patterns and/or changes in breathing patterns, (d) skin temperature distributions and/or changes in the temperature distribution over time, (e) blood flow patterns and/or changes in blood flow patterns, (f) skin characteristics such as texture, coloring, etc., and/or changes in skin characteristics, (g) body, body part, organ (internal and/or external) movements over short, medium, long, and/or very long time frames (short time frames range between 1 nanosecond and 1 microsecond, medium time frames range between 1 microsecond and 1 millisecond, and long time frames range between 1 millisecond and 1 second) such as eye flutters, skin fluctuations, facial tremors, hand tremors, rapid eye movement, other types of rapid body part movements, or combinations thereof, (h) movement patterns associated with one or more body parts and/or movement patterns of one body part relative to other body parts, (i) movement trajectories associated with one or more body parts and/or movement trajectories of one body part relative to other body parts either dynamically or associated with a predetermined, predefined, or mirrored set of movements, (j) blob data fluctuations associated with one or more body parts and/or movement patterns or trajectories of one body part relative to other body parts either dynamically or associated with a predetermined, predefined, or mirrored set of movements, (k) any other kinetic movements of the body, body parts, organs (internal or external), etc., (l) any movement of an object under control of a user, and (m) mixtures or combinations thereof.

Suitable biokinetic measurements include, without limitation, any combination of biometric measurements and kinetic measurements and biokinetic measurements.

DETAILED DESCRIPTION OF DRAWINGS OF THIS INVENTION

Control Apparatuses, Systems, and Methods

Referring now to FIGS. 1A-H, an embodiment of a motion sensing apparatus of this disclosure, generally 100, is shown to include a motion sensor 102. The motion sensor 102 has a field of view or active sensing zone 104, shown here as a cone. Within the field of view or active sensing zone 104, motion or movement may be detected or sensed. The apparatus 100 also includes a processing unit 106 in communication via communication path 108 with the motion sensor 102 for receiving output from the motion sensor 102 and generate command and/or control functions.

Figure 1A:
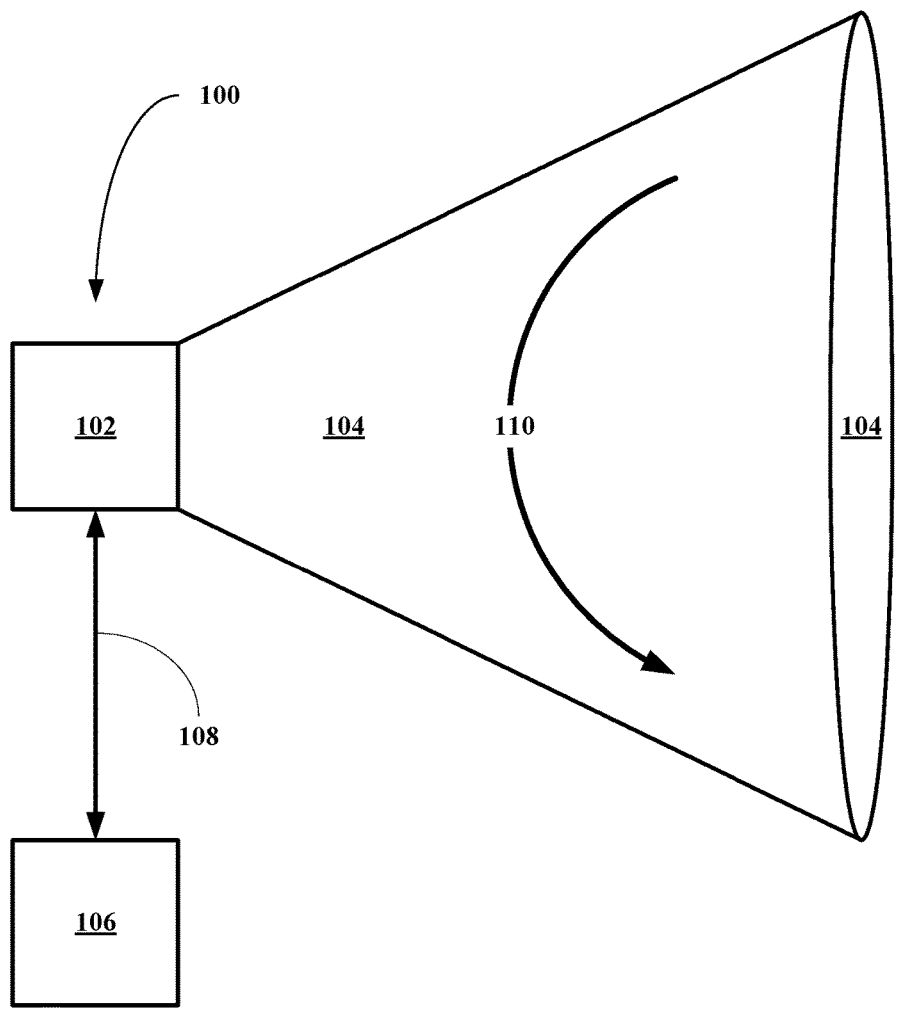
FIG. 1A depicts an embodiment of a system of this disclosure sensing an arcuate path illustrating simple angular motion.

Looking at FIG. 1A, an arcuate path 110 is shown. Because the path 106 is arcuate, the motion sensor 102 is capable of detecting various components of motion within in the field of view or active sensing zone 104. These components include direction along the path 106, changes in direction along the path 110, velocity along the path 110, changes in the velocity along the path 110, acceleration along the path 110, and changes in acceleration along the path 110. It should be recognized, the velocity and acceleration are vectorial values that have a magnitude and a direction. Thus, the motion sensor 102 may also separately determine the magnitude, time, and direction of the velocity and/or acceleration movement. As the motion is arcuate, the sensor 102 would generate all these types of path data. Moreover, the processing unit may use each data element individually and/or collectively (any combination) to cause an effect such as executing a command function to control devices, software programs, and/or any other object electrically or electro-mechanically. As stated previously, the velocity or acceleration may be linear, radial (linear from a center), angular (circular, spiral, elliptical, etc.) or arcuate, random, or any mixture thereof, or of any type that one might use to interface with objects. Random motions may be used for security purposes, where such motions may be duplicated later for unlocking, securing, or providing unique identifiers for users, including using kinetic (such as mouse cursor) or biokinetic signatures, where motion and biometrics (such as joint length of two fingers) are used to provide unique identifiers for individuals. In the present disclosure, the motion sensor(s) may be able to sense movement of multiple body parts or multiple objects in the field of view. Each individual sensed movement corresponding to a velocity, an acceleration, a change of velocity, a change of acceleration, a rate of change of velocity, and/or a rate of change of acceleration, or any collection of movements may be used to cause the processing unit to issue a command and the nature of the command may be based on the movement of multiple body parts or objects.

Figure 1B:
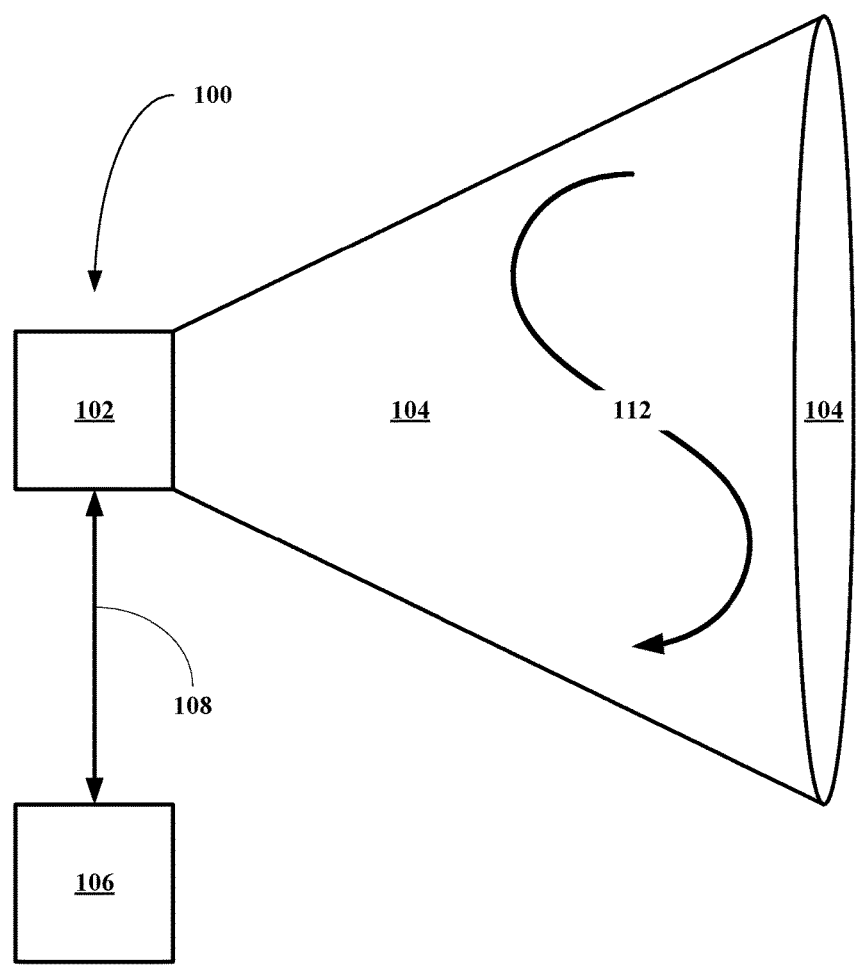
FIG. 1B depicts another embodiment of a system of this disclosure sensing a sinuous path illustrating complex angular motion.

Looking at FIG. 1B, a path 112 is shown to be S-shaped. Because the path 112 is S-shaped, the motion sensor 102 will detect components of motion including direction, changes in direction, time, velocity, changes in the velocity, acceleration, and changes in acceleration. It should be recognized, the velocity and acceleration are vectorial values that have a magnitude and a direction. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other object electrically or electro-mechanically.

Figure 1C:
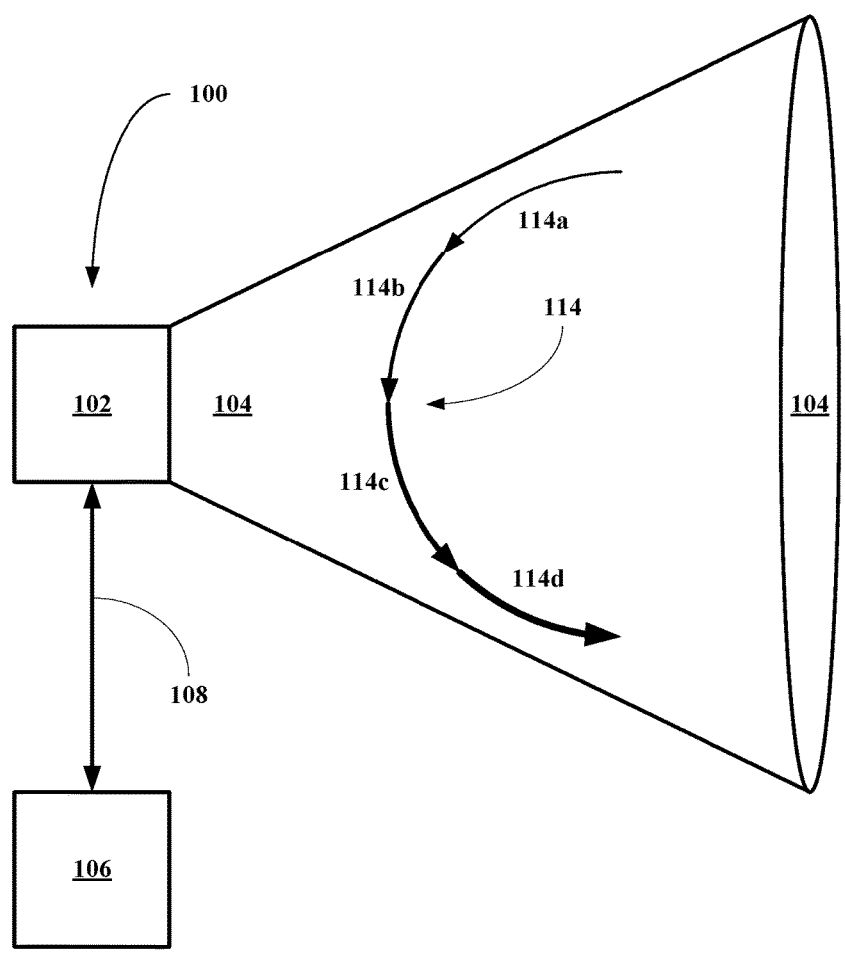
FIG. 1C depicts another embodiment of a system of this disclosure sensing an arcuate path including segments having different velocities and/or accelerations, but the same direction.

Referring now to FIG. 1C, an arcuate path 114 is shown, where the path 114 includes four segments 114a, 114b, 114c, and 114d. Each segment 114a-d has an increasing velocity and an increasing acceleration as indicated by the thickness of the lines. Because the path 114 is arcuate and includes ever increasing velocities, the motion sensor 102 is capable of detecting direction, changes in direction, velocity, changes in the velocity, acceleration, and changes in acceleration. It should be recognized, the velocity and acceleration are vectorial values that have a magnitude and a direction. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other object electrically or electro-mechanically.

Figure 1D:
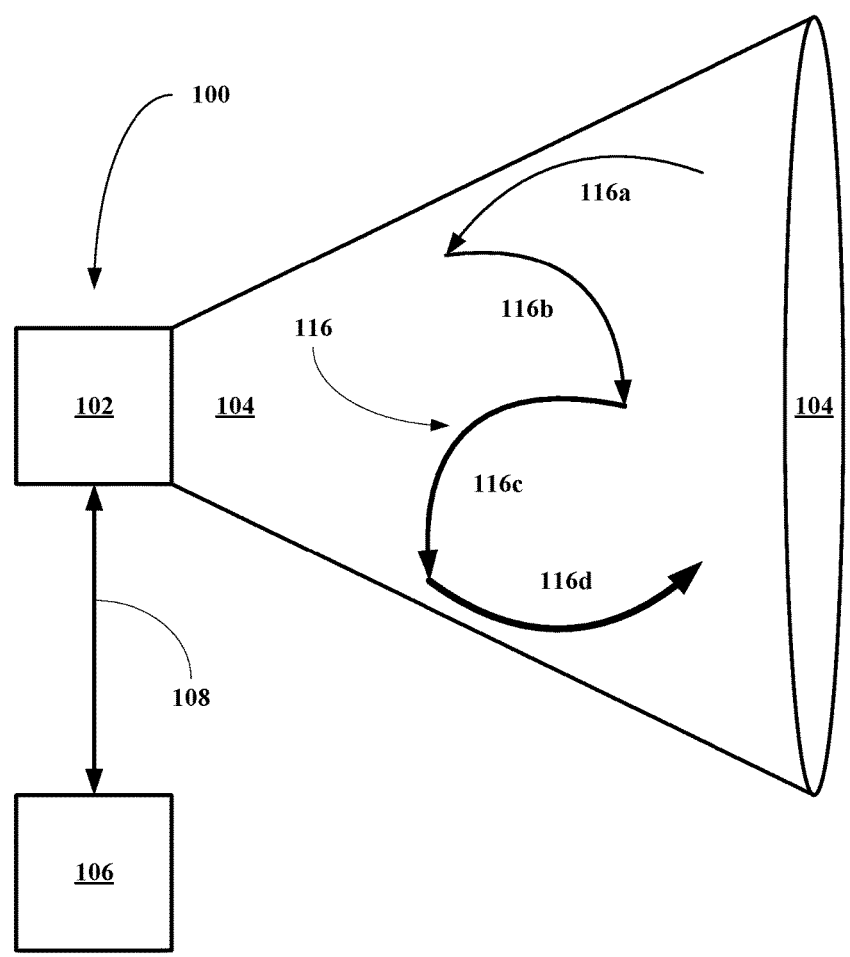
FIG. 1D depicts another embodiment of a system of this disclosure sensing a sequential path including a plurality of arcuate segments having different directions, velocities, and/or accelerations.

Referring now to FIG. 1D, a complex arcuate path 116 is shown, where the path 116 includes four segments 116a, 116b, 116c, and 116d. Each segment 116a-d has an increasing velocity and an increasing acceleration as indicated by the thickness of the lines, but with different directions as compared to the path 110. Because the path 116 is arcuate and includes ever increasing velocities, the motion sensor 102 is capable of detecting direction, changes in direction, velocity, changes in the velocity, acceleration, and changes in acceleration. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other virtual or real object electrically or electro-mechanically. In other embodiments, the motion represents an acceleration gesture, where the totality of the parts are used to provide an output, and the uniqueness of the gesture is provided by the changes of velocity and/or acceleration within the gesture.

Figure 1E:
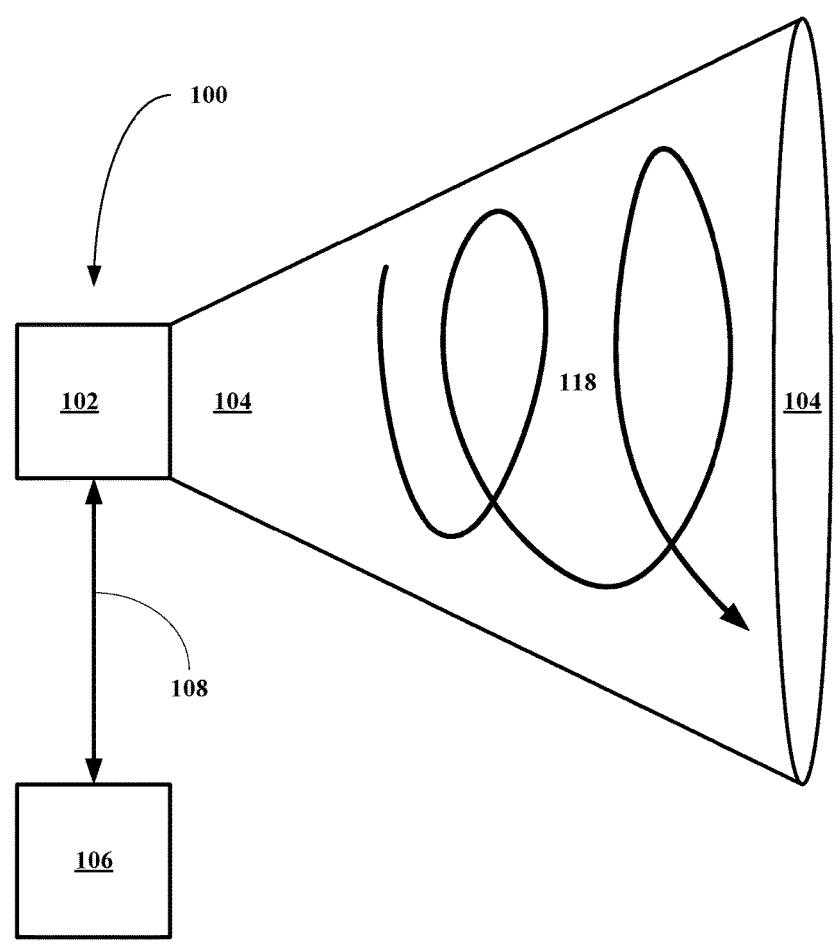
FIG. 1E depicts another embodiment of a system of this disclosure sensing a spiral path, where the spiral path may have constant or variable velocities, and/or accelerations.

Referring now to FIG. 1E, a spiral motion path 118 is shown. Because the path 118 is spiral shaped, the motion sensor 102 will detect components of motion including direction, changes in direction, velocity, changes in the velocity, acceleration, and changes in acceleration. It should be recognized, the velocity and acceleration are vectorial values that have a magnitude and a direction. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other virtual object, or any other real object such as a electrical objects or electro-mechanical objects.

Figure 1F:
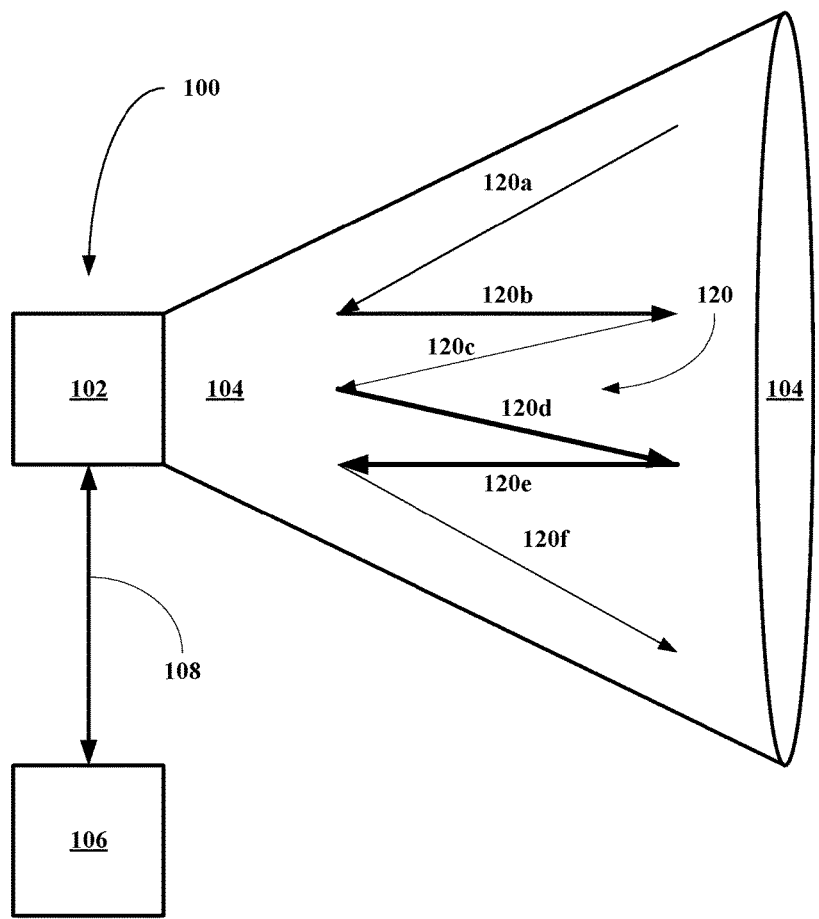
FIG. 1F depicts another embodiment of a system of this disclosure sensing a sequential path including a plurality of straight segments having different directions with different velocities, and/or accelerations.

Referring now to FIG. 1F, a path 120 is shown, where the path 120 includes six segments 120a, 120b, 120c, 120d, 120e, and 120f. Each segment 120a-f has a different direction and different velocity and/or acceleration as indicated by the thickness of the lines. Because the path 120 includes different segments, the motion sensor 102 is capable of detecting direction, changes in direction, velocity, changes in the velocity, acceleration, and changes in acceleration. It should be recognized, the velocity and acceleration are vectorial values that have a magnitude and a direction. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other object electrically or electro-mechanically.

Figure 1G:
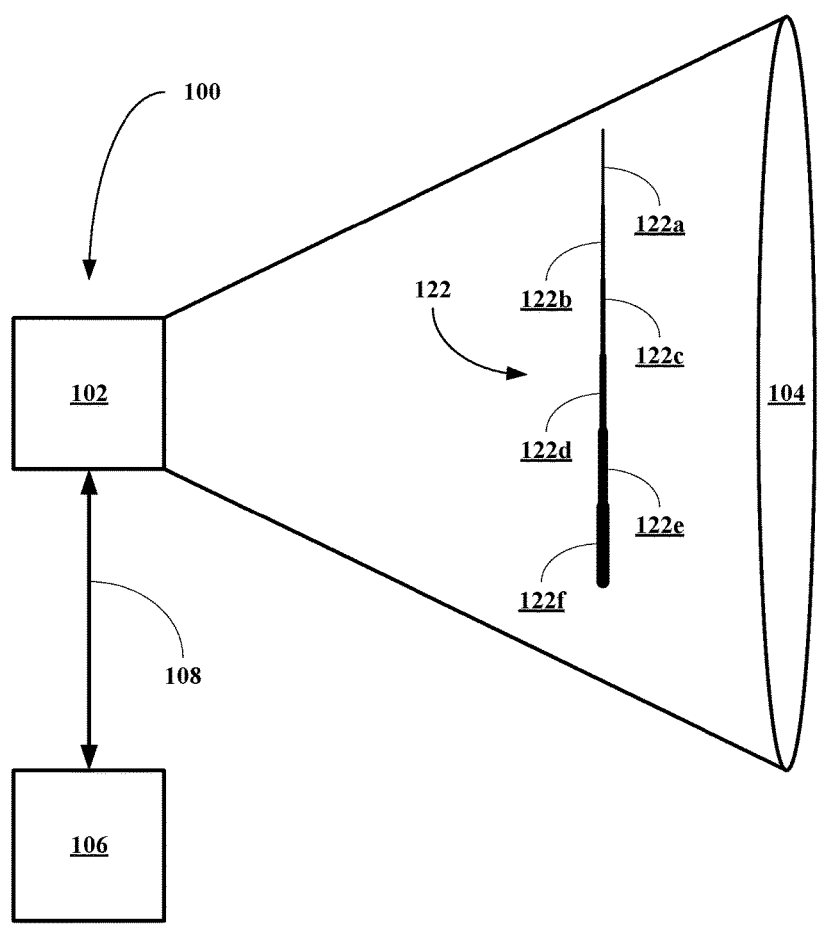
FIG. 1G depicts another embodiment of a system of this disclosure sensing a straight path having segments having different velocities and/or accelerations, but the same direction.

Referring now to FIG. 1G, a path 122 is shown, where the path 122 includes a sequence of segments 122a, 122b, 122c, 122d, 122e, and 122f having the same direction, but different velocities as indicated by the thickness of the lines. Because the path 122 includes different segments, the motion sensor 102 is capable of detecting the direction and the velocity or the acceleration of the motion direction, changes in the velocity, acceleration, changes in acceleration, rates of velocity changes, and/or rates of acceleration changes. It should be recognized, the velocity and acceleration are vectorial values that have a magnitude and a direction. Thus, the motion sensor 102 may also separately determine the magnitude and direction of the velocity and/or acceleration vectors. As the motion is arcuate, the sensor 102 would generate all these types of path data. Moreover, the processing unit may use each data element individually and/or collectively (any combination) to cause an effect such as executing a command function to control devices, software programs, and/or any other object electrically, optically, or electro-mechanically, or through any other medium by which commands or information may be communicated. Of course, the path 122 may be a path 122 that has a smooth change in velocity, where the processing unit or sensor or both interpret the path 122 as indicating a constantly changing velocity or acceleration, which may cause the processing unit to issue a command different from a series of segments, each segment having a constant velocity, but different from the previous or later segment.

Figure 1H:
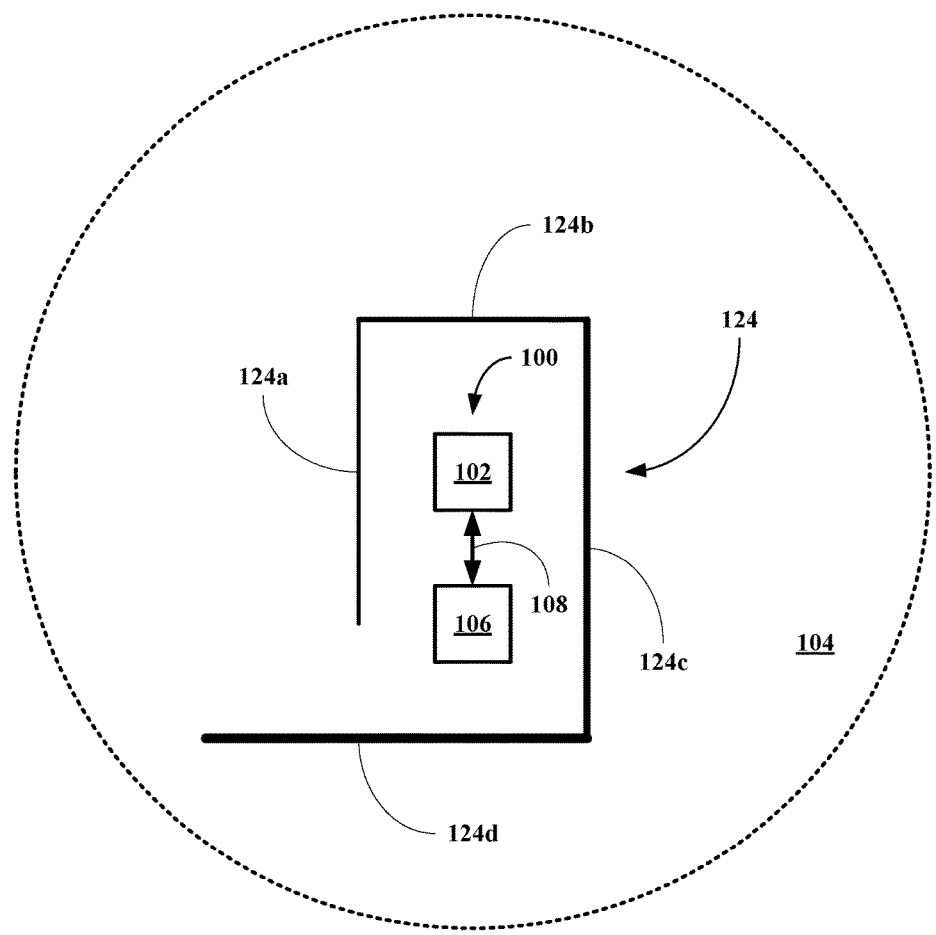
FIG. 1H depicts another embodiment of a system of this disclosure sensing a gesture including up, right, down and left segments having different directions with different velocities, and/or accelerations.

Referring now to FIG. 1H, a gesture 124 is shown, where the gesture 124 includes a sequence of segments 124a, 124b, 124c, and 124d having the different directions, different velocities, and/or different accelerations, illustrated by different line thicknesses. While the gesture 124 here is shown to include segments 124a-d that increase in velocity and/or acceleration and change in direction in going from 124a to 124d, the segments 124a-d may have any direction, velocity, and/or acceleration change profile, where each combination of directions, velocities, and/or accelerations may represent a different gesture. Thus, a gesture including motion up, right, down and left may represent a number of different gestures depending upon the velocity and/or acceleration of each segment.

Figure 2:
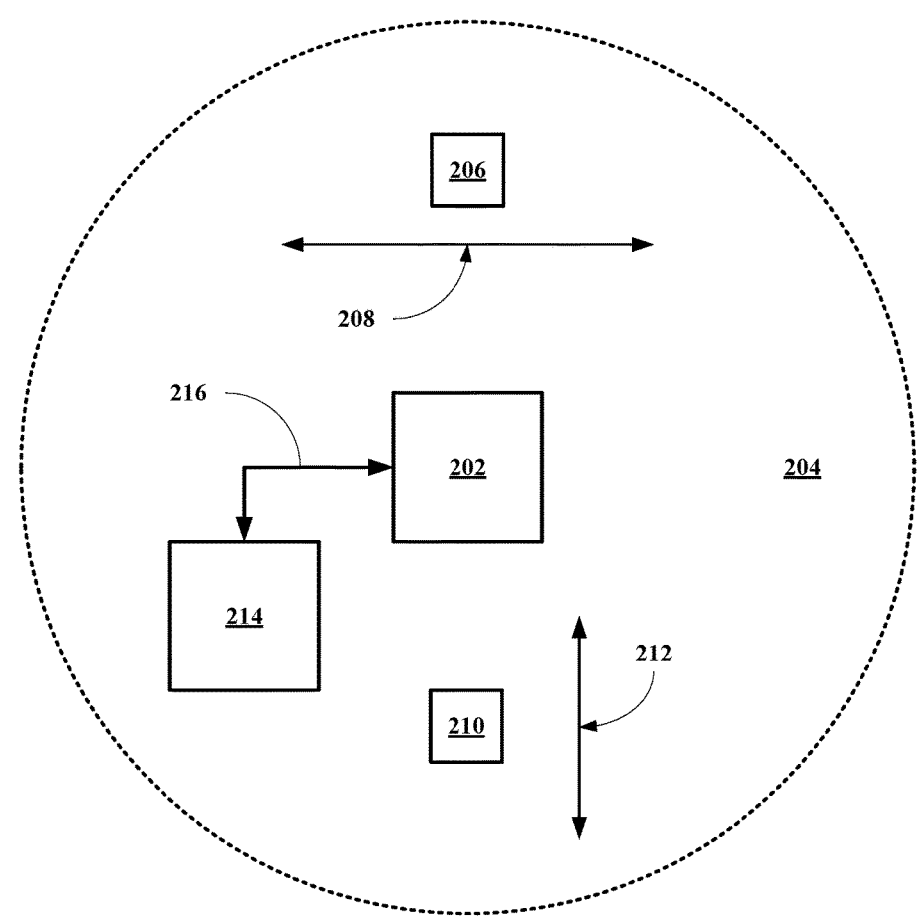
FIG. 2 depicts an embodiment of a system of this disclosure including a sensor and two separate movements within an active zone in two different directions by two different entity objects.

Referring now to FIG. 2, an embodiment of a motion sensing apparatus of this disclosure, generally 200, is shown to include a motion sensor 202. The motion sensor 202 has a field of view or active sensing zone 204, shown here as dashed circle. Within the field of view or active sensing zone 204, motion or movement may be detected or sensed as the active zone 204 is either pointing in the +z or −z direction or both the +z and −z directions. As shown in the system 200, a first entity or a first entity object 206 under the control of the first entity in the real world that is sensed by the motion sensor 202 in a first direction 208, here shown as motion is the x-direction. The system 200 also includes a second entity or a second entity object 210 under the control of the second entity in the real world that is sensed by the motion sensor 202 in a second direction 212, here shown as motion is the y-direction. The apparatus 200 also includes a processing unit 214 in communication with the sensor 202 via a communication path 216. While in this figure, the two directions are in the x-direction and y-direction, the two directions do not have to be different nor at right angles to each other. The two sensed motions or movements may result in separate sensor output signals or a combined sensor output signal, where the separate and/or combined sensor output signals are used by the processing unit or units to generate a command and/or control functions as set forth above. One of the separate sensor outputs could be used by the processing unit to generate a command and/or control function, while the second could be used as a confirmation of the function, cause a modification of the function, causes a further specification of the function, or causes the function to be rejected. Thus, the two motions could be separated by a delay so that the second motion would represent a confirmatory motion or a rejection of the selection.

Figure 3A:
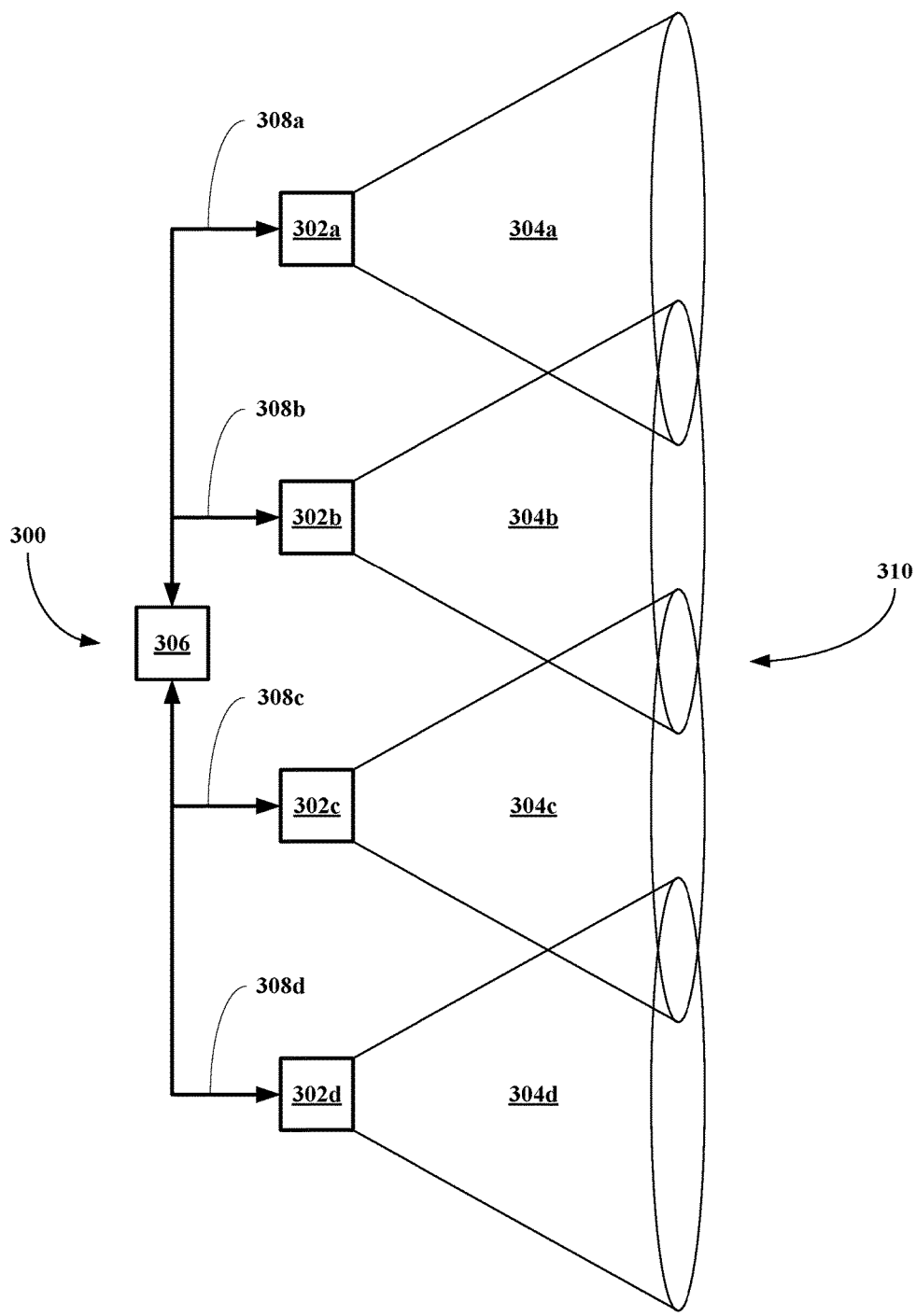
FIG. 3A depicts an embodiments of a system of this disclosure including a central processing unit and a plurality (here four) motions sensors having active zones pointing in the +x direction.

Referring now to FIG. 3A, an embodiment of a motion sensing apparatus of this disclosure, generally 300, is shown to include four motion sensors 302a-d having fields of view or active sensing zones 304a-d and a processing unit 306 in active communication with the sensors 302a-d via communication pathways 308a-d. Within the fields of view or active sensing zones 304a-d, motion or movement may be detected or sensed by the respective sensors 302a-d. The fours sensor 302a-d comprise an sensor array 310. The sensor array 310 is show here with all sensors 302a-d having their active zones 304a-d pointing only in one direction, +x. Of course, it should be recognized that the sensor array 310 may have any desired unidirectional configuration.

Figure 3B:
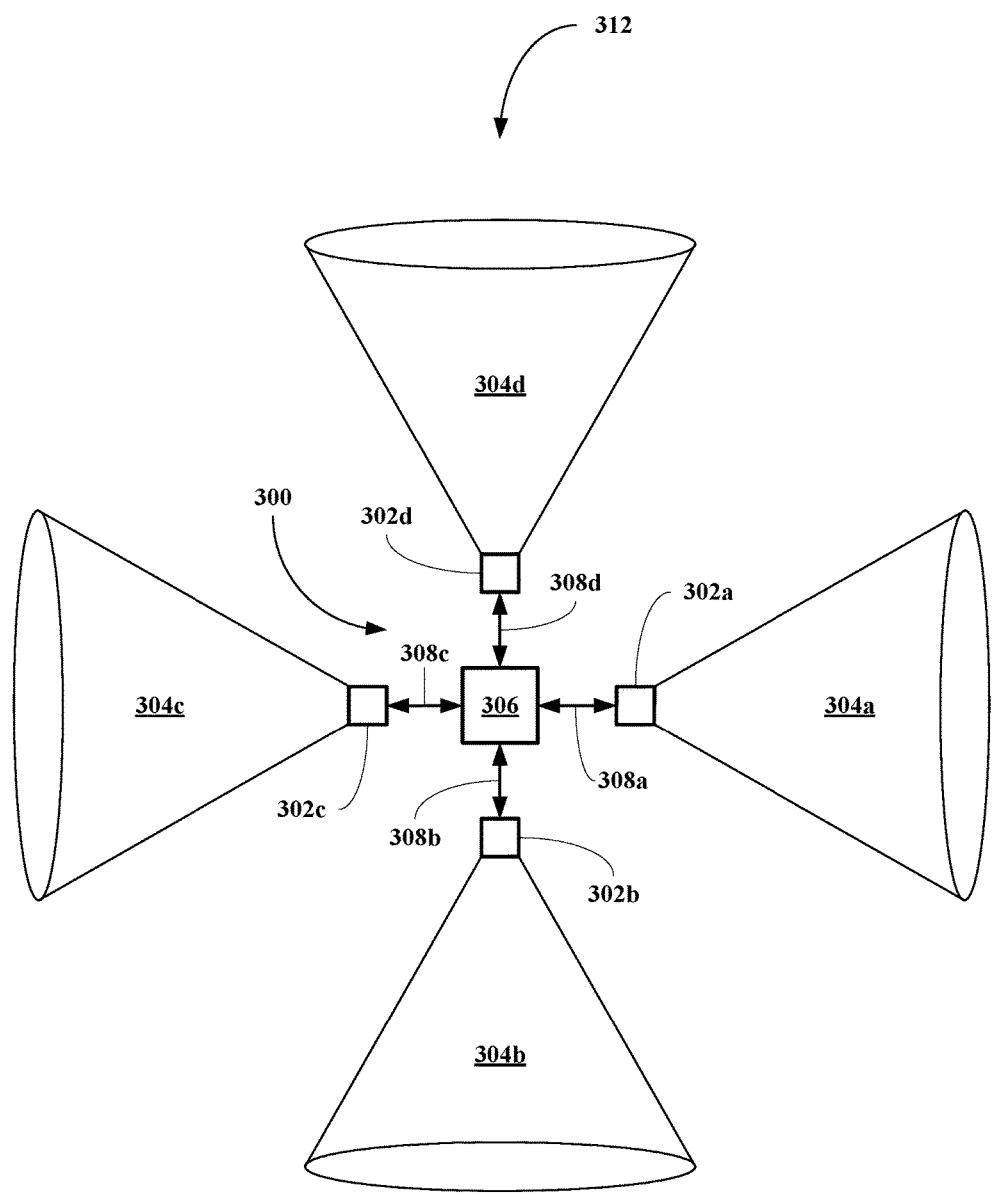
FIG. 3B depicts an embodiments of a system of this disclosure including a central processing unit and a plurality (here four) motions sensors having active zones pointing in the +x, −y, −x and +y directions.

Referring now to FIG. 3B, an embodiment of a motion sensing apparatus of this disclosure, generally 300, is shown to include four motion sensors 302a-d having fields of view or active sensing zones 304a-d and a processing unit 306 in active communication with the sensors 302a-d via communication pathways 308a-d. Within the fields of view or active sensing zones 304a-d, motion or movement may be detected or sensed by the respective sensors 302a-d. The fours sensor 302a-d comprise an sensor array 312. The sensor array 312 is show here with the four sensors 302a-d having their active zones 304a-d pointing in four different directions, +x, −x, +y, and −y, respectively. Of course, it should be recognized that the sensor array 312 may have any desired four directional configuration and may be in 2D or 3D environments.

Figure 3C:
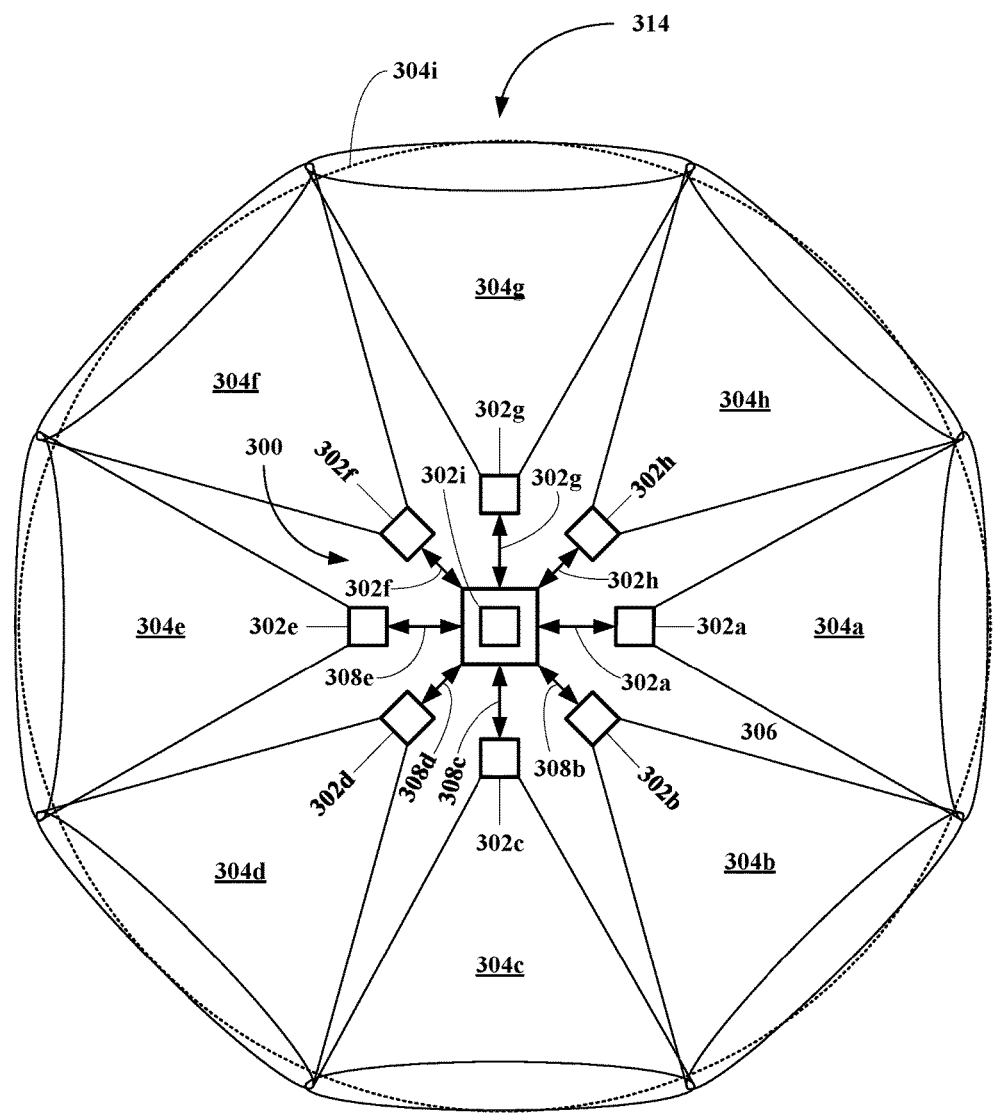
FIG. 3C depicts an embodiments of a system of this disclosure including a central processing unit and a plurality (here nine) motions sensors having active zones pointing in the +x, +x−y, −y, −x−y, −x, −x+y, +y, +x+y, and +z directions.

Referring now to FIG. 3C, an embodiment of a motion sensing apparatus of this disclosure, generally 300, is shown to include nine motion sensors 302a-i having fields of view or active sensing zones 304a-i and a processing unit 306 in active communication with the sensors 302a-i via communication pathways 308a-i. Within the fields of view or active sensing zones 304a-i, motion or movement may be detected or sensed by the respective sensors 302a-i. The nine sensor 302a-i comprise a sensor array 314. The sensor array 314 is show here with the nine sensors 302a-i having their active zone 304a-i pointing in nine different directions, +x, +x−y, −y, −x−y, −x, −x+y, +y, +x+y, and +z. The apparatus 300 may also include as tenth motion sensor 302j (not shown) having an active zone 304j (not shown) pointing in the −z direction. Of course, it should be recognized that the sensor array 314 may have any desired four directional configuration.

Figure 3D:
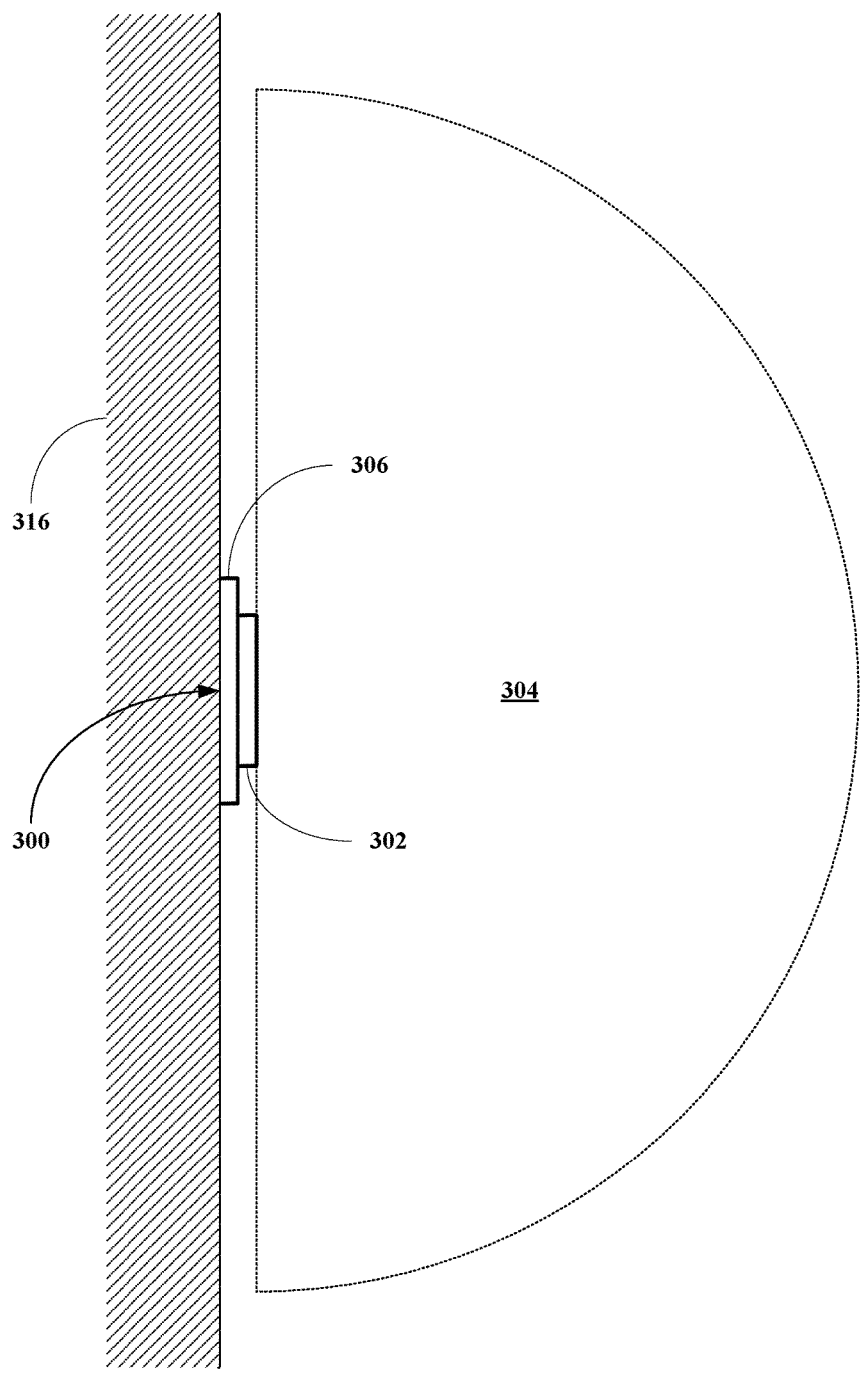
FIG. 3D depicts an embodiments of a system of this disclosure including a central processing unit and a plurality (here four) motions sensors.

Referring now to FIG. 3D, an embodiment of a motion sensing apparatus of this disclosure, generally 300, is shown to include a motion sensor 302 having field of view or active sensing zone 304 and a processing unit 306 in active communication with the sensors 302 via communication pathway via direct contact. The motion sensor 302 has a field of view or active sensing zone 304, shown here as a hemisphere. Within the field of view or active sensing zone 304, motion or movement may be detected or sensed. The apparatus 300 is mounted on a wall or a ceiling 316. It should be noted that multiple hemispherical sensors, with overlapping zones may be used. In certain embodiments, movement in overlapped zones may carry a different weight of verification.

Referring now to FIGS. 4A-F, embodiments of uses of the present apparatuses and systems of this disclosure are shown. Looking at FIG. 4A, the apparatuses and systems is used to control lights in a room 400 including a left wall 402, a right wall 404, a bottom wall 406, and a top wall 408. The left wall 402 includes lights 410; the right wall 404 includes lights 412; the bottom wall 406 includes lights 414; and the top wall 408 includes lights 416. Not shown here, the user has already used the apparatuses and systems of this disclosure to select lights in the room 400, instead of a sound system, a TV system, a security system, or any other controllable system associated with room 400 and controllable from within the room 400. In these figures, all of the lights 410, 412, 414, and 416 are all in their maximum intensity state. It should be recognized that the starting point of each light may be the same or different and the effect of the motion will proportionally change the intensity of each light in accord with the properties of the motion and context may be included as well, i.e., stage lighting might be given greater range of motion than audience lighting for the same motions. It should also be recognized that intensity may be replaced or used in combination with any other attribute, and the effect of each fixture or attribute may be pre-configured or configured to change proportionately or no-proportionately as desired.

Figure 4A:
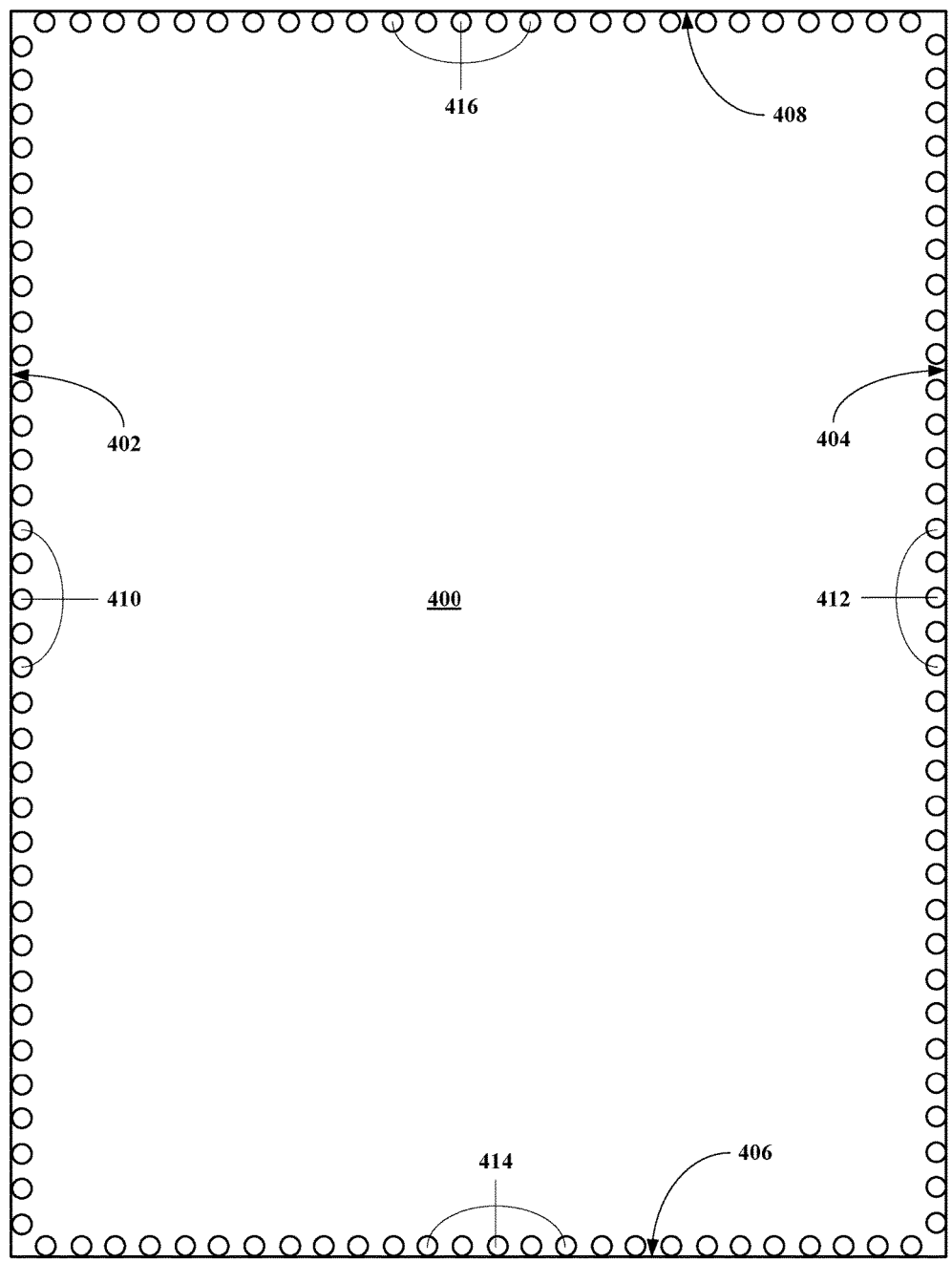
FIGS. 4A-F depict uses of the apparatuses, systems, and methods of this disclosure to control lights within a room.
Figure 4B:
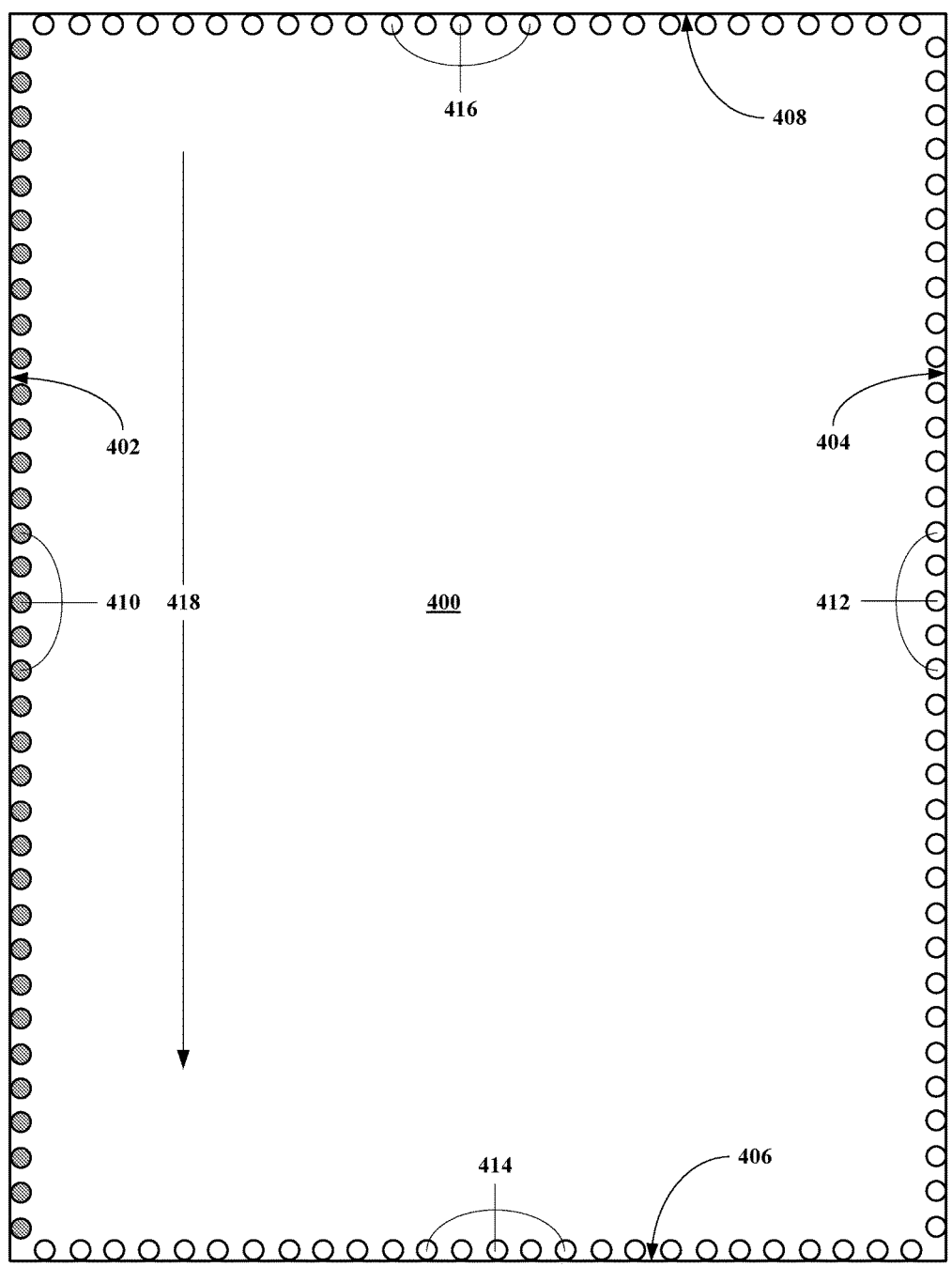

Looking at FIG. 4B, the apparatuses or systems of this disclosure recognizes motion 418 in a downward direction to the right of a center of the room 400. The motion 418 is at a constant velocity and no acceleration causing all of the left wall lights 410 to dim based on the velocity of the motion 418. Thus, slower downward motion would cause the lights 410 to dim less than faster motion downward would cause the light 410 to dim more. The user could also start the motion and hold, which would cause the light to dim until the user moves again as which point the dimming would stop.

Figure 4C:
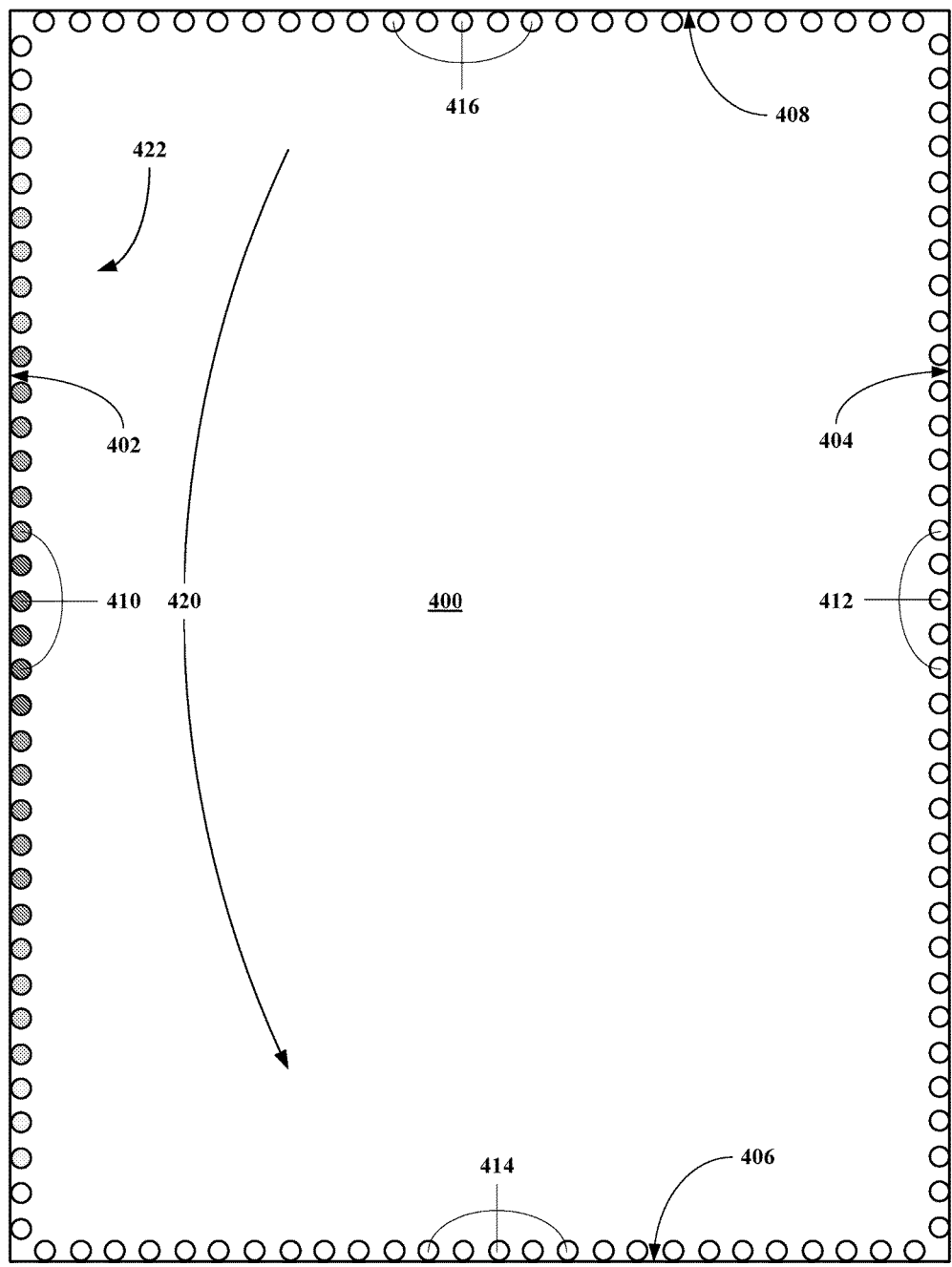

Looking at FIG. 4C, the apparatuses or systems of this disclosure recognizes motion 420 in a concave downward direction to the right of a center of the room 400. The motion 420 is at a constant angular velocity and no angular acceleration causing the left wall lights 410 to dim in a pattern 422, which differentially dims the lights 410 from the left wall edges to its center with the greatest dimming at the center of the wall 402 and the lest dimming at the edges of the wall 402.

Figure 4D:
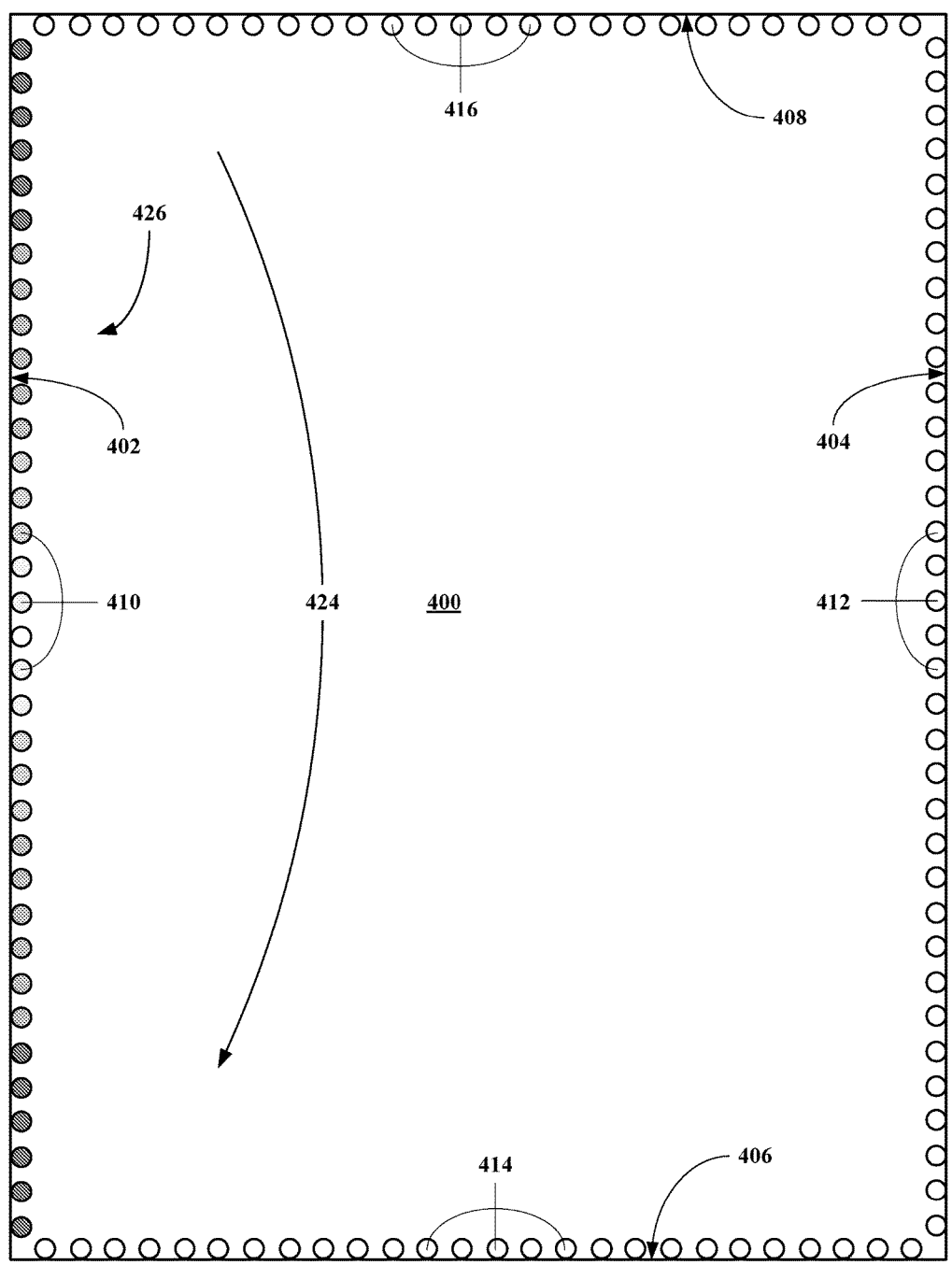

Looking at FIG. 4D, the apparatuses or systems of this disclosure recognizes motion 424 in a convex downward direction to the right of a center of the room 400. The motion 420 is at a constant angular velocity and no angular acceleration causing the left wall lights 410 to dim in a pattern 426, which differentially dims the lights 410 from the left wall edges to its center with the greatest dimming at the edges of the wall 402 and the lest dimming at the center of the wall 402.

Figure 4E:
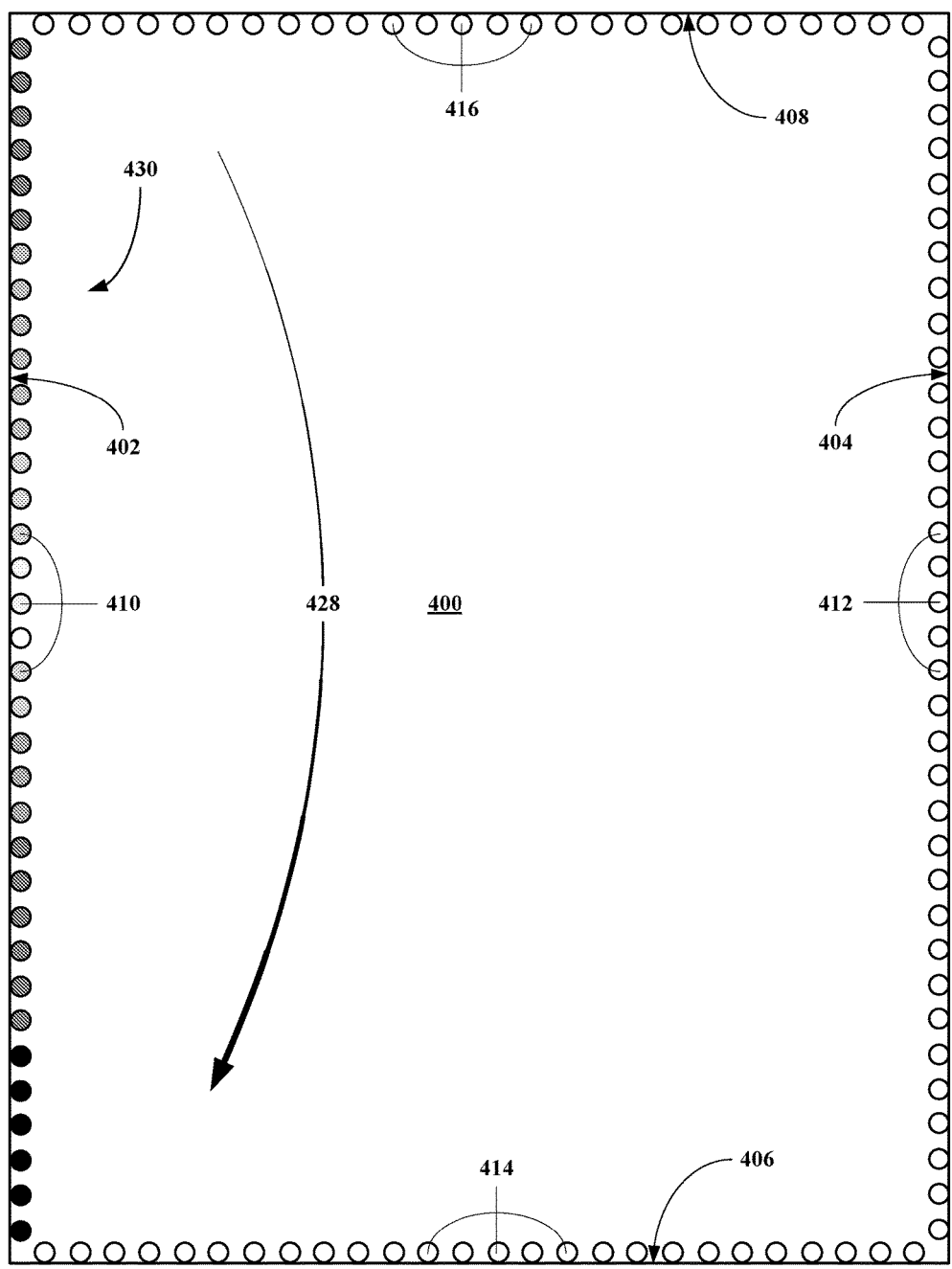

Looking at FIG. 4E, the apparatuses or systems of this disclosure recognizes motion 428 in a variable convex downward direction to the right of a center of the room 400. The motion 428 is variable in that the angular velocity increases as the motion proceeds downward, i.e., the motion 428 includes angular acceleration. The motion 428 causes the left wall lights 410 to dim in a pattern 430, which differentially dims the lights 410 from the left wall edges to its center with the greatest dimming at the lower edge, less dimming at the upper edge and the least dimming at the center of the wall 402. Thus, the dimming pattern of the lights conforms to the changes in the velocity of the motion. By changing the direction, velocity and acceleration properties of the motion, the apparatuses and systems will adjust the intensity of the lights accordingly. Therefore, the user can achieve very complex lighting configurations simply by changing the motion properties sensed by the motion sensor(s).

Figure 4F:
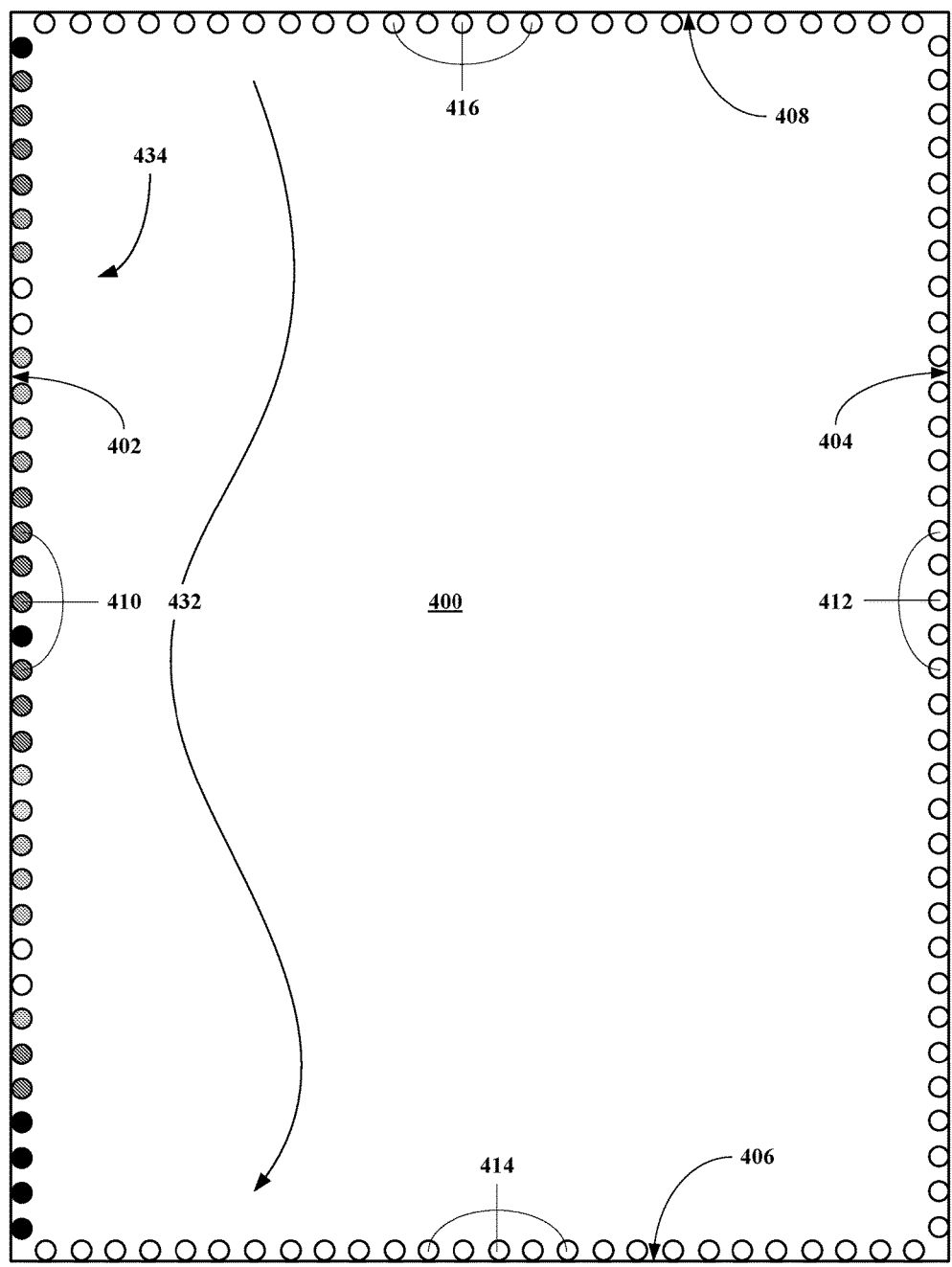

Looking at FIG. 4F, the apparatuses or systems of this disclosure recognizes motion 432 in a sinusoidal downward motion to the right of a center of the room 400. The motion 420 is at a constant angular velocity and no angular acceleration causing the left wall lights 410 to dim in a pattern 434, which differentially dims the lights 410 from the left wall edges to its center in conformity to the closeness of the motion 432 to each of the light 410. Again, by changing the direction, velocity and acceleration properties of the motion, the apparatuses and systems will adjust the intensity of the lights accordingly. Therefore, the user can achieve very complex lighting configurations simply by changing the motion properties sensed by the motion sensor(s).

Referring now to FIGS. 5A-F, embodiments of uses of the present apparatuses and systems of this disclosure are shown. Looking at FIG. 5A, the apparatuses and systems is used to control lights in a room 500 including a left wall 502, a right wall 504, a bottom wall 506, and a top wall 508. The left wall 502 includes lights 510; the right wall 504 includes lights 512; the bottom wall 506 includes lights 514; the top wall 508 includes lights 516. Not shown here, the user has already used the apparatuses and systems of this disclosure to select lights in the room 500, instead of a sound system, a TV system, a security system, or any other controllable system associated with room 500 and controllable from within the room 500. In these figures, all of the lights 510, 512, 514, and 516 are all in their minimum intensity or off state. It should be recognized that the starting point of each light may be the same or different and the effect of the motion will proportionally change the intensity of each light in accord with the properties of the motion.

Figure 5A:
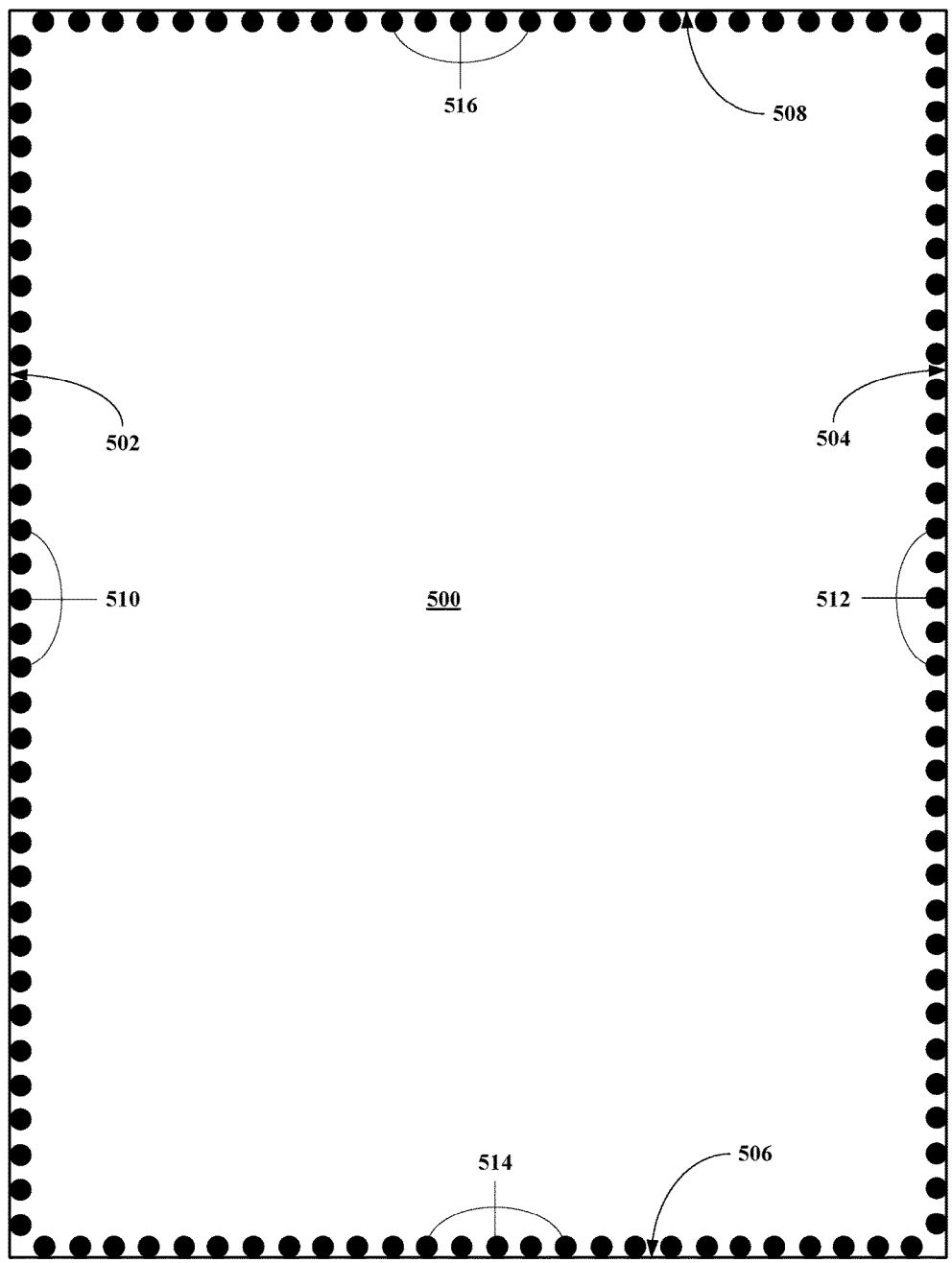
FIGS. 5A-D depict other uses of the apparatuses, systems, and methods of this disclosure to control lights within a room.
Figure 5B:
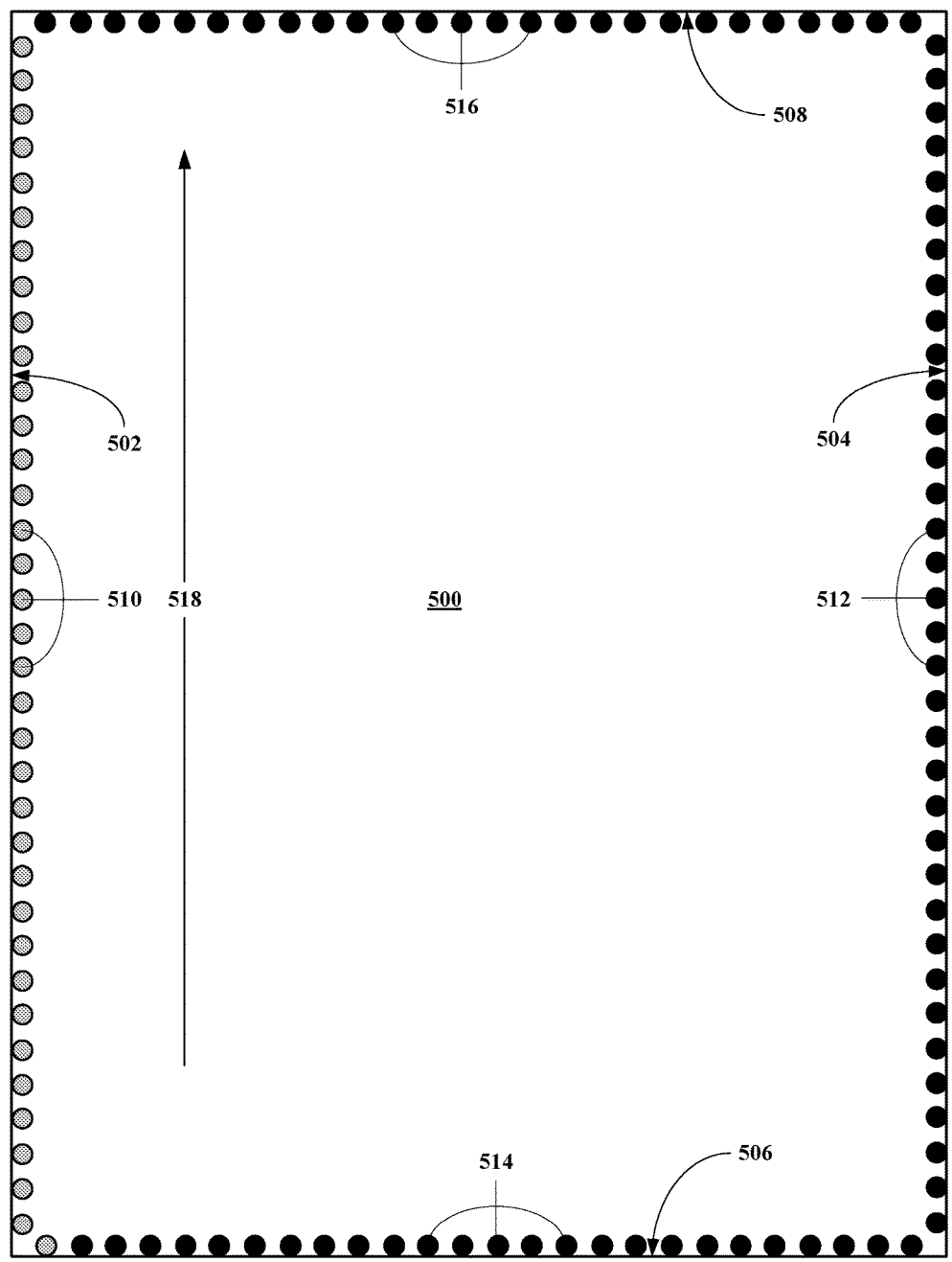

Looking at FIG. 5B, the apparatuses or systems of this disclosure recognizes motion 518 in a upward direction to the right of a center of the room 500. The motion 518 is at a constant velocity and no acceleration causing all of the left wall lights 510 to brighten based on the velocity of the motion 518. Thus, slower upward motion would cause the lights 510 to brighten less than, faster motion upward would cause the light 510 to brighten more. The user could also start the motion and hold, which would cause the light to brighten until the user moves again as which point the brightening would stop.

Figure 5C:
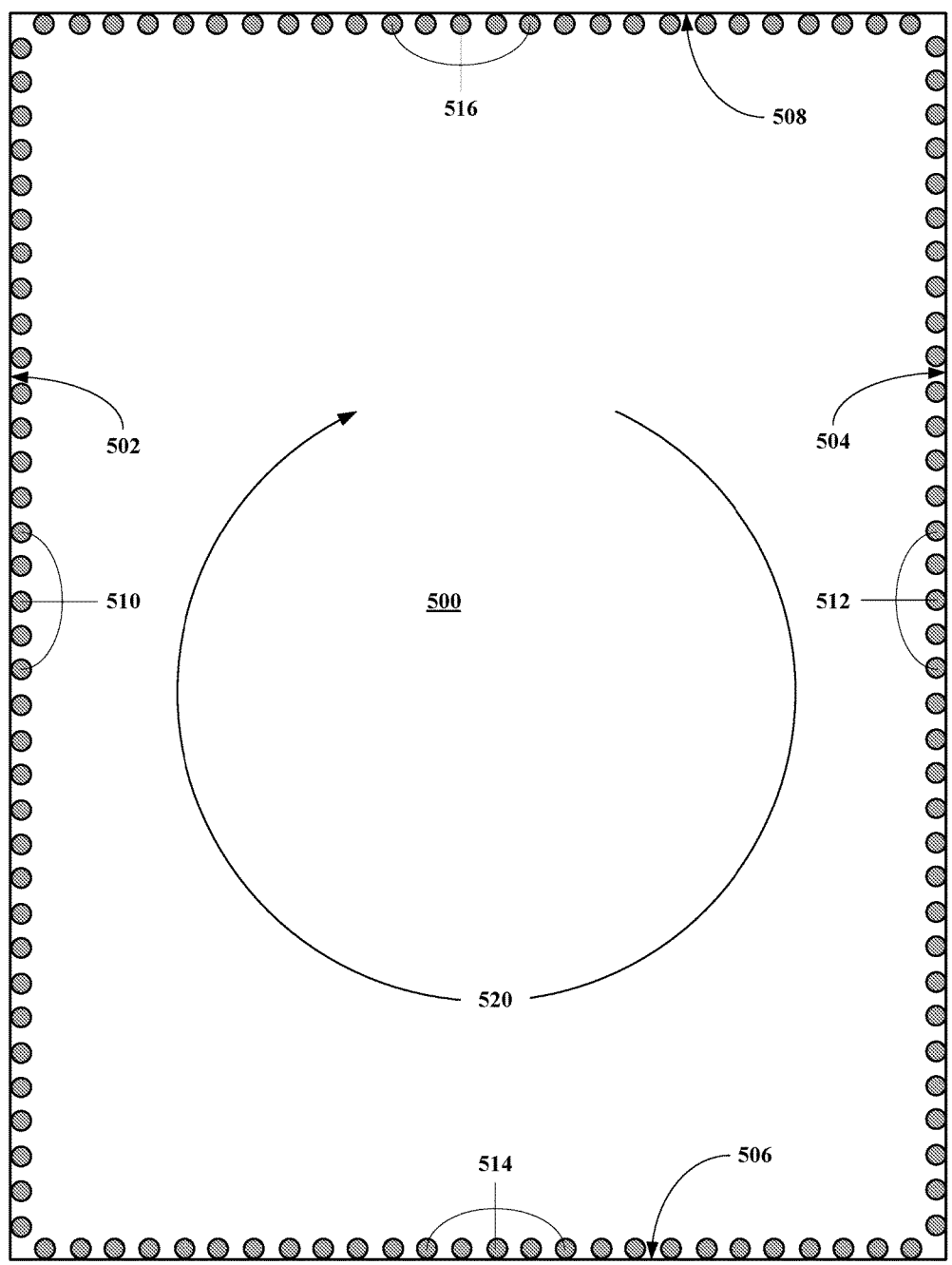

Looking at FIG. 5C, the apparatuses or systems of this disclosure recognizes motion 520 in a circular direction. The motion 520 is at a constant angular velocity and no angular acceleration causing all of the lights 510, 512, 514, and 516 to brighten based on the velocity of the motion 520. Thus, slower upward motion would cause the lights 510 to brighten less than, faster motion upward would cause the light 510 to brighten more. The user could also start the motion and hold, which would cause the light to brighten until the user moves again as which point the brightening would stop. The apparatuses and systems may also be used to control software objects and their attributes or elements.

Figure 5D:
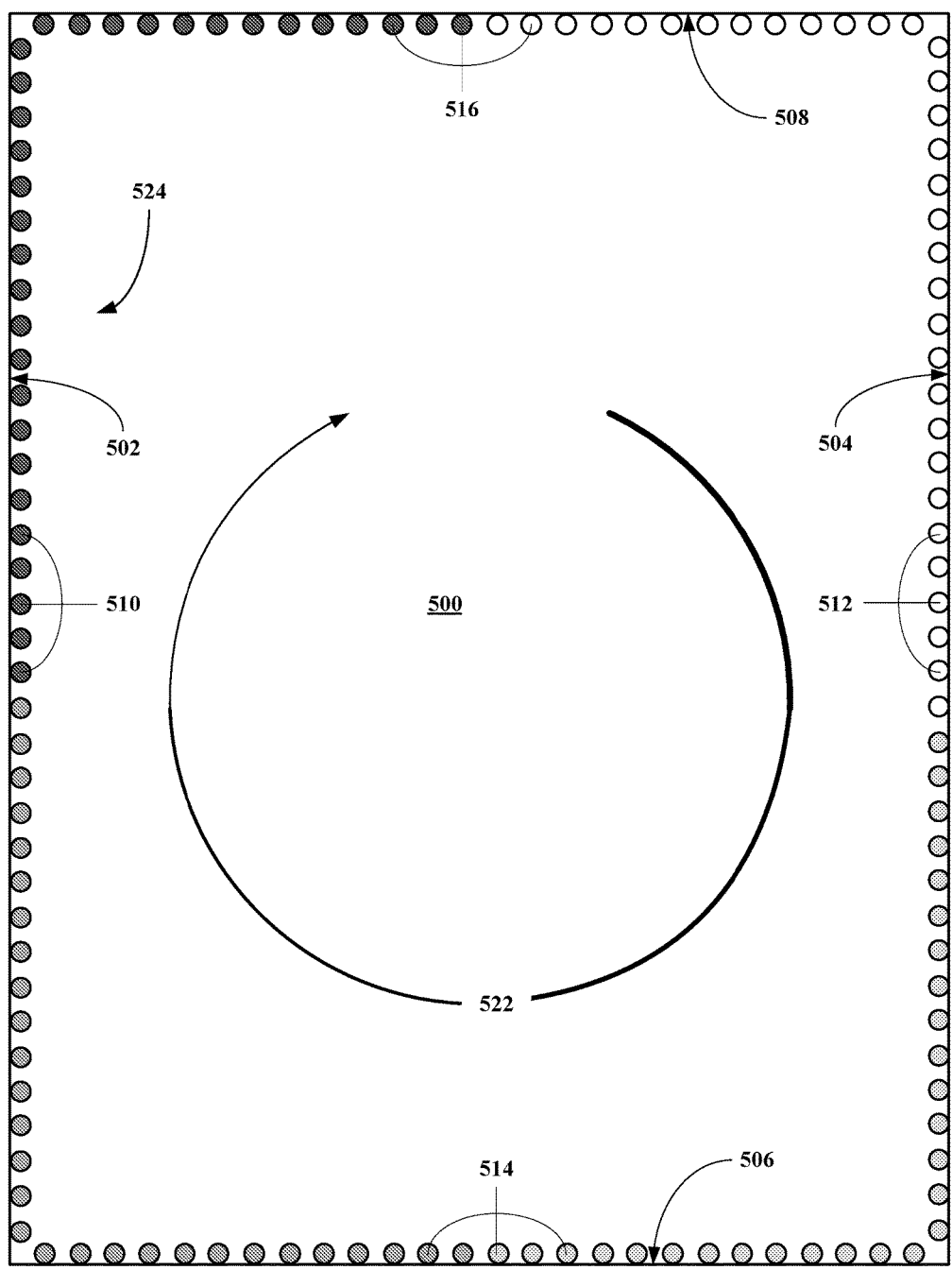

Looking at FIG. 5D, the apparatuses or systems of this disclosure recognizes motion 522 in a variable circular direction. The motion 522 have a variable angular velocity or an angular acceleration causing all of the lights 510, 512, 514, and 516 to brighten based on the variable velocity or acceleration properties of the motion 522. In this case, the velocity starts out high and continuously reduces so that the lights 510, 512, 514, and 516 to brighten accordingly. Again, by changing the direction, velocity and acceleration properties of the motion, the apparatuses and systems will adjust the intensity of the lights accordingly. Therefore, the user can achieve very complex lighting configurations simply by changing the motion properties sensed by the motion sensor(s).

Referring now to FIGS. 6A-F, embodiments of uses of the present apparatuses and systems of this disclosure are shown. Looking at FIG. 6A, the apparatuses and systems is used to control lights in a room 600 including a left wall 602, a right wall 604, a bottom wall 606, a top wall 608, and a ceiling 610. The left wall 602 includes lights 612; the right wall 604 includes lights 614; the bottom wall 606 includes lights 616; the top wall 608 includes lights 618, and the ceiling 610 includes lights 620. Not shown here, the user has already used the apparatuses and systems of this disclosure to select lights in the room 600, instead of a sound system, a TV system, a security system, or any other controllable system associated with room 600 and controllable from within the room 600.

Figure 6A:
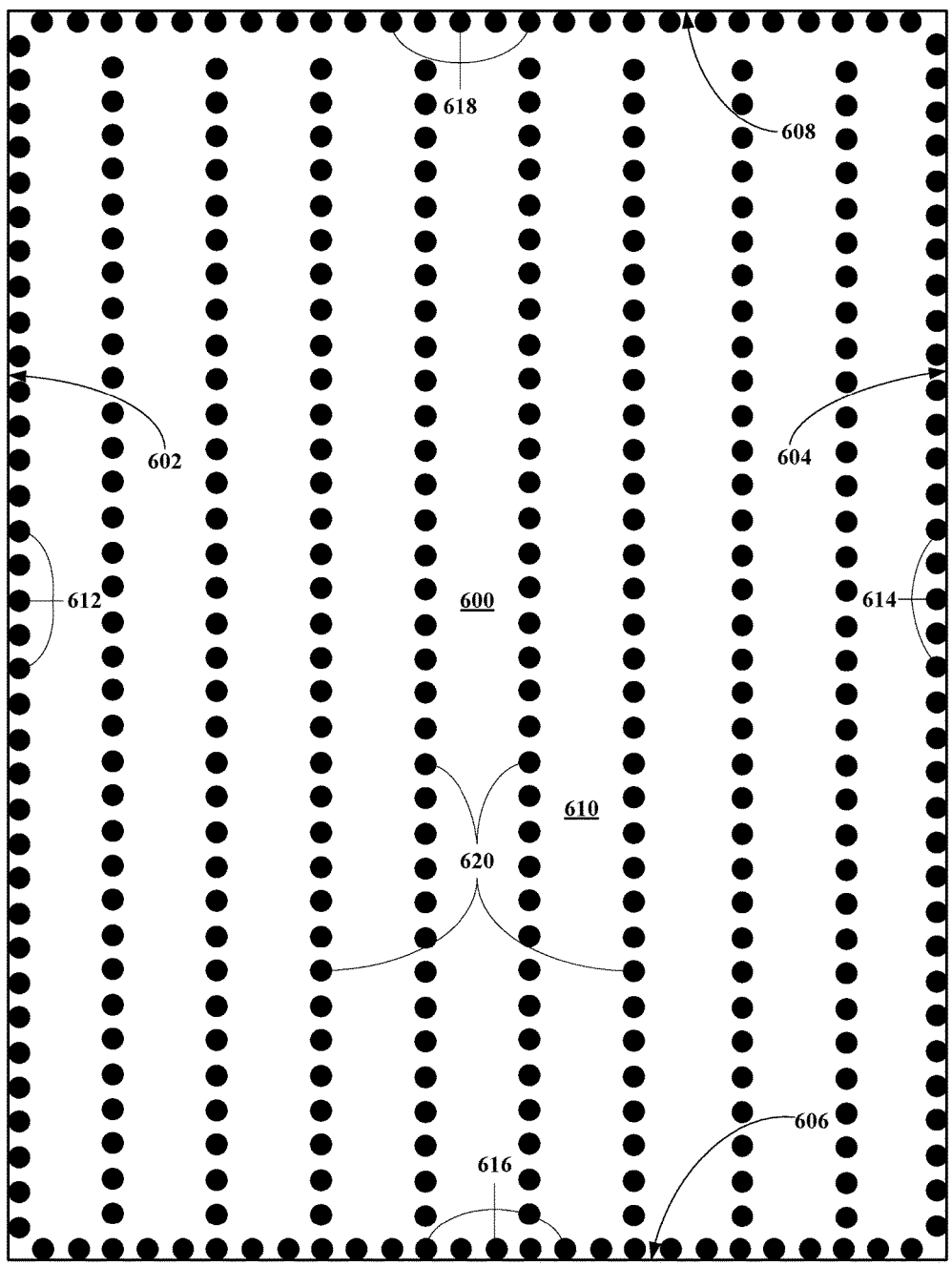
FIGS. 6A-B depict other uses of the apparatuses, systems, and methods of this disclosure to control lights within a room.
Figure 6B:
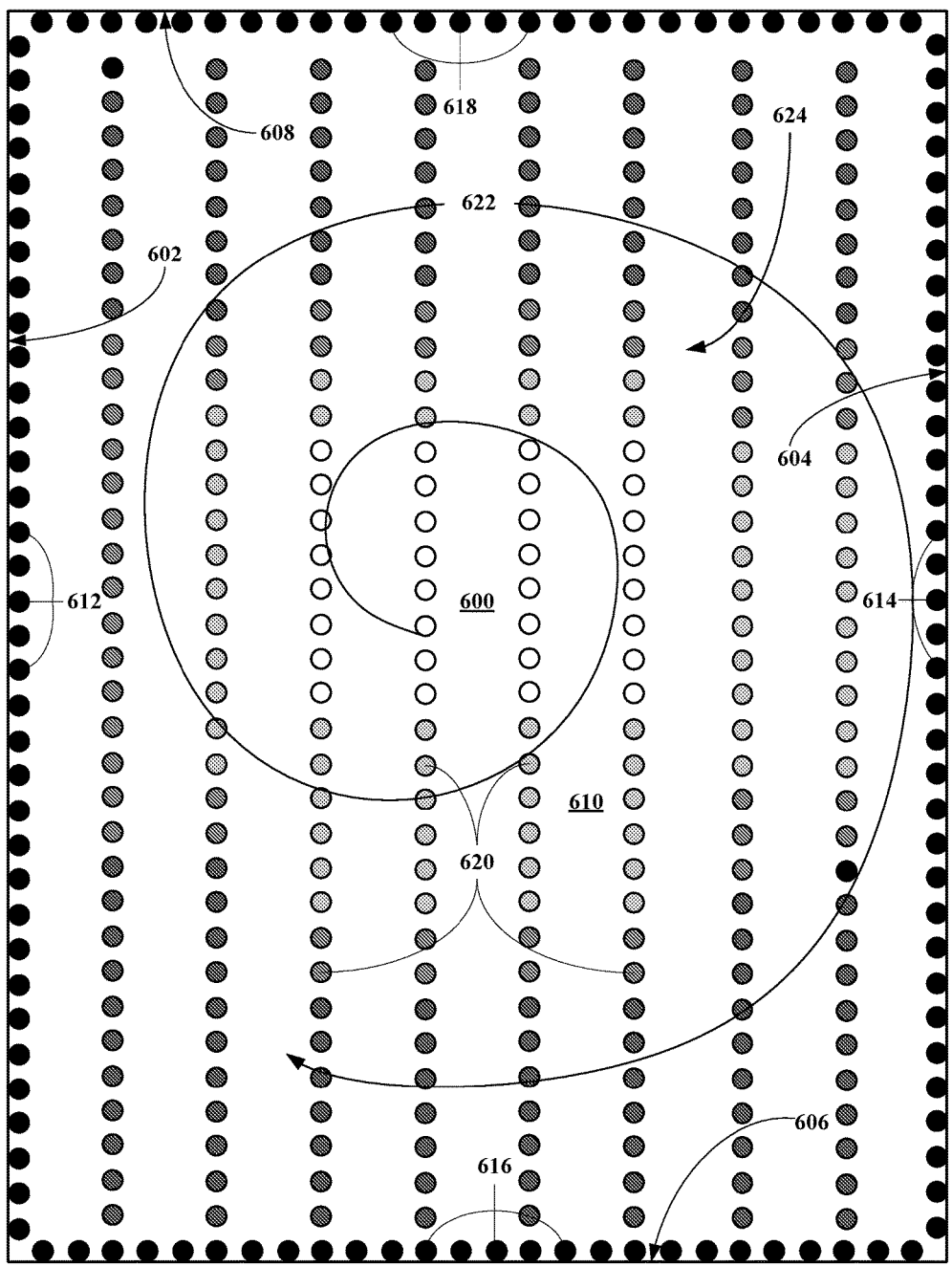

Looking at FIG. 6B, the apparatuses or systems of this disclosure recognizes motion 622 in a upward pointing spiral (not visual from the flat perspective of the figure). The motion 622 has a regular spiral angular velocity causing all of the lights 612, 614, 616, 618, and 620 to brighten in a pattern 624 in accord with the upward pointing spiral motion 622. Again, by changing the direction, velocity and acceleration properties of the motion, the apparatuses and systems will adjust the intensity of the lights accordingly. Therefore, the user can achieve very complex lighting configurations simply by changing the motion properties sensed by the motion sensor(s).

From these examples, it is apparent that the apparatuses, systems and methods of this disclosure may be used to select and simultaneously control one, a plurality or all objects and/or attributes associated with the objects in accord with the nature of the motions. Thus, the motion properties can be used to differentially control the objects and/or attributes associated therewith in conformity to the motions. Each properties of the motions may be used to control all of the objects based on distance, direction, velocity, acceleration and/or changes thereof so that complex selection and control of the objects can occur quickly, effectively and efficiently. The attributes controlled may be simultaneously or sequentially controlled at different rates even though the motion may be the same. It should be recognized that these motion control systems may be combined with bio-kinetic aspects so the motions (kinetic) become a combination of controls and security.

The previous figures and associated description are designed to illustrate the control of a large number of devices using properties and/or characteristics of the sensed motion including, without limitation, relative distance of the motion for each object (real like a person in a room using his/her hand as the object for which motion is being sensed or virtual representations of the objects in a virtual or rendered room on a display apparatus), direction of motion, speed of motion, acceleration of motion, changes an any of these properties, rates of changes in any of these properties, or mixtures and combinations thereof to control a single controllable attribute of the object such as lights. However, the systems, apparatuses, and methods of this disclosure are also capable of using motion properties and/or characteristics to control two, three, or more attributes of an object including software objects, apparatuses, and methods of this disclosure are also capable of using motion properties and/or characteristics from a plurality of moving objects within a motion sensing zone to control different attributes of a collection of objects. Contextual awareness, such as distance or proximity from devices or objects may also be used to change attributes. For example, if the lights in the above figures are capable of color as well as brighten, then the motion properties and/or characteristic may be used to simultaneously change color and intensity of the lights or one sensed motion could control intensity, while another sensed motion could control color, and furthermore, distance from the lights might mean the closer lights brighten or dim at different intensities than the lights far away. This may also apply to Virtual or Software objects, or combinations of all these. For example, if an artist wanted to paint a picture on a computer generated canvas, then motion properties and/or characteristic would allow the artist to control the pixel properties of each pixel on the display using the properties of the sensed motion from one, two, three, etc. sensed motions. Thus, the systems, apparatuses, and methods of this disclosure are capable of converting the motion properties associated with each and every object being controlled based on the instantaneous properties values as the motion traverse the object in real space or virtual space. In certain embodiments, context and/or environmental conditions may be variables to change the control of objects and/or attributes in a linear or non-linear way with each object, attribute, state, etc.

Unique Identifier Apparatuses and Systems

Biokinetic Sensors

Referring now to FIG. 7A, an embodiments of an apparatus or system of this disclosure, generally 700, is shown to include a user interface 702 shown here as a display unit, a processing unit 704, and a biokinetic sensor 706. The interface 702 is in bi-directional communication with the processing unit 704, and the processing unit 704 is in bi-directional communication with the biokinetic sensor 706. The biokinetic sensor is capable of capturing motion and biometric data simultaneously from which unique biokinetic identifiers may be constructed.

Referring now to FIG. 7B, another embodiments of an apparatus or system of this disclosure, generally 700, is shown to include a user interface 702 shown here as a display unit, a processing unit 704, and a plurality of biokinetic sensor 706a-d or data therefrom, here four biokinetic sensors. The interface 702 is in bi-directional communication with the processing unit 704, and the processing unit 704 is in bi-directional communication with the biokinetic sensors 706a-d. Each biokinetic sensor is capable of capturing motion and biometric data simultaneously, but not necessarily the same data, from which unique biokinetic identifiers may be constructed. This may provide sequential or simultaneous data improving data quality.

Referring now to FIG. 7C, another embodiments of an apparatus or system of this disclosure, generally 700, is shown to include two user interfaces 702a-b shown here as display units, a processing unit 704, and a biokinetic sensor 706. The interfaces 702a-b are in bi-directional communication with the processing unit 704, and the processing unit 704 is in bi-directional communication with the biokinetic sensor 706. The biokinetic sensor is capable of capturing motion and biometric data simultaneously from which unique biokinetic identifiers may be constructed.

Referring now to FIG. 7D, another embodiments of an apparatus or system of this disclosure, generally 700, is shown to include a user interface 702 shown here as a display unit, two processing units 704a-b, and four biokinetic sensors 706a-d. The interface 702 is in bi-directional communication with the two processing units 704a-b; the two processing units 704a-b are in bi-directional communication with each other; the first processing unit 704a is in bi-directional communication with the biokinetic sensors 706a-b; and the second processing unit 704b is in bi-directional communication with the biokinetic sensors 706c-d. Each biokinetic sensor is capable of capturing motion and biometric data simultaneously, but not necessarily the same data, from which unique biokinetic identifiers may be constructed.

Referring now to FIG. 7E, another embodiments of an apparatus or system of this disclosure, generally 700, is shown to include two user interfaces 702a-b shown here as display units, two processing units 704a-b, and four biokinetic sensor 706a-d. The interfaces 702a-b are in bi-directional communication with the two processing units 704a-b; the two processing units 704a-b are in bi-directional communication with each other; the first processing unit 704a is in bi-directional communication with the biokinetic sensors 706a-b; and the second processing unit 704b is in bi-directional communication with the biokinetic sensors 706c-d. Each biokinetic sensor is capable of capturing motion and biometric data simultaneously, but not necessarily the same data, from which unique biokinetic identifiers may be constructed.

Referring now to FIG. 7F, another embodiments of an apparatus or system of this disclosure, generally 700, is shown to include two user interfaces 702a-b shown here as display units, two processing units 704a-b, and four biokinetic sensor 706a-d. The first interface 702a is in bi-directional communication with the first processing unit 704a; the second interface 702b is in bi-directional communication with the second processing unit 704b; the two processing units 704a-b are in bi-directional communication with each other; the first processing unit 704a is in bi-directional communication with the biokinetic sensors 706a-b; and the second processing unit 704b is in bi-directional communication with the biokinetic sensors 706c-d. Each biokinetic sensor is capable of capturing motion and biometric data simultaneously, but not necessarily the same data, from which unique biokinetic identifiers may be constructed.

Kinetic and Biokinetic Sensors

Referring now to FIG. 7G, another embodiments of an apparatus or system of this disclosure, generally 700, is shown to include a user interface 702 shown here as a display unit, a processing unit 704, a biokinetic sensor 706, and a motion sensor 708. The interface 702 is in bi-directional communication with the processing unit 704; the processing unit 704 is in bi-directional communication with the biokinetic sensor 706 and with the motion sensor 708. The biokinetic sensors are capable of capturing motion and biometric data simultaneously, while the motion sensors are capable of capturing motion data from which all data may be used to construct unique biokinetic identifiers.

Referring now to FIG. 7H, another embodiments of an apparatus or system of this disclosure, generally 700, is shown to include a user interface 702 shown here as a display unit, a processing unit 704, four biokinetic sensors 706a-d, and six motion sensors 708a-e. The interface 702 is in bi-directional communication with the processing unit 704, and the processing unit 704 is in bi-directional communication with the biokinetic sensors 706a-d and with the motion sensors 708a-e. The biokinetic sensors are capable of capturing motion and biometric data simultaneously, while the motion sensors are capable of capturing motion data from which all data may be used to construct unique biokinetic identifiers.

Referring now to FIG. 7I, another embodiments of an apparatus or system of this disclosure, generally 700, is shown to include a two user interfaces 702a-b shown here as display units, a processing unit 704, four biokinetic sensors 706a-d, and six motion sensors 708a-e. The first interface 702a is in bi-directional communication with the first processing unit 704a; the second interface 702b is in bi-directional communication with the second processing unit 704b; the two processing units 704a-b are in bi-directional communication with each other; the first processing unit 704a is in bi-directional communication with the biokinetic sensors 706a-d; and the second processing unit 704b is in bi-directional communication with the motion sensor 708a-e. The biokinetic sensors are capable of capturing motion and biometric data simultaneously, while the motion sensors are capable of capturing motion data from which all data may be used to construct unique biokinetic identifiers.

Referring now to FIG. 7J, another embodiments of an apparatus or system of this disclosure, generally 700, is shown to include two user interfaces 702a-b shown here as display units, two processing units 704a-b, four biokinetic sensors 706a-d, and six motion sensors 708a-e. The interfaces 702a-b are in bi-directional communication with the processing unit 704; the processing unit 704 is in bi-directional communication with the biokinetic sensors 706a-d and with the motion sensor 708a-e. The biokinetic sensors are capable of capturing motion and biometric data simultaneously, while the motion sensors are capable of capturing motion data from which all data may be used to construct unique biokinetic identifiers.

Biokinetic, Kinetic and Biometric Sensors

Referring now to FIG. 7K, another embodiments of an apparatus or system of this disclosure, generally 700, is shown to include a user interface 702 shown here as a display unit, a processing unit 704, a biokinetic sensor 706, a motion sensor 708, and a biometric sensor 710. The interface 702 is in bi-directional communication with the processing unit 704; the processing unit 704 is in bi-directional communication with the biokinetic sensor 706, the motion sensor 708, and the biometric sensor 710. The biokinetic sensors are capable of capturing motion and biometric data simultaneously, the motion sensors are capable of capturing motion data, and the biometric sensors are capable of capturing biometric data from which all data may be used to construct unique biokinetic identifiers.

Referring now to FIG. 7L, another embodiments of an apparatus or system of this disclosure, generally 700, is shown to include a user interface 702 shown here as a display unit, a processing unit 704, four biokinetic sensors 706a-d, six motion sensors 708a-e, and three biometric sensor 710a-c. The interface 702 is in bi-directional communication with the processing unit 704; the processing unit 704 is in bi-directional communication with the biokinetic sensors 706a-d, the motion sensors 708a-e, and the biometric sensors 710a-c. The biokinetic sensors are capable of capturing motion and biometric data simultaneously, the motion sensors are capable of capturing motion data, and the biometric sensors are capable of capturing biometric data from which all data may be used to construct unique biokinetic identifiers.

Referring now to FIG. 7M, another embodiments of an apparatus or system of this disclosure, generally 700, is shown to include two user interfaces 702a-b shown here as display units, a processing unit 704, four biokinetic sensors 706a-d, six motion sensors 708a-e, and three biometric sensors 710a-c. The interfaces 702a-b are in bi-directional communication with the processing unit 704; the processing unit 704 is in bi-directional communication with the biokinetic sensors 706a-d, the motion sensors 708a-e, and the biometric sensor 710a-c. The biokinetic sensors are capable of capturing motion and biometric data simultaneously, the motion sensors are capable of capturing motion data, and the biometric sensors are capable of capturing biometric data from which all data may be used to construct unique biokinetic identifiers.

Referring now to FIG. 7N, another embodiments of an apparatus or system of this disclosure, generally 700, is shown to include three user interface 702a-c shown here as display units, three processing units 704a-c, four biokinetic sensors 706s, six motion sensors 708a-d, and three biometric sensors 710a-c. The first interface 702a is in bi-directional communication with the first processing unit 704a; the second interface 702b is in bi-directional communication with the second processing unit 704b; the third interface 702c is in bi-directional communication with the third processing unit 704c; the three processing units 704a-c are in bi-directional communication with each other; the first processing unit 704a is in bi-directional communication with the biokinetic sensors 706a-d; the second processing unit 704b is in bi-directional communication with the motion sensor 708; and the third processing unit 704c is in bi-directional communication with the biometric sensor 710. The biokinetic sensors are capable of capturing motion and biometric data simultaneously, the motion sensors are capable of capturing motion data, and the biometric sensors are capable of capturing biometric data from which all data may be used to construct unique biokinetic identifiers. It should be recognized that the interfaces may be real or virtual in the case of AR and VR environments, and the output data from the sensors may be used instead of direct communication with the sensors.

Kinetic and Biometric Sensors

Referring now to FIG. 7O, another embodiments of an apparatus or system of this disclosure, generally 700, is shown to include a user interface 702 shown here as a display unit, a processing unit 704, a motion sensor 708, and a biometric sensor 710. The interface 702 is in bi-directional communication with the processing unit 704; the processing unit 704 is in bi-directional communication with the motion sensor 708 and with the biometric sensor 710. The motion sensors are capable of capturing motion data and the biometric sensors are capable of capturing biometric data from which all data may be used to construct unique biokinetic identifiers.

Referring now to FIG. 7P, another embodiments of an apparatus or system of this disclosure, generally 700, is shown to include a user interface 702 shown here as a display unit, a processing unit 704, four motion sensors 708a-d, and six biometric sensors 710a-e. The interface 702 is in bi-directional communication with the processing unit 704, and the processing unit 704 is in bi-directional communication with the motion sensors 708a-d and with the biometric sensors 710a-e. The motion sensors are capable of capturing motion data and the biometric sensors are capable of capturing biometric data from which all data may be used to construct unique biokinetic identifiers. It should be noted that the display unit and sensors may be a combination environment where the display may simultaneously or sequentially act as the sensing unit or part of the sensing unit as well.

Referring now to FIG. 7Q, another embodiments of an apparatus or system of this disclosure, generally 700, is shown to include two user interfaces 702a-b shown here as display units, a processing unit 704, four motion sensors 708a-d, and six biometric sensors 710a-e. The two interface 702a&b are in bi-directional communication with the processing unit 704; the processing unit 704 is in bi-directional communication with the motion sensors 708a-d and the biometric sensors 710a-e. The motion sensors are capable of capturing motion data and the biometric sensors are capable of capturing biometric data from which all data may be used to construct unique biokinetic identifiers.

Referring now to FIG. 7R, another embodiments of an apparatus or system of this disclosure, generally 700, is shown to include two user interfaces 702a-b shown here as display units, two processing units 704a-b, four motion sensors 706a-d, and six biometric sensors 708a-e. The first interface 702a is in bi-directional communication with the first processing unit 704a; the second interface 702b is in bi-directional communication with the second processing unit 704b; the two processing units 704a-b are in bi-directional communication with each other; the first processing unit 704a is in bi-directional communication with the motion sensors 708a-d; and the second processing unit 704b is in bi-directional communication with the motion sensor 710a-e. The motion sensors are capable of capturing motion data and the biometric sensors are capable of capturing biometric data from which all data may be used to construct unique biokinetic identifiers.

It should be recognized that the embodiments of FIGS. 7A-R are mere illustrative examples of the apparatuses and systems of this disclosure. It should be further recognized that the apparatuses and systems this disclosure may include any number of biokinetic, motion, and biometric sensors. Additionally, the sensors may be configured separately or configures in arrays. The only requirement is that the processing units be able to receive data from the sensors and use all or any portion of the data to construct unique biokinetic identifiers. Of course, in all of these embodiments, all units and sensors may be independently powered by separate power supplies and/or by a single power supply depending on configuration and location. Additionally, the communications may be wired and/or wireless again depending on configuration. The wired and/or wireless communications may be over intranets and/or internets so that the sensors, processing units and user interfaces may be distributed over large distances.

Unique Identifier Construction Methods

Kinetic

Figure 8:
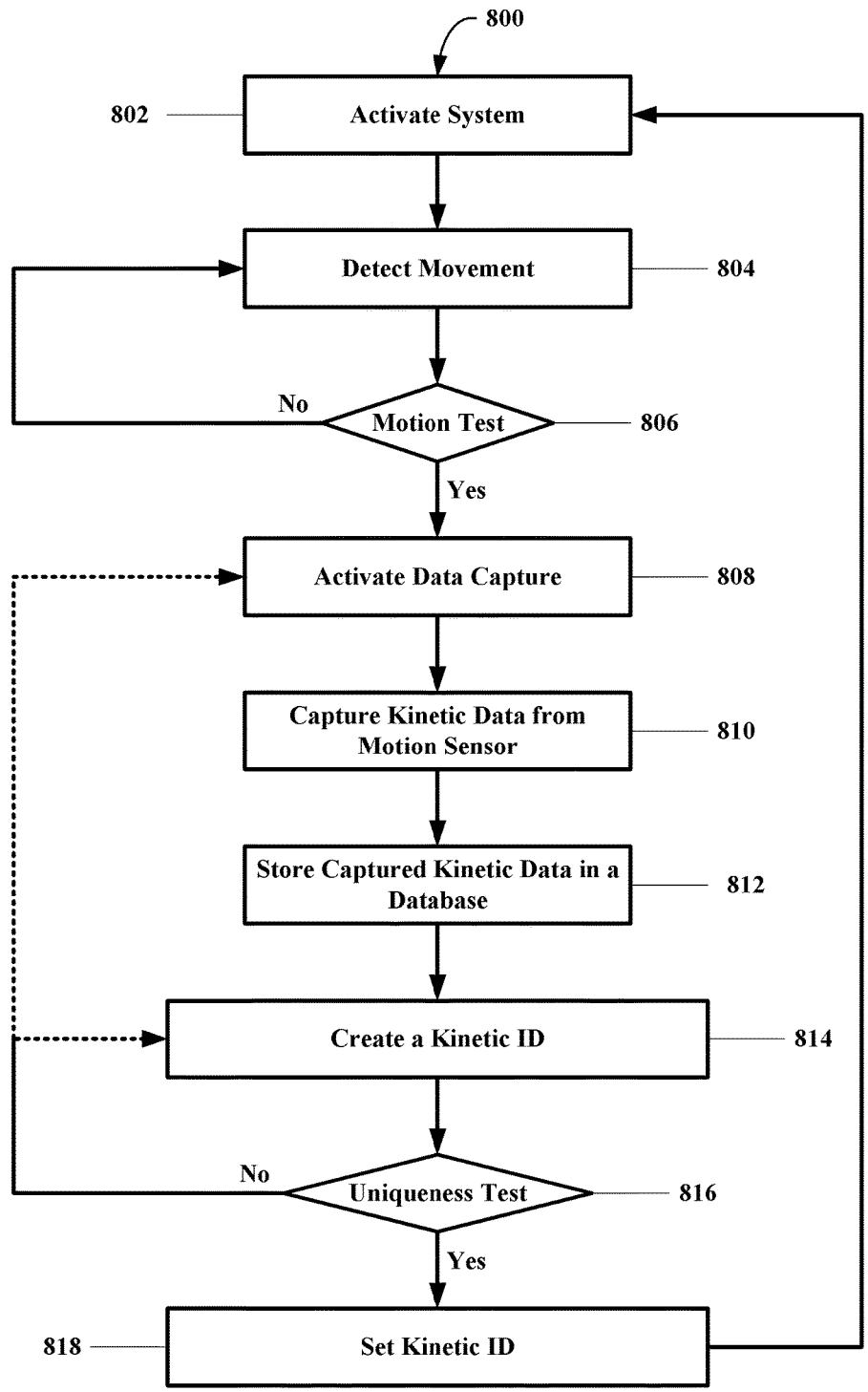

Referring now to FIG. 8, an embodiments of a method of this disclosure, generally 800, is shown to an activate system step 802. Activation may be accomplished by touching a screen, moving within a zone of a motion/biokinetic or proximity sensor, a voice command, any other activation technique, or any combination thereof. After activation of the biokinetic system, which may include one or a plurality of biokinetic, motion, and/or biometric sensors or sensor arrays, control is transferred to a detect movement step 804. After movement or motion detection, control is transferred to a motion test step 806, where the detected movement, proximity, or motion is tested to determine if it meets certain threshold criteria such as type of motion, duration of motion, type of object performing the motion, distance from the objects or zones, etc. If the detected movement or motion fails the motion test, then control is transferred along a No path back to the detect movement step 804. If the movement or motion passes the motion test, then control is transferred along a Yes path to an activate biokinetic data capture step 808, where the sensors and/or the processing unit captures biokinetic data, which may include data from biokinetic sensors or motion sensors and biometric sensors, or any combination thereof. Control is then transferred to a capture biokinetic data step 810, where data from the biokinetic sensors are captured and processed either by biokinetic sensors and/or the processing units and/or capture by the sensor and transferred to the processing units for processing. After the data are captured and processed, the processing unit stores the data in a database in a store step 812. Then, the data is used to create a biokinetic identifier in a create step 814, where the identifier may be a signature, an identifier, a verifier, and/or an authenticator. After creation, control is transferred to a uniqueness test step 816, where the biokinetic identifier is tested by a set of uniqueness criteria to determine whether the identifier is sufficiently unique. If the biokinetic identifier fails the uniqueness test, then control is transferred along a No path back to either the activate step 808, the create step 814 or both. If the biokinetic identifier passes the uniqueness test, then control is transferred along a Yes path to a set biokinetic identifier step 818, where the biokinetic identifier is established as the identifier for the particular application for which the system is being used to establish a unique biokinetic identifier for a bank, a website, a social media site, games, any other program, site, or application that requires unique signatures, identifiers, verifiers, and/or authenticators. If the biokinetic identifier is dynamic, that is if the biokinetic identifier is created in the system without user participation, then next time to user enters the application, the system will verify the user either immediately or may require the user to perform some simple task to verify.

BioKinetic

Figure 9:
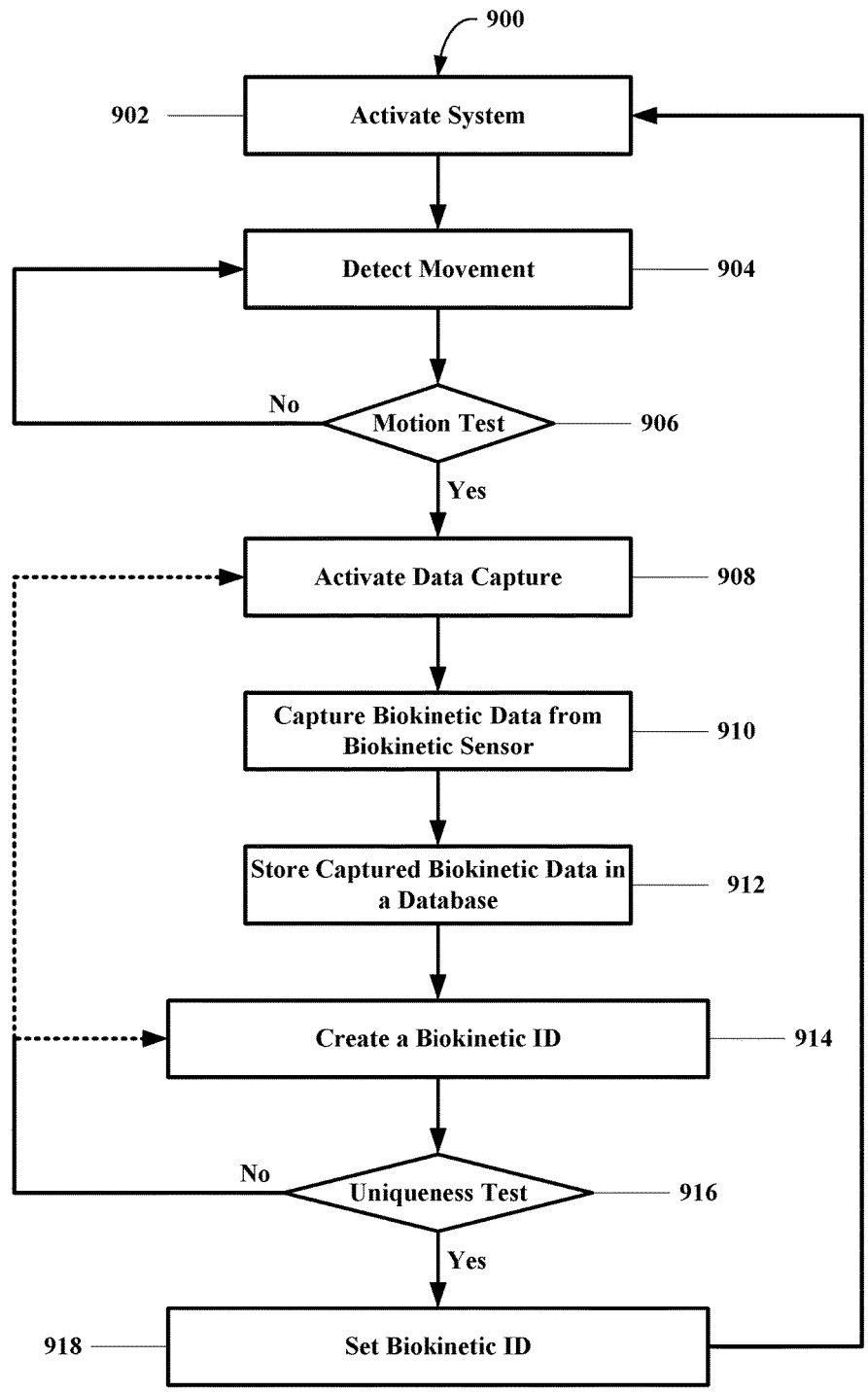

Referring now to FIG. 9, an embodiments of a method of this disclosure, generally 900, is shown to an activate system step 902. Activation may be accomplished by touching a screen, moving within a zone of a motion/biokinetic or proximity sensor, a voice command, any other activation technique, or any combination thereof. After activation of the biokinetic system, which may include one or a plurality of biokinetic, motion, and/or biometric sensors or sensor arrays, control is transferred to a detect movement step 904. After movement or motion detection, control is transferred to a motion test step 906, where the detected movement, proximity, or motion is tested to determine if it meets certain threshold criteria such as type of motion, duration of motion, type of object performing the motion, distance from the objects or zones, etc. These motions may be simultaneously providing scrolling, attribute, selection or actuation controls. If the detected movement or motion fails the motion test, then control is transferred along a No path back to the detect movement step 804. If the movement or motion passes the motion test, then control is transferred along a Yes path to an activate biokinetic data capture step 908, where the sensors and/or the processing unit captures biokinetic data, which may include data from biokinetic sensors or motion sensors and biometric sensors, or any combination thereof. Control is then transferred to a capture biokinetic data step 910, where data from the biokinetic sensors are captured and processed either by biokinetic sensors and/or the processing units and/or capture by the sensor and transferred to the processing units for processing. After the data are captured and processed, the processing unit stores the data in a database in a store step 912. Then, the data is used to create a biokinetic identifier in a create step 914, where the identifier may be a signature, an identifier, a verifier, and/or an authenticator. After creation, control is transferred to a uniqueness test step 916, where the biokinetic identifier is tested by a set of uniqueness criteria to determine whether the identifier is sufficiently unique. If the biokinetic identifier fails the uniqueness test, then control is transferred along a No path back to the activate step 908, the create step 914 or both. If the biokinetic identifier passes the uniqueness test, then control is transferred along a Yes path to a set biokinetic identifier step 918, where the biokinetic identifier is established as the identifier for the particular application for which the system is being used to establish a unique biokinetic identifier for a bank, a website, a social media site, games, any other program, site, or application that requires unique signatures, identifiers, verifiers, and/or authenticators. If the biokinetic identifier is dynamic, that is if the biokinetic identifier is created in the system without user participation, then next time to user enters the application, the system will verify the user either immediately or may require the user to perform some simple task to verify.

Biokinetic and Kinetic

Figure 10:
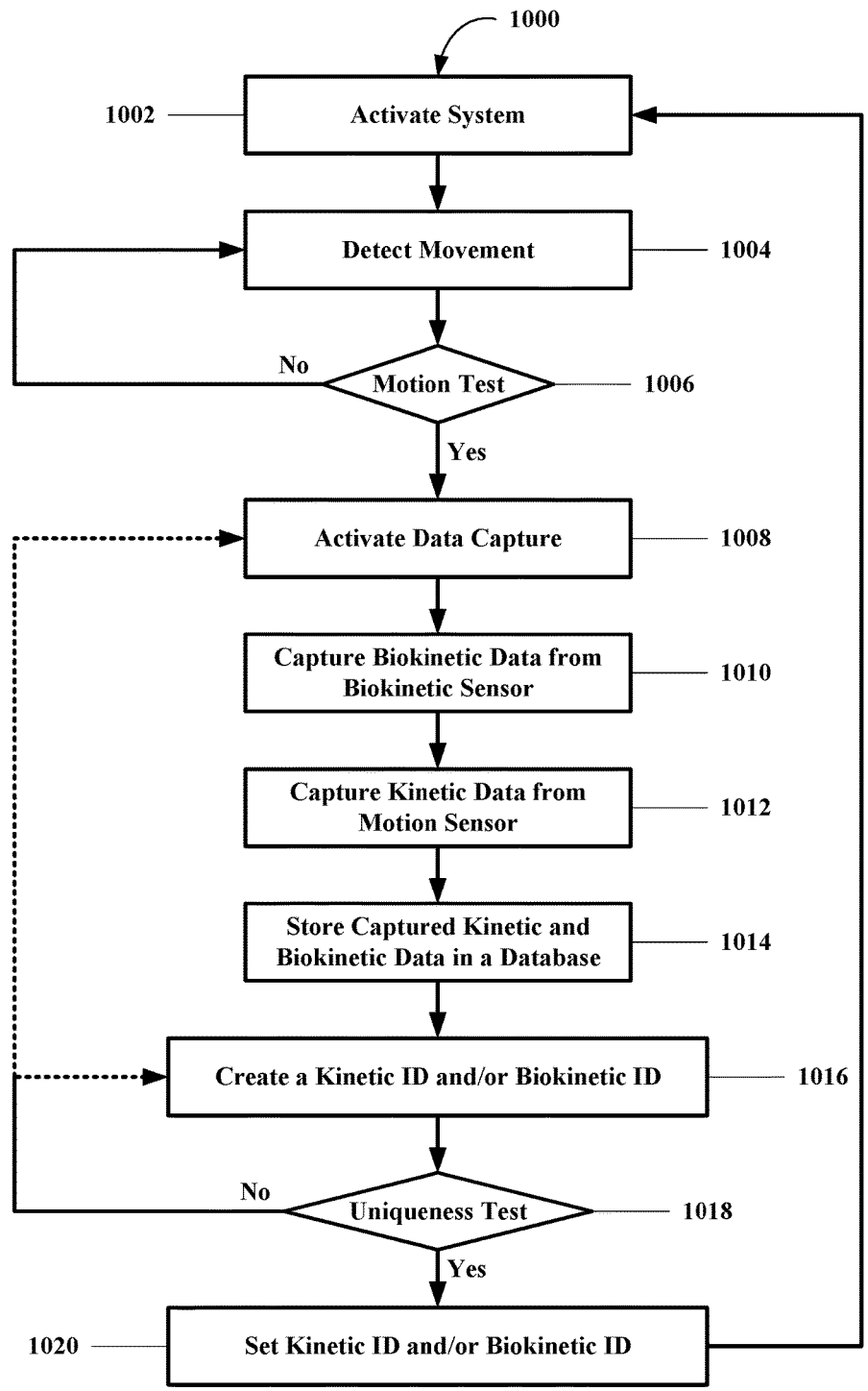

Referring now to FIG. 10, an embodiments of a method of this disclosure, generally 1000, is shown to an activate system step 1002. Activation may be accomplished by touching a screen, moving within a zone of a motion/biokinetic sensor, a voice command, any other activation technique, or any combination thereof. After activation of the biokinetic system, which may include one or a plurality of biokinetic, motion, and/or biometric sensors or sensor arrays, control is transferred to a detect movement step 1004. After movement or motion detection, control is transferred to a motion test step 1006, where the detected movement or motion is tested to determine if it meets certain threshold criteria such as type of motion, duration of motion, type of object performing the motion, etc. If the detected movement or motion fails the motion test, then control is transferred along a No path back to the detect movement step 904. If the movement or motion passes the motion test, then control is transferred along a Yes path to an activate biokinetic data capture step 1008, where the sensors and/or the processing unit captures biokinetic data, which may include data from biokinetic sensors or motion sensors and biometric sensors, or any combination thereof. Control is then transferred to a capture biokinetic data step 1010, where data from the biokinetic sensors are captured and processed either by biokinetic sensors and/or the processing units and/or capture by the sensors and transferred to the processing units for processing. Control is then transferred to a capture motion data step 1012, where data from the motion sensors are captured and processed either by motion sensors and/or the processing units and/or capture by the sensors and transferred to the processing units for processing. After the data are captured and processed, the processing unit stores the data in a database in a store step 1014. After the data are captured and processed, the processing unit uses the data to create a biokinetic identifier in a create step 1016, where the identifier may be a signature, an identifier, a verifier, and/or an authenticator. After creation, control is transferred to a uniqueness test step 1018, where the biokinetic identifier is tested by a set of uniqueness criteria to determine whether the identifier is sufficiently unique. If the biokinetic identifier fails the uniqueness test, then control is transferred along a No path back to the activate step 1008, the create step 1016 or both. If the biokinetic identifier passes the uniqueness test, then control is transferred along a Yes path to a set biokinetic identifier step 1020, where the biokinetic identifier is established as the identifier for the particular application for which the system is being used to establish a unique biokinetic identifier for a bank, a website, a social media site, games, any other program, site, or application that requires unique signatures, identifiers, verifiers, and/or authenticators. If the biokinetic identifier is dynamic, that is if the biokinetic identifier is created in the system without user participation, then next time to user enters the application, the system will verify the user either immediately or may require the user to perform some simple task to verify.

BioKinetic and Biometric

Figure 11:
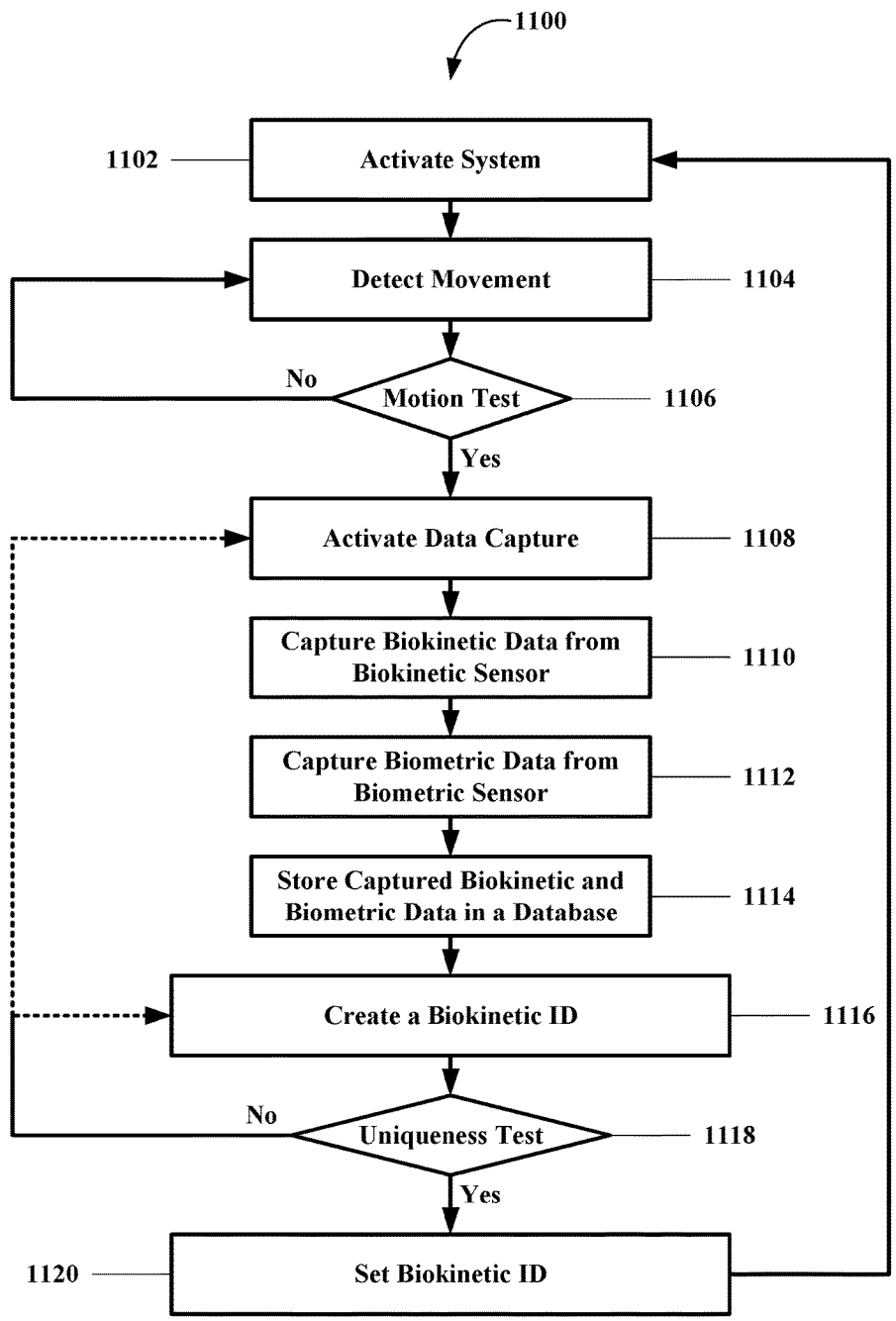

Referring now to FIG. 11, an embodiments of a method of this disclosure, generally 1100, is shown to an activate system step 1102. Activation may be accomplished by touching a screen, moving within a zone of a motion/biokinetic sensor, a voice command, any other activation technique, or any combination thereof. After activation of the biokinetic system, which may include one or a plurality of biokinetic, motion, and/or biometric sensors or sensor arrays, control is transferred to a detect movement step 1104. After movement or motion detection, control is transferred to a motion test step 1106, where the detected movement or motion is tested to determine if it meets certain threshold criteria such as type of motion, duration of motion, type of object performing the motion, etc. If the detected movement or motion fails the motion test, then control is transferred along a No path back to the detect movement step 1004. If the movement or motion passes the motion test, then control is transferred along a Yes path to an activate biokinetic data capture step 1108, where the sensors and/or the processing unit captures biokinetic data, which may include data from biokinetic sensors or motion sensors and biometric sensors, or any combination thereof. Control is then transferred to a capture biokinetic data step 1110, where data from the biokinetic sensors are captured and processed either by biokinetic sensors and/or the processing units and/or capture by the sensors and transferred to the processing units for processing. Control is then transferred to a capture biometric data step 1112, where data from the biometric sensors are captured and processed either by biometric sensors and/or the processing units and/or capture by the sensors and transferred to the processing units for processing. After the data are captured and processed, the processing unit stores the data in a database in a store step 1114. Control is then transferred to a capture biometric data step 1116, where data from the biometric sensors are captured and processed either by biometric sensors and/or the processing units and/or capture by the sensors and transferred to the processing units for processing. After the data are captured and processed, the processing unit uses the data to create a biokinetic identifier in a create step 1118, where the identifier may be a signature, an identifier, a verifier, and/or an authenticator. After creation, control is transferred to a uniqueness test step 1120, where the biokinetic identifier is tested by a set of uniqueness criteria to determine whether the identifier is sufficiently unique. If the biokinetic identifier fails the uniqueness test, then control is transferred along a No path back to the activate step 1108, the create step 1116, or both. If the biokinetic identifier passes the uniqueness test, then control is transferred along a Yes path to a set biokinetic identifier step 1122, where the biokinetic identifier is established as the identifier for the particular application for which the system is being used to establish a unique biokinetic identifier for a bank, a website, a social media site, games, any other program, site, or application that requires unique signatures, identifiers, verifiers, and/or authenticators. If the biokinetic identifier is dynamic, that is if the biokinetic identifier is created in the system without user participation, then next time to user enters the application, the system will verify the user either immediately or may require the user to perform some simple task to verify.

Kinetic and Biometric

Figure 12:
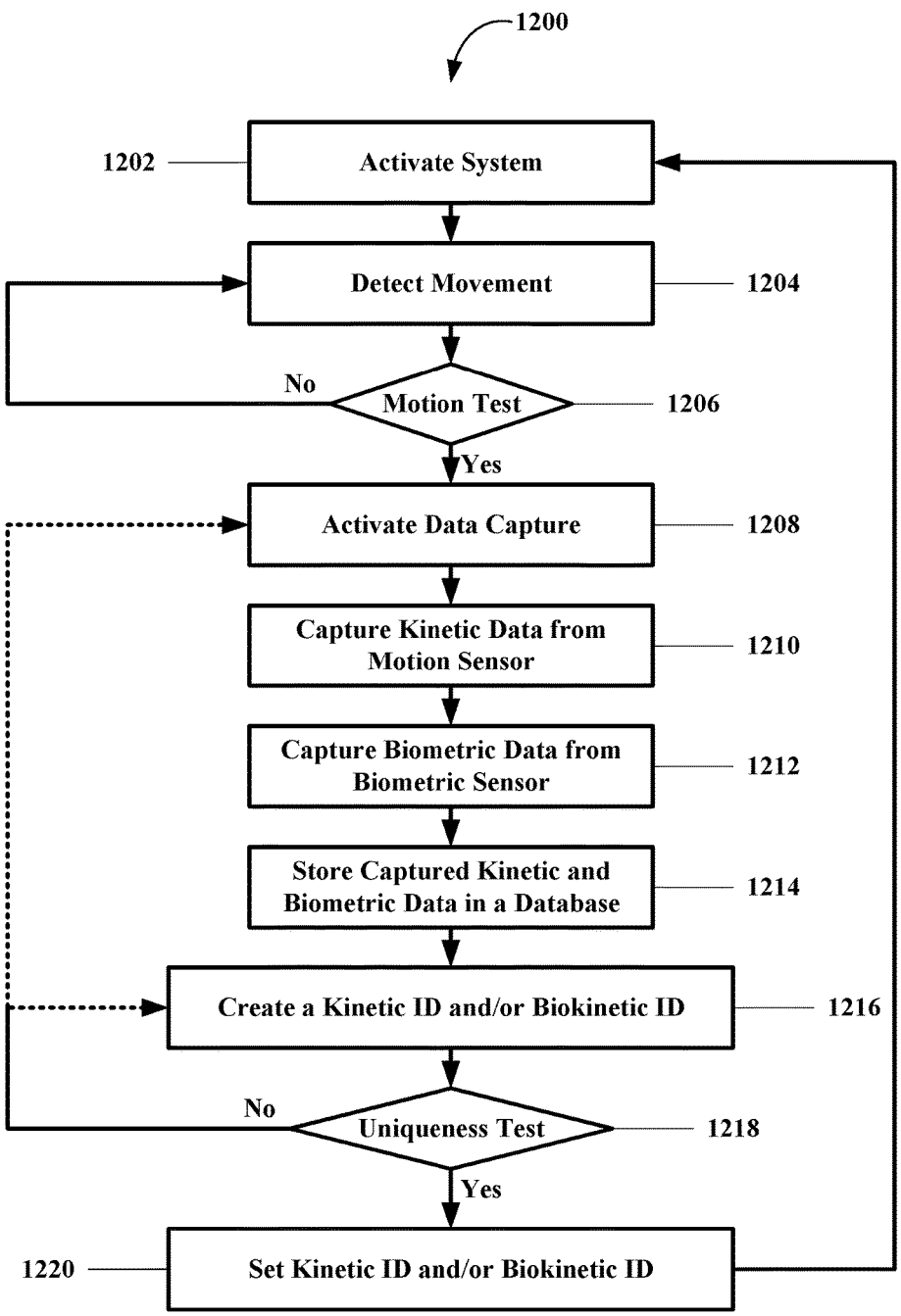

Referring now to FIG. 12, an embodiments of a method of this disclosure, generally 1200, is shown to an activate system step 1202. Activation may be accomplished by touching a screen, moving within a zone of a motion/biokinetic sensor, a voice command, any other activation technique, or any combination thereof. After activation of the biokinetic system, which may include one or a plurality of biokinetic, motion, and/or biometric sensors or sensor arrays, control is transferred to a detect movement step 1204. After movement or motion detection, control is transferred to a motion test step 1206, where the detected movement or motion is tested to determine if it meets certain threshold criteria such as type of motion, duration of motion, type of object performing the motion, etc. If the detected movement or motion fails the motion test, then control is transferred along a No path back to the detect movement step 1104. If the movement or motion passes the motion test, then control is transferred along a Yes path to an activate biokinetic data capture step 1208, where the sensors and/or the processing unit captures biokinetic data, which may include data from biokinetic sensors or motion sensors and biometric sensors, or any combination thereof. Control is then transferred to a capture motion data step 1210, where data from the biokinetic sensors are captured and processed either by biokinetic sensors and/or the processing units and/or capture by the sensors and transferred to the processing units for processing. Control is then transferred to a capture biometric data step 1212, where data from the biometric sensors are captured and processed either by biometric sensors and/or the processing units and/or capture by the sensors and transferred to the processing units for processing. After the data are captured and processed, the processing unit stores the data in a database in a store step 1214. After the data are captured and processed, the processing unit uses the data to create a biokinetic identifier in a create step 1216, where the identifier may be a signature, an identifier, a verifier, and/or an authenticator. After creation, control is transferred to a uniqueness test step 1218, where the biokinetic identifier is tested by a set of uniqueness criteria to determine whether the identifier is sufficiently unique. If the biokinetic identifier fails the uniqueness test, then control is transferred along a No path back to the activate step 1208, the create step 1216, or goth. If the biokinetic identifier passes the uniqueness test, then control is transferred along a Yes path to a set biokinetic identifier step 1220, where the biokinetic identifier is established as the identifier for the particular application for which the system is being used to establish a unique biokinetic identifier for a bank, a website, a social media site, games, any other program, site, or application that requires unique signatures, identifiers, verifiers, and/or authenticators. If the biokinetic identifier is dynamic, that is if the biokinetic identifier is created in the system without user participation, then next time to user enters the application, the system will verify the user either immediately or may require the user to perform some simple task to verify.

BioKinetic, Kinetic, and Biometric

Figure 13:
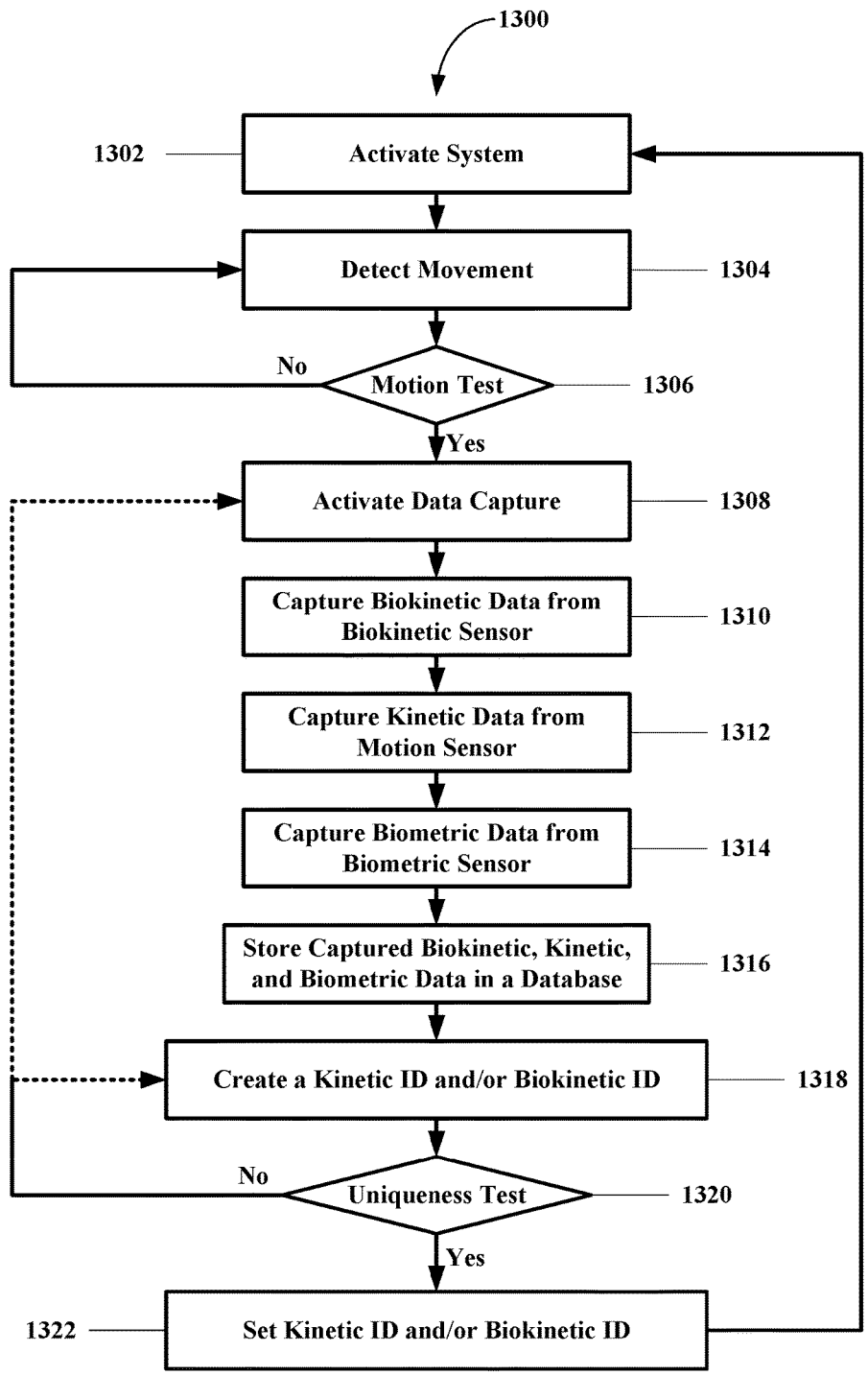

Referring now to FIG. 13, an embodiments of a method of this disclosure, generally 1300, is shown to an activate system step 1302. Activation may be accomplished by touching a screen, moving within a zone of a motion/biokinetic sensor, a voice command, any other activation technique, or any combination thereof. After activation of the biokinetic system, which may include one or a plurality of biokinetic, motion, and/or biometric sensors or sensor arrays, control is transferred to a detect movement step 1304. After movement or motion detection, control is transferred to a motion test step 1306, where the detected movement or motion is tested to determine if it meets certain threshold criteria such as type of motion, duration of motion, type of object performing the motion, etc. If the detected movement or motion fails the motion test, then control is transferred along a No path back to the detect movement step 1204. If the movement or motion passes the motion test, then control is transferred along a Yes path to an activate biokinetic data capture step 1308, where the sensors and/or the processing unit captures biokinetic data, which may include data from biokinetic sensors or motion sensors and biometric sensors, or any combination thereof. Control is then transferred to a capture motion data step 1310, where data from the biokinetic sensors are captured and processed either by biokinetic sensors and/or the processing units and/or capture by the sensors and transferred to the processing units for processing. Control is then transferred to a capture motion data step 1312, where data from the motion sensors are captured and processed either by motion sensors and/or the processing units and/or capture by the sensors and transferred to the processing units for processing. Control is then transferred to a capture biometric data step 1314, where data from the biometric sensors are captured and processed either by biometric sensors and/or the processing units and/or capture by the sensors and transferred to the processing units for processing. After the data are captured and processed, the processing unit stores the data in a database in a store step 1316. After the data are captured and processed, the processing unit uses the data to create a biokinetic identifier in a create step 1318, where the identifier may be a signature, an identifier, a verifier, and/or an authenticator. After creation, control is transferred to a uniqueness test step 1320, where the biokinetic identifier is tested by a set of uniqueness criteria to determine whether the identifier is sufficiently unique. If the biokinetic identifier fails the uniqueness test, then control is transferred along a No path back to the activate step 1308, the create step 1318, or both. If the biokinetic identifier passes the uniqueness test, then control is transferred along a Yes path to a set biokinetic identifier step 1322, where the biokinetic identifier is established as the identifier for the particular application for which the system is being used to establish a unique biokinetic identifier for a bank, a website, a social media site, games, any other program, site, or application that requires unique signatures, identifiers, verifiers, and/or authenticators. If the biokinetic identifier is dynamic, that is if the biokinetic identifier is created in the system without user participation, then next time to user enters the application, the system will verify the user either immediately or may require the user to perform some simple task to verify.

Uniqueness Testing

Figure 14:
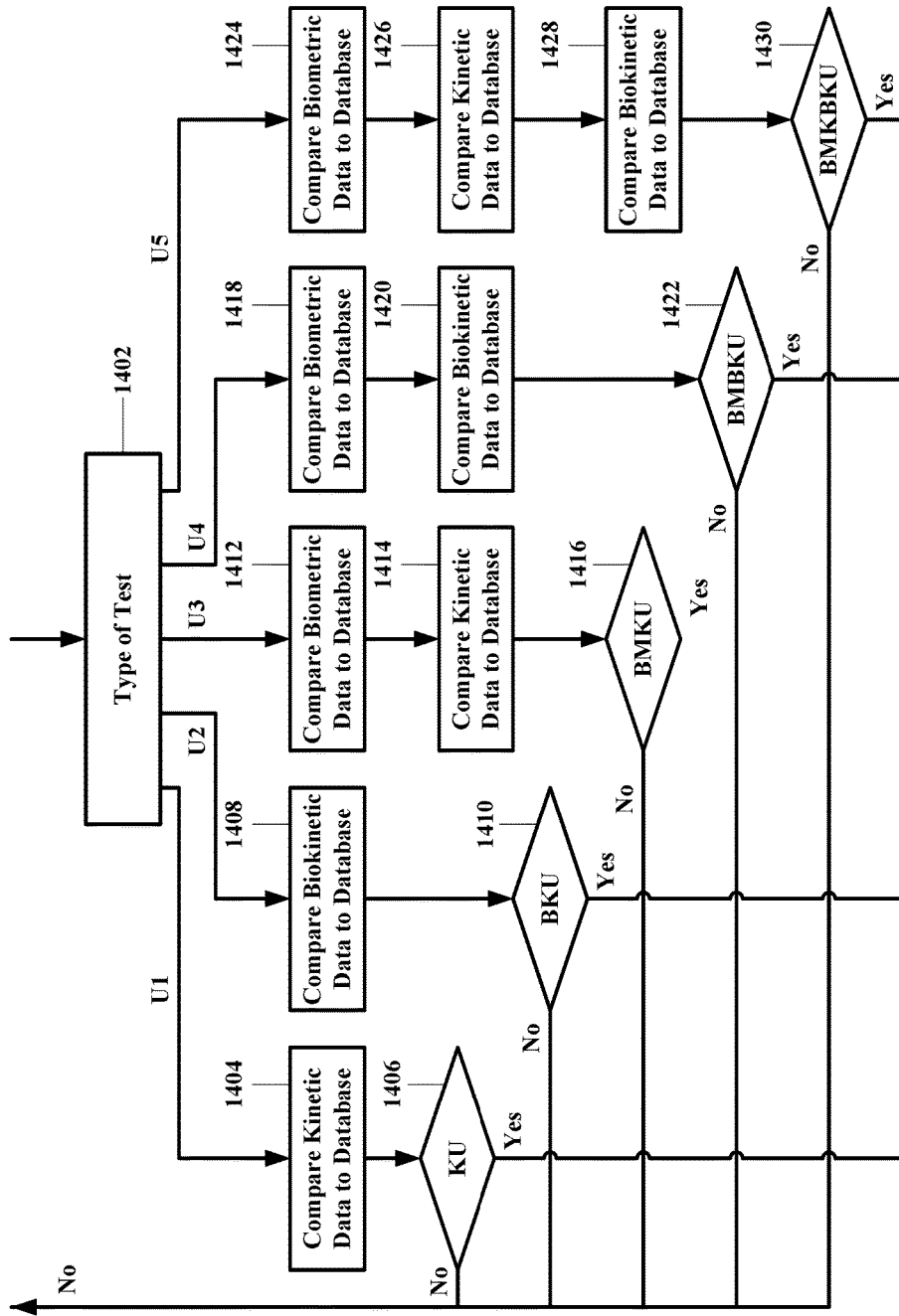

Referring now to FIG. 14, an embodiment of the uniqueness tests 816, 918, 1018, 1118, or 1220 including a test type step 1402, where the type of the uniqueness test to be used is determined and control is transferred to an appropriate uniqueness test. The systems may be instructed by the user as to which type of identifier is to be constructed, the program requesting the identifier may specific the type of identifier to be constructed, or the systems may generate all of them and let the user or program select from one or more of the constructed identifiers.

If the identifier is to be a kinetic identifier based on kinetic data only, then control is sent along a U1 path to a compare kinetic data step 1404 and then to a kinetic uniqueness test in a KU step 1406. If the identifier is not unique, then control proceeds along a NO path, while if it is unique, then control proceeds along a YES path to the set steps 818, 920, 1020, 1120, or 1222.

If the identifier is to be a biokinetic identifier based on biokinetic data only, then control is sent along a U2 path to a compare biokinetic data step 1408 and then to a biokinetic uniqueness test in a BKU step 1410. If the identifier is not unique, then control proceeds along a NO path, while if it is unique, then control proceed along a YES path to the set steps 818, 920, 1020, 1120, or 1222.

If the identifier is to be a biometric/kinetic identifier based on biometric and kinetic data, then control is sent along a U3 path to a compare biometric data step 1412 and a compare kinetic data step 1414 and then to a BMKU step 1416. If the identifier is not unique, then control proceeds along a NO path, while if it is unique, then control proceed along a YES path to the set steps 818, 920, 1020, 1120, or 1222.

If the identifier is to be a biometric/biokinetic identifier based on biometric and biokinetic data, then control is sent along a U4 path to a compare biometric data step 1418 and a compare biokinetic data step 1420 and then to a BMBKU step 1422. If the identifier is not unique, then control proceeds along a NO path, while if it is unique, then control proceed along a YES path to the set steps 818, 920, 1020, 1120, or 1222.

If the identifier is to be a biometric/kinetic/biokinetic identifier based on biometric, kinetic, and biokinetic data, then control is sent along a U5 path to a compare biometric data step 1424, a compare kinetic data step 1426, and a compare biokinetic data step 1428 and then to a BMKBKU step 1430. If the identifier is not unique, then control proceeds along a NO path, while if it is unique, then control proceed along a YES path to the set steps 818, 920, 1020, 1120, or 1222.

Please note that at the database may be originally populated with biometric feature data (average biometric indicators for different body types, body feature types, etc.), kinetic data (movement characteristics, movement types, movement hesitations, movement jitters, stationary jitters, etc.), and/or biokinetic data (body feature and movement characteristics, body part feature and movement characteristics, member body feature and movement characteristics, member part feature and movement characteristics, etc.). As the system is used, the database is updated, enhanced, enriched in all manner of data—biometric, kinetic and biokinetic data.

It should be noted that the threshold tests of biokinetic and/or motion (kinetic) may be used simultaneously or sequentially. In these methods, the motion test is designed to insure that the sensed motion comprises sufficient movement of an entity or an object under the control of an entity within an active zone of at least one sensor capable of detecting motion, regardless of whether it is capable of sensing other types of data as well, for the system to activate. For example, if the sensed movement is spurious, inconsistent, chaotic, random, or otherwise of an insufficient nature to pass threshold movement criteria including, but not limited to, direction, smoothness, duration, type, other motion attributes, or mixtures and combinations thereof. The test is basically to reduce activation do to sensed motion that the system deems insufficient for activation.

In the create biokinetic identifier step, the methods of this disclosure analyze that captured data including motion data and biometric data from the sensors. If the user has predefined that type of motion data and biometric data to be used by the system, then the steps will take that predefined data types and construct a biokinetic identifier therefrom. For example, if the user predefined that body features (e.g., body shape, organ shape, organ placement, organ orientation, body part placement, body part orientation, etc.) and body part motion are to be used to construct the biokinetic identifier, then the step will select one or a plurality of body features and combine the body feature data with motion data associated with the user motion, user body part motion, and/or motion of objects under the control of the user to construct a biokinetic identifier. If the user has predefined that the data types include organ texture and/or patterns (e.g., finger prints, palm prints, retinal prints, scar patterns, vein patterns, EEG patterns, EKG patterns, brain wave patterns, etc.) and motion of body parts (e.g., eye, hand, foot, arm, etc.) to construct a biokinetic identifier. If the user elects dynamic selection, then the system will select captures biometric data and motion data and combine the selected data to construct a biokinetic identifier.

In all of these methods, the uniqueness test is designed to test the kinetic and/or biokinetic identifiers to determine a uniqueness of the identifier based on a set of uniqueness criteria that may be predetermined, created by repeated user actions to form a baseline, or created to show a pattern of changes over time dynamically including, but not limited to, an amount and type of biometric data (such as two vs. three fingers, EKG, EEG, shape and size of body parts, capacitive or inductive potential or other emf or optical characteristics of the user, tremoring motion, eye lash length, internal organ configurations and size, and any relative set able to uniquely identify a user, or unique enough that when combined with motion, creates a unique identity). The systems are designed to collect and database kinetic, biometric, and biokinetic data and prepare categories of the motion (kinetic) data, the biometric data, and the biokinetc data. As a new user interacts with the interface, the interfaces collect and capture user kinetic data, user biometric data, and/or user biokinetic data. The systems then compare the user data to the data in the database to determine appropriate user kinetic data, user biometric data, and/or user biokinetic data to construct one or more unique identifiers that may be used in one or more unique signatures, validators, identifiers, or similar login protocols. One of the unique features of the present disclosure is the ability for the interface to construct one or more unique identifiers for use in a login protocol for a program, website, etc. without the user having to do anything more than interact with the interfaces of this disclosure. The specific tests may be similarity tests, dissimilarity tests, any other measuring test, or mixtures and combinations thereof. The uniqueness test may be any test that determines a uniqueness probability and if the identifier passes the uniqueness threshold, the identifier is considered unique. Uniqueness test may be a similarity test or measures including, without limitation, a Pearson correlation coefficient measures, a Tanimoto measure, stochastic sign change measures, deterministic sign change measures, minimum ratio measures, Spearman's rho measures, Kendall's tau measures, greatest deviation measures, ordinal measures, correlation ratio measures, distance-base similarity measures, energy of joint probability distribution measures, material similarity measures, Shannon mutual information measures, Renyi mutual information measures, Tsallis mutual information measures, F-information measures, feature-based similarity measures, probabilistic similarity measures, other similarity measures, and/or combinations thereof. Similarity models may be classified into Type I, II and III models, which may be deterministic or probabilistic. The uniqueness tests may also be dissimilarity measures including, without limitation, $L_1$ norm measures, median of absolute differences measures, square $L_2$ norm measures, median of square differences measures, normalized square $L_2$ norm measures, incremental sign distance measures, intensity-ratio variance measures, intensity-mapping-ratio variance measures, rank distance measures, joint entropy measures, exclusive F-information measures, and/or similar dissimilarity measures.

Types of Data Collected and/or Captured

Referring now to FIG. 15A, an active zone or surface of a sensor device, generally 1500, is shown to include three contact regions 1502, 1504, and 1506. The contact region 1502 comprises a region where the sensor contact meets a firm threshold contact value sufficient to produce a firm contact output signal. The contact region 1504 comprises a region where the sensor contact is greater than zero but less than the firm threshold contact value to produce a below threshold output signal. The contact region 1506 comprises a region where the sensor contact is zero or substantially zero producing a zero contact output signal. It should be recognized, that these regions and their associated output signals may and generally will vary, change, and/or fluctuate over time. While the firm contact region 1502 will be sufficient to produce the firm contact output signal, the below threshold output signal alone or in conjunction with the firm contact output signal and/or the zero contact output signal may be user specific. Thus, the systems of this disclosure collect and/or capture firm contact output data, below threshold output data, and zero contact output data. These data may be classified into biometric data, kinetic data, and/or biokinetic data, stored into the database, and used to construct unique kinetic, biokinetic, biometric/kinetic, biometric/biokinetic, and/or biometric/kinetic/biokinetic identifiers. Again, the biometric data may be the exact shape and pressure of the firm contact region 1502, the kinetic data may be the temporal variations, changes, and/or fluctuations of the three output signals, and the biokinetic data is any combination of biometric and kinetic data simultaneous and/or sequentially produced. It should be recognized that while the regions are shown to be circular, they may be of any shape—regular or irregular.

Referring now to FIG. 15B, an active zone or surface of a sensor device, generally 1520, is shown to include four contact regions 1522, 1524, 1526, and 1528. The contact region 1522 comprises a region where the sensor contact meets a firm contact threshold value sufficient to produce a firm contact or first output signal. The contact region 1524 comprises a region where the sensor contact is less than the firm threshold contact value and greater than or equal to a second threshold value to produce a second output signal. The contact region 1526 comprises a region where the sensor contact is less than the second threshold value and greater than zero or substantially zero to produce a third output signal. The contact region 1528 comprises a region where the sensor contact is zero or substantially zero producing a zero contact or fourth output signal. It should be recognized, that these regions and their associated output signals may and generally will vary, change, and/or fluctuate over time. While the firm contact region 1522 will be sufficient to produce the firm contact output signal, any combination of the four output signals may be user specific. Thus, the systems of this disclosure collect and/or capture data associated with the four output signals. These data may be classified into biometric data, kinetic data, and/or biokinetic data, stored into the database, and used to construct unique kinetic, biokinetic, biometric/kinetic, biometric/biokinetic, and/or biometric/kinetic/biokinetic identifiers. Again, the biometric data may be the exact shape and pressure of the firm contact region 1522, the kinetic data may be the temporal variations, changes, and/or fluctuations of the three output signals, and the biokinetic data is any combination of biometric and kinetic data simultaneous and/or sequentially produced. It should be recognized that while the regions are shown to be circular, they may be of any shape—regular or irregular.

Although the active zone has been illustrated with three regions and four regions represent only two possible threshold valued arrangements, the systems of this disclosure may collect or capture data associated with different threshold valued arrangements to improve user specific data.

Referring now to FIG. 16A, an active zone or surface of a sensor device, generally 1600, is shown to include a plurality of contact regions 1602a&b, 1604a&b, 1606, 1608a&b, and 1610. The contact regions 1602a&b comprise regions where the sensor contact meets a firm threshold contact value sufficient to produce two firm contact output signals. The contact regions 1604a&b comprise regions where the sensor contact is greater than zero but less than the firm threshold contact value to produce two below threshold output signals. The contact region 1606 comprises a region where the sensor contact is a mixture of the two below threshold output signals to produce a mixed of the two below threshold output signals, which may include interference signal components. The contact region 1608a comprises a region where the sensor contact is a mixture of the firm contact output signals 1602a and the below threshold output signal 1604b and the contact region 1608b comprises a region where the sensor contact is a mixture of the firm contact output signals 1602b and the below threshold output signal 1604a to produce two mixed output signals. The contact region 1610 comprises a region where the sensor contact is zero or substantially zero producing a zero contact output signal. It should be recognized, that these regions and their associated output signals may and generally will vary, change, and/or fluctuate over time. While the firm contact regions 1602a&b will be sufficient to produce the firm contact output signals, any combination of the output signals may be user specific. Thus, the systems of this disclosure collect and/or capture data associated with the output signals. These data may be classified into biometric data, kinetic data, and/or biokinetic data, stored into the database, and used to construct unique kinetic, biokinetic, biometric/kinetic, biometric/biokinetic, and/or biometric/kinetic/biokinetic identifiers. Again, the biometric data may be the exact shape and pressure of the firm contact regions 1602a&b, the kinetic data may be the temporal variations, changes, and/or fluctuations of the three output signals, and the biokinetic data is any combination of biometric and kinetic data simultaneous and/or sequentially produced. It should be recognized that while the regions are shown to be circular, they may be of any shape—regular or irregular.

Referring now to FIG. 16B, an active zone or surface of a sensor device, generally 1650, is shown to include a plurality of contact regions 1652a&b, 1654a&b, 1656a&b, 1658, 1660, 1662a&b, 1664a&b, and 1666. The contact regions 1652a&b comprise regions where two sensor contacts meet a firm contact threshold value sufficient to produce two firm contact output signals or two first output signals. The contact regions 1654a&b comprise regions where two sensor contacts are less than the firm threshold contact value and greater than or equal to a second threshold value to produce two second output signals. The contact regions 1656a&b comprise regions where two sensor contacts are less than the second threshold value and greater than zero or substantially zero to produce two third output signals. The contact region 1658 comprises a region where the sensor contact comprises mixtures of the two second output signals associated with the contact regions 1654a&b to produce a first mixed output signal, which may include interference signal components. The contact regions 1660 comprises regions where the sensor contact is mixtures of the third output signals associated with the contact regions 1656a&b to produce second mixed output signals, which may include interference signal components. The contact regions 1662a comprise regions where the sensor contacts comprise mixtures of the second output signal associated with the contact region 1654a and the third output signal associated with the contact region 1656b to produce third mixed output signals, which may include interference signal components. The contact regions 1662b comprise regions where the sensor contacts comprise mixtures of the second output signal associated with the contact region 1654b and the third output signal associated with the contact region 1656a to produce fourth mixed output signals, which may include interference signal components. The contact regions 1664a comprise regions where the sensor contacts comprise mixtures of the first output signal associated with the contact region 1652a and the third output signal associated with the contact region 1656b to produce fifth mixed output signals, which may include interference signal components. The contact regions 1664b comprise regions where the sensor contacts comprise mixtures of the first output signal associated with the contact region 1652b and the third output signal associated with the contact region 1656a to produce sixth mixed output signals, which may include interference signal components. The contact region 1666 comprises a region where the sensor contact is zero or substantially zero producing a zero contact or fourth output signal. It should be recognized, that these regions and their associated output signals may and generally will vary, change, and/or fluctuate over time. While the firm contact regions 1652a&b will be sufficient to produce the firm contact output signal, any combination of the four output signals may be user specific.

Thus, the systems of this disclosure collect and/or capture data associated with the four output signals. These data may be classified into biometric data, kinetic data, and/or biokinetic data, stored into the database, and used to construct unique kinetic, biokinetic, biometric/kinetic, biometric/biokinetic, and/or biometric/kinetic/biokinetic identifiers. Again, the biometric data may be the exact shape and pressure of the firm contact regions 1652a&b, the kinetic data may be the temporal variations, changes, and/or fluctuations of the three output signals, and the biokinetic data is any combination of biometric and kinetic data simultaneous and/or sequentially produced. It should be recognized that while the regions are shown to be circular, they may be of any shape—regular or irregular.

Referring now to FIG. 17, an active volume of a sensor device, generally 1700, is shown to include a hand 1702 holding up one finger 1704 within the active volume 1700, which comprises a first image region 1706. The sensor captures an image of the hand 1702 to produce a first image output so that the systems of this disclosure may collect biometric and/or gesture data. As the image capture continues, the hand 1702 and/or the finger 1704 may move, vary, change, and/or fluctuate producing a time variation of the first image region 1706. The sensor captures these time variations as illustrated here as three additional image regions 1708, 1710, and 1712 surrounding the first image region 1706, which in turn produces a second image output, a third image output, and a fourth image output. The image region 1708 comprises a region where the hand 1702 and/or the finger 1704 spends an amount of time greater than or equal to a first threshold value, which is less than the value the sensor uses to determine the position of the hand 1702 and the finger 1704. The image region 1710 comprises a region where the hand 1702 and/or the finger 1704 spends an amount of time greater than or equal to a second threshold value, but less than the first threshold value, where the second threshold value is less than the first threshold value. The image region 1712 comprises a region where the hand 1702 and/or the finger 1704 spends an amount of time less than the second threshold value and represents a zero region—generally, meaning that the hand 1702 and/or the finger 1704 spends zero or substantially zero time in the region. The second, third, and fourth outputs may include interference components as will depending on the type of sensor being used. It should be recognized, that these regions and their associated output signals may and generally will vary, change, and/or fluctuate over time. While the firm image region 1706 will be sufficient to produce the firm contact output signal, the below threshold output signal alone or in conjunction with the firm contact output signal and/or the zero contact output signal may be user specific. Thus, the systems of this disclosure collect and/or capture firm contact output data, below threshold output data, and zero contact output data. These data may be classified into biometric data, kinetic data, and/or biokinetic data, stored into the database, and used to construct unique kinetic, biokinetic, biometric/kinetic, biometric/biokinetic, and/or biometric/kinetic/biokinetic identifiers. Again, the biometric data may be the exact shape and pressure of the firm image region 1706, the kinetic data may be the temporal variations, changes, and/or fluctuations of the three output signals, and the biokinetic data is any combination of biometric and kinetic data simultaneous and/or sequentially produced. It should be recognized that while the regions are shown to be circular, they may be of any shape—regular or irregular.

Referring now to FIG. 18, an active zone or surface of a sensor device, generally 1800, is shown to include a hand 1802 making an OK sign within the active volume 1800, which comprises a first image region 1804. The sensor captures an image of the hand 1802 to produce a first image output so that the systems of this disclosure may collect biometric and/or gesture data. As the image capture continues, the hand 1802 may move, vary, change, and/or fluctuate producing a time variation of the first image region 1804. The sensor captures these time variations as illustrated here as three additional image regions 1806, 1808, and 1810 surrounding the first image region 1804, which in turn produces a second image output, a third image output, and a fourth image output. The image region 1808 comprises a region where the hand 1802 spends an amount of time greater than or equal to a first threshold value, which is less than the value the sensor uses to determine the position of the hand 1802. The image region 1810 comprises a region where the hand 1802 spends an amount of time greater than or equal to a second threshold value, but less than the first threshold value, where the second threshold value is less than the first threshold value. The image region 1812 comprises a region where the hand 1802 spends an amount of time less than the second threshold value and represents a zero region—generally, meaning that the hand 1802 spends zero or substantially zero time in the region. The second, third, and fourth outputs may include interference components as will depending on the type of sensor being used. It should be recognized, that these regions and their associated output signals may and generally will vary, change, and/or fluctuate over time. While the firm image region 1804 will be sufficient to produce the firm contact output signal, the below threshold output signal alone or in conjunction with the firm contact output signal and/or the zero contact output signal may be user specific. Thus, the systems of this disclosure collect and/or capture firm contact output data, below threshold output data, and zero contact output data. These data may be classified into biometric data, kinetic data, and/or biokinetic data, stored into the database, and used to construct unique kinetic, biokinetic, biometric/kinetic, biometric/biokinetic, and/or biometric/kinetic/biokinetic identifiers. Again, the biometric data may be the exact shape and pressure of the firm image region 1804, the kinetic data may be the temporal variations, changes, and/or fluctuations of the three output signals, and the biokinetic data is any combination of biometric and kinetic data simultaneous and/or sequentially produced. It should be recognized that while the regions are shown to be circular, they may be of any shape—regular or irregular. While these collection systems were focused on images, the same technique may be used in other devices that use collect/capture light, sound, or other wave forms and analyze them to produce biometric, kinetic, and/or biokinetic data.

Systems and Methods Using Blob Data

In certain embodiments, the systems and methods of this disclosure include using blob data as a source of data to analyze, determine, and predict movement and movement attributes, where movement is understood to mean sensing movement meeting a threshold measure of motion by a motion sensor, a plurality of motion sensors or an array of motion sensor. Blob data comprises raw motion sensor data representing sensor elements that have been activated by movement within an active area, volume or zone of the motion sensor(s). In the case of a touch screen including a large plurality of touch elements, touching the screen produces raw output data corresponding to all touch elements activated by the area of contact with the screen. The term activate as it relates to touch elements means that touch elements within the contact area produce touch element outputs above a threshold level set either by the manufacturer or set by the user. For other types of sensors, movement within an active sensing zone of the sensors (e.g., areas for 2D devices, volumes for 3D devices) will activate an area and/or a volume within the zone. These areas and volumes represent the "blob" data for each type of device. For capacitive sensors or inductive sensors or electromagnetic field (EMF) sensors, the blob data will relate to areas or volumes corresponding to sensor elements that meet a threshold output for the sensors.

The contact area or blob data will change with changes in contact, pressure, and/or movement of any kind. The blob data represents an additional type of data to analyze, determine, and predict movement and/or movement attributes. The blob data may be used to identify a particular finger, to differentiate between different fingers, to determine finger orientations, to determine differences in pressure distributions, to determine tilt orientations, and/or to determine any other type of change in the blob data.

In the BioKinetic applications, we discussed how the blob data compared with filtered data (center of contact, center of pressure, or other types of centroid data) may be used to create a proportionate and/or unique identifier for signature identification. The methods and systems of this disclosure may also include analyzing the blob data and analyzing transitions from blob to filtered data or centroid data. For example, a user places a thumb on a phone capacitive (touch) screen. In doing so, the blob data may be used to identify which thumb was being used or to confirm that the thumb belongs to a particular user. If the touch screen also include temperature sensors, then the blob data may not only be used to differentiate and identify particular thumbs (or fingers, irises, retinas, palms, etc.) alone or in conjunction with other movement data based on a shape of the blob data or output signal and a direction to which the blob data or blob data and centroid data may be pointing or oriented. This technique may be used to directly turn a knob using a pivoting movement versus using movement of a centroid, where the thumb is represented as a point and movement of the centroid from one point to another is used to determine direction. Using blob data allows the user to select zones, control attributes, and/or select, scroll, and/or actuate the systems and methods of this disclosure simply by pivoting the thumb. Then moving the thumb in a direction may be used to activate different commands, where the blob data movements may be used to accentuate, to confirm, to enhance, and/or to leverage centroid data. For examples, pivoting the thumb while in contact with the touch screen results in blob data that may be used to determine finger orientation and/or tilt, allowing the user to select between groups or fields of objects (for example), or through pages of data or objects. Once the user scrolls and selects a particular group or field, further movement results in a different set of set of controls, instructions, commands, attributes, etc. The systems and methods may use the blob data to "see" or anticipate movement attributes (direction, pressure distribution, temperature distribution, speed (linear and angular), velocity (linear and angular), acceleration (linear and angular), etc.). The systems and methods may use the blob data, the centroid data or a combination of the two types of data to analyze, determine, and/or predict or anticipate user movement, desired intent, and/or desired control. The transition from blob data to centroid data may also be used to see or anticipate user intent. For example, as a user twists or pivots the thumb, then begins to move towards an object, zone or location, the thumb may begin to roll in a lifting motion, rolling up towards the tip of the thumb, providing less of a pattern and more of a typical centroid touch pattern on the screen. This transition may also provide user intent through not only movement in an x/y plane, but also providing shape distinctions that may be used for commands and other functions. The rocking of the thumb or finger (rocking from a flat orientation to a tip orientation) may also provide z-axis attributes or functions. This may also be combined with movement while rocking. In 3D environments, the blob and/or centroid data (along with other movement attributes such as direction, pressure distribution, temperatures distribution, etc.) may be used, but instead of blob data, pixilation in 3D in any environment, or volumetric differences (sensed in any way) along axis (plural) may be used in the same way as blob and/or centroid data to analyze, determine, anticipate, and/or predict user intent. These aspects may also be seen or used as a "field" of influence determinative. In these embodiments, temperature may be used for a number of different purposes. First, the temperature data may be used to insure that the motion sensor is detecting a living person. Second, the temperature data may be used as data to insure that the user sensed within the active zones of the sensor or sensors is indeed the user that has access to the systems and methods on the particular device. Of course, temperature data is not the only data that the sensors may determine. The sensors may also capture other user specific data.

In certain embodiments, the systems and methods of this disclosure include controlling a hologram remotely or by interacting with it. Pivoting the hand in parallel with a field may provide one control, while changing an angle of the hand may be perceived as a "blob" data change, a transition to centroid data, or a combination thereof. This transition may also be represented on a display as going from a blob to a point, and the transition may be shown as a line or vector with or without gradient attributes. Putting these into the hologram example, changing from blob data to centroid data, and seeing a vector and a gradient of change of volume or area along the vector may be used to change the display in the hologram of a shoe (for example) so the shoe may change size and direction according to the movement of the user. This methodology may be performed in any conceivable predetermined or dynamically controllable way, where attributes may be any single or combination of intent, attribute, selection, object, command or design. These movements and/or movement attributes may be simultaneously or sequentially used in any environment, and in whole or part, and include gradients of attributes based on changes of perceived mass, pressures, temperature, volume, area, and/or influence. These changes may be sensed and defined by any sensor or software reproduction ability (software may be used to replicate movement or the effects of movement). All this may also be used to determine unique BioKinetic identifiers as well and in combination with these attributes.

In certain embodiments, the systems and methods of this disclosure include using blob data to orient a menu appropriately, where the blob data comprises raw sensor output data based on a number of sensing elements being activated above the threshold activation. For example, in the case of a touch screen, when a user touches the screen with a finger tip or other part of a finger, the sensor generates a blob of data comprising all sensing elements activated (based on some threshold activation value). The data is generally used to determine a centroid of the contact and that value is then used in further processing. However, the blob data may be used not only to differentiate different users, but may also be used to predict or anticipate user movement and ascertain movement and changes in movement. By knowing which thumb or finger is located at what area of the screen, the displayed menu upon a touch or entry into a sensor area may be positioned to provide a best heuristics or positioning based on the touch area and or user movement. For instance, touching the right thumb on a right side of a phone screen in a lower quadrant may signal the systems or methods to display a menu along a radius just above the thumb, while an angle of the thumb when touching a middle of the screen may result in displaying a radial menu just below the thumb if the thumb was pointing upwards towards an opposite corner, or above the thumb if the thumb was pointing towards a bottom left corner.

In certain embodiments, the systems and methods of this disclosure include one menu appearing when touching an upper part of the screen and a different menu appearing when touching a different part of the screen such as a lower part of the screen. If the finger is flat and not angled when touching the screen, different menus may be activated. So the position of the finger, finger angle, finger direction, finger pressures distribution, and/or combinations thereof may result in different menu sets, object sets, attribute sets, command sets, etc., and/or mixtures of combinations thereof for further processing based on movement data. Of course, all of these concepts may be equally applied to 2D, 3D, 4D, or other multi-dimensional environments both real, augments and/or virtual.

Figure 19A:
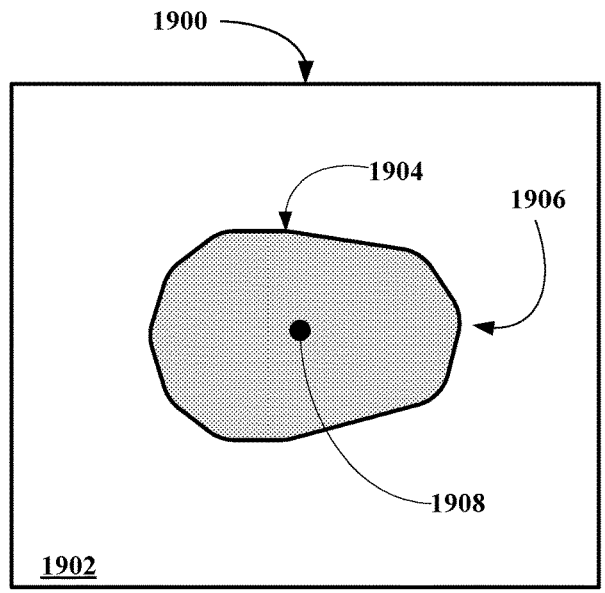

Referring now to FIG. 19A, an embodiments of a touch screen interface of this disclosure, generally 1900, is shown to include a touch screen 1902 having a touch area 1904 corresponding to a user's thumb or finger in contact with the screen located in a central portion 1906 of the screen 1902. The touch area 1904 represents blob data associated with all touch screen elements activated by the user thumb or finger touch. The area 1904 is shown to include a centroid 1908, which represent the data normally used in processing systems to determine movement. The blob data with or without the centroid data may represent a unique identifier for determine to whom the thumb or finger belongs. Depending on the sensitive of the touch screen (number of elements per unit of area and whether the elements are pressure sensitive—output varies with pressure), the blob data may not only include shape information, but may include pressure distribution information as well as the underlying skeletonal structure of the thumb or finger and/or skin surface textural features (fingerprint features) adding further unique identifiers aspects.

Figure 19B:
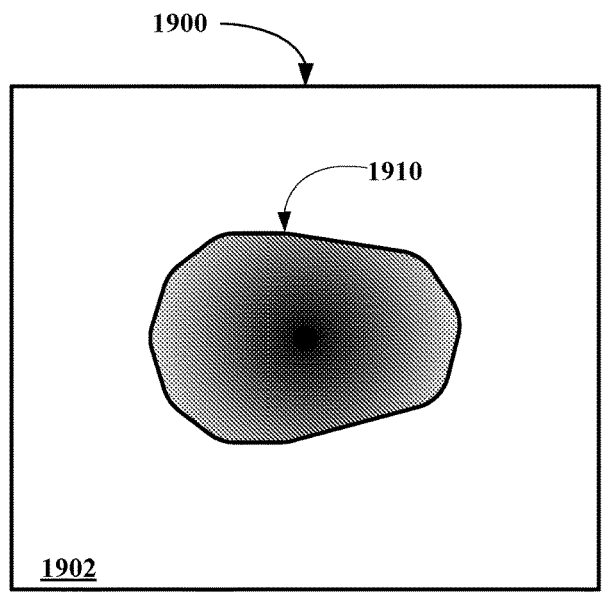
Figure 19C:
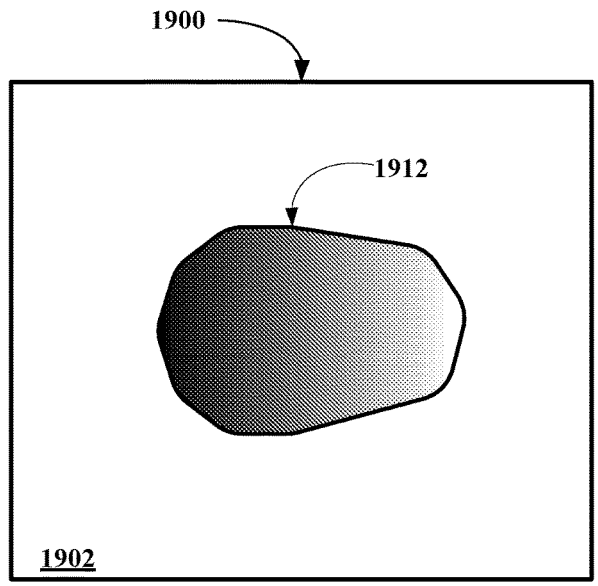
Figure 19D:
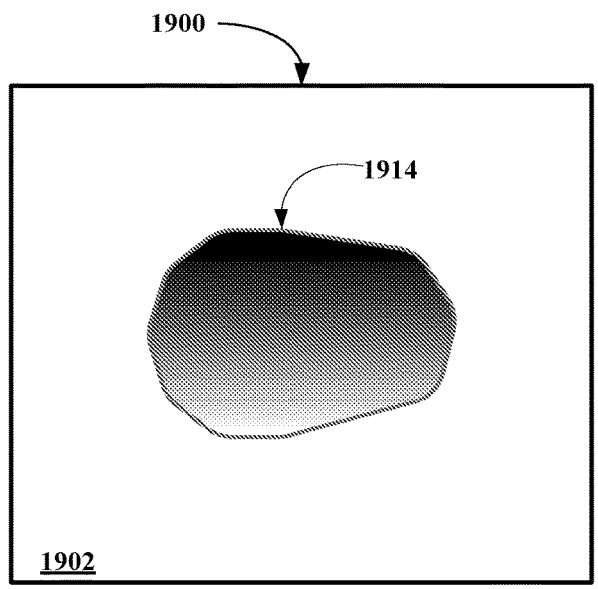

Looking at FIGS. 19B-D, the area 1904 is shown to have three different pressure distributions 1910, 1912, and 1914. Looking at FIG. 19B, the first pressure distribution 1910 represents an initial contact pressure distribution of the thumb or finger on the screen 1902, then the other distributions 1912 and 1914 may represent changes over time do to the user changing contact pressure within the area 1904. The distribution 1912 of FIG. 19C represents the user changing contact pressure from the center type contact pressure distribution 1910 to the tip type contact pressure distribution 1912. The distribution 1914 of FIG. 19D represents the user changing contact pressure from the center type contact pressure distribution 1910 to the top edge type contact pressure distribution 1914. Each of these contact pressure distributions may cause the systems and methods of this disclosure to transition between menu levels, change the orientation of displayed menu items, transition between pre-defined menu levels, etc. Additionally, the transitions from the pressure distribution 1910 to one of the other distributions 1912 and 1914 may be used as movement to control the systems of this disclosure.

Figure 19E:
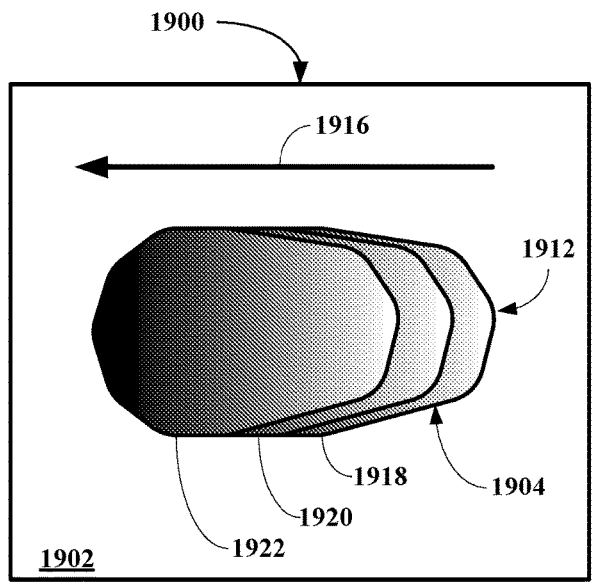

Looking at FIG. 19E, the area 1904 is shown to undergo left movement 1916 of the distribution 1912 from a first location 1918, to a second location 1920, and finally to a third location 1922. These locations 1918, 1920, and 1922 may represent very minute movements, i.e., movement is sufficiently small so that the movement is insufficient to result in a change of the centroid. Thus, subtle changes in the pressure distribution within the area 1904 may result in movement determination, anticipation, and or prediction. Again, the blob data with or without the centroid data may be used to determine movement and movement attributes for control of the systems of this disclosure.

Figure 19F:
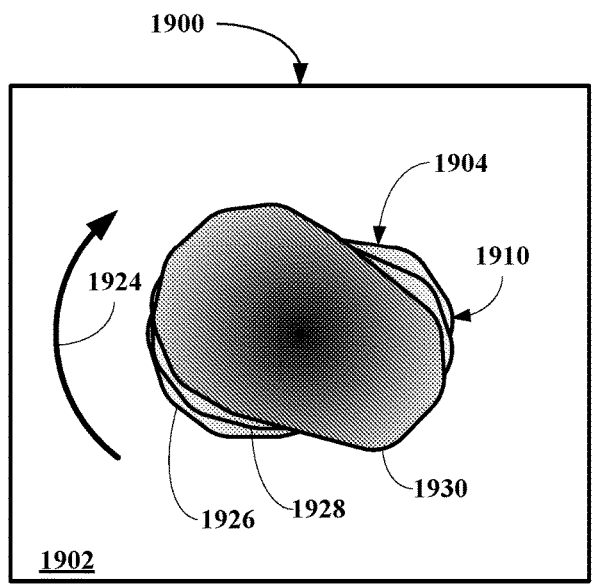

Looking at FIG. 19F, the area 1904 is shown to undergo clockwise rotationally movement 1924 of the distribution 1910 from a first location 1926, to a second location 1928, and finally to a third location 1930. These locations 1926, 1928, and 1930 may represent very minute movements, i.e., movement is sufficiently small so that the movement is insufficient to result in a change of the centroid. Thus, subtle changes in the pressure distribution within the area 1904 may result in movement determination, anticipation and or prediction. Again, the blob data with or without the centroid data may be used to determine movement and movement attributes for control of the systems of this disclosure.

Figure 19G:
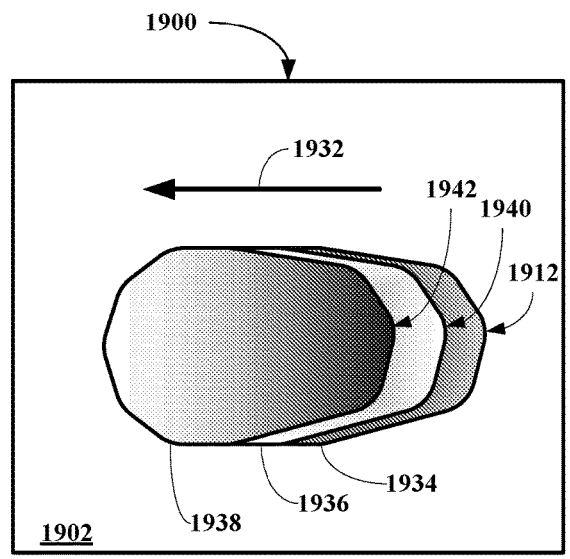

Looking at FIG. 19G, the area 1904 is shown to undergo left movement 1932 of the distribution 1912 from a first location 1934, to a second location 1936, and finally to a third location 1938 and simultaneous changes in pressure distributions from the pressure distribution 1912 to an intermediate pressure distribution 1940, and finally to a backward pressure distribution 1942. Such compound blob data changes, e.g., movement in a given direction and changes in the pressure distributions. Again, the blob data with or without the centroid 1908 may be used to analyze, determine and even predict the direction of movement, especially is the movement is small resulting in insufficient movement of the centroid to indication any movement at all. Thus, subtle changes in the pressure distribution of the area 1904 may result in movement determination, anticipation and or prediction. This compound movement may be used to affect to different levels of control within a give environment.

Figure 19H:
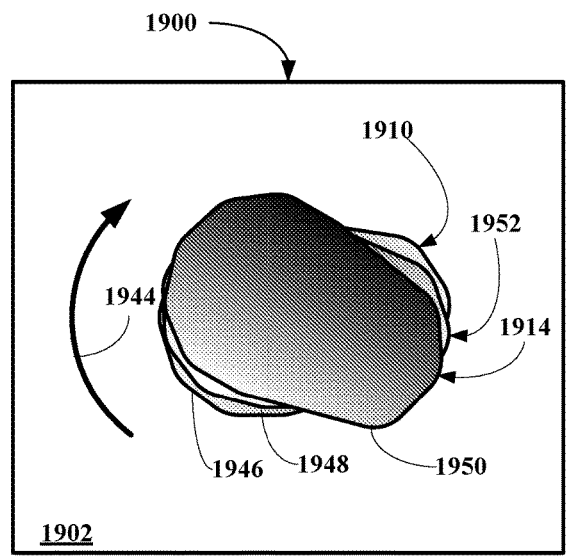

Looking at FIG. 19H, the area 1904 is shown to undergo clockwise rotationally movement 1944 of the distribution 1910 from a first location 1946, to a second location 1948, and finally to a third location 1950 and simultaneous changes in pressure distributions from the pressure distribution 1910 to an intermediate pressures distribution 1952, and finally to the top edge pressure distribution 1914. Such compound blob data changes, e.g., movement in a given direction and changes in the pressure distributions. Again, the blob data with or without the centroid 1908 may be used to analyze, determine and even predict the direction of movement, especially is the movement is small resulting in insufficient movement of the centroid to indication any movement at all. Thus, subtle changes in the pressure distribution of the area 1904 may result in movement determination, anticipation and or prediction. This compound movement may be used to affect to different levels of control within a give environment.

Figure 20A:
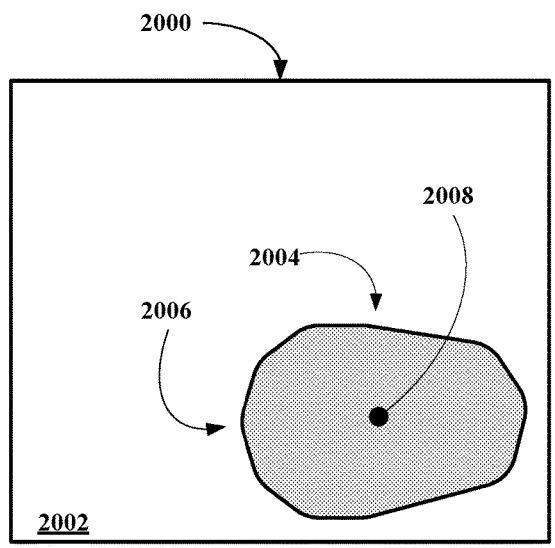

Referring now to FIG. 20A, an embodiments of a touch screen interface of this disclosure, generally 2000, is shown to include a touch screen 2002 having a touch area 2004 corresponding to a user's thumb or finger in contact with the screen located in a lower right portion 2006 of the screen

2002. The touch area represent blob data associated with all touch screen elements activated by the user thumb or finger touch. The area 2004 is shown to include a centroid 2008, which represent the data normally used in processing systems to determine movement. The blob data with or without the centroid data may represent a unique identifier for determine to whom the thumb or finger belongs. Depending on the sensitive of the touch screen (number of elements per unit of area and whether the elements are pressure sensitive—output varies with pressure), the blob data may not only include shape information, but may include pressure distribution information as well as the underlying skeletal structure of the thumb or finger and/or skin surface textural features (fingerprint features) adding further unique identifiers aspects.

Figure 20B:
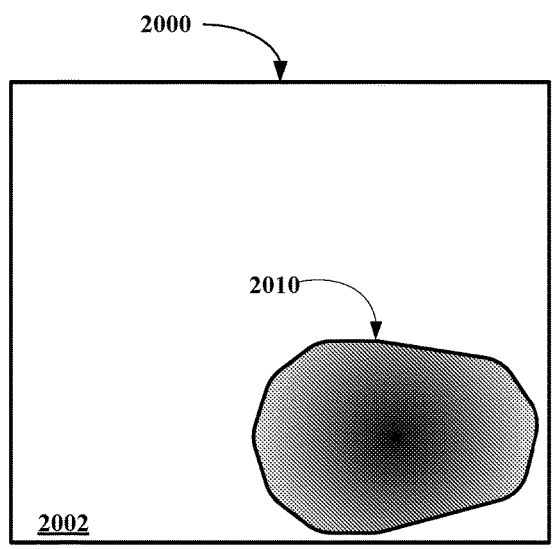
Figure 20C:
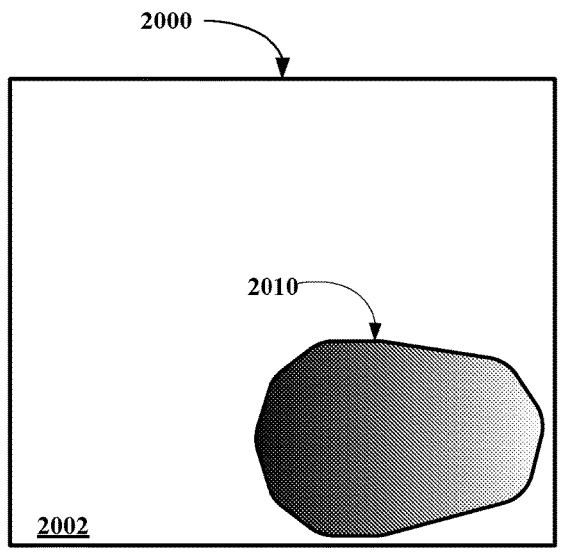
Figure 20D:
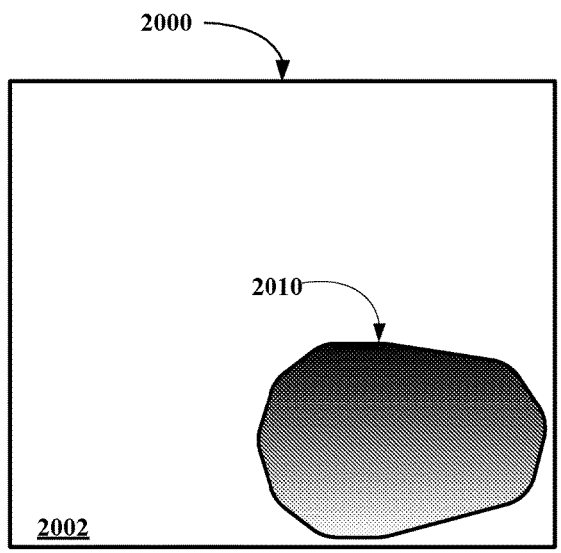

Looking at FIGS. 20B-D, the area 2004 is shown to have three different pressure distributions 2010, 2012, and 2014. Looking at FIG. 20B, the first pressure distribution 2010 represents an initial contact of the thumb or finger with the screen 2002, then the other distributions 2012 and 2014 may represent changes over time do to the user changing contact pressure within the area 2004. The distribution 2012 of FIG. 20C represents the user changing contact pressure from the center type contact pressure distribution 2010 to the tip type contact pressure distribution 2012. The distribution 2014 of FIG. 20D represents the user changing contact pressure from the center type contact pressure distribution 2010 to the top edge type contact pressure distribution 2014. Each of these contact pressure distributions may cause the systems of this disclosure to transition between menu levels, change the orientation of displayed menu items, transition between pre-defined menu levels, etc. Additionally, the transition from the pressure distribution 2010 to one of the other distributions 2012 and 2014 may be used as a movement to control the systems of this disclosure.

Figure 20E:
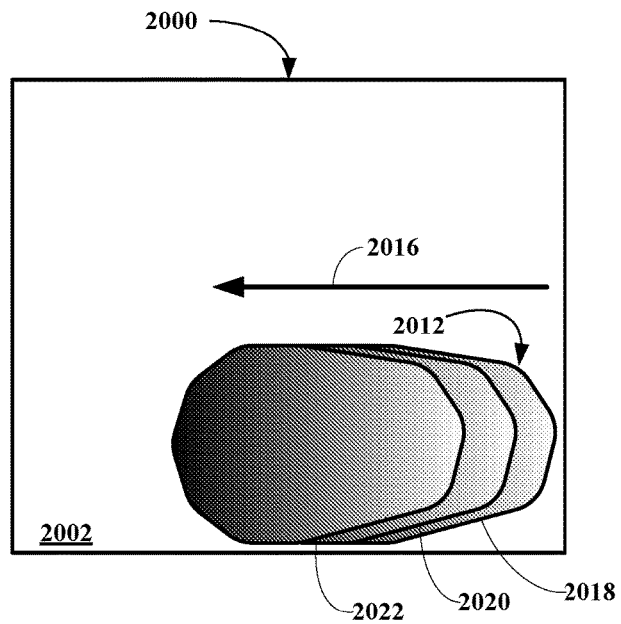

Looking at FIG. 20E, the area 2004 is shown to undergo left movement 2016 of the distribution 2012 from a first location 2018, to a second location 2020 and finally to a third location 2022. These locations 2016, 2018, and 2020 may represent very minute movements, i.e., movement is sufficiently small so that the movement is insufficient to result in a change of the centroid. Thus, subtle changes in the pressure distribution within the area 2004 may result in movement determination, anticipation, and or prediction. Again, the blob data with or without the centroid data may be used to determine movement and movement attributes for control of the systems of this disclosure.

Figure 20F:
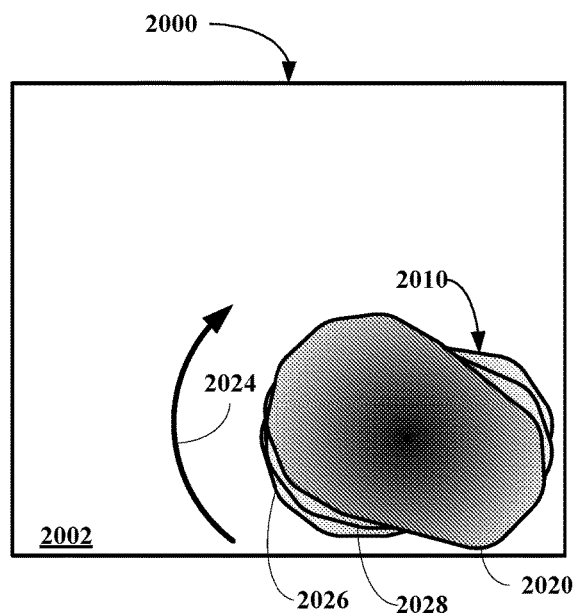

Looking at FIG. 20F, the area 2004 is shown to undergo clockwise rotationally movement 2024 of the distribution 2010 from a first location 2026, to a second location 2028 and finally to a third location 2030. These locations 2026, 2028, and 2030 may represent very minute movements, i.e., movement is sufficiently small so that the movement is insufficient to result in a change of the centroid. Thus, subtle changes in the pressure distribution within the area 2004 may result in movement determination, anticipation and or prediction. Again, the blob data with or without the centroid data may be used to determine movement and movement attributes for control of the systems of this disclosure.

Figure 20G:
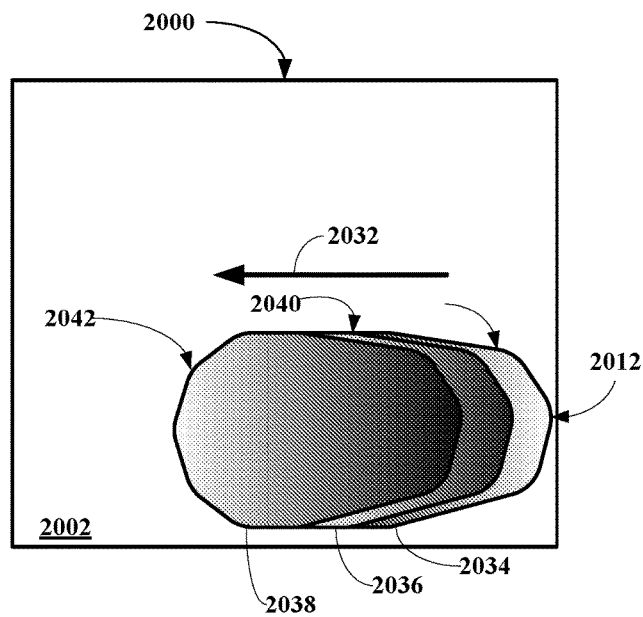

Looking at FIG. 20G, the area 2004 is shown to undergo left movement 2032 of the distribution 2012 from a first location 2034, to a second location 2036 and finally to a third location 2038 and a simultaneous change in pressure distribution from the pressure distribution 2012 to an intermediate pressures distribution 2040, and finally to a backward pressure distribution 2042. Such compound blob data changes, e.g., movement in a given direction and changes in the pressure distributions. Again, the blob data with or without the centroid 2008 may be used to analyze, determine and even predict the direction of movement, especially is the movement is small resulting in insufficient movement of the centroid to indication any movement at all. Thus, subtle changes in the pressure distribution of the area 2004 may result in movement determination, anticipation and or prediction. This compound movement may be used to affect to different levels of control within a give environment.

Figure 20H:
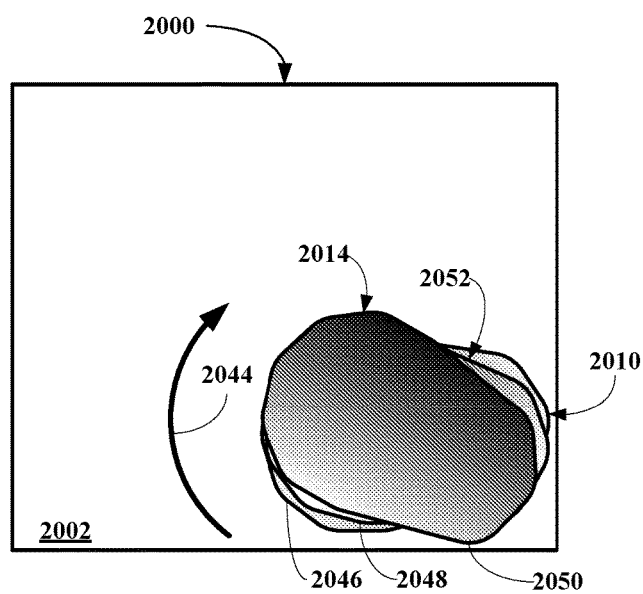

Looking at FIG. 20H, the area 2004 is shown to undergo clockwise rotationally movement 2044 of the distribution 2010 from a first location 2046, to a second location 2048 and finally to a third location 2050 and a simultaneous change in pressure distribution from the pressure distribution 2010 to an intermediate pressures distribution 2052, and finally to the backward pressure distribution 2012. Such compound blob data changes, e.g., movement in a given direction and changes in the pressure distributions. Again, the blob data with or without the centroid 2008 may be used to analyze, determine and even predict the direction of movement, especially is the movement is small resulting in insufficient movement of the centroid to indication any movement at all. Thus, subtle changes in the pressure distribution of the area 2004 may result in movement determination, anticipation and or prediction. This compound movement may be used to affect to different levels of control within a give environment.

It should be recognized that each portion of the screen 1902 or 2002 may correspond to active portions that cause the systems and methods of this disclosure to transition between different sets of menus, objects, and/or attributes. Thus, if a user contact the screen in the central portion and then moves to one of the other portion, the systems and methods may cause a transition from one set of menus, objects, and/or attributes to another set of menus, objects, and/or attributes or the user my lift off the screen and contact one of the portion causing the transition depending on the configuration of the systems and methods, which may be set and/or changed by the user. It should also be recognized that the changes in pressure distribution may also be accompanied by changes in contact area shape. Thus, the systems and methods of this disclosure may use blob data in the form of area shape and size, area pressure distribution and area movement to control many different aspects of the control interfaces of this disclosure. Thus, the user could transition between menu, menu levels, objects, and/or attributes simply by contacting the screen and then changing contact pressure, contact shape and/or movement of the contact (especially rotational movement) without ever breaking contact with the screen.

Systems and Methods Using Bread Crumb Procedures

In certain embodiments, the systems and methods of this disclosure include using "bread crumbs" or "habits" to determine direction of movement in an active zone or field of a sensor, of a plurality of sensors, and/or of a sensor array or arrays. When a user moves towards a desired location on a screen of a display device such as a phone, especially across the screen to make a touch event, the sensor(s) begin to capture or "see" data associated with the user movement, but not necessarily in a continuous manner. Instead, the sensor(s) will "see" a series of points, with increasing frequency, intensity, and/or coverage area, and will begin to be sensed as the user movement comes closer to "contact" with a desired screen location. This data may be used to determine speed and direction, which in turn may be used to predict or anticipate user intent, which objects or attributes are active for choosing attributes rather than objects first is another application that you have filed. This provides a verification aspect so the objects and/or attributes may be selected before a physical confirmation occurs (a touch event), or to cause objects and/or attributes to begin to respond (with color changes, sounds, tactile feedback, shape, animations, etc.) before a confirmatory touch or action occurs. In this way, movement and then a touch may represent a unique signature or identifier as well. It should be recognized that the bread crumbs or habits may be positive attributes and/or reactions or negative attributes and/or reactions.

In certain embodiments, the systems and methods of this disclosure include capturing a user performed movement or gesture coupled with a verbal utterance to construct unique IDs and when used in the control systems to identify or confirm what attribute, command, or function to associate with the movement or gesture. This may be simultaneously or sequentially performed. Again, in the context of this disclosure, simultaneous means events that occur concurrently or event that occur in rapid succession within in a "short" time frame (e.g., a short time frame is between about 1 ps and about 1 s), while sequentially means that the actions occur sequentially over a "long" time frame (e.g., a long time frame is between about 1 s and about 10 s). For example, a user moving in an upward direction, while saying "volume up" results in controlling and increasing a volume of a sound. A user may instead say "base" or "base up", and a base intensity increases instead of the volume.

In certain embodiments, the above describe aspect may be used as security identifiers, where a movement and a voice command may be used to unlock a locked menu, object, and/or attribute or act as a unique identifier for activating a menu, object, and/or attribute. By moving with a right finger from left to right, and saying "open", a locked phone may be unlocked, or any other command or function may occur. These changes may be sequential changes collected over a long time frame and/or simultaneous changes collected over a short time frame allowing further refinement of user identification, verification and/or authentication. This may also include multiple touches or sensed points, multiple words or commands, or any combination of these. Instead of words, sounds, notes, or any audible or other kind of waveform response or neurological response may be used. Touching a zone or location on a screen, while saying a desired attribute, command, or any other desired choice is another way this may be used. Another benefit of this is the ability to quickly associate commands or attributes (scrolls, selections, actuations, or attributes), training a system or interface in an easy way.

Another example of this methodology is to use an area of a touch on the screen. By touching the upper right quadrant of the screen (or moving in that direction) and saying "travel", the system may be trained or programmed so that this touch may display a travel menu of objects or other attributes. By touching or moving in (or towards) the bottom right quadrant and saying "food", a menu of restaurants may be displayed. From that point on, touching or moving towards the associated location or area may provide a different menu, selection or attribute than moving towards or touching a different area. This is also true in 3D environments such as an augmented or virtual reality environment, where gestures or movement may be associated with controls, selections, menu items or attributes by performing the desired gesture or motion and saying (simultaneously or sequentially) what the associated attribute and/or selection is.

In certain embodiments, the systems and methods of this disclosure include locating an object at a point where it may have been before, or a 3D camera in a structure so it is the optimal distance from walls or other objects in a space. One way of doing this is to take a phone (or any device with sensors) and touch a wall or come close enough to be considered a threshold event (for example) with the phone and a trigger of some kind (touching a control object on the phone or saying "start" or other kind of triggering command, and begin to walk towards a perceived location in the middle of a room. The phone displays a visual "chord" or vector from where the wall was touched to your location. This can be done by using the compass sensor of the phone and the steps as measure by other sensors of the phone (such as changes in the accelerometer data of the phone). Repeating this with each wall, and as the user moves, the intersection of these vectors can be determined and seen on a screen. By running spatial algorithms, the central part of the room can be determined. This can then be repeated later using different wall points to locate the center at a later point. By also using the distance from each wall or using corners or a wall at a specific height, accuracy is greatly enhanced. This ability to "drag" a set of vectors makes it easy for a user to move and locate the point they wish to recreate or find by using a display, processor and sensor combination. A central point or center of area can be determined as well as a previous point. From here, all points in a room can be identified from a single or multiple reference point(s).

Encryption Systems and Methods

Embodiments of this disclosure also relate to methods for encrypting data between users. The methods involve establishing a biokinetic identifier for each user using motion sensors and biometric sensors and/or biokinetic sensors to construct a unique kinetic and/or biokinetic identifier for the sender and receiver. The identifiers are then embedded in the file to be send during encryption and act as the key for locking or opening the file after transmission and receipt. Thus, the sender is able to open the file for any purpose and the receiver is able to open the file for any purpose.

While the biokinetic identifiers may be preconstructed by the users using the interfaces and systems of this disclosure, the identifiers may be made even more unique by constructing the biokinetic IDs at the time of encryption. Thus, the systems capture sufficient biometric and kinetic and/or biokinetic data from the sender and receiver to construct on-the-fly unique kinetic and/or biokinetic IDs. The receiver kinetic and/or biokinetic identifier, whether pre-made or on-the-fly, is transmitted to the sender system. The sender system then uses the sender identifier, whether premade or on the fly, and the receiver identifier, whether premade or on the fly, as the lock and key for encrypting the file and opening the file. The file may then be sent from the sender system to the receiver system.

Security Systems and Methods

Embodiments of this disclosure also relate computer security systems utilizing the unique kinetic and/or biokinetic IDs. Once the computer security system software of this disclosure is installed on a computer, the system utilizes the motion and biometric sensors to construct a security identifier to reduce or prevent security breaches into the computer. When the user opens the computer, the system using the security identifier to unlock the computer before it can be used.

For computer networks including a plurality of computers, the computer security systems are installed on all of the computers. Once installed, the systems is used to construct a plurality of authorized security identifiers. These authorized security identifiers, which are each biokinetic identifiers unique for each authorized personnel, are then uploaded to each computer in the computer network. The set of authorized personnel may be updated or modified by a subset of the authorized personnel that have the authority to added, deleted, update or modify user security levels, where the security levels provide the systems with information on the scope of activities each authorized person can undertake in changing or modifying elements of the computer systems from added new computers, to deleting old computers, to updating user information on each computer, to locking computer systems when motion sensor or biometric sensors fail or the software becomes corrupted. Once the computer security systems have been installed across the network to all connected and authorized computers and the authorized security identifiers have been uploaded to all the connected and authorized computers, each time a user activates the computer assigned to the user, the systems captures biometric and motion data via the biometric and motion sensors, which of course may be the same or different, until a unique biokinetic identifier is capable of being constructed. Once constructed, the identifier is uploaded to an identifier database and the computer is locked by the identifier so that each time the user comes to the assigned computer, the systems will capture biometric and motion data sufficient to determine that the user is then one assigned to this computer. Of course, each computer may be assessable by one or more users, provided that each users identifier is resident on the user computers. Please note that each identifier of this disclosure is designed to have a security quotient of greater than about 80%, greater than about 85%, greater than about 90, greater than about 95%, or greater than about 99%.

Systems and Methods Using Body or Body Part Expression/Language

Embodiments of this disclosure also relate to systems and methods that include capturing body part movement evidencing expression and/or body language and using the information in aspects of motion based processing herein. For example, expression and body language data may be evidence by eye, facial, and/or body part movements captured over time. In certain embodiments, eye, facial and body (in whole or in part) movement is used either for direct control of the functioning of the interfaces of this disclosure or a confirmatory movement for function selection and activation. In other embodiments, a full range of such data may be used in motion based processing, especially in the construction of biokinetic identifiers. For example, there are a number of physiological changes that occur when people interact with other people or with things. Such changes include, without limitation, iris dilation and constriction, eyes fixation, eye fluttering or rapid movement, eye lids blinking, changes in facial expressions, facial flushing, facial sweating, facial temperature changes, other body part sweating, other body part temperature changes, moisture content of tissue and changes in moisture content of tissue, body part poses and changes in poses over time, for scent sensors the changes may include odor, odor components, changes in odor, changes in odor components, etc., for gas sensors gas content of exhaled breath, changes gas content of exhaled breath, etc., for breathing rate sensor, the changes may include, without limitation, rate of breathing, exhalation gas patterns, nose v. mouth inhalation and exhalation patterns, etc., other changes to body part features over time, and mixtures or combinations thereof. All of these changes evidence likes, dislikes, fascination, excitement, pleasure, anger, rage, and/or any other human emotion or mixtures and combinations thereof. These attributes of body part changes do to interactions with information content may be used to assist in the motion based function selection and processing and in improving prediction of motion based function selection and processing and in tailoring the motion based interfaces for the particular user based on these changes in body part movements and poses. For example, as an interface of this disclosure is activated and a scrolling function is invoked causing a list or menu to scroll across the display or other human cognizable output device, a change in iris dilation or constriction may be used to cluster desired content from less desired content or for activation the object that corresponds to the highest amount of dilation or constriction. These same changes may be used to confirm a preliminary selection or to reject a preliminary selection. As the user interacts with the system over time, the system learns from these changes and structures the objects or content to conform with these changes. These changes may also be used in the construction of unique identifiers for new programs accessed by the user and color coding system or acoustic system may be used allowing "highlight" (color, sound, shape, pulsating, etc.) one or more objects to attract the attention of the user. The particular highlighting may be determined from general preferences—how a user in general respond to different stimuli or may be particularized based on the systems or methods learning to what particular highlighting a particular user best responds. Of course, negative responses may be used to de-emphasize objects by invoking negative highlighting—highlighting that the user would not be attracted to. As this information is kinetic, the information may be combined with the biometric and other movement attributes in the creation of unique identifiers. Thus, the systems of this disclosure may improve identifier uniqueness not only by capturing data associated with the manner of interaction with the interface, but also by using physiological responses and changes in physiological responses of a body and/or body part (e.g., physiological responses and changes in response of eyes, ears, face, mouth, lips, finger, hands, arms, shoulders, head, iris, sweat, or any other detectable change in physiological responses of bodies or body parts) to further enhance user identification. Thus, the systems of this disclosure may simply observe the user until the systems have accumulated sufficient user specific biometric, kinetic, and/or biokinetic data to construct unique identifiers so that when user activates a new application that requires a user name and password, the systems generate unique user names and passwords that are established without the user having to remember anything. The systems would simply observe the user and then all applications user names and passwords would be established by the systems of this disclosure automatically when a particular application is activated.

Mirror Guiding for Identity Construction

Embodiments of the systems and methods of this disclosure may also include the step of capturing kinetic data, biometric data, kinetic and biometric data, or kinetic, biometric, and biokinetic data based on a user performing a set of predetermined, predefined, or on-the-fly movements and from the captured data constructing unique identifiers, which may include biometric data only, kinetic data only, biokinetic only, or mixtures and combinations of two or more of the data types. In certain embodiments, the set of movements may be displayed on the display device in a mirrored format. In certain embodiments, the systems or methods cause the display device to show the user the set of movements that are needed to verify user identity. In other embodiments, the systems or methods cause the display device to show mirrored movements of the user and displaying corrected movements so that the user may adjust movements to conform to the predetermined, predefined, or on-the-fly movements until the systems or methods have captured sufficient data to verify the identity of the user based on previously stored user specific biometric data, kinetic data, biokinetic or mixtures and combinations of two or more of the data types.

For example, the systems or methods cause the display device to display in a mirror image format an image of a hand with the thumb pointing towards the screen at a slight upward angle, just above a head level. Based on the angle and position of the hand and thumb, the systems and methods cause the mirrored image to led the user to correct the movement to conform to the set of predetermined, predefined, or on-the-fly movements, i.e., the systems and methods indicate that the user should put the user's thumb in a like position to the image in the mirror, and reach for the thumb in the picture (towards the screen). As the user reached towards the thumb on the screen, the thumb began to move towards the user in the mirrored image, so that the image and my own thumb met at the screen. The systems and methods are capable of capturing information such as nail shape, size, etc. and thumb shape, size, etc., finger shape, size, etc., nail, thumb, and/or finger color, etc. Once the user's movements are conformed to the set of movements displayed on the display device, the systems and methods are capable of verifying the identity of the user, which will provide access to whatever device, website, program, system, etc., the user is attempting to activate.

One aspect of the mirroring embodiment of this disclosure relates to the fact that by showing a mirrored image, the user intuitively knows where or is guided to where to put the user's thumb, knows or is guided to a properly angle to orient the thumb, and know how or is guided as to how to move the hand and/or thumb. Once the user movements match the displayed set of movements to a sufficient degree of confidence to permit identity verification to a confidence value of greater than 90% by any known or yet invented confidence test. In other embodiments, the confidence is greater than 95%. In other embodiments, the confidence is greater than 99%. In other embodiments, the confidence is greater than 99.9%. In certain embodiment, once the movements meet the confidence test, then the hand and thumb in the mirrored image moved towards the user in a mirrored way, or rather, the displayed mirrored images were leading the user to move towards the mirrored image in a mirrored way, or a combination of both, meaning it was guiding the user in position, path, and movement. Because the user is attempting to follow the displayed images, the activity make it difficult for the user to determine if the user is following the mirrored images or the mirrored images are following the user making the experience intuitive. Technically, the procedure provides an easy and straightforward way to verify kinetic, biometric, and/or biokinetic identifiers using a guided experience—guided sets of predetermined, predefined, or on-the-fly movements. Thus, the systems and methods of this disclosure may utilize these guided set of predetermined, predefined, or on-the-fly movements mirrored in the display device to construct unique kinetic, biometric, and/or biokinetic identifiers and then to verify user identity by requiring the user to repeat the predetermined, predefined, or on-the-fly movements.

All references cited herein are incorporated by reference. Although the invention has been disclosed with reference to its embodiments, from reading this description those of skill in the art may appreciate changes and modification that may be made which do not depart from the scope and spirit of the invention as described above and claimed hereafter.

We claim:

1. A method implemented on an apparatus comprising: (a) at least one sensor or at least one sensor array, (b) at least one processing unit, and (c) at least one user interface, wherein each sensor has an active zone, wherein the sensors and/or sensor arrays comprise biokinetic sensors or, kinetic sensors and/or biometric sensors, wherein the method comprises:

detecting biometric properties and movement properties from outputs from one or more of the sensors and/or sensor arrays;

testing the detected biometric properties and/or movement properties to determine if the detected biometric properties and/or movement properties meet or exceed biometric and/or movement threshold criteria;

if the biometric properties and/or movement properties fail the biometric and/or movement test, repeating the detecting and testing steps until the biometric properties and/or movement properties pass the biometric and/or movement test;

converting the biometric properties and movement properties into kinetic data, biokinetic data, and biometric data;

generating a user specific identifier, wherein the user specific identifier including some or all of the biometric data and the kinetic data and/or the biokinetic data; and setting the generated user specific identifier for use in a user verification interface, program, website, or other verification system, wherein the biometric data comprises whole body data and/or body part data, wherein the kinetic and/or biokinetic data comprises variations, changes, and/or fluctuations of the whole body data and/or the body part data over a time period, wherein the time period is a short time frame, a medium time frame, or a long time frame, or a very long time frame, wherein the short time frame is a time duration between less than or equal to 1 ns and less than 1 µs, wherein the medium time frame is a time duration between less than or equal to 1 µs and less than 1 ms, wherein the long time frame is a time duration between less than or equal to about 1 ms and less than or equal to 1 s, and wherein the very long time frame is a time duration greater than 1 s, but less than or equal to 1 minute.

2. The method of claim 1, further comprising:

before the setting step, uniqueness testing the generated user specific identifier in a uniqueness test;

if the generated user specific identifier fails the uniqueness test, repeating generating step and the uniqueness testing step until the generated user specific identifier passes the uniqueness test.

3. The method of claim 1, further comprising:

storing the generated user specific identifier and the outputs and/or the data in a database associated with the processing unit.

4. The method of claim 3, further comprising:

after storing step, detecting new biometric properties from outputs from one or more of the sensors and/or sensor arrays and/or new movement properties from outputs from one or more of the sensors and/or sensor arrays;

converting the new biometric properties and new movement properties from the sensor outputs into new biometric data, new kinetic data, and/or new biokinetic data;

comparing the new biometric data, the new kinetic data, and/or the new biokinetic data with the stored user specific identifier;
if comparison confirms user identity, then activating the user interface for further processing otherwise stopping further processing;
sensing a first motion within the active sensing zone of one or more of the sensors or sensor arrays;
producing an output signal based on the sensed first motion;
in response to the sensed first motion, displaying, on a display device in communication with the at least one processing unit, a plurality of objects or a menu or a list of items;
converting, via the at least one processing unit, the output signal into a scroll command;
processing the scroll command corresponding to traversal through the plurality of objects or to traversal through the list or menu of items until sensing, via the at least one sensor, a second motion that is non-collinear with respect to the first motion;
producing a second output signal based on the sensed second motion;
converting, via the at least one processing unit, the second output signal into a select command;
processing the selection command corresponding to selecting a particular object from the plurality of objects or a particular item from the list or menu of items responsive to the sensed second motion; and
if the particular object or item requires a user specific identifier, retrieving the user specific identifier from the database and activating the object using the user specific identifier.

5. The method of claim 1, wherein the user specific identifier comprises a signature, a user name, a password, a verifier, an authenticator, or any combination thereof.

6. The method of claim 4, wherein the activating the user interface comprises logging into a virtual reality (VR) or an augmented reality (AR) environment and further comprises:
displaying the virtual reality (VR) or the augmented reality (AR) environment; and
interacting with the virtual reality (VR) or the augmented reality (AR) environment based on sensed motion from one or more of the sensors or sensor arrays.

7. The method of claim 1, wherein the whole body data comprises internal whole body structural data and/or external whole body structure data and wherein the body part data comprises internal body part structural data and/or external body part structure data.

8. The method of claim 7, wherein the internal whole body structural data comprises skeletal data, blood circulation data, muscular data, EEG data, EKG data, ratio of internal body parts, location of internal body parts, forms of internal body parts, structures of internal body parts, or mixtures and combinations thereof and wherein the internal body part structural data comprises body part shape, size, location, structure, form, orientation, texture, color, coloring, features, or mixtures and combinations thereof.

9. The method of claim 7, wherein the external whole body structural data comprises height, weight, posture, size, location, structure, form, orientation, texture, color, coloring, features, ratio of body parts, location of body parts, forms of body parts, structures of body parts, brain waves, brain wave patterns, temperature distributions, aura data, bioelectric and/or biomagnetic data, or mixtures and combinations thereof and wherein the external body part structural data comprises body part shape, size, location, structure, form, orientation, texture, color, coloring, features, auditory data, retinal data, finger print data, palm print data, or mixtures and combinations thereof.

10. The method of claim 9, wherein the body part or the body parts are selected from the group consisting of a leg, an arm, a hand, a wrist, a finger, a foot, a toe, an eyes, a mouth, a joint, an ear, a face, a lip, a shoulder, a head, an iris, a cheek, a tongue, a thumb, and combinations thereof.

11. The method of claim 1, wherein:
the whole body data comprises internal whole body structural data and/or external whole body structure data,
the body part data comprises internal body part structural data and/or external body part structure data,
the body part or the body parts are selected from the group consisting of a leg, an arm, a hand, a wrist, a finger, a foot, a toe, an eyes, a mouth, a joint, an ear, a face, a lip, a shoulder, a head, an iris, a cheek, a tongue, a thumb, and combinations thereof.

12. The method of claim 11, wherein:
the internal whole body structural data comprises skeletal data, blood circulation data, muscular data, EEG data, EKG data, ratio of internal body parts, location of internal body parts, forms of internal body parts, structures of internal body parts, or mixtures and combinations thereof and
the internal body part structural data comprises body part shape, size, location, structure, form, orientation, texture, color, coloring, features, or mixtures and combinations thereof.

13. The method of claim 11, wherein:
the external whole body structural data comprises height, weight, posture, size, location, structure, form, orientation, texture, color, coloring, features, ratio of body parts, location of body parts, forms of body parts, structures of body parts, brain waves, brain wave patterns, temperature distributions, aura data, bioelectric and/or biomagnetic data, or mixtures and combinations thereof and
the external body part structural data comprises body part shape, size, location, structure, form, orientation, texture, color, coloring, features, auditory data, retinal data, finger print data, palm print data, or mixtures and combinations thereof.

14. The method of claim 1, wherein:
the body parts comprise two fingers held tightly together and gaps between the tightly held fingers, and
the kinetic and/or biokinetic data comprise variation, changes or fluctuation of the is the fingers and gaps of the time period.

15. An apparatus comprising:
an interface including one sensor or sensor array or a plurality of sensors or sensor arrays, at least one processor, and a display device, and configured to:
detect biometric properties and movement properties by one or more of the sensors and/or sensor arrays;
test the detected biometric properties and/or movement properties to determine if the detected biometric properties and/or movement properties meet or exceed biometric and/or movement threshold criteria;
if the detected biometric properties and/or movement properties fail the biometric and/or movement test, then repeat the detect and the test until the biometric properties and/or movement properties pass the biometric and/or movement test, wherein the biometric properties and movement properties comprise kinetic data and/or biokinetic data, and biometric data; and the at least one processor is configured to:
generate a user specific identifier, where the user specific identifier including some or all of the biometric data, kinetic data, and biokinetic data;
set the generated user specific identifier for use in a virtual reality (VR) or augmented reality (AR) environment; and
log into, take control of, or interact with the virtual reality (VR) or augmented reality (AR) environment using the user specific identifier,
wherein the biometric data comprises whole body data and/or body part data,
wherein the kinetic and/or biokinetic data comprises variations, changes, and/or fluctuations of the whole body data and/or body part data over a time period,
wherein the time period is a short time frame, a medium time frame, a long time frame, or a very long time frame,
wherein the short time frame is a time duration between less than or equal to 1 ns and less than 1 µs,
wherein the medium time frame is a time duration between less than or equal to 1 µs and less than 1 ms,
wherein the long time frame is a time duration between less than or equal to about 1 ms and less than or equal to 1 s, and
wherein the very long time frame is a time duration greater than 1 s, but less than or equal to 1 minute.

16. The apparatus of claim 15, wherein:
the interface is further configured to:
sense a first input corresponding to a first sensed movement within an active zone of one of the sensors or arrays; and
produce an output signal corresponding to the first sensed movement; and
the processor is further configured to:
initiate the display device and display the virtual reality (VR) or the augmented reality (AR) environment,
display a first menu or a plurality of selectable objects in response to the first input, the first menu including the one or a plurality of selectable items; and
initiate, at the display device, an indication that a particular selectable object or item has been selected and activated based on the first input.

17. The apparatus of claim 16, further comprising:
an input device, and/or
wherein the interface is further configured to:
sense a further input corresponding to a further sensed movement; and
produce an output signal corresponding to the further sensed movement; and
the processor is further configured to:
prior to activating the particular selectable object or item, confirm the selection the particular selectable object or item,
wherein the further input is received from the motion sensors or sensor arrays or from an input device.

18. The apparatus of claim 17, wherein the input device and at least one of the motion sensors comprises an eye tracking device.

19. The apparatus of claim 1, wherein the first input is received from the one sensor or sensor array of a plurality of sensors or sensor arrays and wherein the second input is received from a second input device that is distinct from the one sensor or senor array or a plurality of sensors or sensor arrays.

20. The apparatus of claim 15, wherein:
the whole body data comprises internal whole body structural data and/or external whole body structure data,
the body part data comprises internal body part structural data and/or external body part structure data,
the body part or the body parts are selected from the group consisting of a leg, an arm, a hand, a wrist, a finger, a foot, a toe, an eyes, a mouth, a joint, an ear, a face, a lip, a shoulder, a head, an iris, a cheek, a tongue, a thumb, and combinations thereof.

21. The apparatus of claim 20, wherein:
the internal whole body structural data comprises skeletal data, blood circulation data, muscular data, EEG data, EKG data, ratio of internal body parts, location of internal body parts, forms of internal body parts, structures of internal body parts, or mixtures and combinations thereof and
the internal body part structural data comprises body part shape, size, location, structure, form, orientation, texture, color, coloring, features, or mixtures and combinations thereof.

22. The apparatus of claim 20, wherein:
the external whole body structural data comprises height, weight, posture, size, location, structure, form, orientation, texture, color, coloring, features, ratio of body parts, location of body parts, forms of body parts, structures of body parts, brain waves, brain wave patterns, temperature distributions, aura data, bioelectric and/or biomagnetic data, or mixtures and combinations thereof and
the external body part structural data comprises body part shape, size, location, structure, form, orientation, texture, color, coloring, features, auditory data, retinal data, finger print data, palm print data, or mixtures and combinations thereof.

23. A method comprising:
detecting biometric properties and movement properties by one sensor and/or sensor array or a plurality of the sensors and/or sensor arrays associated with a mobile device including a touch screen or a display device;
testing the detected biometric properties and/or movement properties to determine if the detected biometric properties and/or movement properties meet or exceed biometric property and/or movement property threshold criteria;
if the detected biometric properties and/or movement properties fail the biometric and/or movement test, then repeating the detecting and testing steps until the biometric properties and/or movement properties pass the biometric and/or movement test, wherein the biometric properties and the movement properties include kinetic data, biokinetic data, and biometric data;
generating a user specific identifier, wherein the user specific identifier including some or all of biometric data, kinetic data, and biokinetic data;
setting and storing, in a database associated with the at least one processing unit, the generated user specific identifier;
logging into a virtual reality (VR) or augmented reality (AR) environment using the user specific identifier;
receiving first input at the touchscreen of the mobile device;

displaying a first menu on the touchscreen in response to the first input, the first menu including a plurality of selectable items;
receiving, at the touchscreen while the first menu is displayed on the touchscreen, a second input corresponding to a particular biometric property and/or movement in a particular direction; and
determining, based on the particular biometric property or the particular direction, that the second input corresponds to a selection of a particular selectable item of the plurality of selectable items and/or attributes,
wherein the biometric data comprises whole body data and/or body part data,
wherein the kinetic and/or biokinetic data comprises variations, changes, and/or fluctuations of the whole body data and/or body part data over a time period,
wherein the time period is a short time frame, a medium time frame, a long time frame, or a very long time frame,
wherein the short time frame is a time duration between less than or equal to 1 ns and less than 1 μs,
wherein the medium time frame is a time duration between less than or equal to 1 μs and less than 1 ms,
wherein the long time frame is a time duration between less than or equal to about 1 ms and less than or equal to 1 s, and
wherein the very long time frame is a time duration greater than 1 s, but less than or equal to 1 minute.

24. The method of claim 23, wherein:
the whole body data comprises internal whole body structural data and/or external whole body structure data,
the body part data comprises internal body part structural data and/or external body part structure data,
the body part or the body parts are selected from the group consisting of a leg, an arm, a hand, a wrist, a finger, a foot, a toe, an eyes, a mouth, a joint, an ear, a face, a lip, a shoulder, a head, an iris, a cheek, a tongue, a thumb, and combinations thereof.

25. The method of claim 24, wherein:
the internal whole body structural data comprises skeletal data, blood circulation data, muscular data, EEG data, EKG data, ratio of internal body parts, location of internal body parts, forms of internal body parts, structures of internal body parts, or mixtures and combinations thereof and
the internal body part structural data comprises body part shape, size, location, structure, form, orientation, texture, color, coloring, features, or mixtures and combinations thereof.

26. The method of claim 24, wherein:
the external whole body structural data comprises height, weight, posture, size, location, structure, form, orientation, texture, color, coloring, features, ratio of body parts, location of body parts, forms of body parts, structures of body parts, brain waves, brain wave patterns, temperature distributions, aura data, bioelectric and/or biomagnetic data, or mixtures and combinations thereof and
the external body part structural data comprises body part shape, size, location, structure, form, orientation, texture, color, coloring, features, auditory data, retinal data, finger print data, palm print data, or mixtures and combinations thereof.

27. A mobile device comprising:
a touchscreen; and
a processor configured to:
detect biometric properties and movement properties by one sensor and/or sensor array or a plurality of the sensors and/or sensor arrays associated with the mobile device and/or the touchscreen;
test the detected biometric properties and/or movement properties to determine if the detected biometric properties and/or movement properties meet or exceed biometric property and/or movement property threshold criteria;
if the detected biometric properties and/or movement properties fail the threshold criteria test, then repeat the detect and test until the biometric properties and/or movement properties pass the biometric and/or movement threshold criteria test,
wherein the biometric properties and movement properties include kinetic data, biokinetic data, and biometric data;
generate a user specific identifier, wherein the user specific identifier including some or all of the biometric data, kinetic data, and biokinetic data;
set the generated user specific identifier;
store the generated user specific identifier in a user identifier database; and
use the stored user specific identifier to log into, take control of, or interact with a virtual reality (VR) or an augmented reality (AR) environment,
wherein the biometric data comprises whole body data and/or body part data,
wherein the kinetic and/or biokinetic data comprises variations, changes, and/or fluctuations of the whole body data and/or body part data over a time period,
wherein the time period is a short time frame, a medium time frame, a long time frame, or a very long time frame,
wherein the short time frame is a time duration between less than or equal to 1 ns and less than 1 μs,
wherein the medium time frame is a time duration between less than or equal to 1 μs and less than 1 ms,
wherein the long time frame is a time duration between less than or equal to about 1 ms and less than or equal to 1 s, and
wherein the very long time frame is a time duration greater than 1 s, but less than or equal to 1 minute.

28. The mobile device of claim 27, wherein:
the processor is further configured to be:
responsive to first input at the touchscreen, initiate display of or interaction with a first menu, object(s), or attribute(s) on the touchscreen, the first menu including a plurality of selectable items; and
responsive to second input corresponding to movement in a particular direction while the first menu is displayed on the touchscreen, determine based on the particular direction that the second input corresponds to a selection of a particular selectable item of the plurality of selectable items.

29. The mobile device of claim 27, wherein the touchscreen and the processor are integrated into a mobile phone, or wherein the touchscreen and the processor are integrated into a tablet computer, or the touchscreen and the processor are integrated into a wearable device.

30. The mobile device of claim 27, wherein:
the whole body data comprises internal whole body structural data and/or external whole body structure data,
the body part data comprises internal body part structural data and/or external body part structure data, and the body part or the body parts are selected from the group consisting of a leg, an arm, a hand, a wrist, a finger, a foot, a toe, an eyes, a mouth, a joint, an ear, a face, a lip, a shoulder, a head, an iris, a cheek, a tongue, a thumb, and combinations thereof.

31. The mobile device of claim 30, wherein:

the internal whole body structural data comprises skeletal data, blood circulation data, muscular data, EEG data, EKG data, ratio of internal body parts, location of internal body parts, forms of internal body parts, structures of internal body parts, or mixtures and combinations thereof and the internal body part structural data comprises body part shape, size, location, structure, form, orientation, texture, color, coloring, features, or mixtures and combinations thereof.

32. The mobile device of claim 30, wherein:

the external whole body structural data comprises height, weight, posture, size, location, structure, form, orientation, texture, color, coloring, features, ratio of body parts, location of body parts, forms of body parts, structures of body parts, brain waves, brain wave patterns, temperature distributions, aura data, bioelectric and/or biomagnetic data, or mixtures and combinations thereof and the external body part structural data comprises body part shape, size, location, structure, form, orientation, texture, color, coloring, features, auditory data, retinal data, finger print data, palm print data, or mixtures and combinations thereof.

* * * * *